US007945495B2

(12) United States Patent
Hill et al.

(10) Patent No.: US 7,945,495 B2

(45) Date of Patent: May 17, 2011

(54) INTEGRATED ON-LINE SYSTEM FOR IDENTIFYING AND VALUING FORECLOSURE PROPERTIES

(75) Inventors: Bernard C. Hill, Glencoe, MN (US); David L. Casper, West St. Paul, MN (US)

(73) Assignee: MT One, Inc., West St Paul, MN (US)

( * ) Notice: Subject to any disclaimer, the term of this patent is extended or adjusted under 35 U.S.C. 154(b) by 1728 days.

(21) Appl. No.: 11/057,115

(22) Filed: Feb. 11, 2005

(65) Prior Publication Data

US 2005/0262016 A1 Nov. 24, 2005

Related U.S. Application Data

(60) Provisional application No. 60/543,795, filed on Feb. 11, 2004.

(51) Int. Cl.
*G06Q 40/00* (2006.01)

(52) U.S. Cl. .............................. 705/35; 705/1.1; 705/38

(58) Field of Classification Search ........... 705/1, 35–45
See application file for complete search history.

(56) References Cited

U.S. PATENT DOCUMENTS

| | | | | |
|---|---|---|---|---|
| 5,930,775 | A * | 7/1999 | McCauley et al. | 705/36 R |
| 6,643,625 | B1 * | 11/2003 | Acosta et al. | 705/38 |
| 2001/0056407 | A1 * | 12/2001 | Williams | 705/52 |
| 2002/0103669 | A1 * | 8/2002 | Sullivan et al. | 705/1 |
| 2003/0144948 | A1 * | 7/2003 | Cleary et al. | 705/38 |
| 2004/0010443 | A1 | 1/2004 | May et al. | 705/10 |
| 2004/0044696 | A1 * | 3/2004 | Frost | 707/200 |
| 2004/0243507 | A1 * | 12/2004 | Deane et al. | 705/38 |

* cited by examiner

*Primary Examiner* — Sarah M Monfeldt

(74) *Attorney, Agent, or Firm* — Mark A Litman & Associates, P.A.

(57) ABSTRACT

A system and method coordinates data and providing information to an external subscriber to the system relating to at least one foreclosure real estate transaction. The system comprises: (a) a centralized transaction coordination system for accessing a transaction database; (b) at least one interface device for accessing said transaction coordination system, each interface device associated with a party to said real estate transaction; (c) information relevant to said real estate transaction being provided directly to said transaction coordination system by at least one information originating party originating said information; (d) said information being stored in said transaction database; and (e) said information being accessible by at least one party having registered access to said real estate transaction database using said at least one interface device to access said transaction coordination system, the system comprising software enabling the creation and transmission of jurisdictionally required notice of a foreclosure based upon information input to the data base by authorized sources.

4 Claims, 103 Drawing Sheets

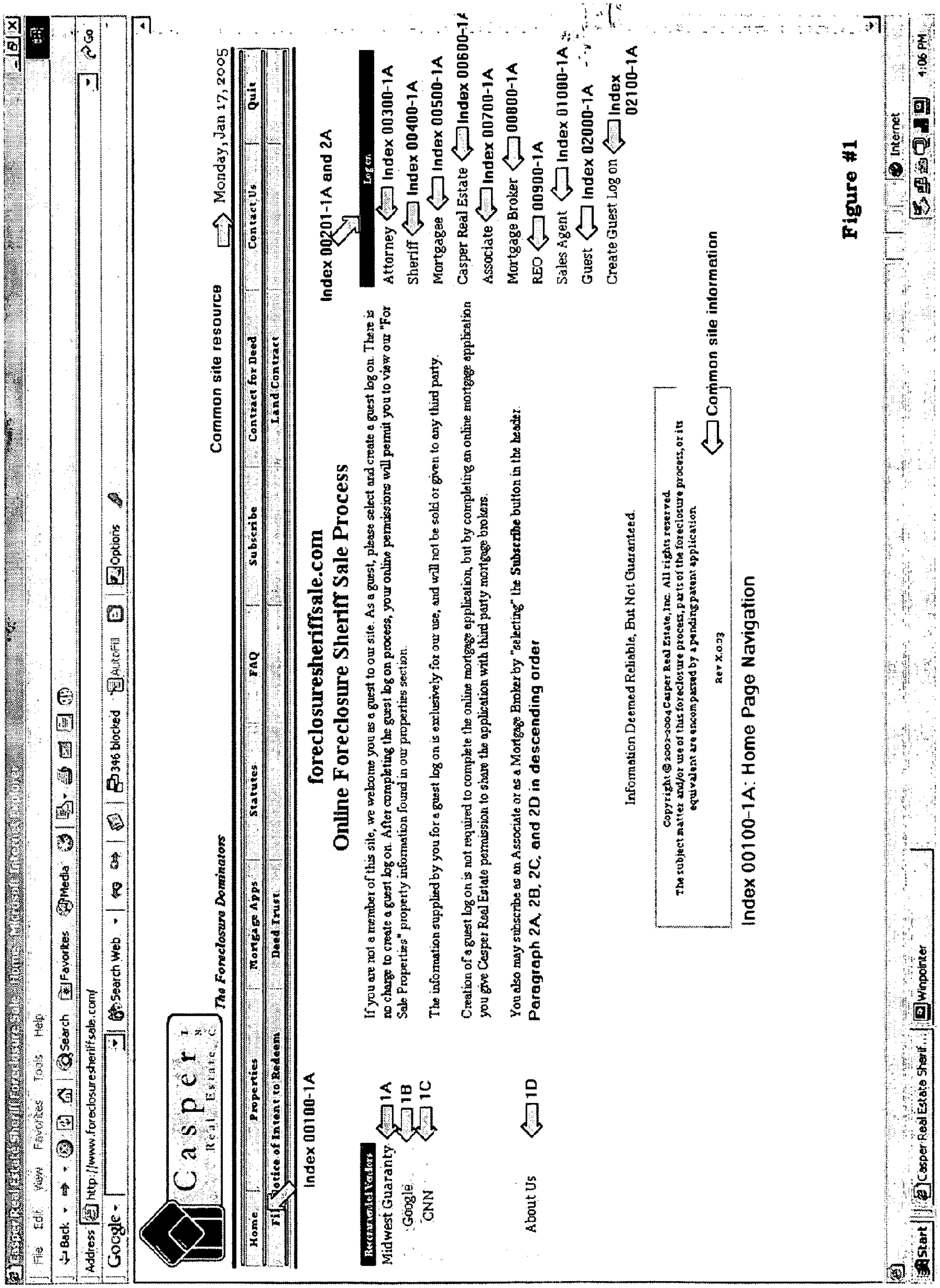
Figure #1

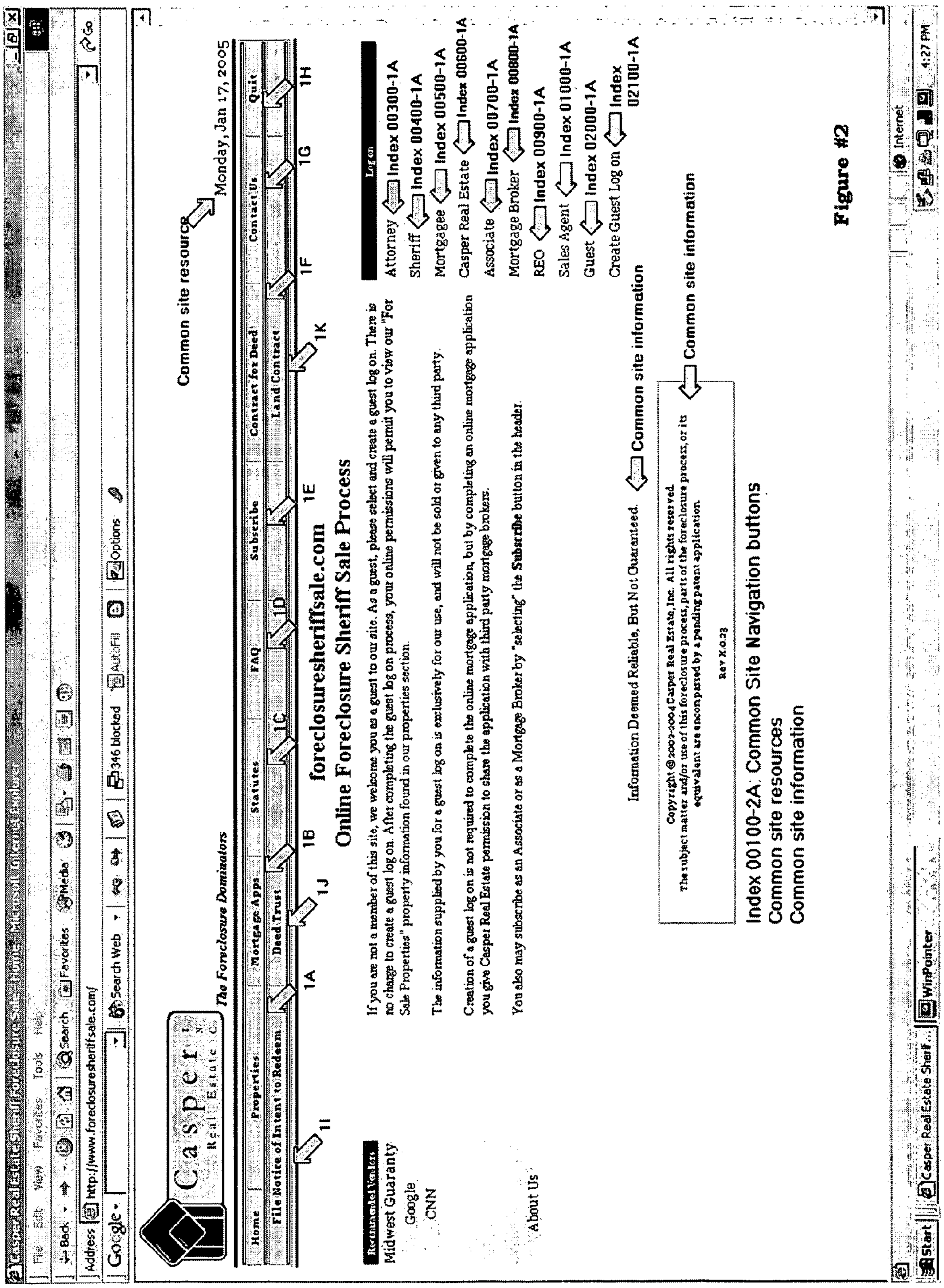
Figure #2

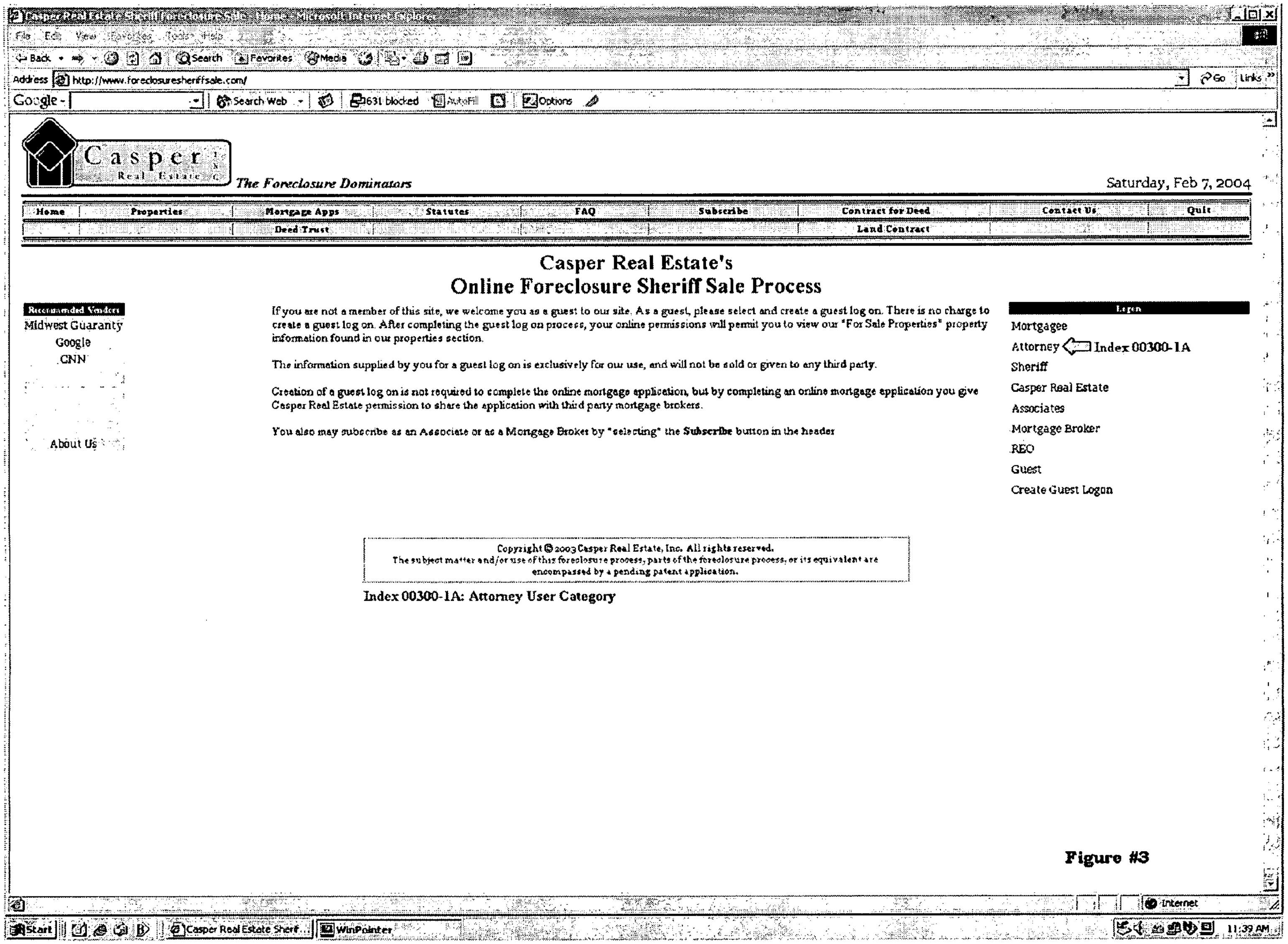
Figure #3

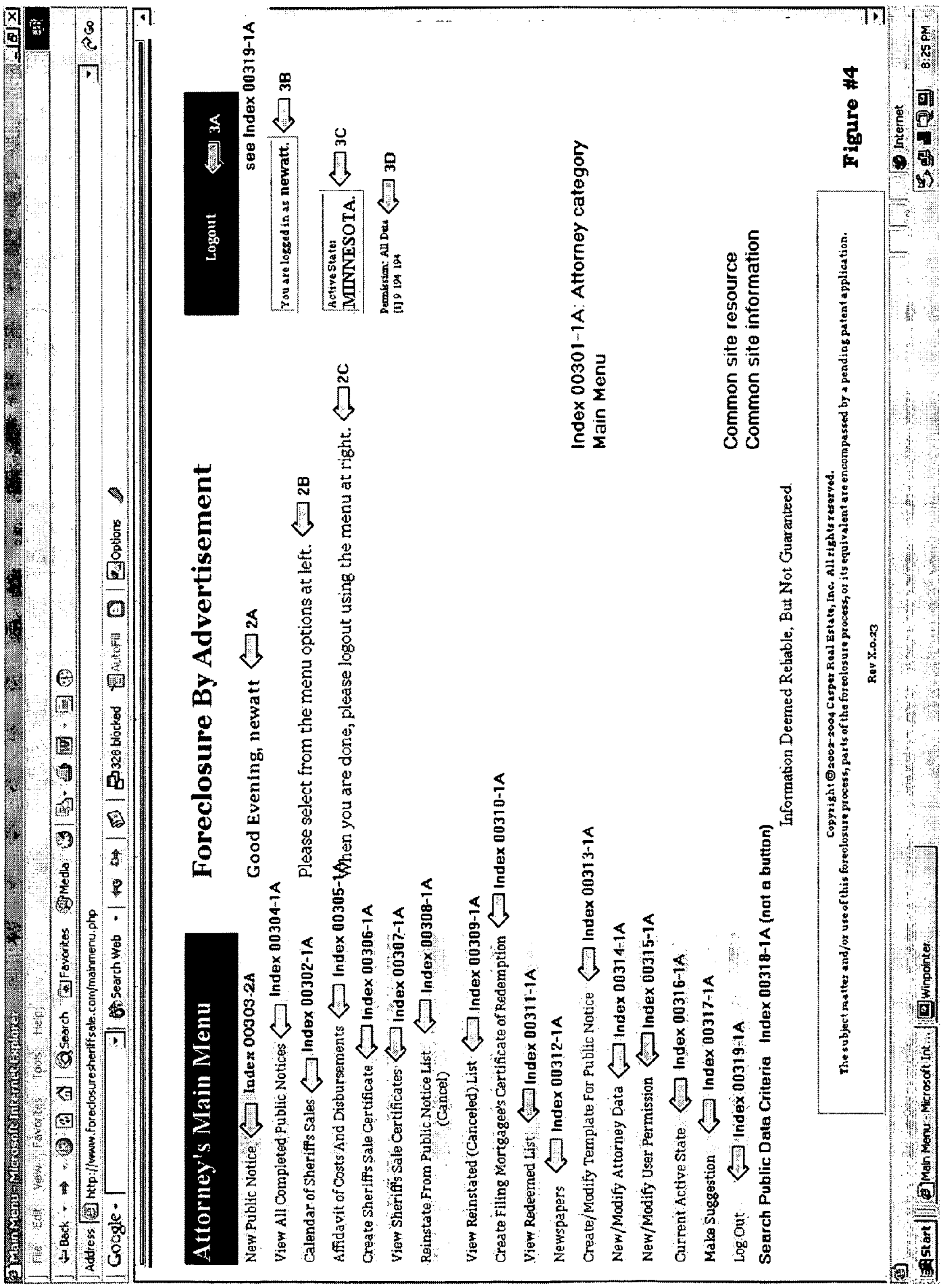
Figure #4

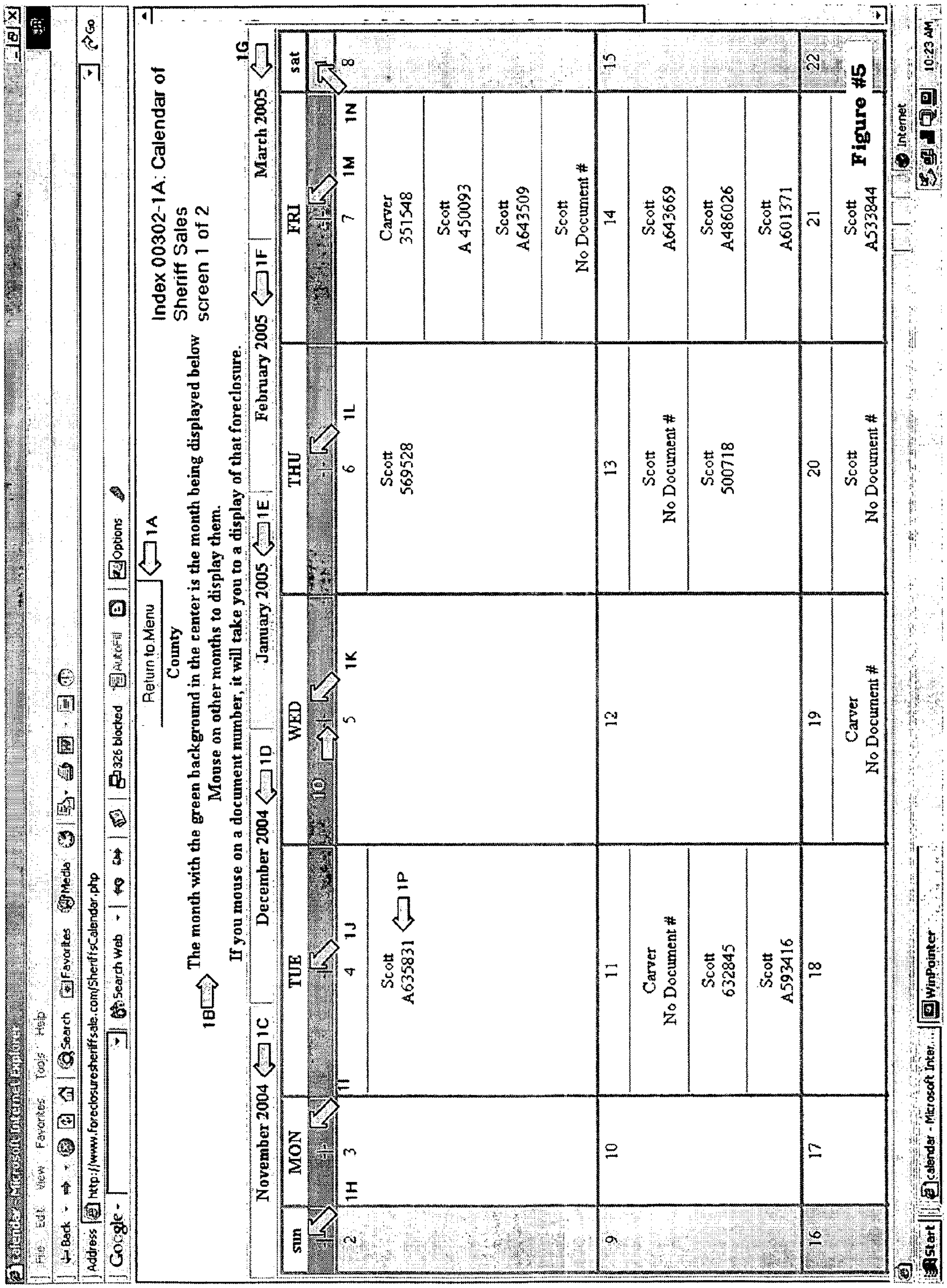
Index 00302-1A: Calendar of Sheriff Sales screen 1 of 2
Return to Menu
County
1A
1B
The month with the green background in the center is the month being displayed below
Mouse on other months to display them.
If you mouse on a document number, it will take you to a display of that foreclosure.
November 2004
1C
December 2004
1D
January 2005
1E
February 2005
1F
March 2005
1G
sun
MON
TUE
WED
THU
FRI
sat
1H
1I
1J
1K
1L
1M
1N
1O
1P
Scott
A635831
Scott
569528
Carver
351548
Scott
A 450093
Scott
A643509
Scott
No Document #
Carver
No Document #
Scott
632845
Scott
A593416
Scott
No Document #
Scott
500718
Scott
A643669
Scott
A486026
Scott
A601371
Carver
No Document #
Scott
No Document #
Scott
A533844
Figure #5

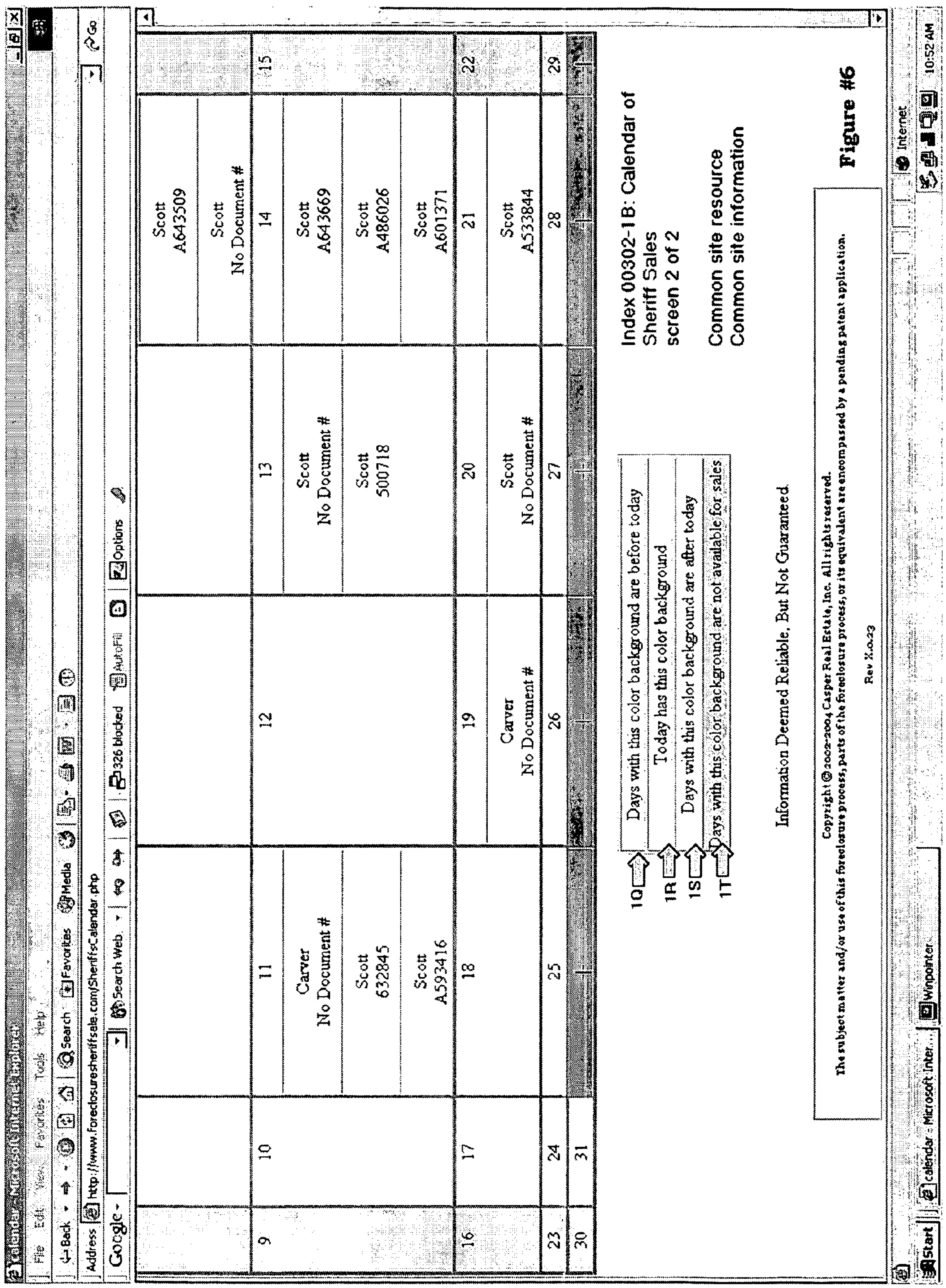
Calendar - Microsoft Internet Explorer
File Edit View Favorites Tools Help
Address http://www.foreclosuresheriffsale.com/SheriffsCalendar.php
Google
Search Web
326 blocked
AutoFill
Options
9
10
11
Carver
No Document #
Scott
632845
Scott
A593416
12
13
Scott
No Document #
Scott
500718
14
Scott
A643509
Scott
No Document #
Scott
A643669
Scott
A486026
Scott
A601371
15
16
17
18
19
20
21
22
Carver
No Document #
Scott
No Document #
Scott
A533844
23
24
25
26
27
28
29
30
31
1Q
Days with this color background are before today
1R
Today has this color background
1S
Days with this color background are after today
1T
Days with this color background are not available for sales
Index 00302-1B: Calendar of Sheriff Sales screen 2 of 2
Common site resource
Common site information
Information Deemed Reliable, But Not Guaranteed.
Copyright © 2002-2004 Casper Real Estate, Inc. All rights reserved.
The subject matter and/or use of this foreclosure process, parts of the foreclosure process, or its equivalent are encompassed by a pending patent application.
Rev X.0.23
Figure #6
Internet
Start
Calendar - Microsoft Inter...
Winpointer
10:52 AM

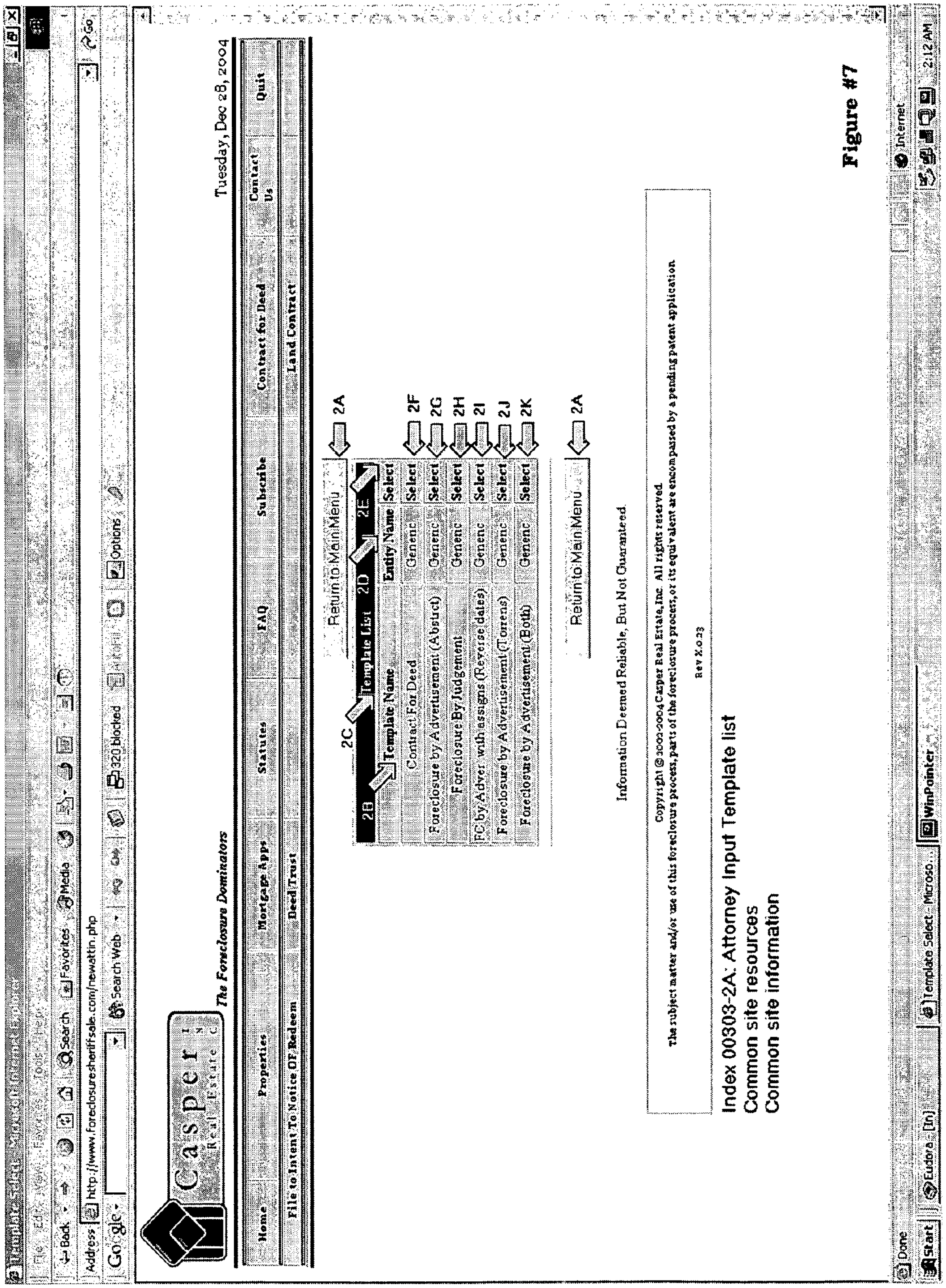
Template Select - Microsoft Internet Explorer
http://www.foreclosuresheriffsale.com/newattn.php
Casper Real Estate
The Foreclosure Dominators
Tuesday, Dec 28, 2004
Home
Properties
Mortgage Apps
Statutes
FAQ
Subscribe
Contract for Deed
Contact Us
Quit
File to Intent To Notice Of Redeem
Deed Trust
Land Contract
Return to Main Menu
Template List
Template Name
Entity Name
Select
Contract For Deed
Foreclosure by Advertisement (Abstract)
Foreclosure By Judgement
FC by Adver with assigns (Reverse dates)
Foreclosure by Advertisement (Torrens)
Foreclosure by Advertisement (Both)
Generic
2A
2B
2C
2D
2E
2F
2G
2H
2I
2J
2K
Information Deemed Reliable, But Not Guaranteed.
Copyright © 2002-2004 Casper Real Estate, Inc. All rights reserved
The subject matter and/or use of this foreclosure process, parts of the foreclosure process, or its equivalent are encompassed by a pending patent application
Rev X.0.23
Index 00303-2A: Attorney Input Template list
Common site resources
Common site information
Figure #7

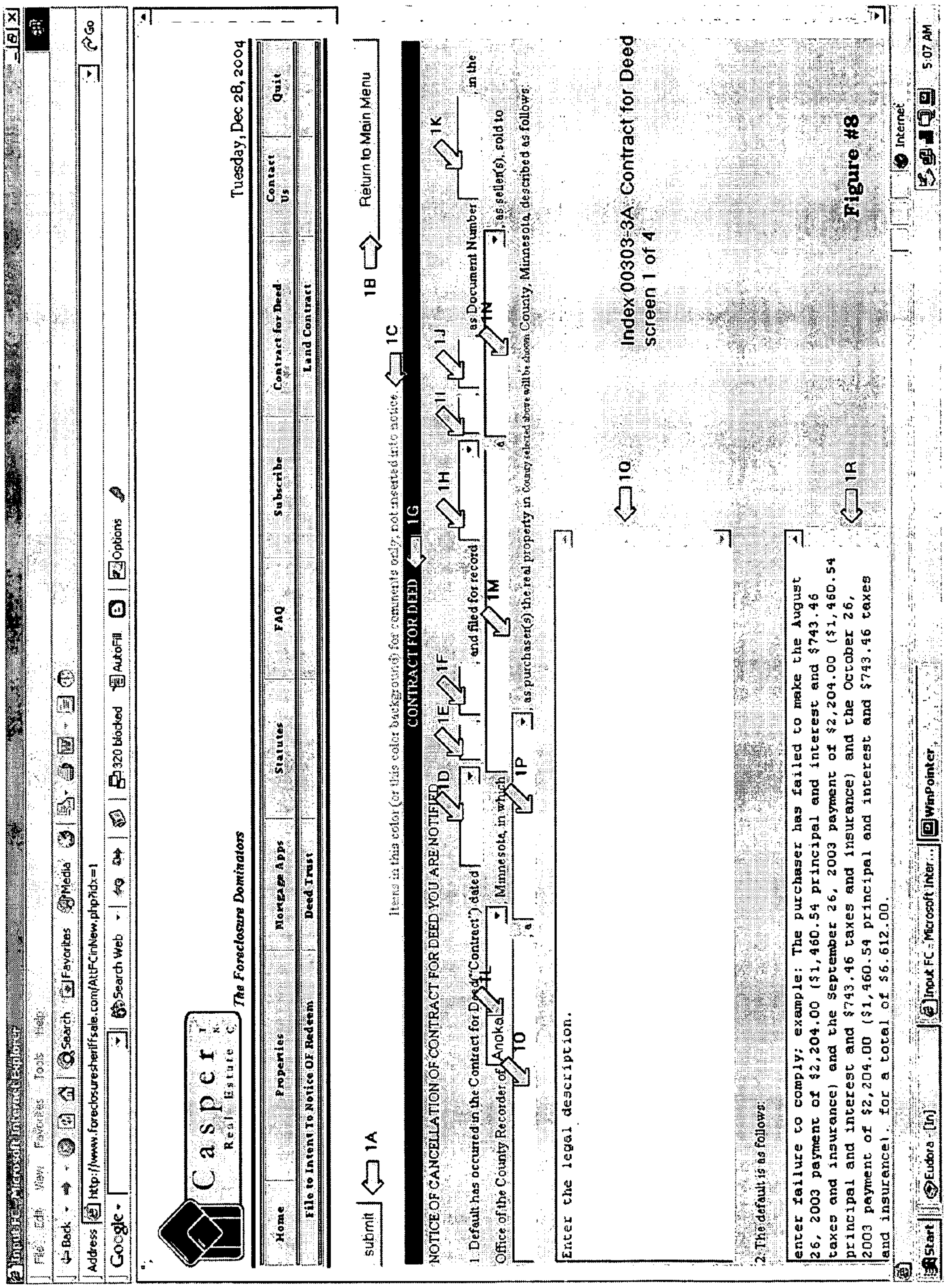
Figure #8

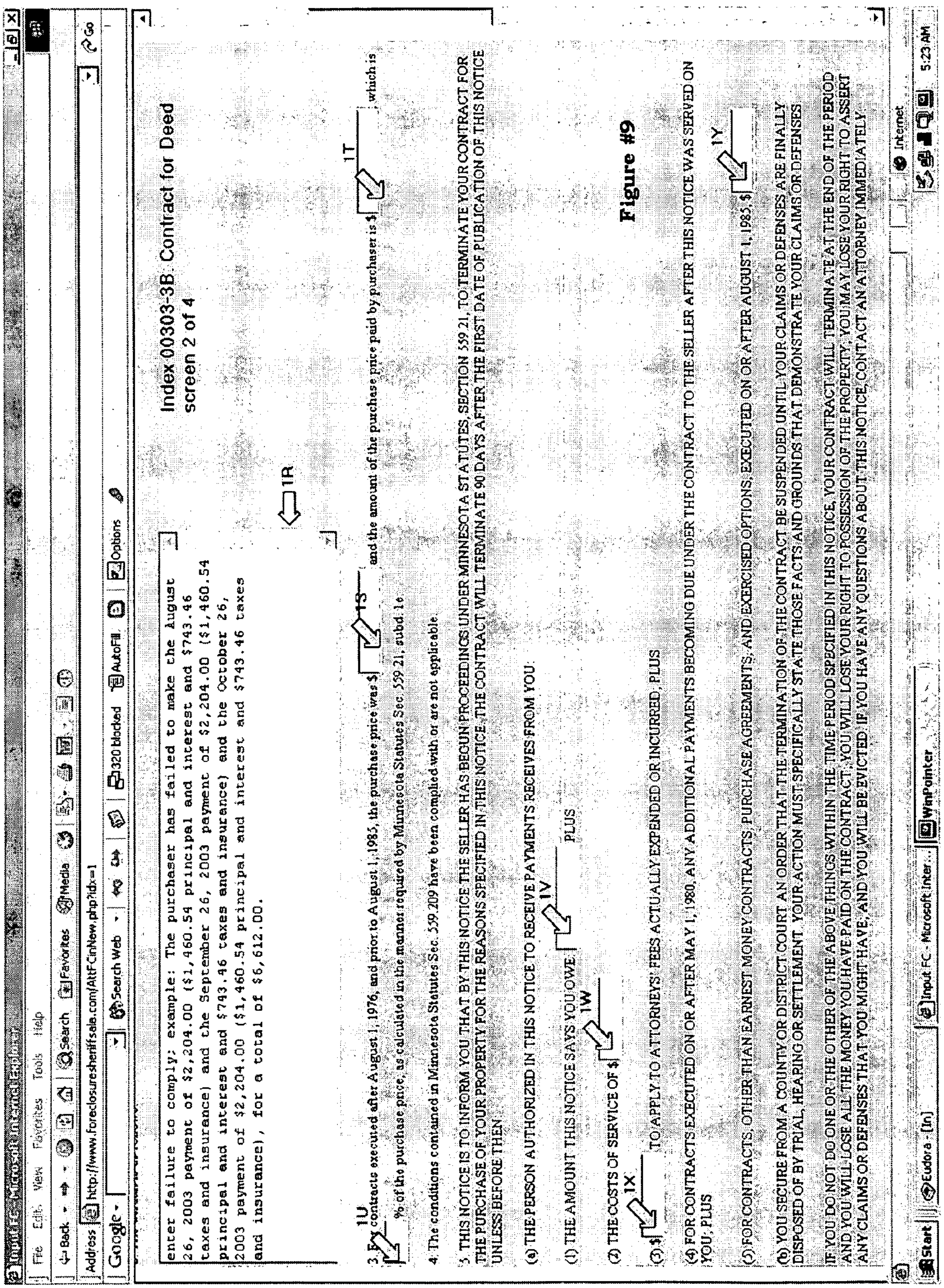
Input FC - Microsoft Internet Explorer
File Edit View Favorites Tools Help
Address http://www.foreclosuresheriffsale.com/AttFCinNew.php?idx=1
Index 00303-3B: Contract for Deed
screen 2 of 4
enter failure to comply: example: The purchaser has failed to make the August 26, 2003 payment of $2,204.00 ($1,460.54 principal and interest and $743.46 taxes and insurance) and the September 26, 2003 payment of $2,204.00 ($1,460.54 principal and interest and $743.46 taxes and insurance) and the October 26, 2003 payment of $2,204.00 ($1,460.54 principal and interest and $743.46 taxes and insurance), for a total of $6,612.00.
1R
1S
1T
1U
3. For contracts executed after August 1, 1976, and prior to August 1, 1985, the purchase price was $ and the amount of the purchase price paid by purchaser is $ which is % of the purchase price, as calculated in the manner required by Minnesota Statutes Sec. 559.21, subd. 1e.
4. The conditions contained in Minnesota Statutes Sec. 559.209 have been complied with or are not applicable.
5. THIS NOTICE IS TO INFORM YOU THAT BY THIS NOTICE THE SELLER HAS BEGUN PROCEEDINGS UNDER MINNESOTA STATUTES, SECTION 559.21, TO TERMINATE YOUR CONTRACT FOR THE PURCHASE OF YOUR PROPERTY FOR THE REASONS SPECIFIED IN THIS NOTICE. THE CONTRACT WILL TERMINATE 90 DAYS AFTER THE FIRST DATE OF PUBLICATION OF THIS NOTICE UNLESS BEFORE THEN:
(a) THE PERSON AUTHORIZED IN THIS NOTICE TO RECEIVE PAYMENTS RECEIVES FROM YOU:
(1) THE AMOUNT THIS NOTICE SAYS YOU OWE PLUS
1V
1W
(2) THE COSTS OF SERVICE OF $
1X
(3) $ TO APPLY TO ATTORNEYS' FEES ACTUALLY EXPENDED OR INCURRED; PLUS
(4) FOR CONTRACTS EXECUTED ON OR AFTER MAY 1, 1980, ANY ADDITIONAL PAYMENTS BECOMING DUE UNDER THE CONTRACT TO THE SELLER AFTER THIS NOTICE WAS SERVED ON YOU; PLUS
Figure #9
(5) FOR CONTRACTS, OTHER THAN EARNEST MONEY CONTRACTS, PURCHASE AGREEMENTS, AND EXERCISED OPTIONS, EXECUTED ON OR AFTER AUGUST 1, 1985, $
1Y
(b) YOU SECURE FROM A COUNTY OR DISTRICT COURT AN ORDER THAT THE TERMINATION OF THE CONTRACT BE SUSPENDED UNTIL YOUR CLAIMS OR DEFENSES ARE FINALLY DISPOSED OF BY TRIAL, HEARING OR SETTLEMENT. YOUR ACTION MUST SPECIFICALLY STATE THOSE FACTS AND GROUNDS THAT DEMONSTRATE YOUR CLAIMS OR DEFENSES.
IF YOU DO NOT DO ONE OR THE OTHER OF THE ABOVE THINGS WITHIN THE TIME PERIOD SPECIFIED IN THIS NOTICE, YOUR CONTRACT WILL TERMINATE AT THE END OF THE PERIOD AND YOU WILL LOSE ALL THE MONEY YOU HAVE PAID ON THE CONTRACT, YOU WILL LOSE YOUR RIGHT TO POSSESSION OF THE PROPERTY, YOU MAY LOSE YOUR RIGHT TO ASSERT ANY CLAIMS OR DEFENSES THAT YOU MIGHT HAVE, AND YOU WILL BE EVICTED IF YOU HAVE ANY QUESTIONS ABOUT THIS NOTICE, CONTACT AN ATTORNEY IMMEDIATELY.

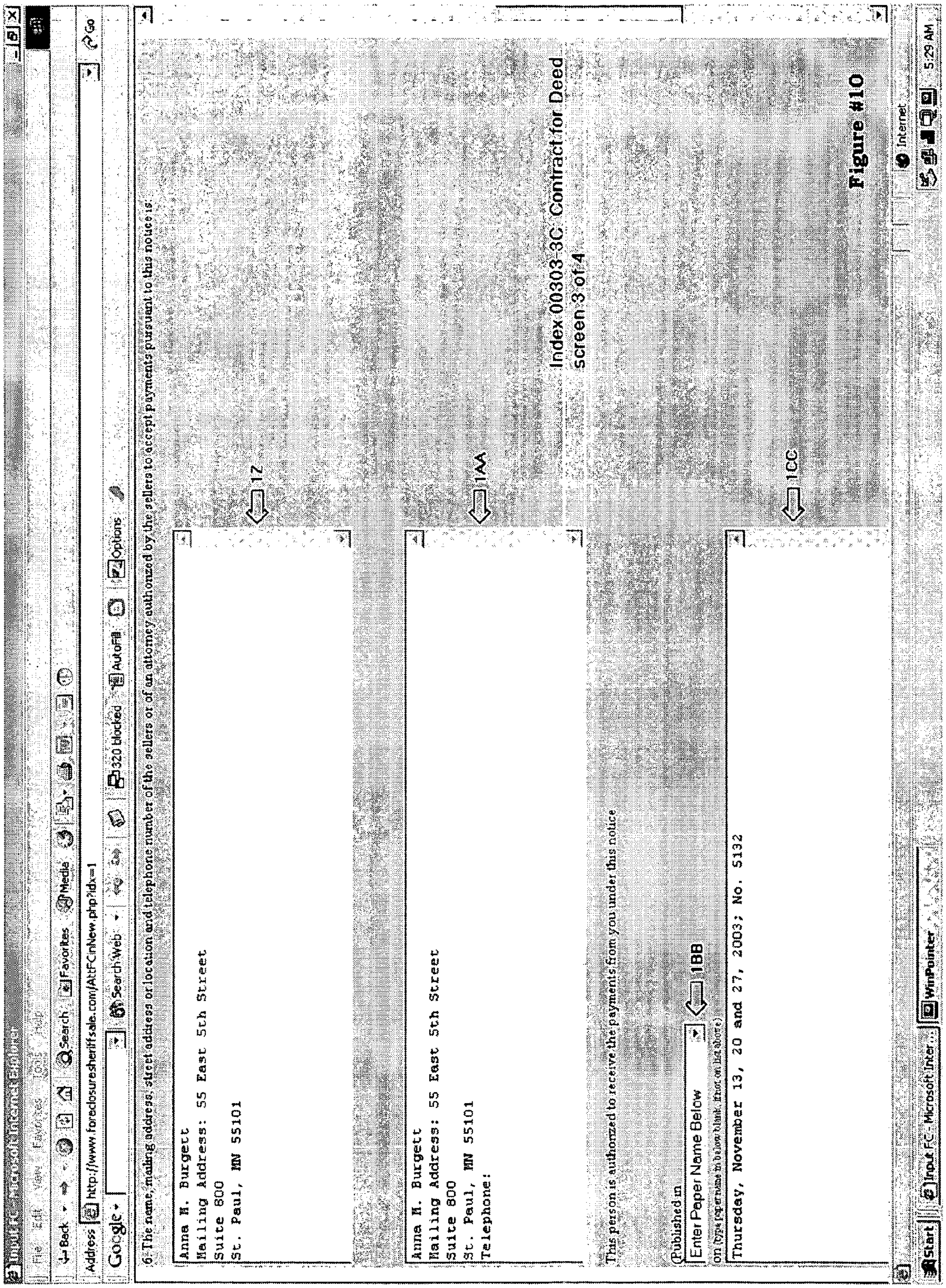
Input FC - Microsoft Internet Explorer
File Edit View Favorites Tools Help
Address http://www.foreclosuresheriffsale.com/AttFCinNew.php?idx=1
6. The name, mailing address, street address or location and telephone number of the sellers or of an attorney authorized by the sellers to accept payments pursuant to this notice is:
Anna M. Burgett
Mailing Address: 55 East 5th Street
Suite 800
St. Paul, MN 55101
1Z
Anna M. Burgett
Mailing Address: 55 East 5th Street
Suite 800
St. Paul, MN 55101
Telephone:
1AA
This person is authorized to receive the payments from you under this notice
Published in
Enter Paper Name Below
1BB
Thursday, November 13, 20 and 27, 2003; No. 5132
1CC
Index 00303-3C Contract for Deed
screen 3 of 4
Figure #10
5:29 AM

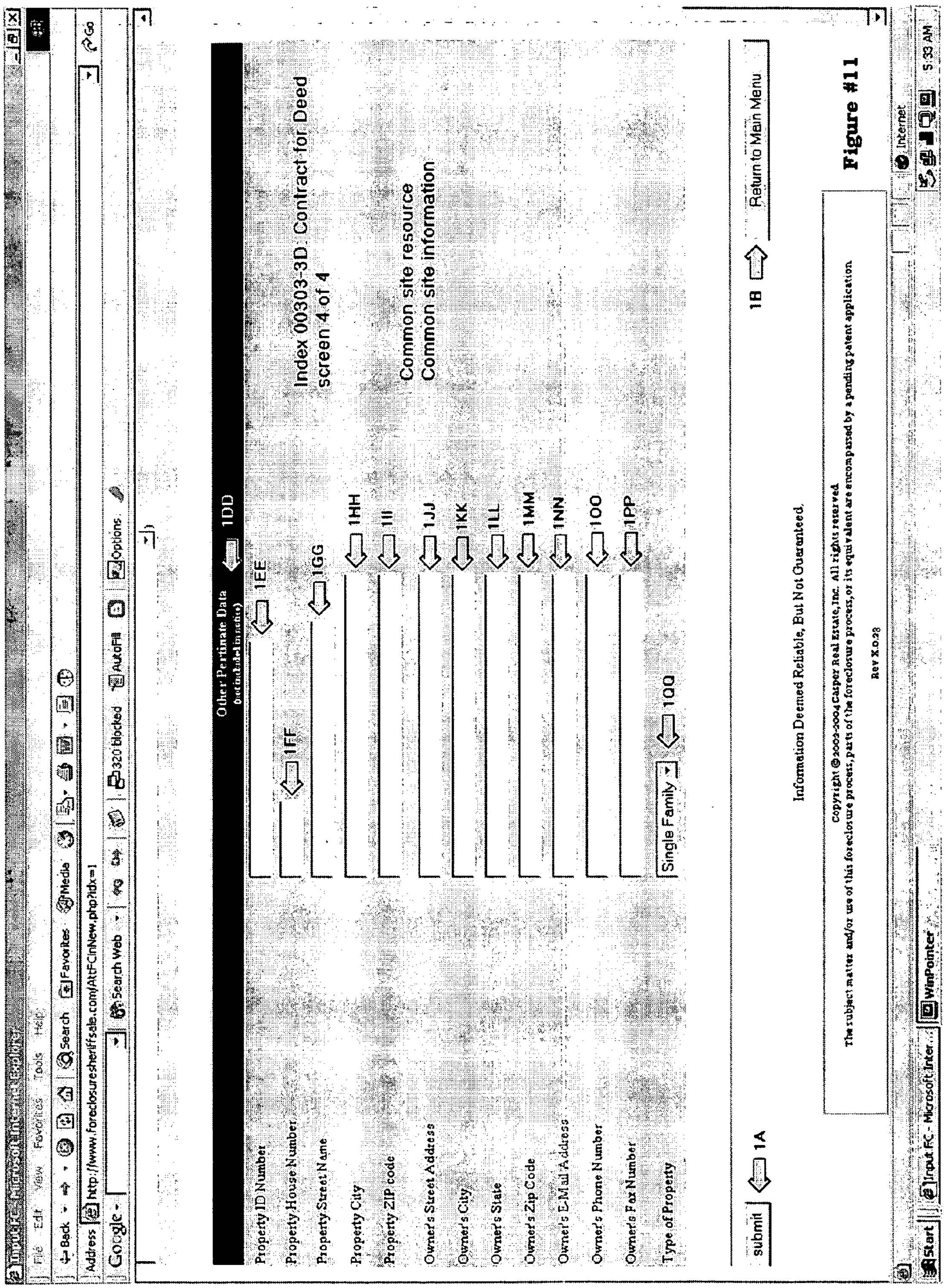
Other Pertinent Data
Property ID Number
Property House Number
Property Street Name
Property City
Property ZIP code
Owner's Street Address
Owner's City
Owner's State
Owner's Zip Code
Owner's E-Mail Address
Owner's Phone Number
Owner's Fax Number
Type of Property
Single Family
submit
1A
1B
Return to Main Menu
1DD
1EE
1FF
1GG
1HH
1II
1JJ
1KK
1LL
1MM
1NN
1OO
1PP
1QQ
Index 00303-3D Contract for Deed
screen 4 of 4
Common site resource
Common site information
Information Deemed Reliable, But Not Guaranteed.
Figure #11

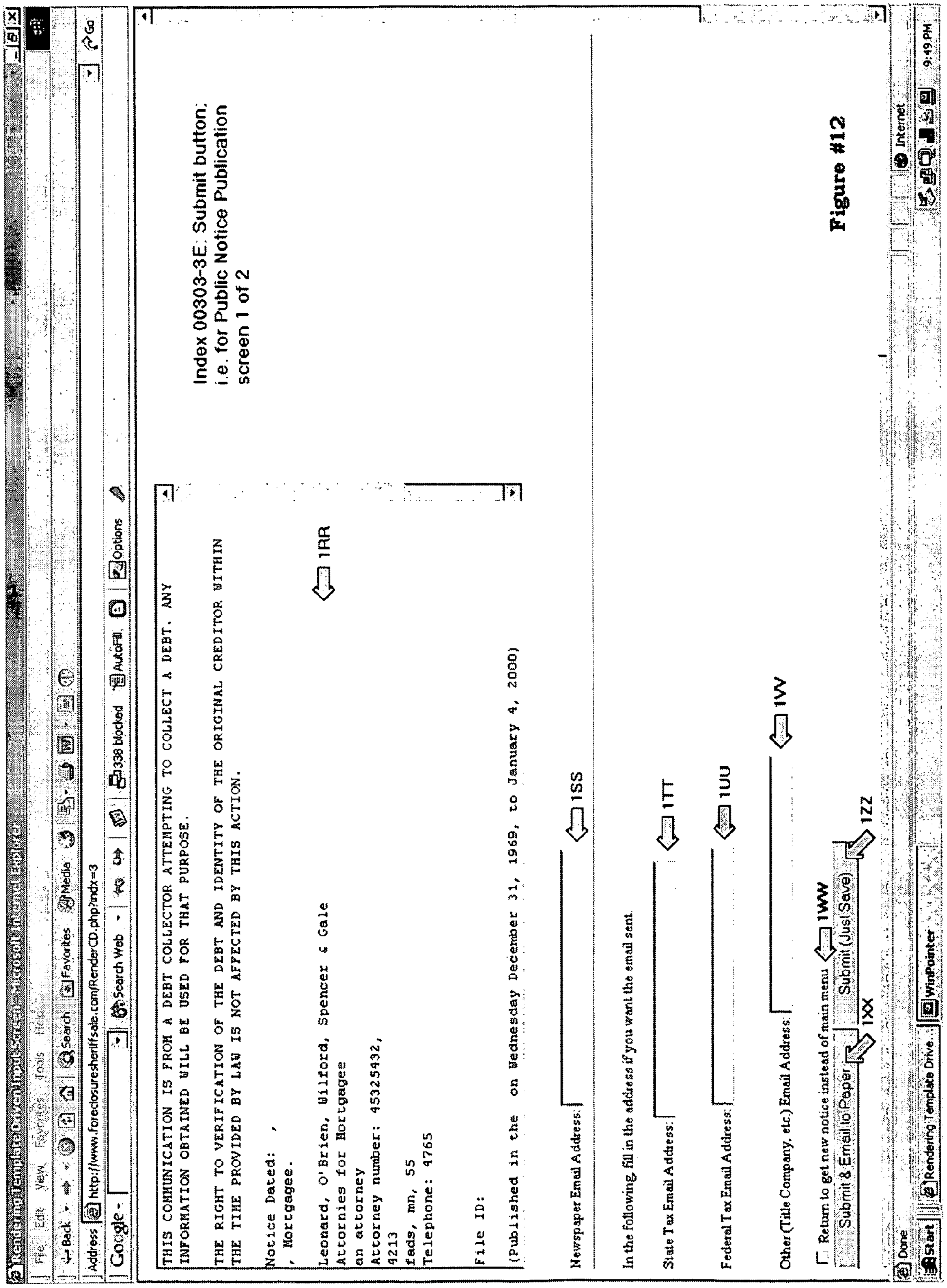
Figure #12

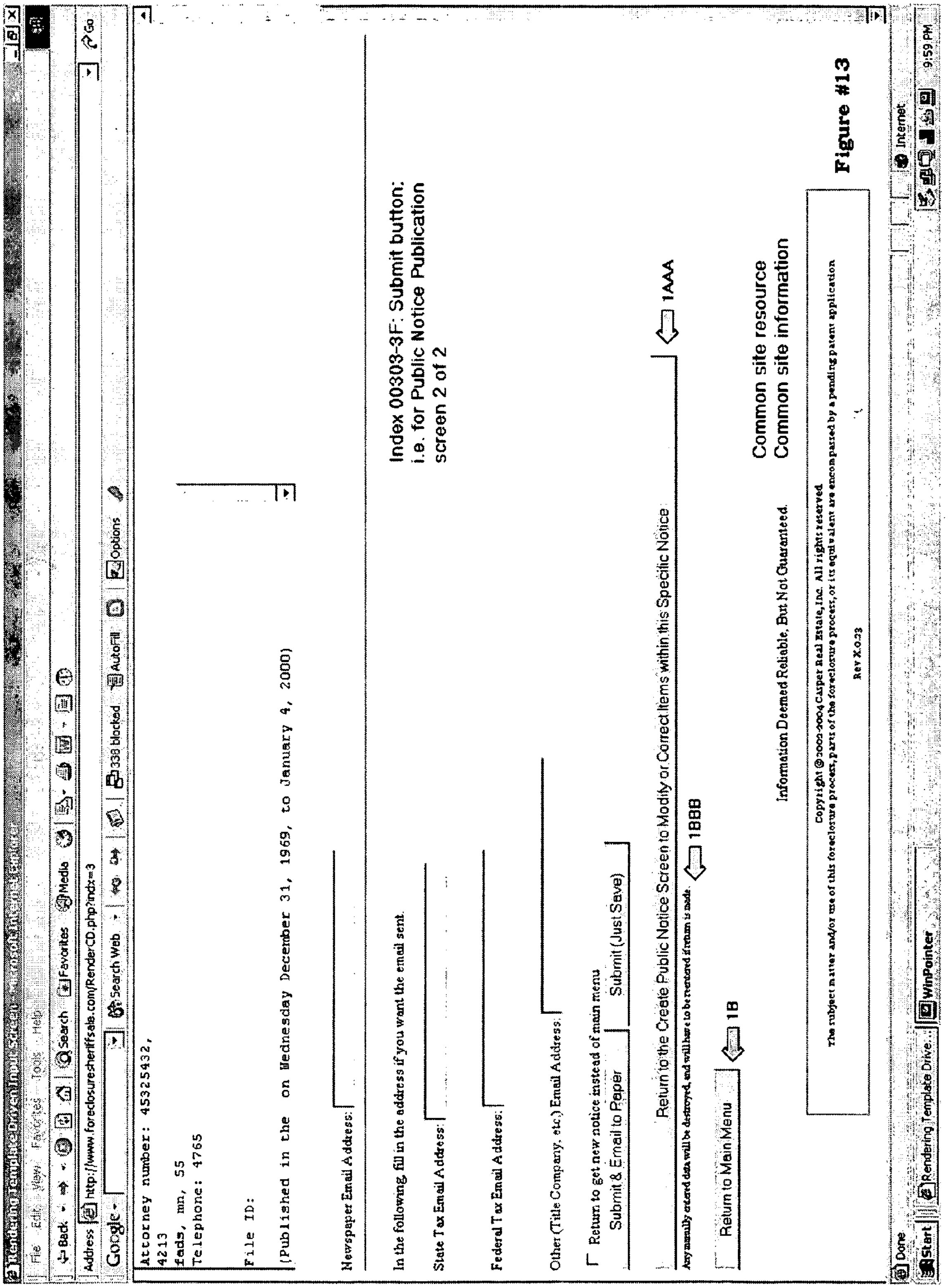
Figure #13

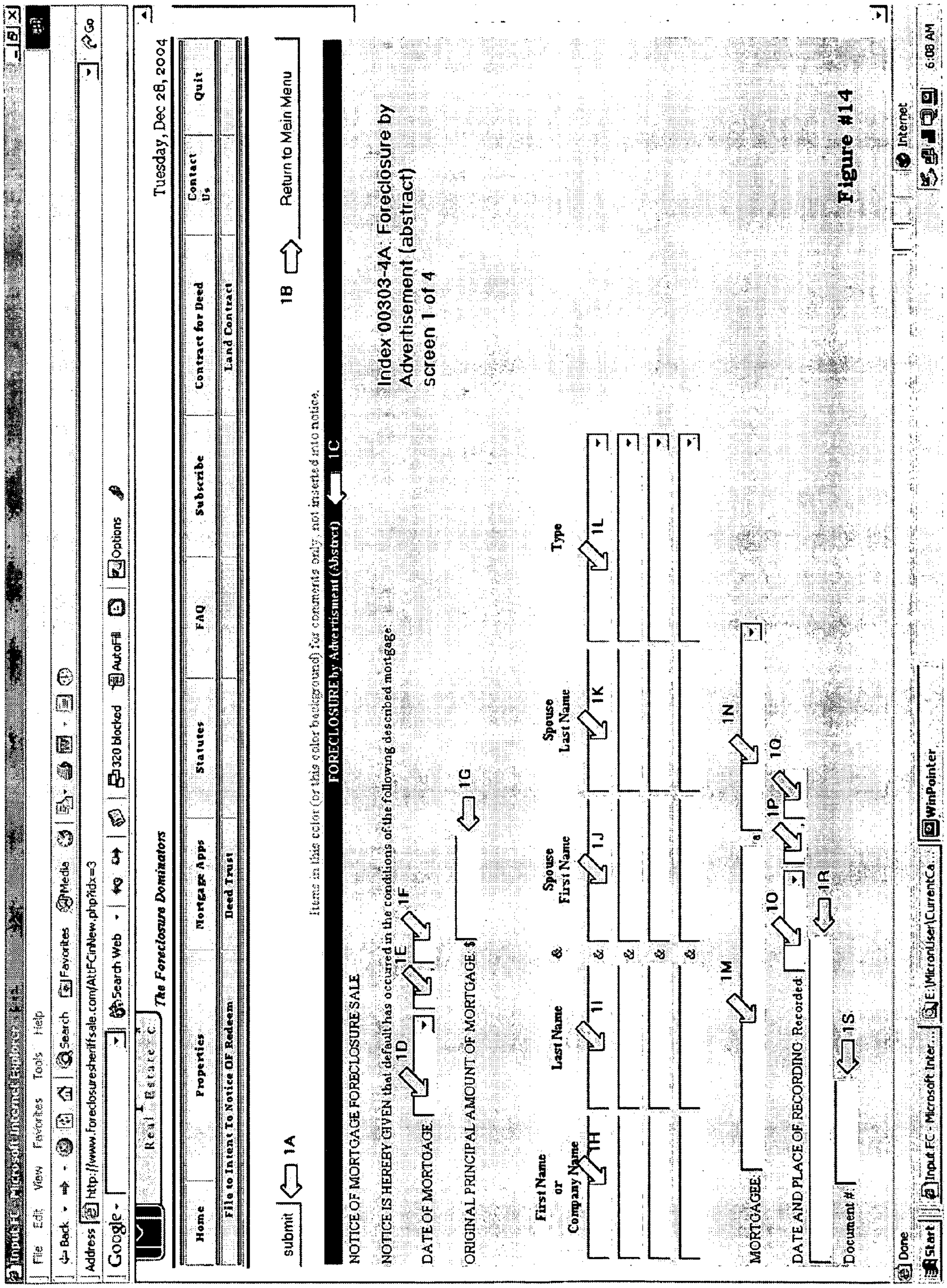
Input FC - Microsoft Internet Explorer
Address http://www.foreclosuresheriffsale.com/AttFCinNew.php?idx=3
The Foreclosure Dominators
Tuesday, Dec 28, 2004
Home
Properties
Mortgage Apps
Statutes
FAQ
Subscribe
Contract for Deed
Contact Us
Quit
File to Intent To Notice Of Redeem
Deed Trust
Land Contract
submit
1A
1B
Return to Main Menu
Items in this color (or this color background) for comments only, not inserted into notice.
FORECLOSURE by Advertisment (Abstract)
1C
Index 00303-4A. Foreclosure by Advertisement (abstract) screen 1 of 4
NOTICE OF MORTGAGE FORECLOSURE SALE
NOTICE IS HEREBY GIVEN that default has occured in the conditions of the following described mortgage:
DATE OF MORTGAGE
1D
1E
1F
ORIGINAL PRINCIPAL AMOUNT OF MORTGAGE $
1G
First Name or Company Name
Last Name
Spouse First Name
Spouse Last Name
Type
1H
1I
1J
1K
1L
MORTGAGEE
1M
1N
DATE AND PLACE OF RECORDING: Recorded:
1O
1P
1Q
1R
Document #:
1S
Figure #14

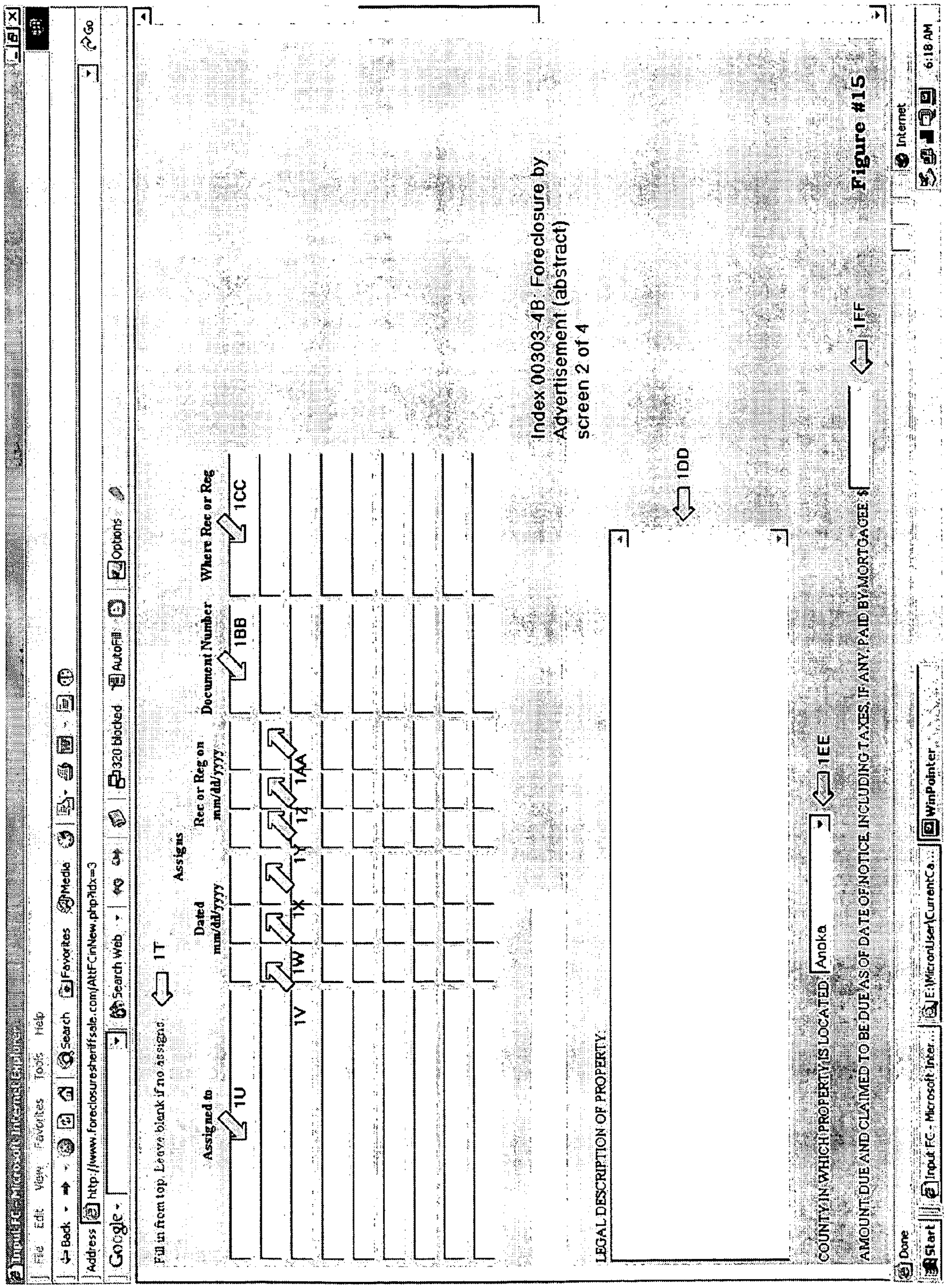

Input FC - Microsoft Internet Explorer
File Edit View Favorites Tools Help
Address http://www.foreclosuresheriffsale.com/AttFCinNew.php?idx=3
Fill in from top. Leave blank if no assigns
1T
Assigns
Assigned to
Dated mm/dd/yyyy
Rec or Reg on mm/dd/yyyy
Document Number
Where Rec or Reg
1U
1V
1W
1X
1Y
1Z
1AA
1BB
1CC
Index 00303-4B: Foreclosure by Advertisement (abstract) screen 2 of 4
LEGAL DESCRIPTION OF PROPERTY:
1DD
COUNTY IN WHICH PROPERTY IS LOCATED: Anoka
1EE
AMOUNT DUE AND CLAIMED TO BE DUE AS OF DATE OF NOTICE, INCLUDING TAXES, IF ANY, PAID BY MORTGAGEE $
1FF
Figure #15
Done
Internet
Start
WinPointer
6:18 AM

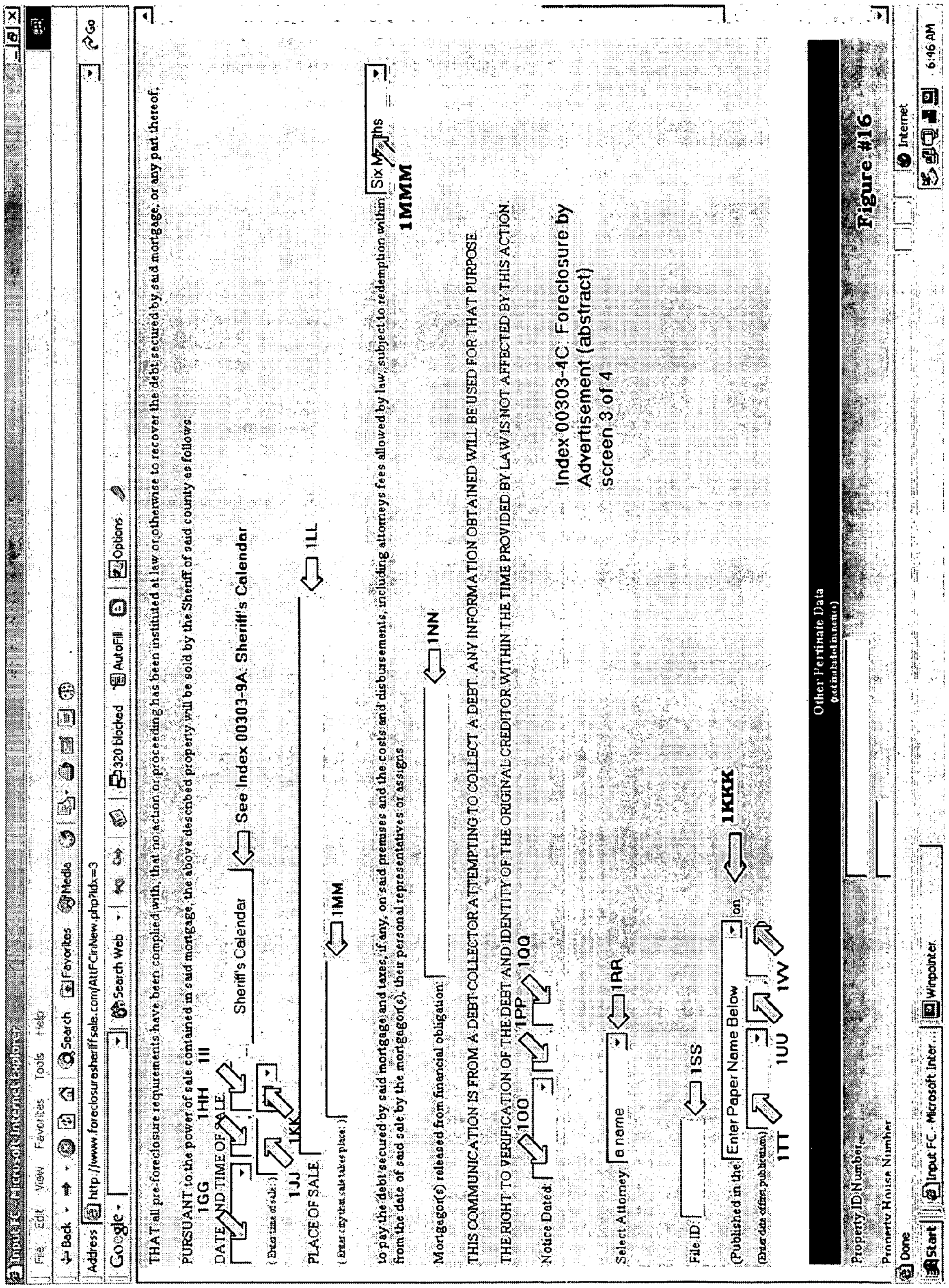
THAT all pre-foreclosure requirements have been complied with, that no action or proceeding has been instituted at law or otherwise to recover the debt secured by said mortgage, or any part thereof.
PURSUANT to the power of sale contained in said mortgage, the above described property will be sold by the Sheriff of said county as follows:
DATE AND TIME OF SALE
PLACE OF SALE
Sheriff's Calendar
See Index 00303-9A: Sheriff's Calendar
to pay the debt secured by said mortgage and taxes, if any, on said premises and the costs and disbursements, including attorneys fees allowed by law, subject to redemption within
Six Months
from the date of said sale by the mortgagor(s), their personal representatives or assigns
Mortgagor(s) released from financial obligation:
THIS COMMUNICATION IS FROM A DEBT COLLECTOR ATTEMPTING TO COLLECT A DEBT. ANY INFORMATION OBTAINED WILL BE USED FOR THAT PURPOSE.
THE RIGHT TO VERIFICATION OF THE DEBT AND IDENTITY OF THE ORIGINAL CREDITOR WITHIN THE TIME PROVIDED BY LAW IS NOT AFFECTED BY THIS ACTION.
Notice Dated:
Select Attorney
File ID:
Published in the
Enter Paper Name Below
Other Pertinent Data
Property ID Number
Property House Number
Index 00303-4C: Foreclosure by Advertisement (abstract) screen 3 of 4
1GG
1HH
1II
1JJ
1KK
1LL
1MM
1NN
1OO
1PP
1QQ
1RR
1SS
1TT
1UU
1VV
1KKK
1MMM
Figure #16

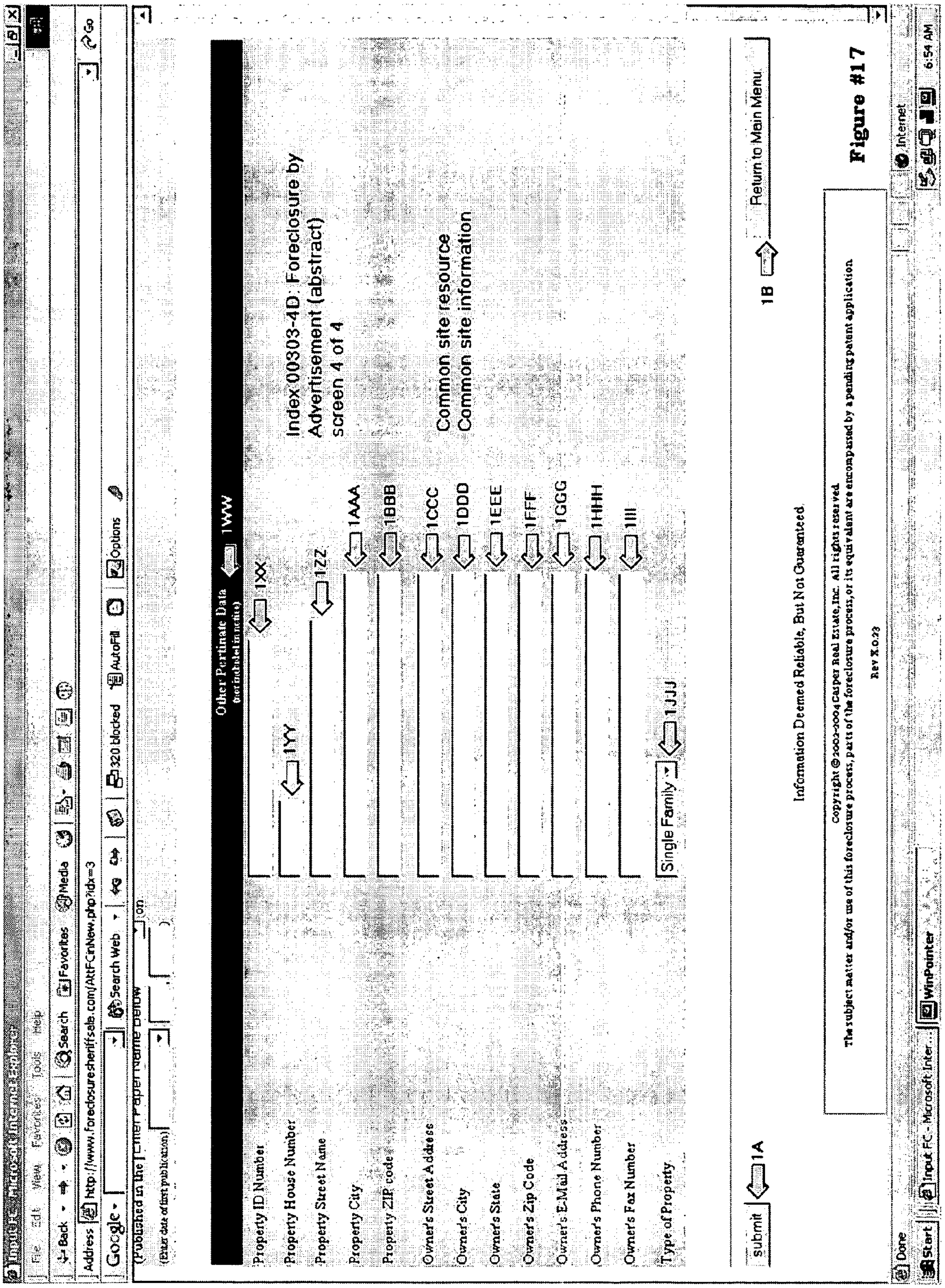
Figure #17

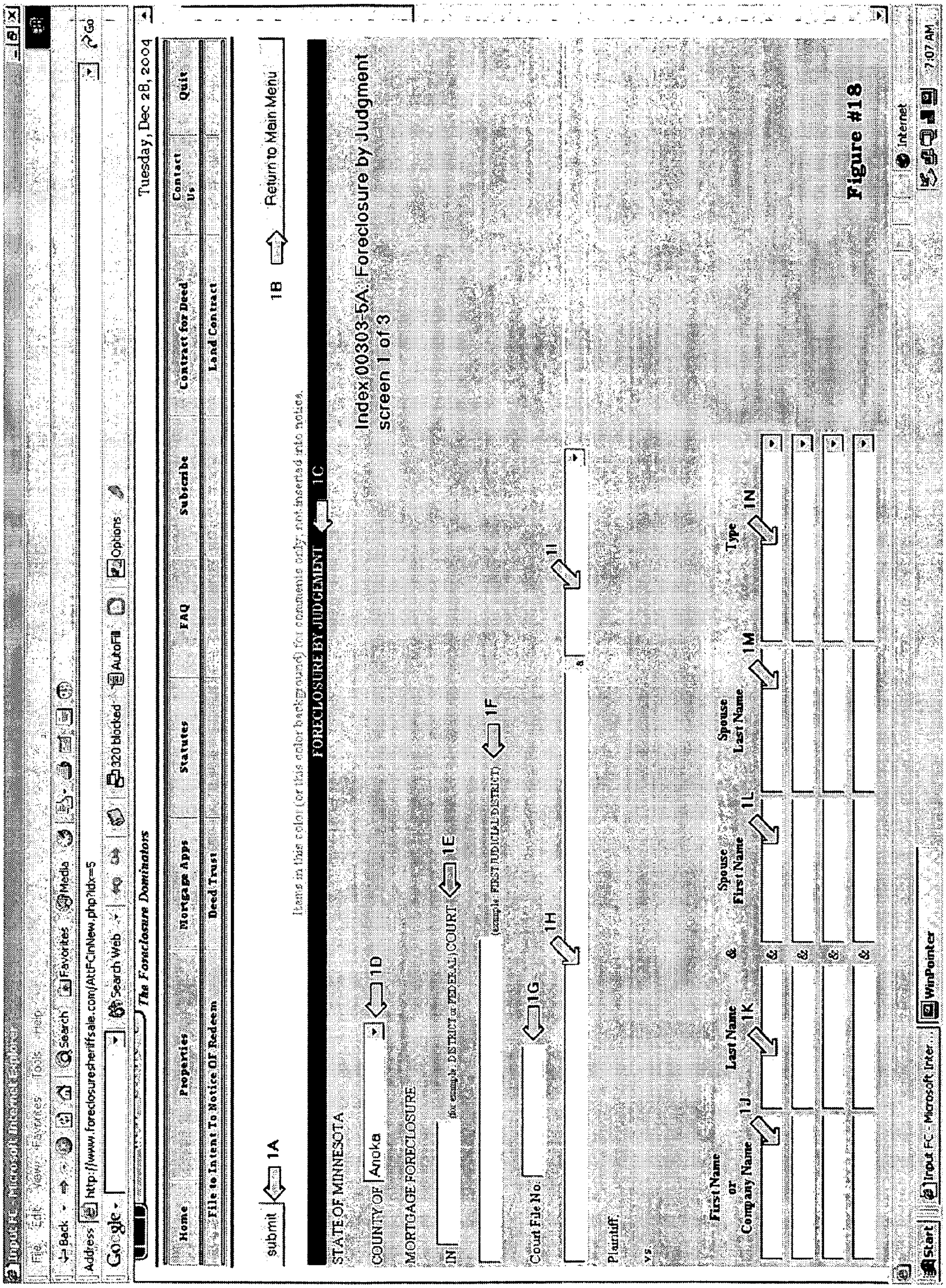

Input FC - Microsoft Internet Explorer
http://www.foreclosuresheriffsale.com/AttFCInNew.php?idx=5
The Foreclosure Dominators
Tuesday, Dec 28, 2004
Home
Properties
Mortgage Apps
Statutes
FAQ
Subscribe
Contract for Deed
Contact Us
Quit
File to Intent To Notice Of Redeem
Deed Trust
Land Contract
submit
1A
1B
Return to Main Menu
Items in this color (or this color background) for comments only; not inserted into notice.
FORECLOSURE BY JUDGEMENT
1C
Index:00303-5A: Foreclosure by Judgment
screen 1 of 3
STATE OF MINNESOTA
COUNTY OF Anoka
1D
MORTGAGE FORECLOSURE
IN
(for example DISTRICT or FEDERAL) COURT
1E
(example: FIRST JUDICIAL DISTRICT)
1F
Court File No.
1G
1H
1I
Plaintiff,
vs.
First Name or Company Name
Last Name
&
Spouse First Name
Spouse Last Name
Type
1J
1K
1L
1M
1N
Figure #18
Internet
Start
WinPointer
7:07 AM

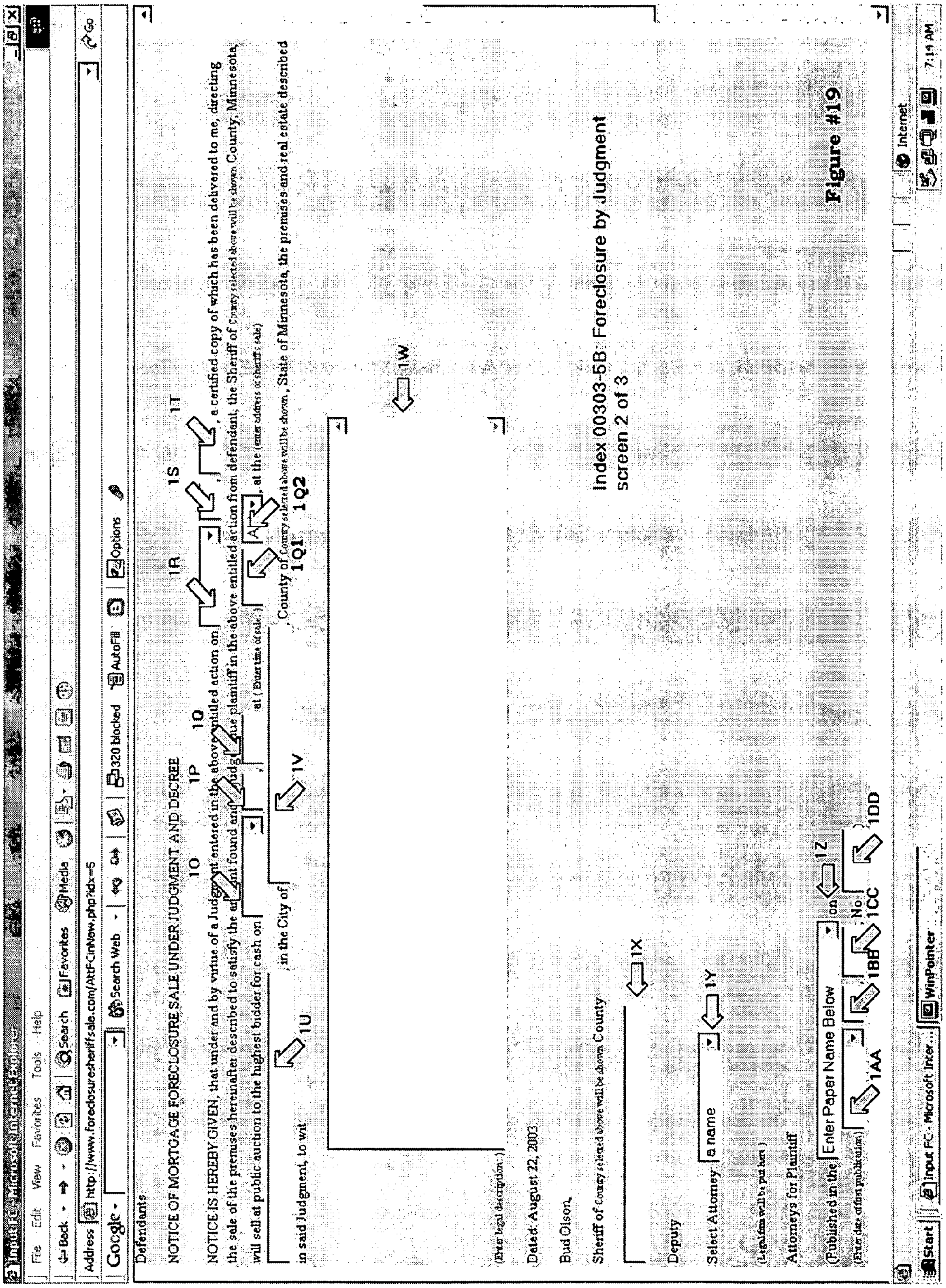
NOTICE OF MORTGAGE FORECLOSURE SALE UNDER JUDGMENT AND DECREE
Index 00303-5B: Foreclosure by Judgment
screen 2 of 3
Figure #19

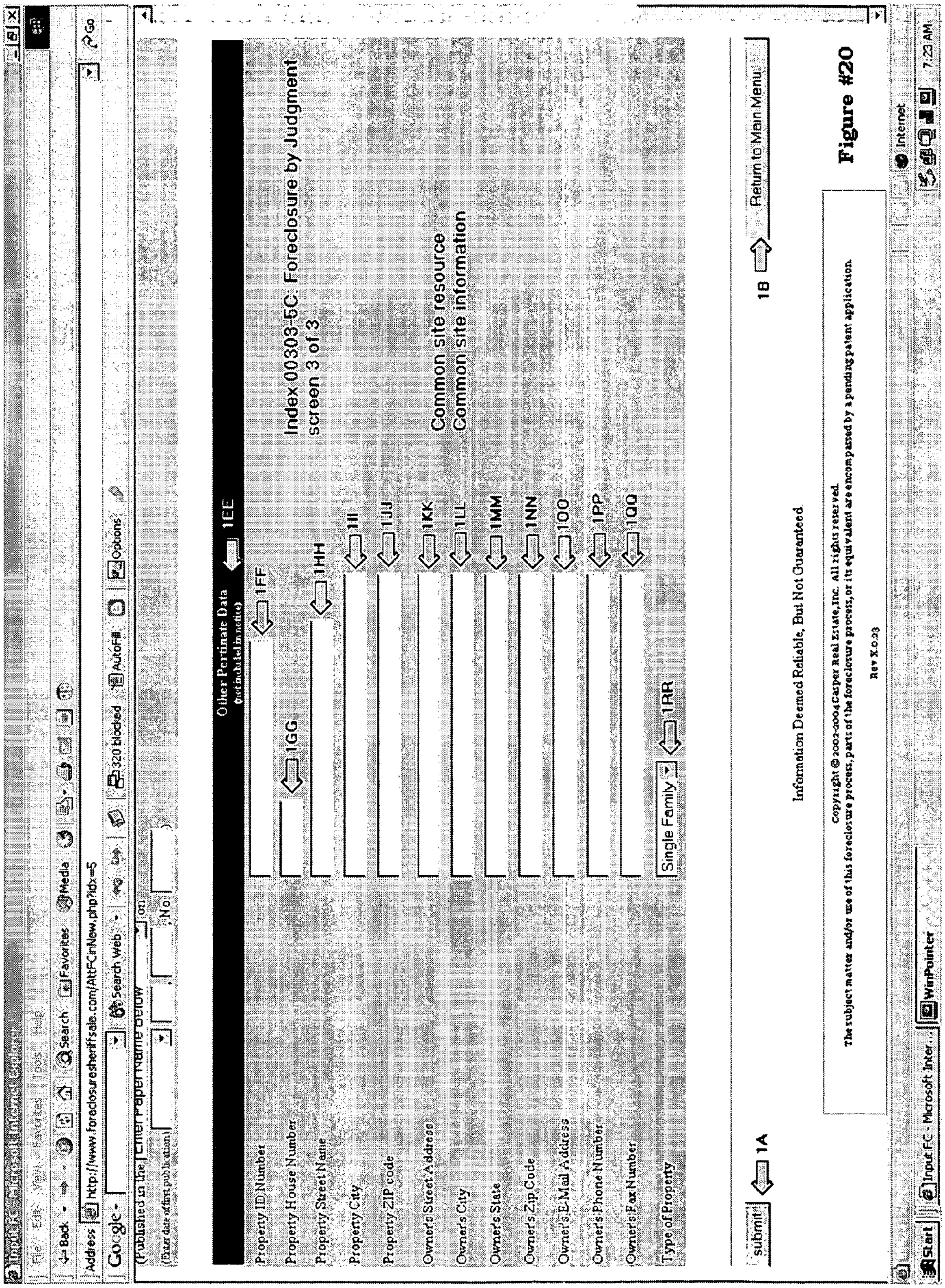
Figure #20

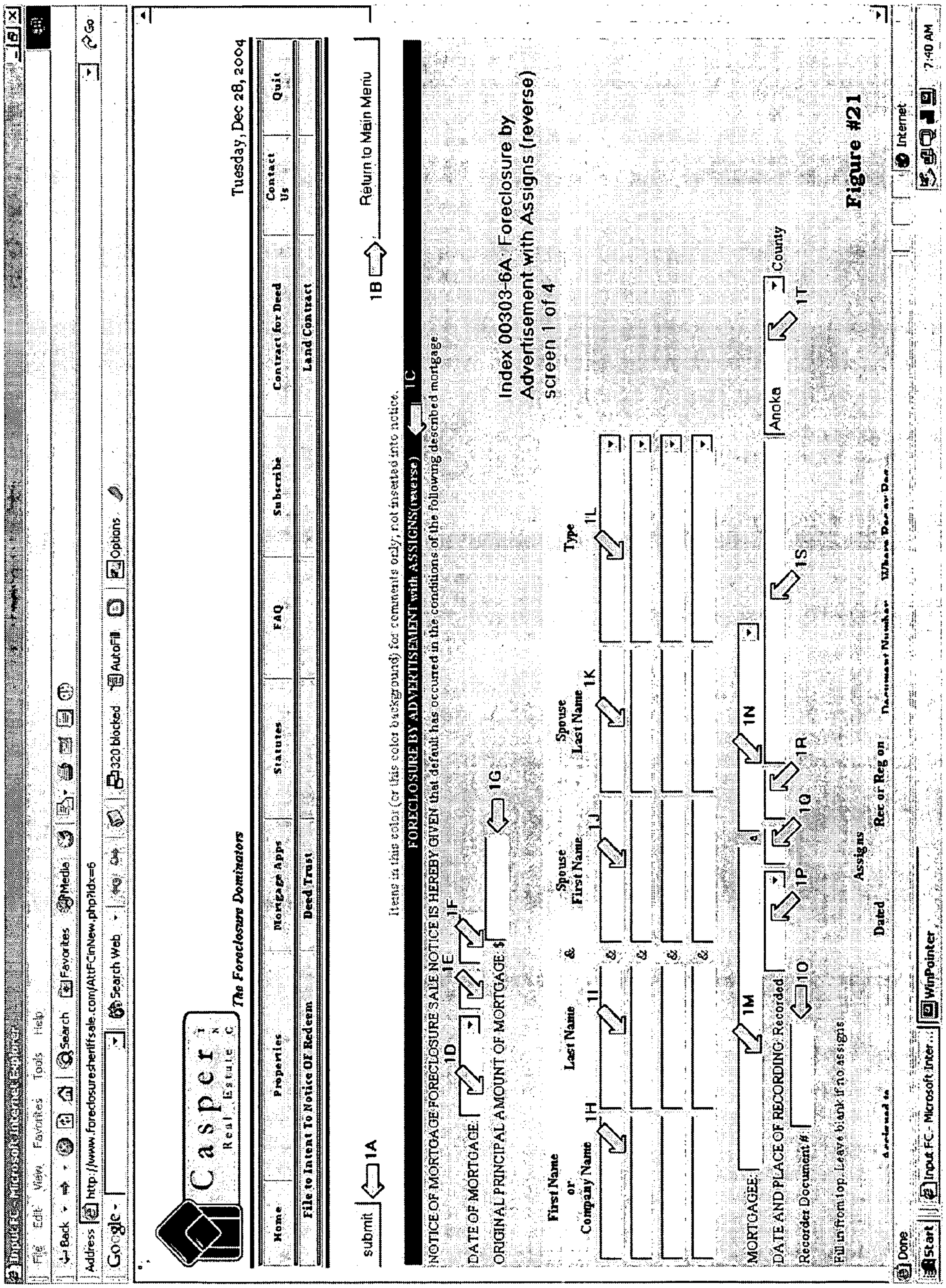
Figure #21

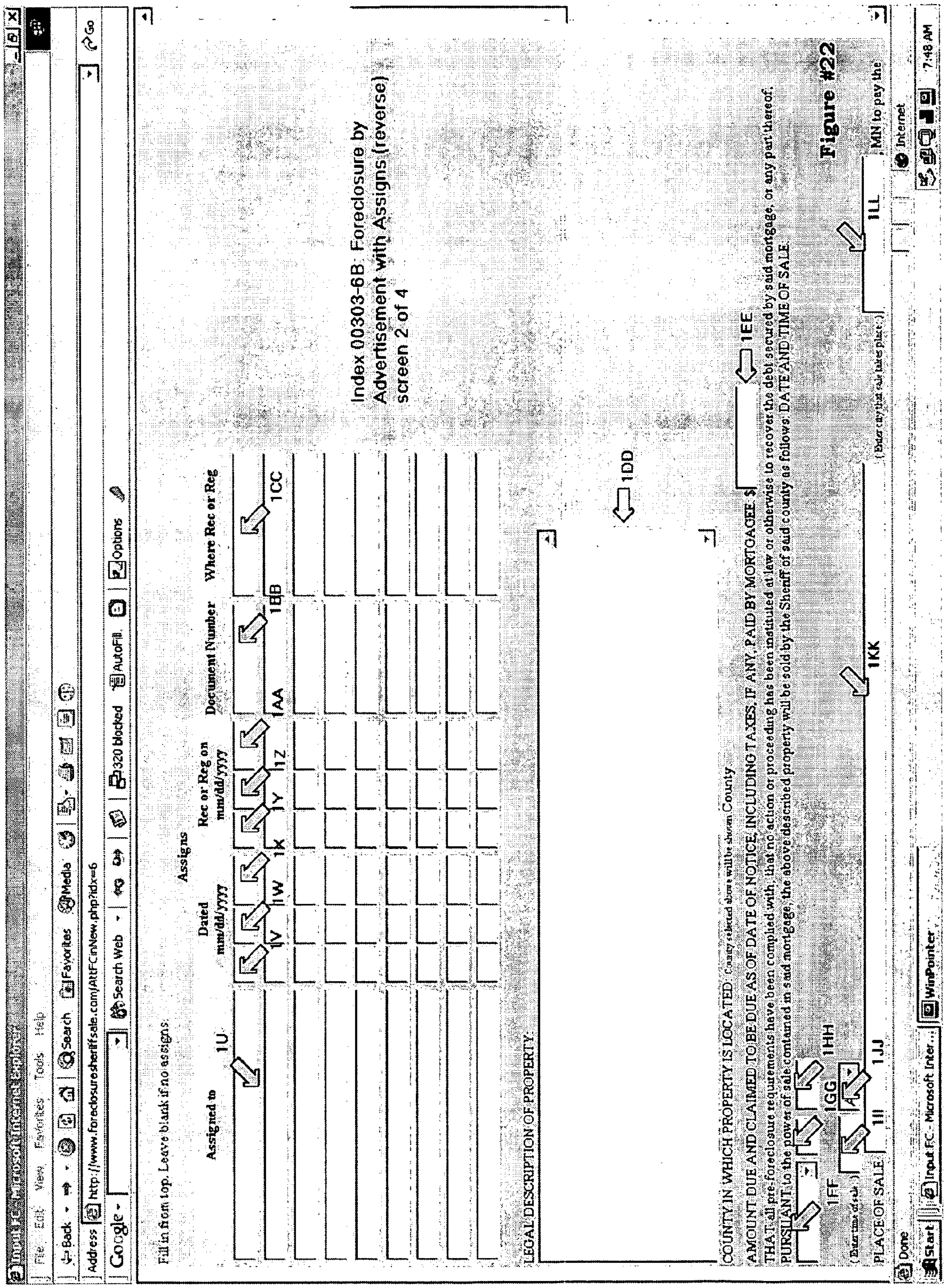
Index 00303-6B: Foreclosure by Advertisement with Assigns (reverse) screen 2 of 4
Fill in from top. Leave blank if no assigns.
Assigns
Assigned to
Dated mm/dd/yyyy
Rec or Reg on mm/dd/yyyy
Document Number
Where Rec or Reg
LEGAL DESCRIPTION OF PROPERTY:
COUNTY IN WHICH PROPERTY IS LOCATED:
AMOUNT DUE AND CLAIMED TO BE DUE AS OF DATE OF NOTICE, INCLUDING TAXES, IF ANY, PAID BY MORTGAGEE: $
PLACE OF SALE
1U
1V
1W
1X
1Y
1Z
1AA
1BB
1CC
1DD
1EE
1FF
1GG
1HH
1II
1JJ
1KK
1LL
Figure #22

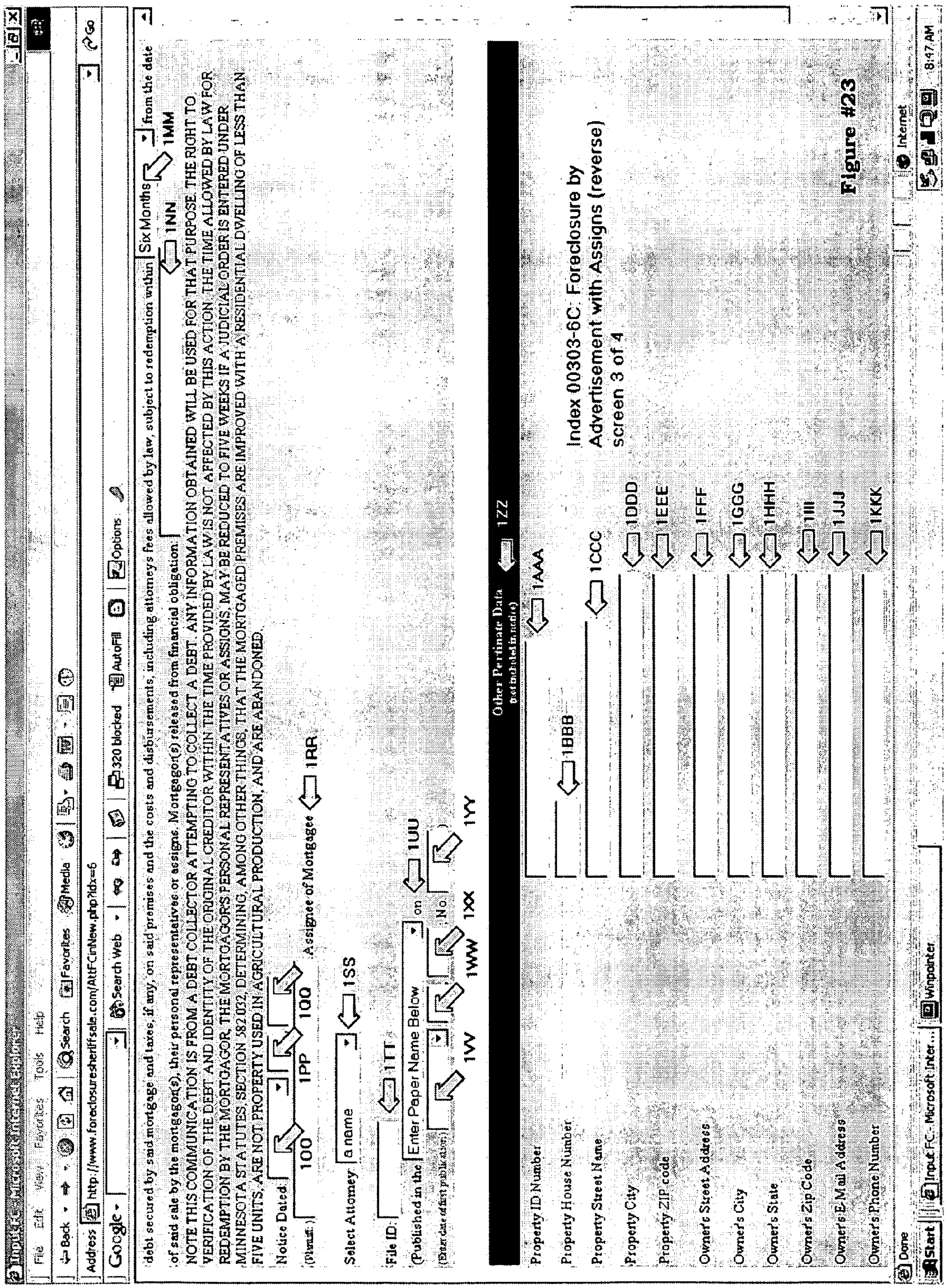

Input FC - Microsoft Internet Explorer
File Edit View Favorites Tools Help
Address http://www.foreclosuresheriffsale.com/AttFCinNew.php?idx=6
debt secured by said mortgage and taxes, if any, on said premises and the costs and disbursements, including attorneys fees allowed by law, subject to redemption within Six Months from the date of said sale by the mortgagor(s), their personal representatives or assigns. Mortgagor(s) released from financial obligation
NOTE THIS COMMUNICATION IS FROM A DEBT COLLECTOR ATTEMPTING TO COLLECT A DEBT. ANY INFORMATION OBTAINED WILL BE USED FOR THAT PURPOSE. THE RIGHT TO VERIFICATION OF THE DEBT AND IDENTITY OF THE ORIGINAL CREDITOR WITHIN THE TIME PROVIDED BY LAW IS NOT AFFECTED BY THIS ACTION. THE TIME ALLOWED BY LAW FOR REDEMPTION BY THE MORTGAGOR, THE MORTGAGOR'S PERSONAL REPRESENTATIVES OR ASSIGNS, MAY BE REDUCED TO FIVE WEEKS IF A JUDICIAL ORDER IS ENTERED UNDER MINNESOTA STATUTES, SECTION 582.032, DETERMINING, AMONG OTHER THINGS, THAT THE MORTGAGED PREMISES ARE IMPROVED WITH A RESIDENTIAL DWELLING OF LESS THAN FIVE UNITS, ARE NOT PROPERTY USED IN AGRICULTURAL PRODUCTION, AND ARE ABANDONED.
1MM
1NN
Notice Dated
1OO
1PP
1QQ
Assignee of Mortgage
1RR
Select Attorney
a name
1SS
File ID:
1TT
Published in the
Enter Paper Name Below
on
1UU
No.
1VV
1WW
1XX
1YY
Other Pertinent Data
1ZZ
Property ID Number
1AAA
Property House Number
1BBB
Property Street Name
1CCC
Property City
1DDD
Property ZIP code
1EEE
Owner's Street Address
1FFF
Owner's City
1GGG
Owner's State
1HHH
Owner's Zip Code
1III
Owner's E-Mail Address
1JJJ
Owner's Phone Number
1KKK
Index 00303-6C: Foreclosure by Advertisement with Assigns (reverse) screen 3 of 4
Figure #23
Done
Internet
Start
8:47 AM

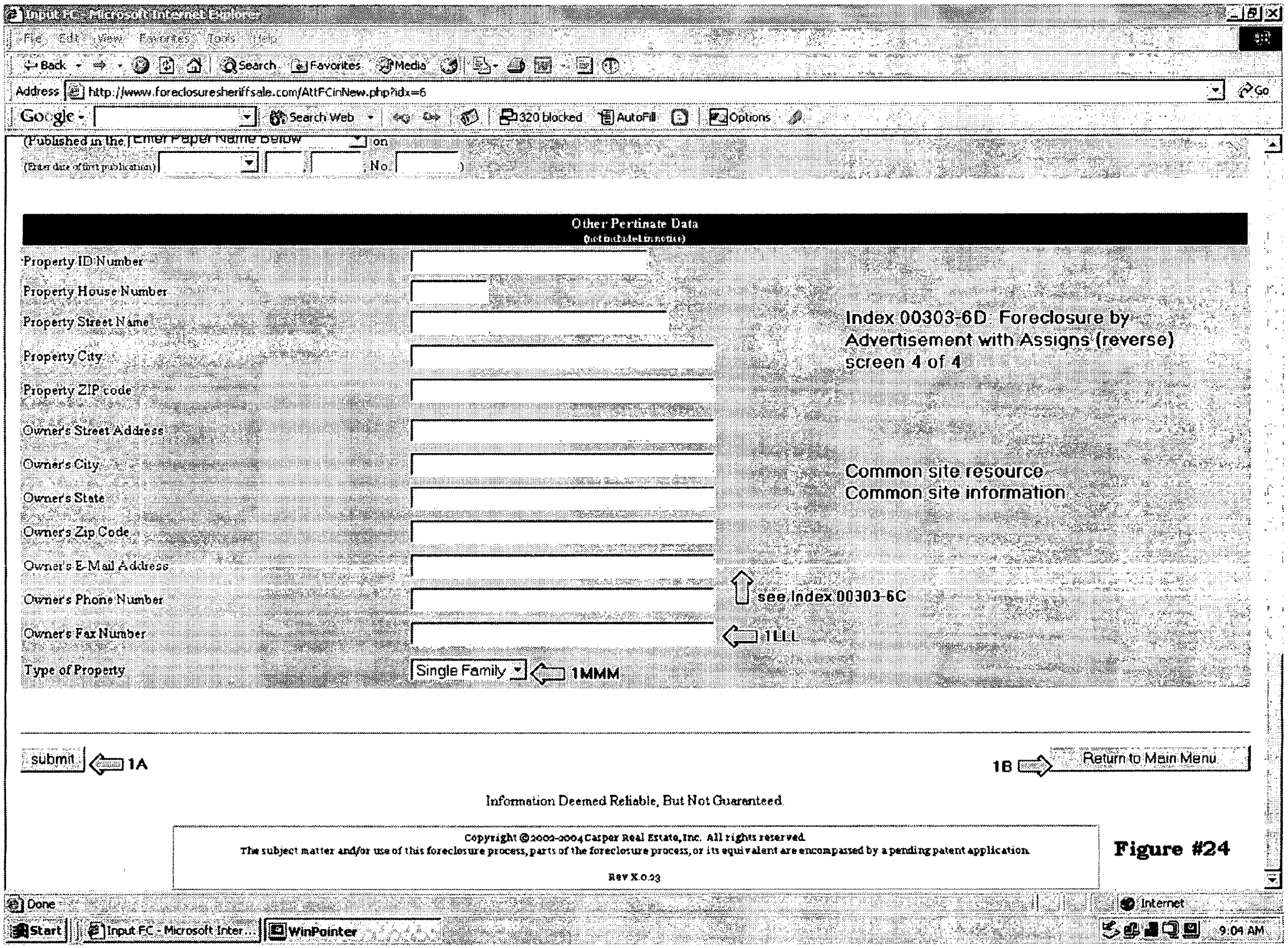
Figure #24

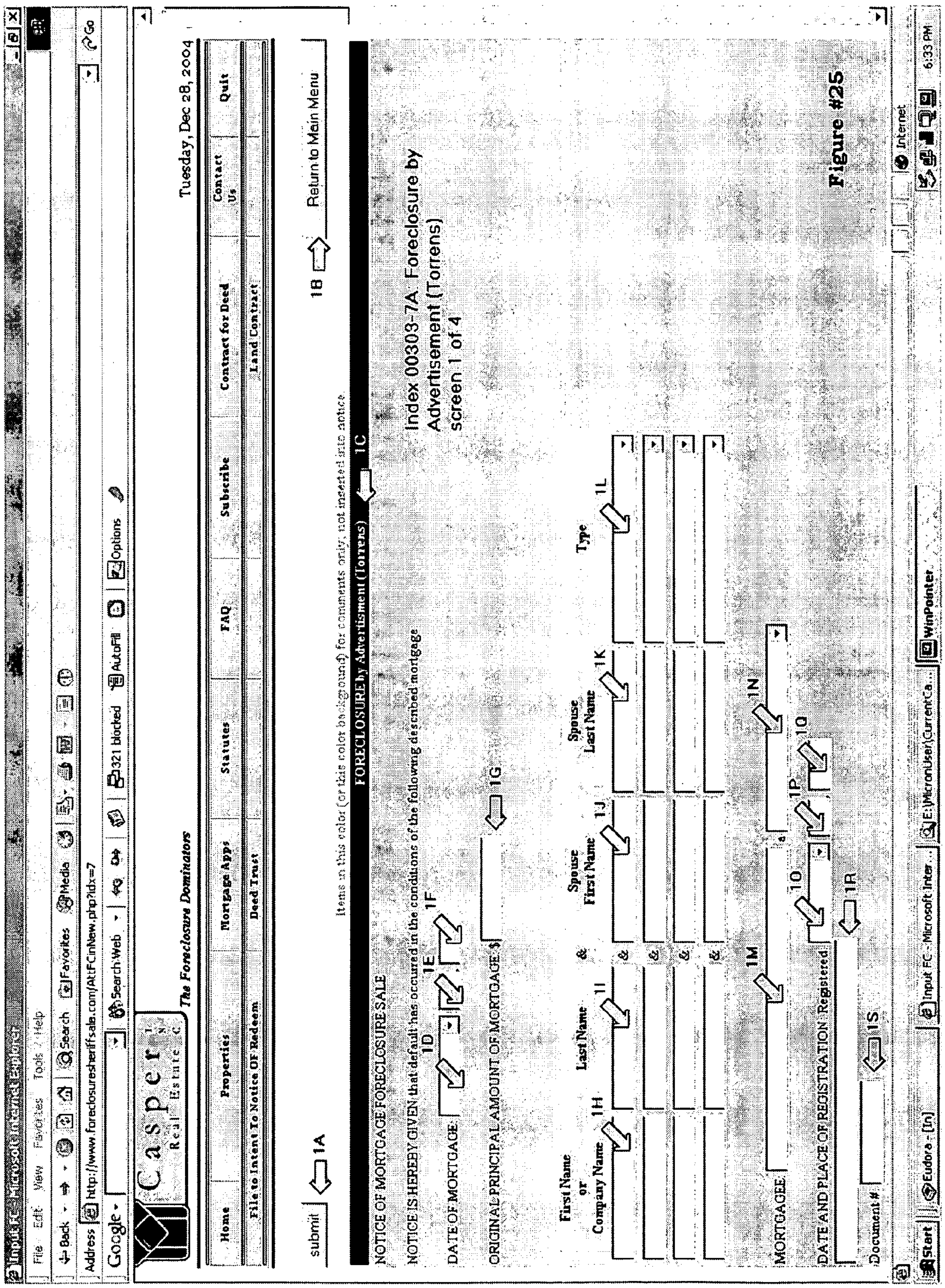
Figure #25

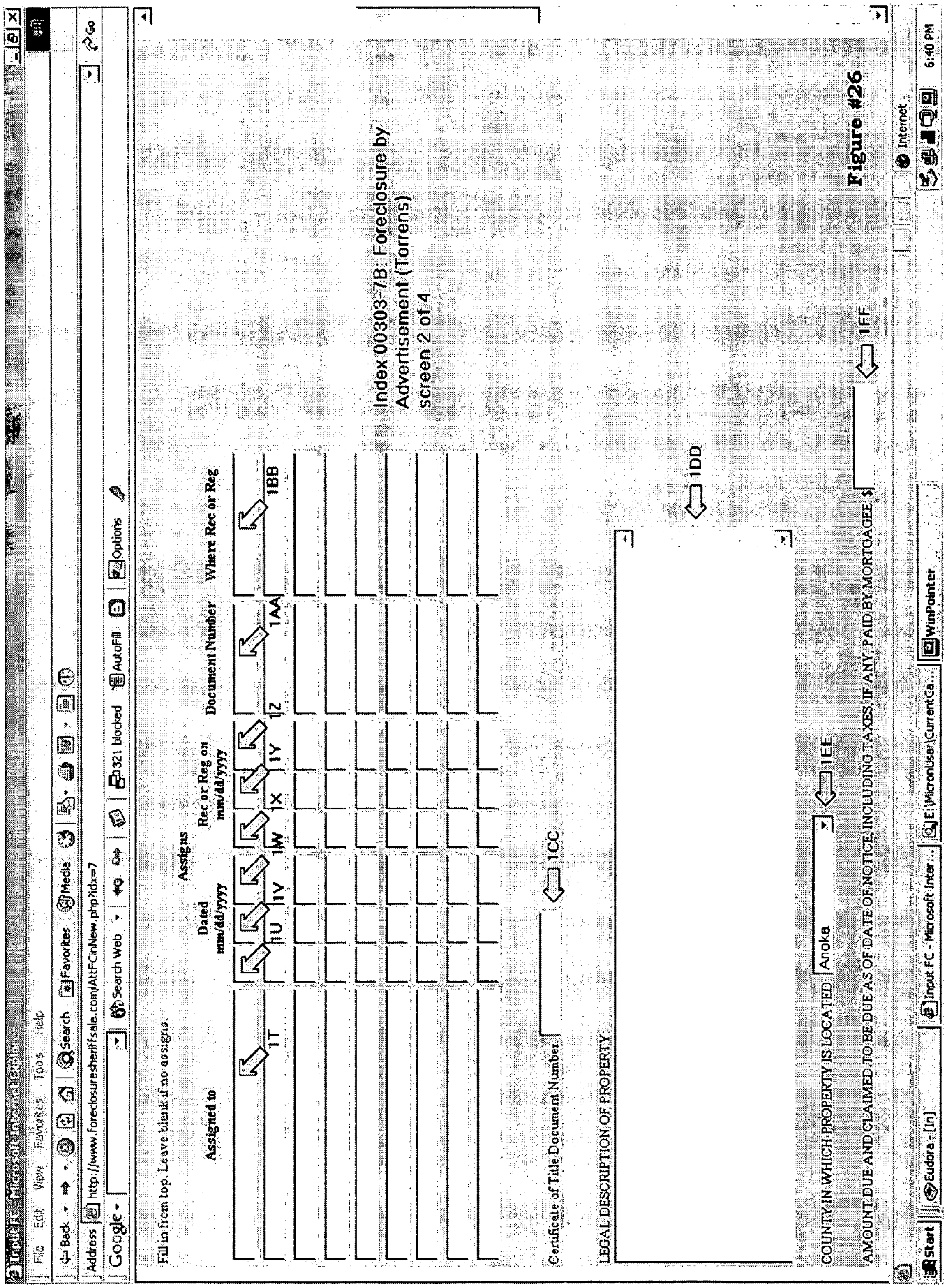
Input FC - Microsoft Internet Explorer
File Edit View Favorites Tools Help
Address http://www.foreclosuresheriffsale.com/AttFCinNew.php?idx=7
Fill in from top. Leave blank if no assigns.
Assigns
Assigned to
Dated mm/dd/yyyy
Rec or Reg on mm/dd/yyyy
Document Number
Where Rec or Reg
1T
1U
1V
1W
1X
1Y
1Z
1AA
1BB
Certificate of Title Document Number
1CC
LEGAL DESCRIPTION OF PROPERTY
1DD
COUNTY IN WHICH PROPERTY IS LOCATED
Anoka
1EE
AMOUNT DUE AND CLAIMED TO BE DUE AS OF DATE OF NOTICE, INCLUDING TAXES, IF ANY, PAID BY MORTGAGE $
1FF
Index 00303-7B: Foreclosure by Advertisement (Torrens)
screen 2 of 4
Figure #26

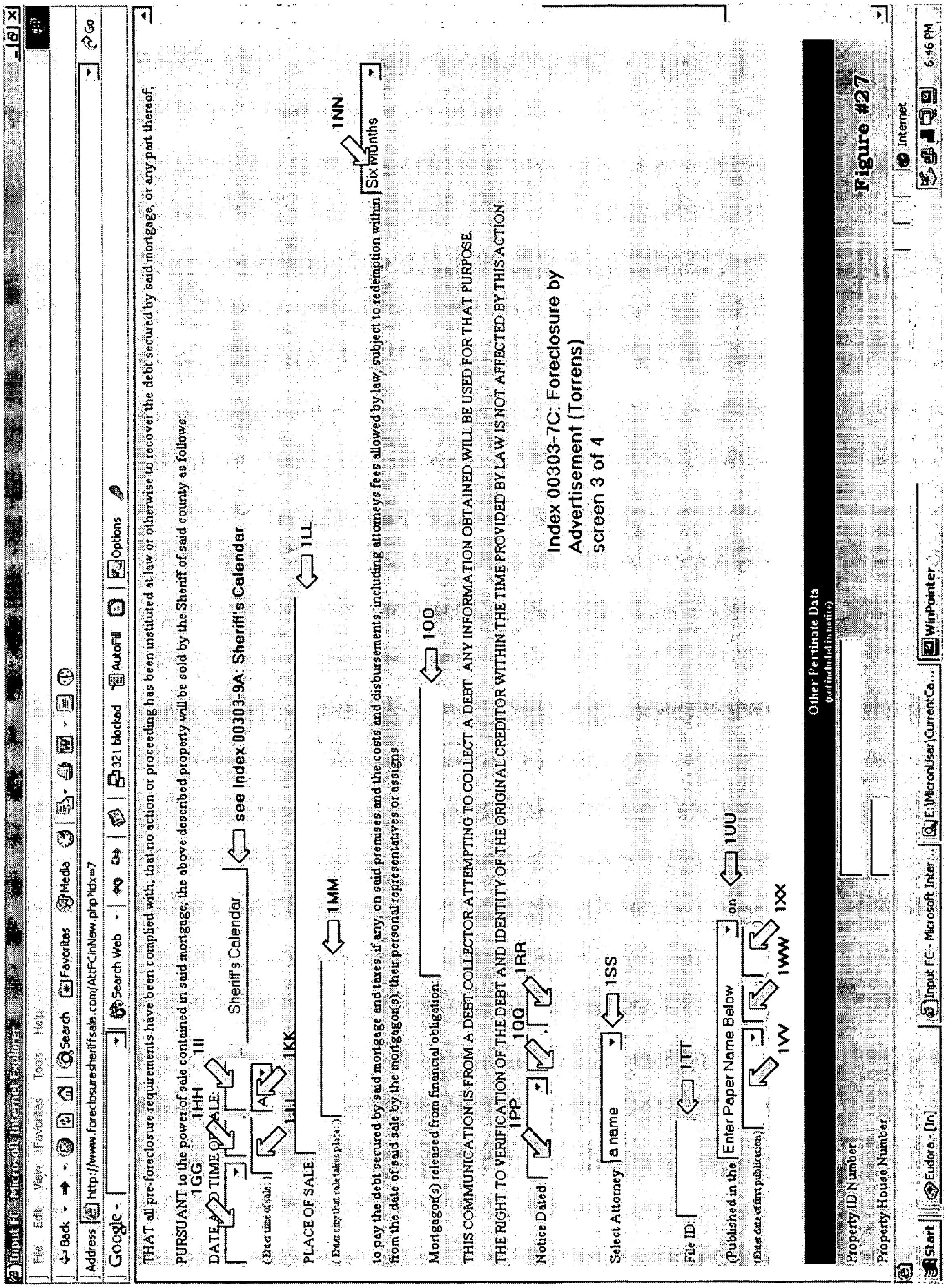
Input FC - Microsoft Internet Explorer
File Edit View Favorites Tools Help
Back Search Favorites Media
Address http://www.foreclosuresheriffsale.com/AttFCinNew.php?idx=7
Go
Google - Search Web 321 blocked AutoFill Options
THAT all pre-foreclosure requirements have been complied with; that no action or proceeding has been instituted at law or otherwise to recover the debt secured by said mortgage, or any part thereof;
PURSUANT to the power of sale contained in said mortgage, the above described property will be sold by the Sheriff of said county as follows:
DATE AND TIME OF SALE:
1GG
1HH
1II
Sheriff's Calendar
see Index 00303-9A: Sheriff's Calendar
(Enter time of sale:)
1JJ
1KK
PLACE OF SALE:
1LL
(Enter city that sale takes place:)
1MM
1NN
to pay the debt secured by said mortgage and taxes, if any, on said premises and the costs and disbursements, including attorneys fees allowed by law, subject to redemption within Six Months from the date of said sale by the mortgagor(s), their personal representatives or assigns.
Mortgagor(s) released from financial obligation:
1OO
THIS COMMUNICATION IS FROM A DEBT COLLECTOR ATTEMPTING TO COLLECT A DEBT. ANY INFORMATION OBTAINED WILL BE USED FOR THAT PURPOSE.
THE RIGHT TO VERIFICATION OF THE DEBT AND IDENTITY OF THE ORIGINAL CREDITOR WITHIN THE TIME PROVIDED BY LAW IS NOT AFFECTED BY THIS ACTION
Notice Dated:
1PP
1QQ
1RR
Index 00303-7C: Foreclosure by Advertisement (Torrens) screen 3 of 4
Select Attorney: a name
1SS
File ID:
1TT
(Published in the Enter Paper Name Below on
1UU
(Enter date of first publication)
1VV
1WW
1XX
Other Pertinate Data
Property ID Number
Property House Number
Figure #27
Internet
Start Eudora - [In] Input FC - Microsoft Inter... E:\MicronUser\CurrentCa... WinPointer
6:46 PM

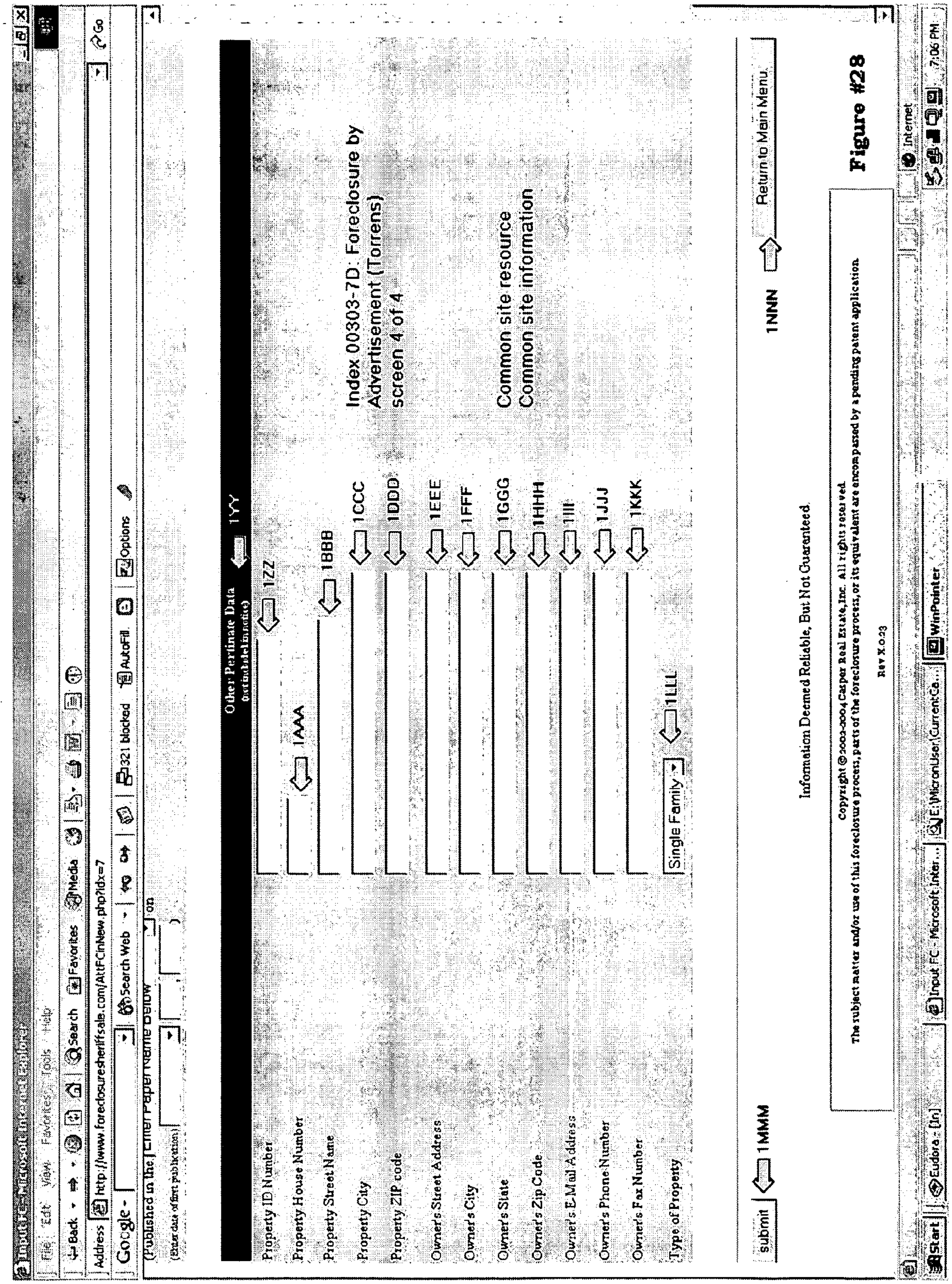
Input FC - Microsoft Internet Explorer
File Edit View Favorites Tools Help
Address http://www.foreclosuresheriffsale.com/AttFCInNew.php?idx=7
Published in the | Enter Paper Name Below | on
(Enter date of first publication)
Other Pertinent Data
Property ID Number
Property House Number
Property Street Name
Property City
Property ZIP code
Owner's Street Address
Owner's City
Owner's State
Owner's Zip Code
Owner's E-Mail Address
Owner's Phone Number
Owner's Fax Number
Type of Property
Single Family
1YY
1ZZ
1AAA
1BBB
1CCC
1DDD
1EEE
1FFF
1GGG
1HHH
1III
1JJJ
1KKK
1LLL
1MMM
1NNN
Index 00303-7D: Foreclosure by Advertisement (Torrens) screen 4 of 4
Common site resource
Common site information
submit
Return to Main Menu
Information Deemed Reliable, But Not Guaranteed.
Copyright © 2003-2004 Casper Real Estate, Inc. All rights reserved.
The subject matter and/or use of this foreclosure process, parts of the foreclosure process, or its equivalent are encompassed by a pending patent application.
Rev X.0.23
Figure #28

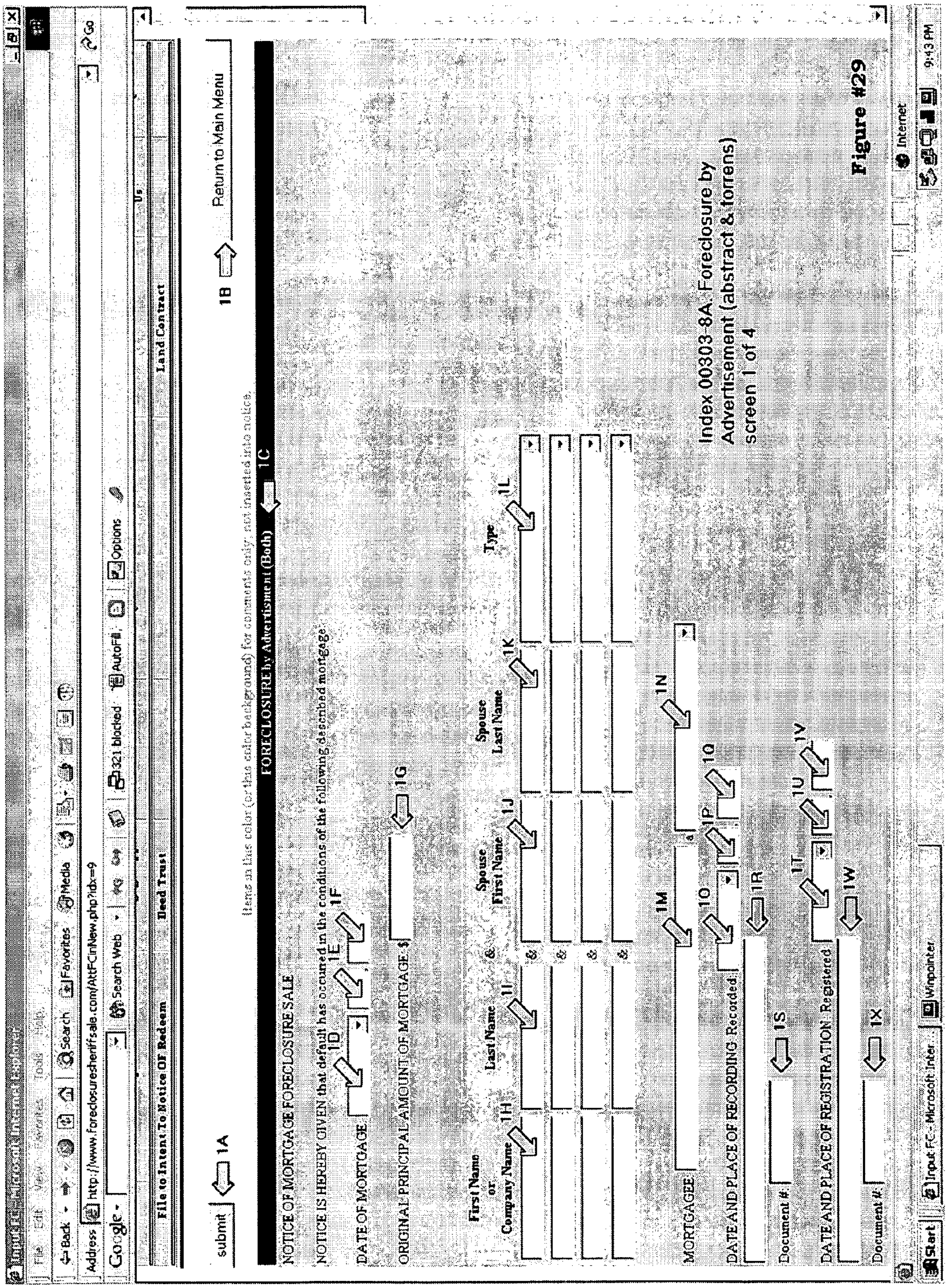

submit
1A
Return to Main Menu
1B
FORECLOSURE by Advertisment (Both)
1C
NOTICE OF MORTGAGE FORECLOSURE SALE
NOTICE IS HEREBY GIVEN that default has occurred in the conditions of the following described mortgage
DATE OF MORTGAGE
ORIGINAL PRINCIPAL AMOUNT OF MORTGAGE $
First Name or Company Name
Last Name
Spouse First Name
Spouse Last Name
Type
MORTGAGEE
DATE AND PLACE OF RECORDING: Recorded
Document #
DATE AND PLACE OF REGISTRATION: Registered
Index 00303-8A: Foreclosure by Advertisement (abstract & torrens) screen 1 of 4
Figure #29

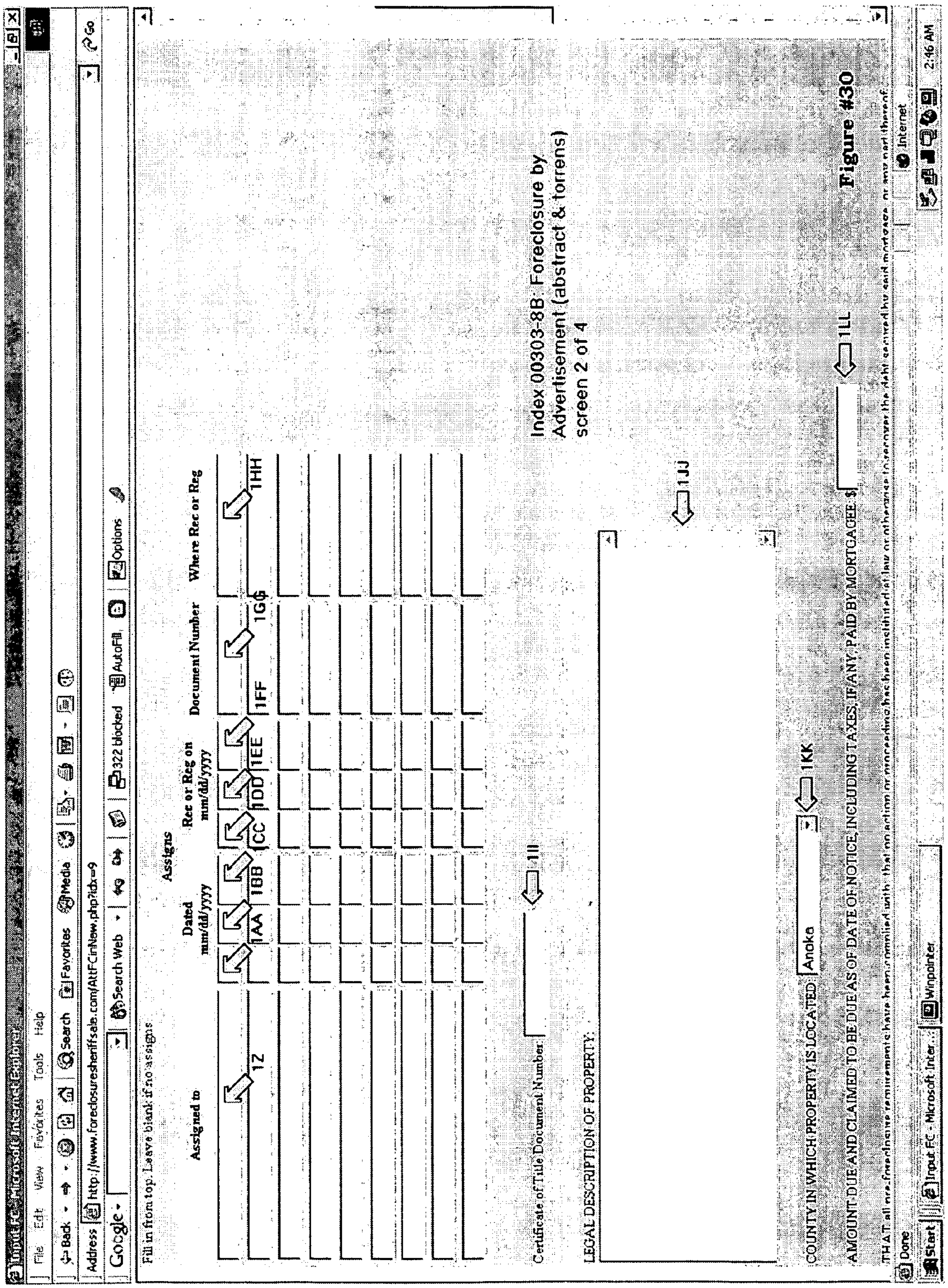
Input FC - Microsoft Internet Explorer
File Edit View Favorites Tools Help
Address http://www.foreclosuresheriffsale.com/AttFCinNew.php?idx=9
Fill in from top. Leave blank if no assigns
Assigns
Assigned to
Dated mm/dd/yyyy
Rec or Reg on mm/dd/yyyy
Document Number
Where Rec or Reg
1Z
1AA
1BB
1CC
1DD
1EE
1FF
1GG
1HH
Certificate of Title Document Number
1II
LEGAL DESCRIPTION OF PROPERTY:
1JJ
Index 00303-8B: Foreclosure by Advertisement (abstract & torrens) screen 2 of 4
COUNTY IN WHICH PROPERTY IS LOCATED
Anoka
1KK
AMOUNT DUE AND CLAIMED TO BE DUE AS OF DATE OF NOTICE, INCLUDING TAXES, IF ANY, PAID BY MORTGAGEE: $
1LL
Figure #30
Done
Internet
2:46 AM

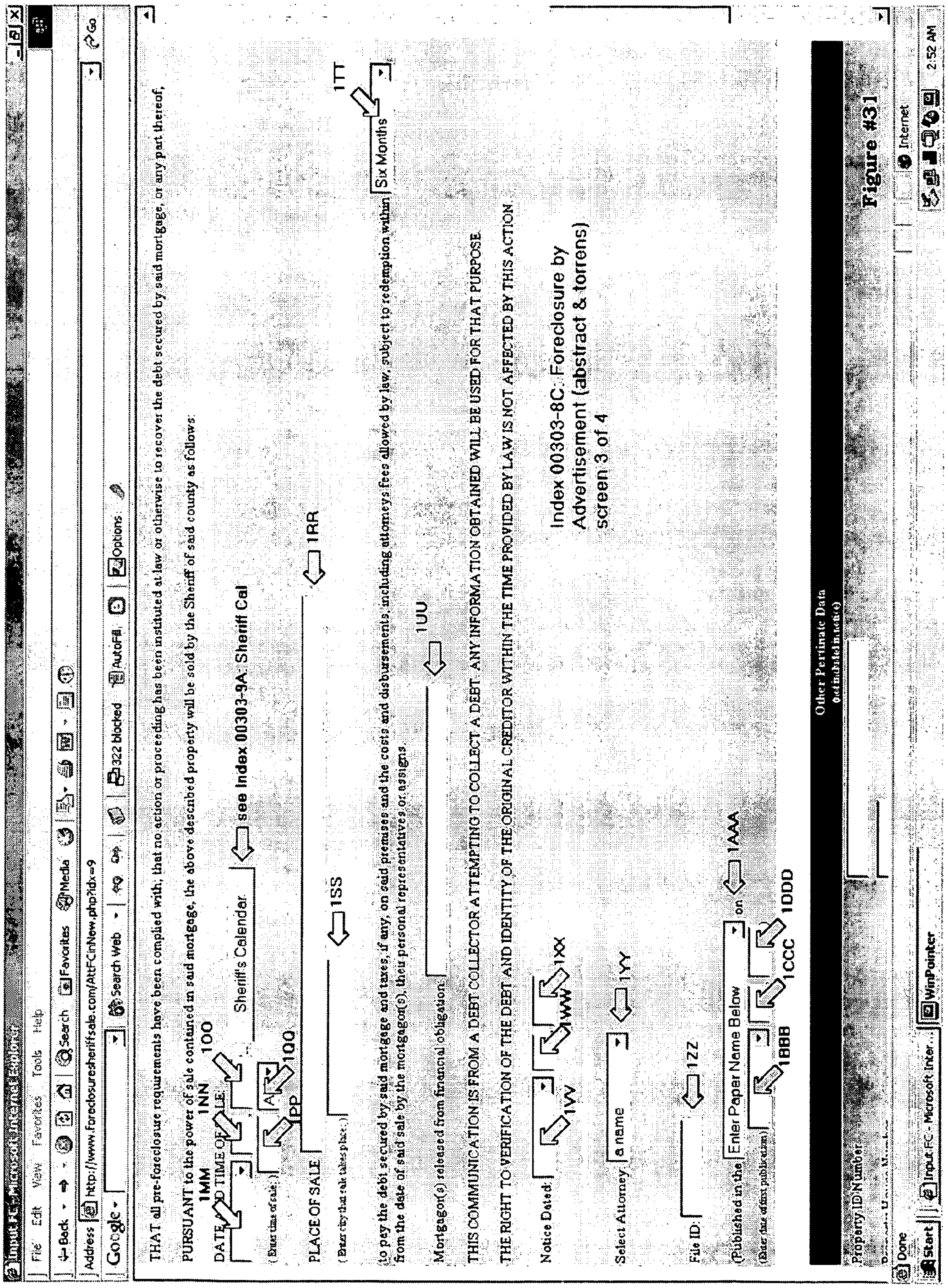
Index 00303-8C: Foreclosure by
Advertisement (abstract & torrens)
screen 3 of 4
Figure #31
THAT all pre-foreclosure requirements have been complied with; that no action or proceeding has been instituted at law or otherwise to recover the debt secured by said mortgage, or any part thereof,
PURSUANT to the power of sale contained in said mortgage, the above described property will be sold by the Sheriff of said county as follows:
DATE AND TIME OF SALE:
Sheriff's Calendar
see Index 00303-9A: Sheriff Cal
PLACE OF SALE
Six Months
Mortgagor(s) released from financial obligation:
THIS COMMUNICATION IS FROM A DEBT COLLECTOR ATTEMPTING TO COLLECT A DEBT. ANY INFORMATION OBTAINED WILL BE USED FOR THAT PURPOSE.
THE RIGHT TO VERIFICATION OF THE DEBT AND IDENTITY OF THE ORIGINAL CREDITOR WITHIN THE TIME PROVIDED BY LAW IS NOT AFFECTED BY THIS ACTION
Notice Dated:
Select Attorney
File ID:
Enter Paper Name Below
Other Pertinent Data
1MM
1NN
1OO
1PP
1QQ
1RR
1SS
1TT
1UU
1VV
1WW
1XX
1YY
1ZZ
1AAA
1BBB
1CCC
1DDD

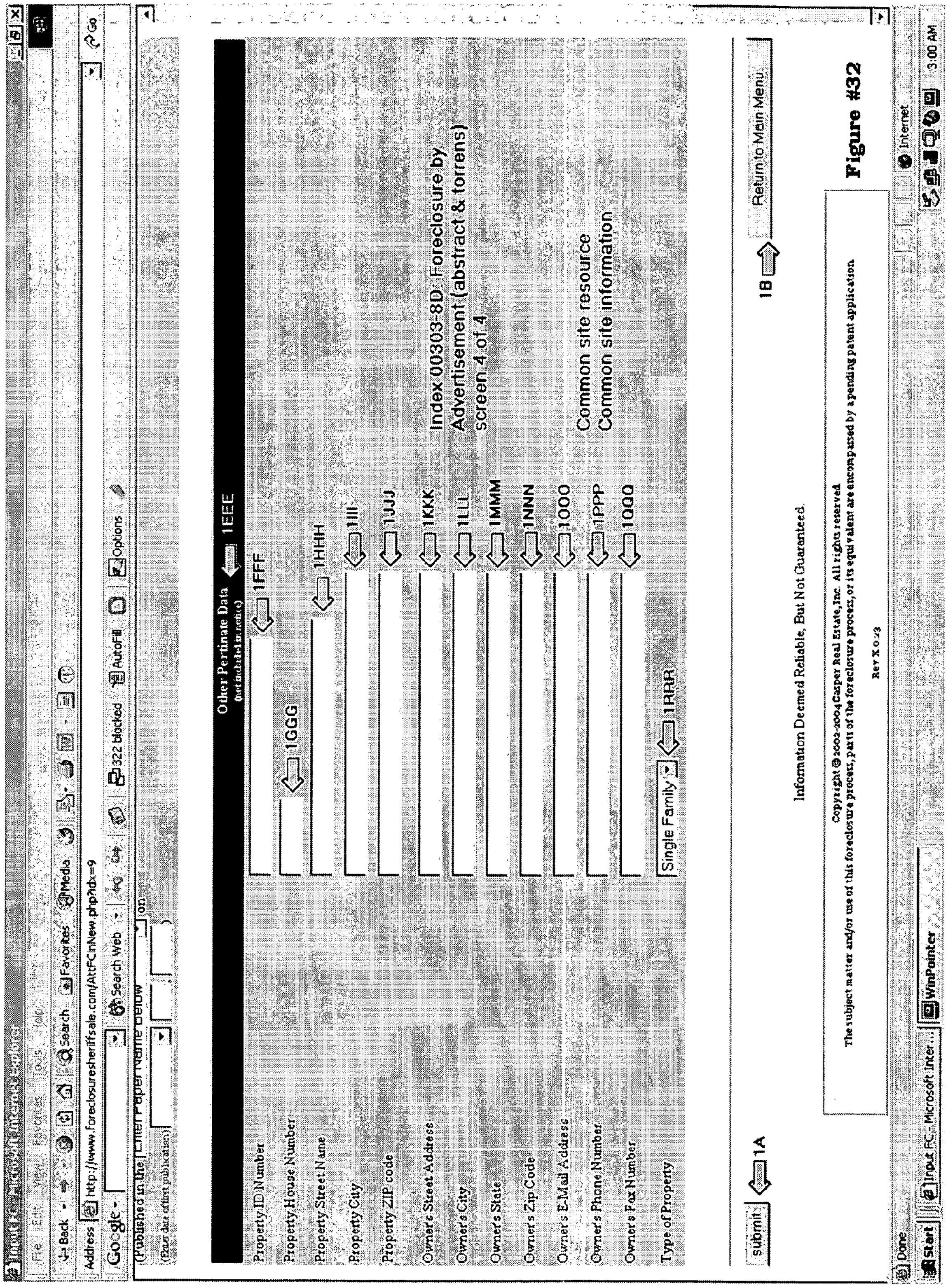
Input FC - Microsoft Internet Explorer
Address http://www.foreclosuresheriffsale.com/AttFCinNew.php?idx=9
Other Pertinate Data
1EEE
1FFF
Property ID Number
Property House Number
1GGG
Property Street Name
1HHH
Property City
1III
Property ZIP code
1JJJ
Owner's Street Address
1KKK
Owner's City
1LLL
Owner's State
1MMM
Owner's Zip Code
1NNN
Owner's E-Mail Address
1OOO
Owner's Phone Number
1PPP
Owner's Fax Number
1QQQ
Type of Property
Single Family
1RRR
Index 00303-8D: Foreclosure by Advertisement (abstract & torrens) screen 4 of 4
Common site resource
Common site information
submit
1A
1B
Return to Main Menu
Information Deemed Reliable, But Not Guaranteed.
Copyright © 2002-2004 Casper Real Estate, Inc. All rights reserved.
The subject matter and/or use of this foreclosure process, parts of the foreclosure process, or its equivalent are encompassed by a pending patent application.
Figure #32

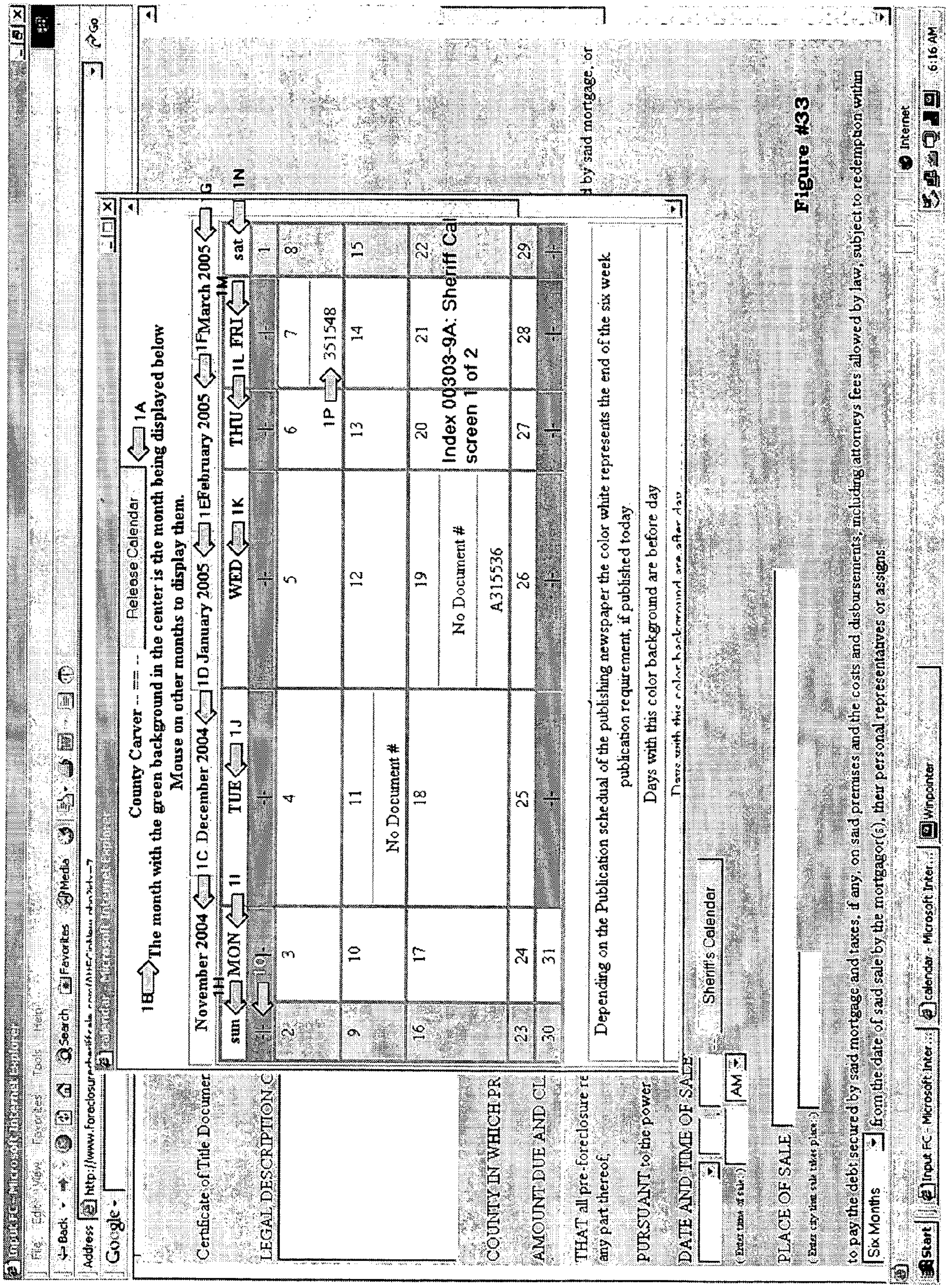
Figure #33

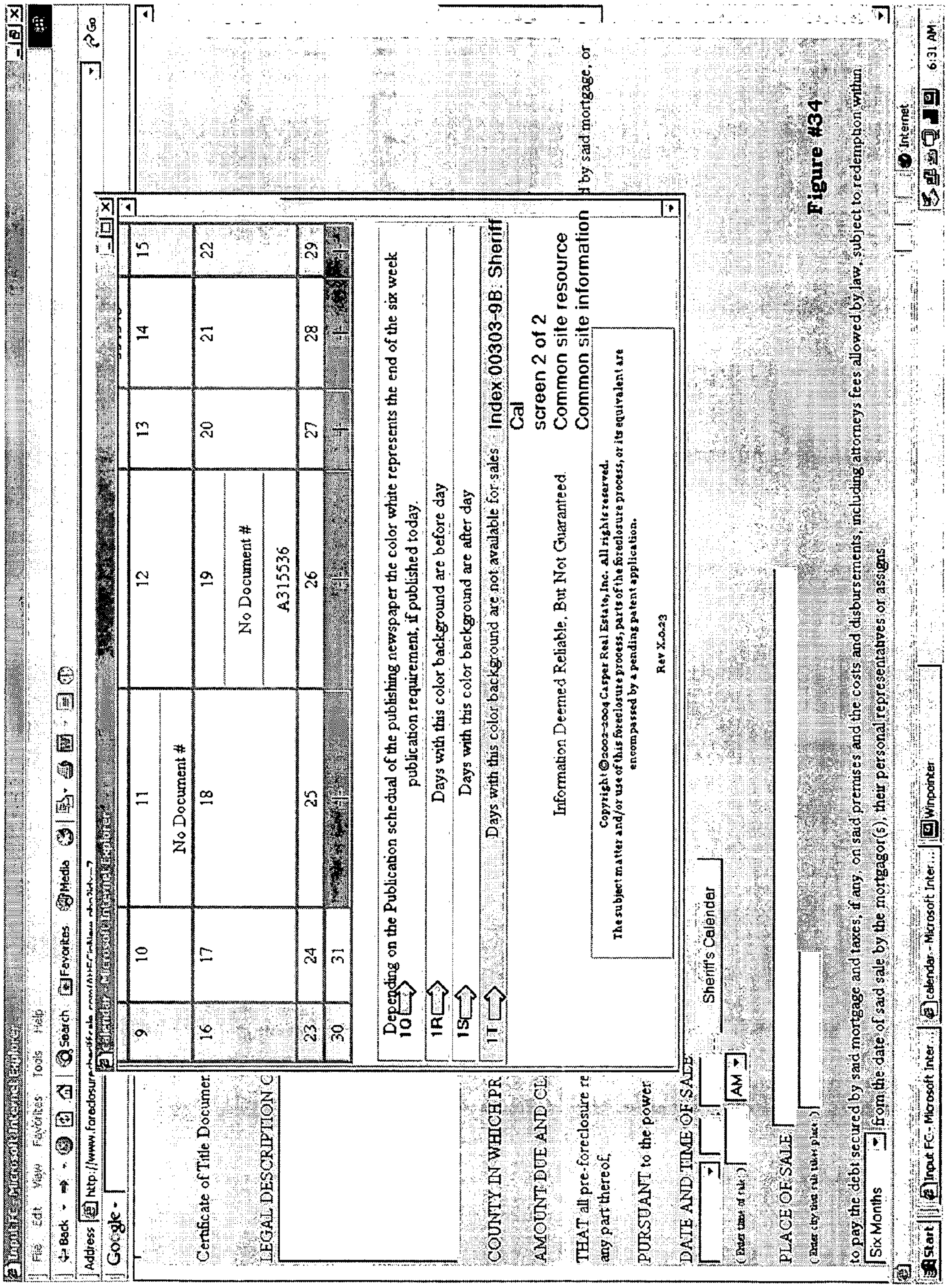
Figure #34
Depending on the Publication schedual of the publishing newspaper the color white represents the end of the six week publication requirement, if published today.
Days with this color background are before day
Days with this color background are after day
Days with this color background are not available for sales
No Document #
A315536
Index 00303-9B: Sheriff's Cal screen 2 of 2
Common site resource
Common site information
Information Deemed Reliable, But Not Guaranteed.
Copyright ©2002-2004 Casper Real Estate, Inc. All rights reserved.
The subject matter and/or use of this foreclosure process, parts of the foreclosure process, or its equivalent are encompassed by a pending patent application.
Rev X.0.23
Sheriff's Calender
Certificate of Title Document
LEGAL DESCRIPTION
COUNTY IN WHICH PR
AMOUNT DUE AND CL
THAT all pre-foreclosure re any part thereof,
PURSUANT to the power
DATE AND TIME OF SALE
PLACE OF SALE
to pay the debt secured by said mortgage and taxes, if any, on said premises and the costs and disbursements, including attorneys fees allowed by law, subject to redemption within
Six Months
from the date of said sale by the mortgagor(s), their personal representatives or assigns.
by said mortgage, or

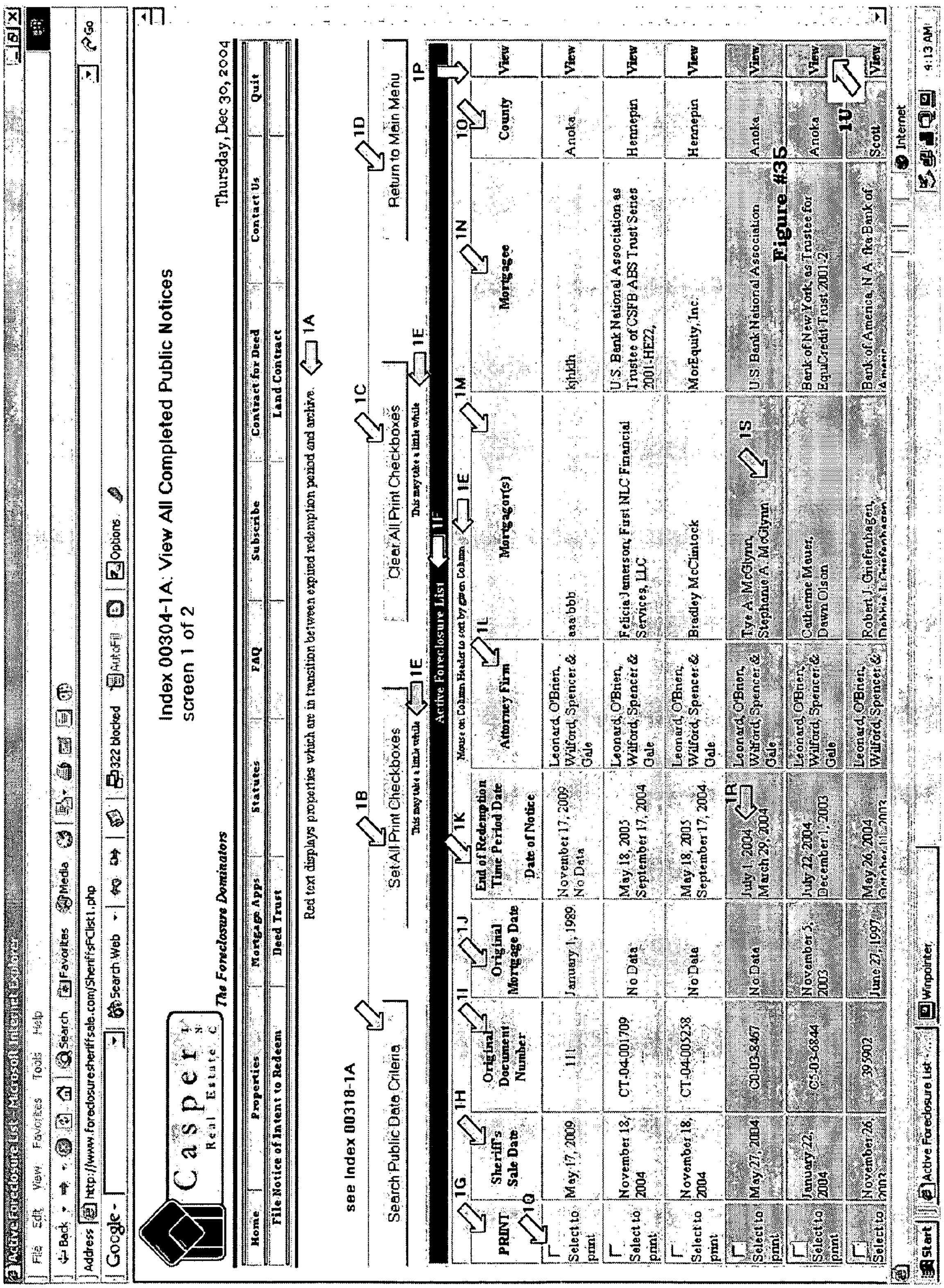
Active Foreclosure List - Microsoft Internet Explorer
http://www.foreclosuresheriffsale.com/SheriffsFClist1.php
Casper Real Estate
The Foreclosure Dominators
Index 00304-1A: View All Completed Public Notices
screen 1 of 2
Thursday, Dec 30, 2004
Home
Properties
Mortgage Apps
Statutes
FAQ
Subscribe
Contract for Deed
Contact Us
Quit
File Notice of Intent to Redeem
Deed Trust
Land Contract
Red text displays properties which are in transition between expired redemption period and archive.
see Index 00318-1A
Search Public Date Criteria
Set All Print Checkboxes
Clear All Print Checkboxes
Return to Main Menu
This may take a little while
Active Foreclosure List
Mouse on Column Header to sort by given Column
PRINT
Sheriff's Sale Date
Original Document Number
Original Mortgage Date
End of Redemption Time Period Date
Date of Notice
Attorney Firm
Mortgagor(s)
Mortgagee
County
Select to print
View
1A
1B
1C
1D
1E
1F
1G
1H
1I
1J
1K
1L
1M
1N
1O
1P
1Q
1R
1S
1U
Figure #35

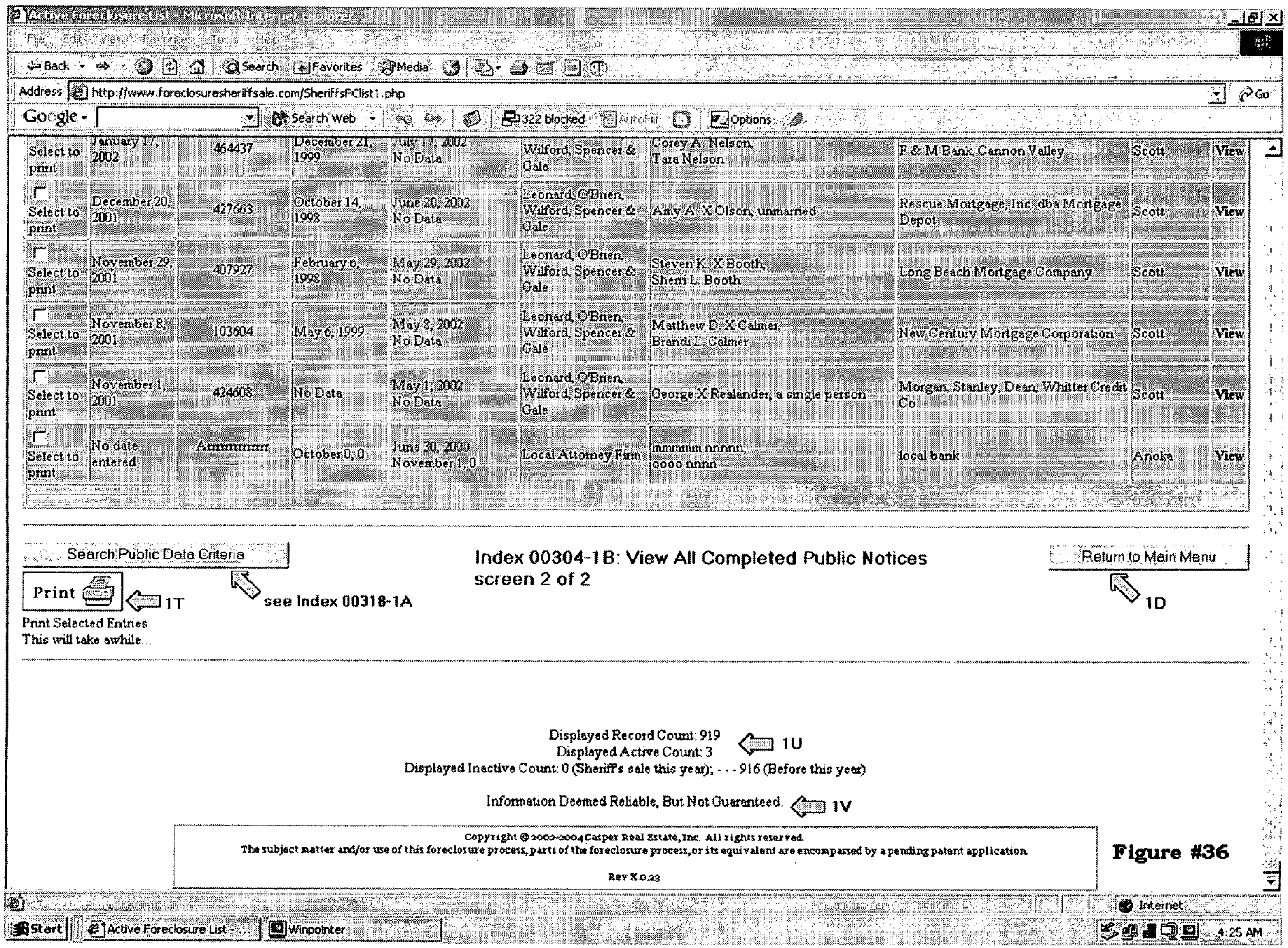
Figure #36

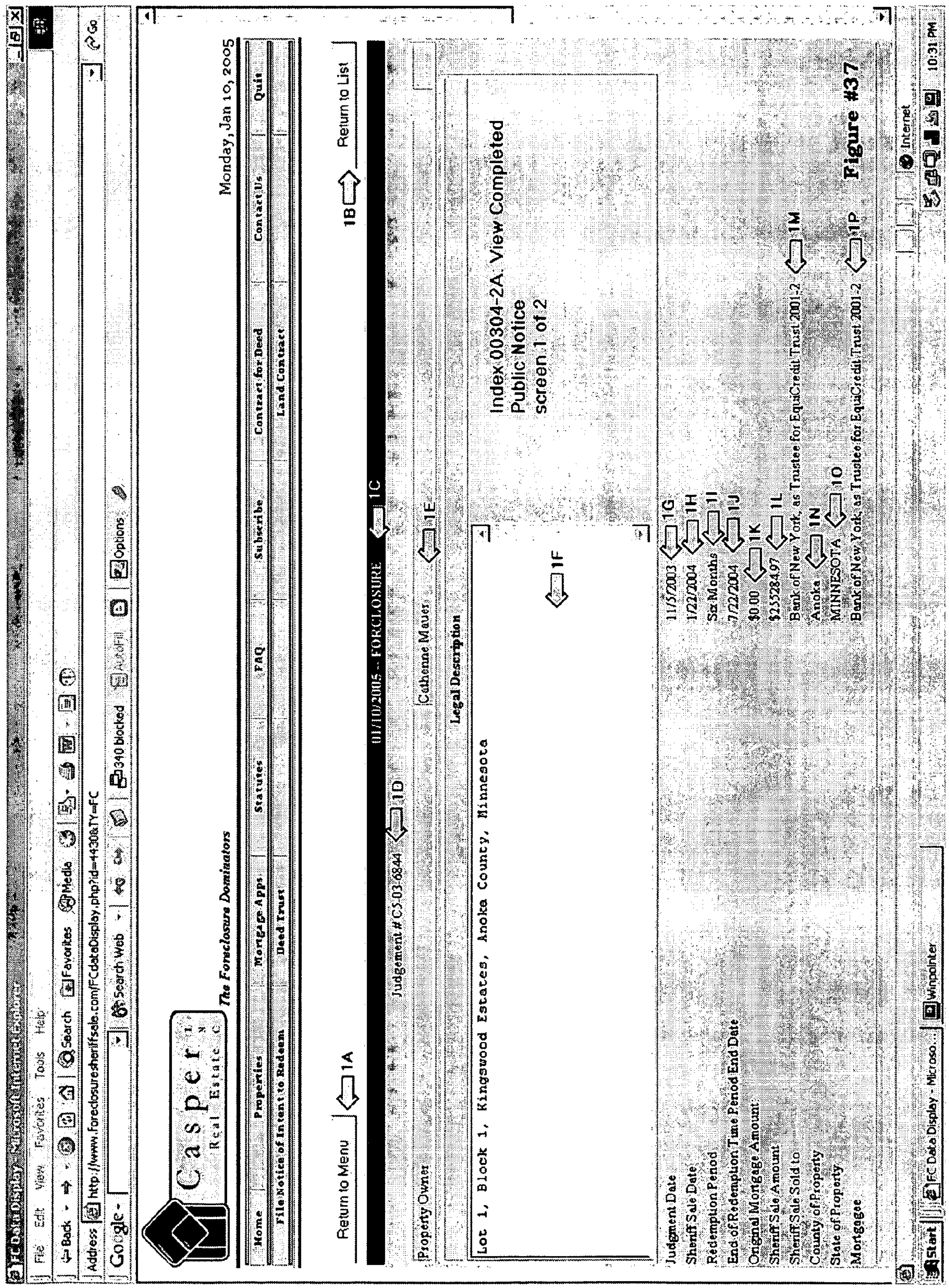
Figure #37

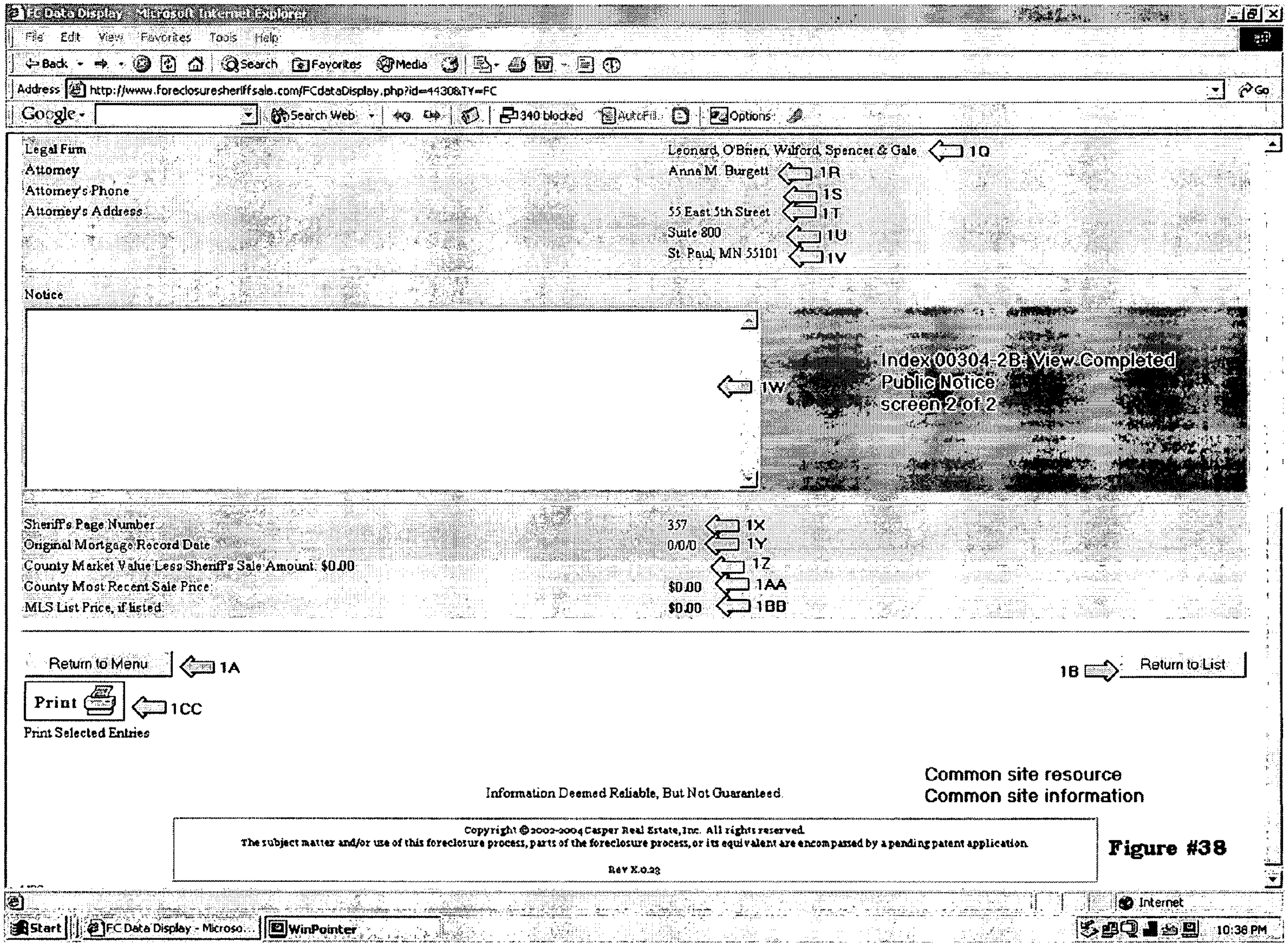
Figure #38

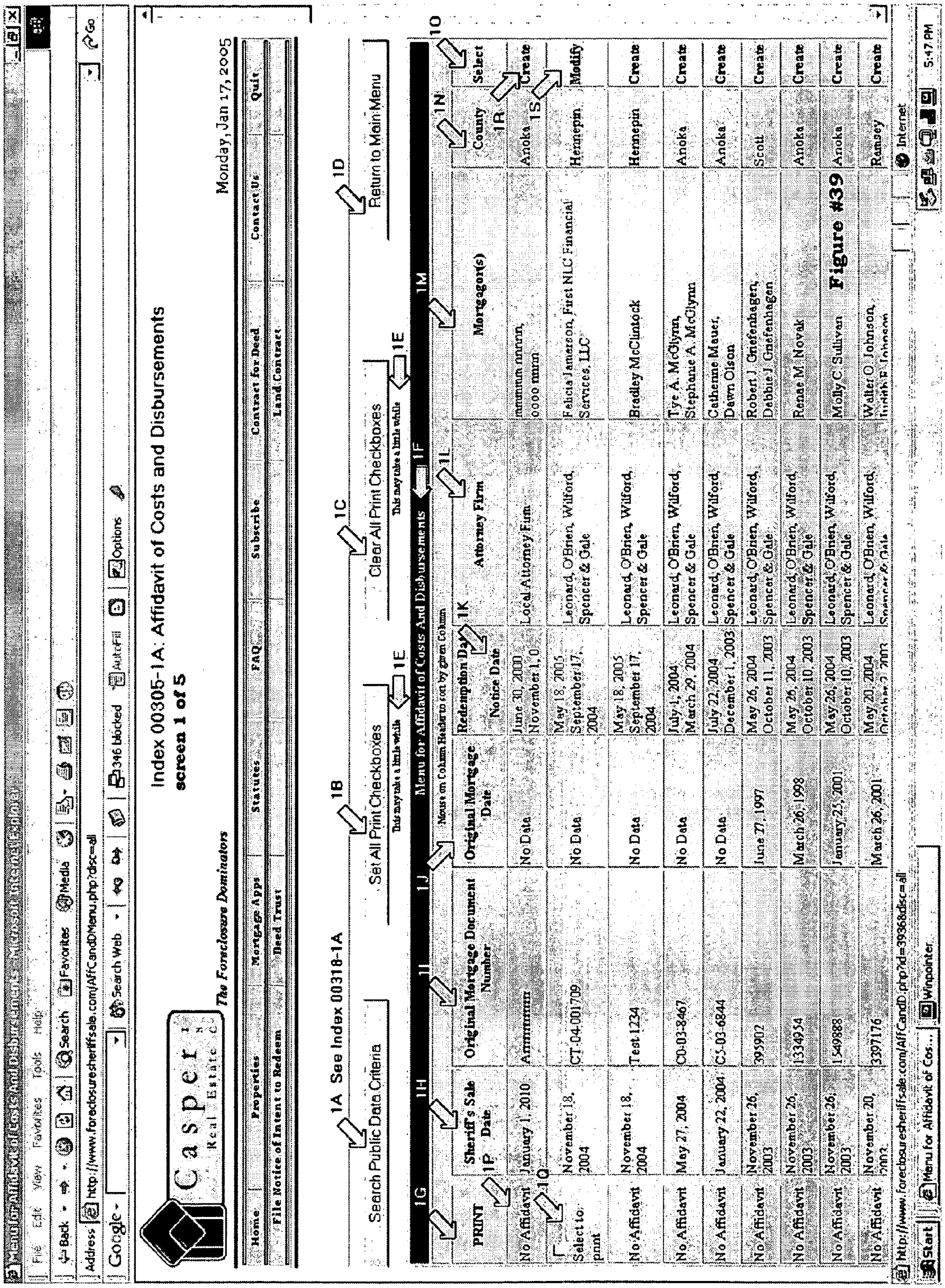
Menu for Affidavit of Costs And Disbursements - Microsoft Internet Explorer
Casper Real Estate
The Foreclosure Dominators
Index 00305-1A: Affidavit of Costs and Disbursements
screen 1 of 5
Monday, Jan 17, 2005
1A See Index 00318-1A
Search Public Data Criteria
1B
Set All Print Checkboxes
1C
Clear All Print Checkboxes
1D
Return to Main Menu
1E
1F
1G
1H
1I
1J
1K
1L
1M
1N
1O
1P
1Q
1R
1S
Menu for Affidavit of Costs And Disbursements
PRINT
Sheriff's Sale Date
Original Mortgage Document Number
Original Mortgage Date
Redemption Day
Notice Date
Attorney Firm
Mortgagor(s)
County
Select
Figure #39

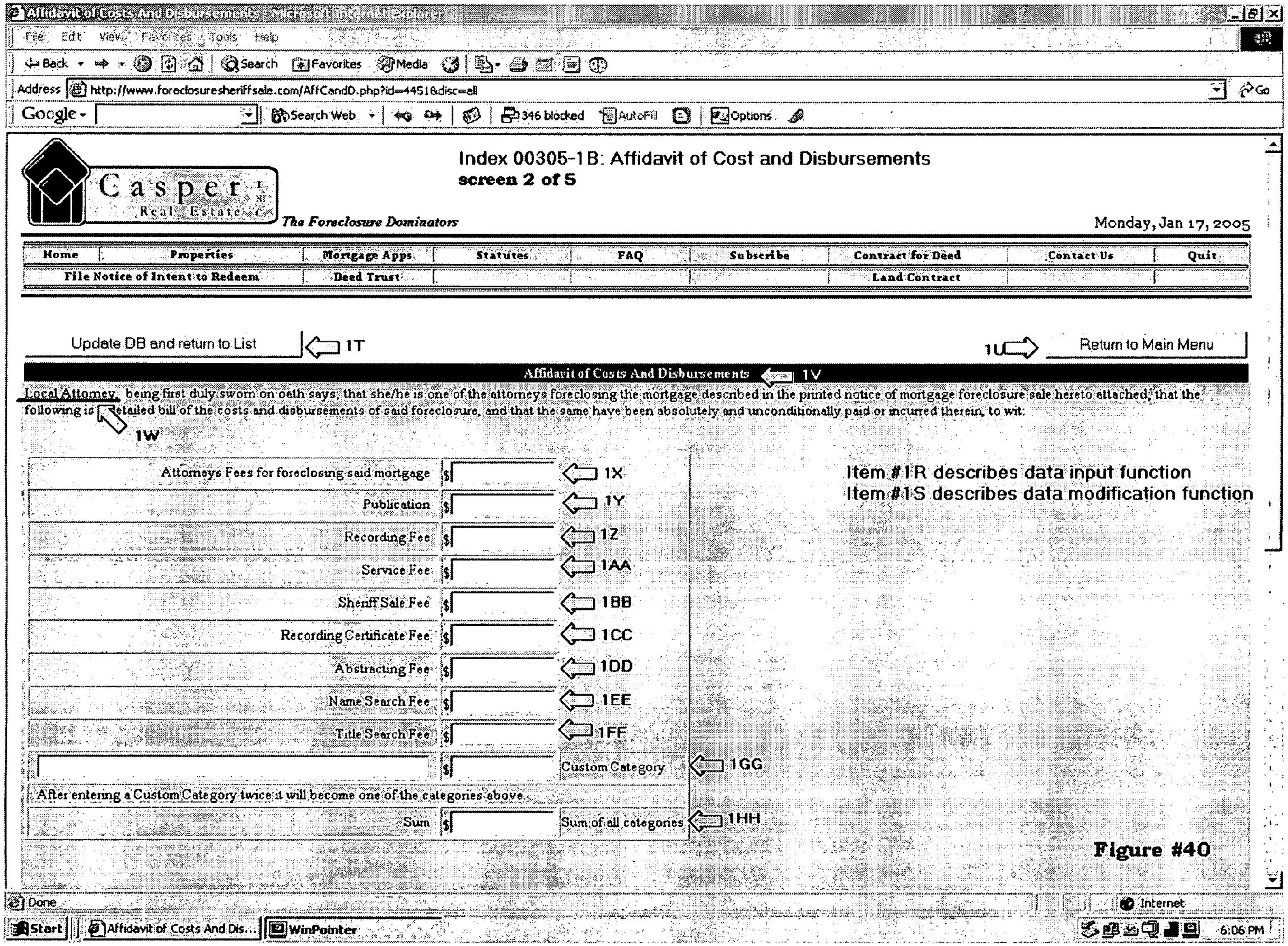
Figure #40

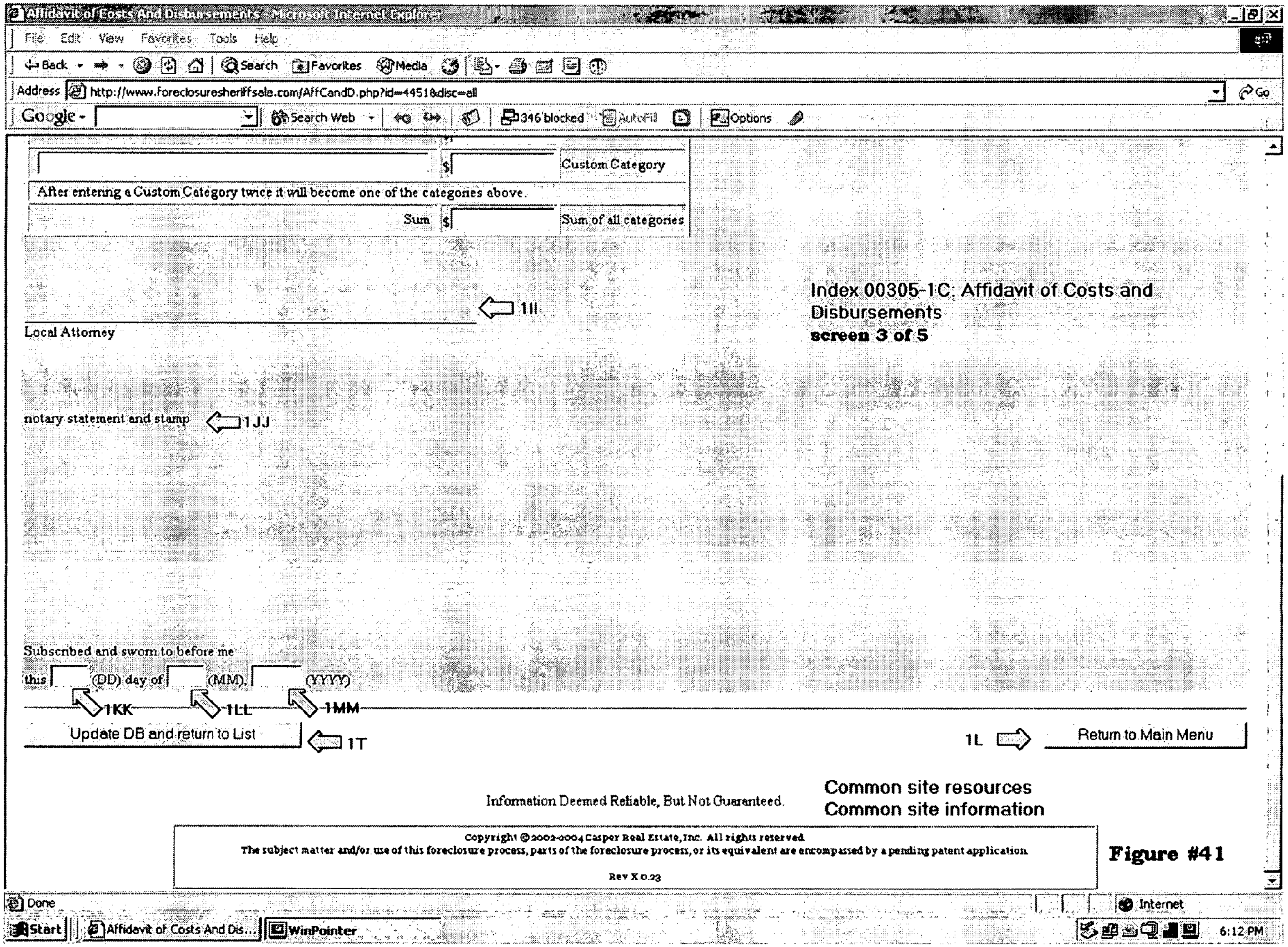
Figure #41

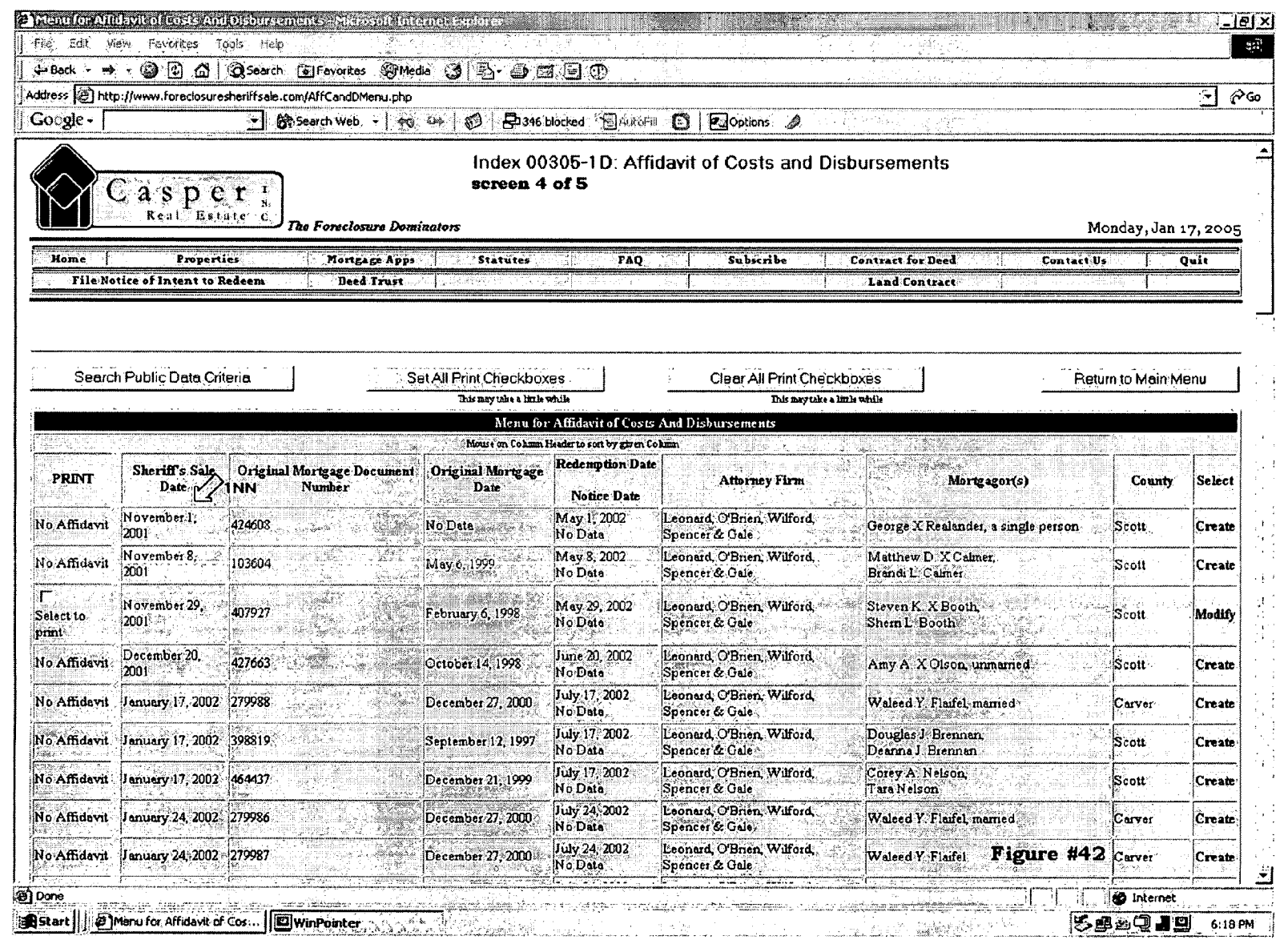

Menu for Affidavit of Costs And Disbursements - Microsoft Internet Explorer

File Edit View Favorites Tools Help

Back Search Favorites Media

Address http://www.foreclosuresheriffsale.com/AffCandDMenu.php Go

Google - Search Web 346 blocked AutoFill Options

Casper Real Estate INC.

*The Foreclosure Dominators*

Index 00305-1D: Affidavit of Costs and Disbursements
screen 4 of 5

Monday, Jan 17, 2005

| Home | Properties | Mortgage Apps | Statutes | FAQ | Subscribe | Contract for Deed | Contact Us | Quit |
|---|---|---|---|---|---|---|---|---|
| File Notice of Intent to Redeem | | Deed Trust | | | | Land Contract | | |

Search Public Data Criteria | Set All Print Checkboxes (This may take a little while) | Clear All Print Checkboxes (This may take a little while) | Return to Main Menu

Menu for Affidavit of Costs And Disbursements

Mouse on Column Header to sort by given Column

| PRINT | Sheriff's Sale Date | Original Mortgage Document Number | Original Mortgage Date | Redemption Date / Notice Date | Attorney Firm | Mortgagor(s) | County | Select |
|---|---|---|---|---|---|---|---|---|
| No Affidavit | November 1, 2001 | 424608 | No Date | May 1, 2002 No Date | Leonard, O'Brien, Wilford, Spencer & Gale | George X Realander, a single person | Scott | Create |
| No Affidavit | November 8, 2001 | 103604 | May 6, 1999 | May 8, 2002 No Date | Leonard, O'Brien, Wilford, Spencer & Gale | Matthew D. X Calmer, Brandi L Calmer | Scott | Create |
| Select to print | November 29, 2001 | 407927 | February 6, 1998 | May 29, 2002 No Date | Leonard, O'Brien, Wilford, Spencer & Gale | Steven K. X Booth, Sherri L Booth | Scott | Modify |
| No Affidavit | December 20, 2001 | 427663 | October 14, 1998 | June 20, 2002 No Date | Leonard, O'Brien, Wilford, Spencer & Gale | Amy A. X Olson, unmarried | Scott | Create |
| No Affidavit | January 17, 2002 | 279988 | December 27, 2000 | July 17, 2002 No Date | Leonard, O'Brien, Wilford, Spencer & Gale | Waleed Y. Flaifel, married | Carver | Create |
| No Affidavit | January 17, 2002 | 398819 | September 12, 1997 | July 17, 2002 No Date | Leonard, O'Brien, Wilford, Spencer & Gale | Douglas J. Brennan, Deanna J. Brennan | Scott | Create |
| No Affidavit | January 17, 2002 | 464437 | December 21, 1999 | July 17, 2002 No Date | Leonard, O'Brien, Wilford, Spencer & Gale | Corey A. Nelson, Tara Nelson | Scott | Create |
| No Affidavit | January 24, 2002 | 279986 | December 27, 2000 | July 24, 2002 No Date | Leonard, O'Brien, Wilford, Spencer & Gale | Waleed Y. Flaifel, married | Carver | Create |
| No Affidavit | January 24, 2002 | 279987 | December 27, 2000 | July 24, 2002 No Date | Leonard, O'Brien, Wilford, Spencer & Gale | Waleed Y. Flaifel | Carver | Create |

Done Internet

Start | Menu for Affidavit of Cos... | WinPointer 6:18 PM

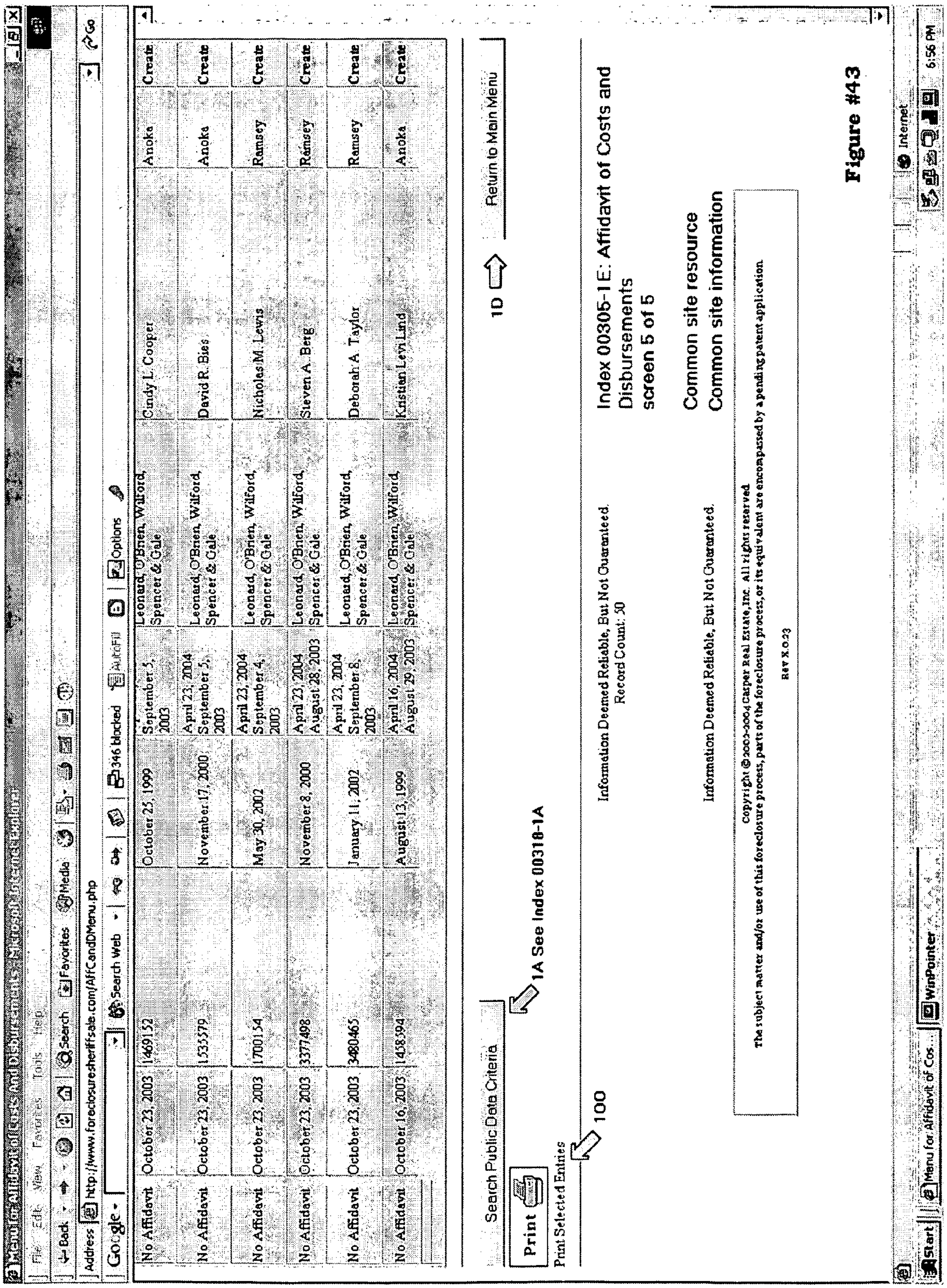
Menu for Affidavit of Costs And Disbursements - Microsoft Internet Explorer
http://www.foreclosuresheriffsale.com/AffCandDMenu.php
No Affidavit October 23, 2003 1469152 October 25, 1999 September 5, 2003 Leonard, O'Brien, Wilford, Spencer & Gale Cindy L. Cooper Anoka Create
No Affidavit October 23, 2003 1535579 November 17, 2000 April 23, 2004 September 5, 2003 Leonard, O'Brien, Wilford, Spencer & Gale David R. Bies Anoka Create
No Affidavit October 23, 2003 1700154 May 30, 2002 April 23, 2004 September 4, 2003 Leonard, O'Brien, Wilford, Spencer & Gale Nicholas M. Lewis Ramsey Create
No Affidavit October 23, 2003 3377498 November 8, 2000 April 23, 2004 August 28, 2003 Leonard, O'Brien, Wilford, Spencer & Gale Steven A. Berg Ramsey Create
No Affidavit October 23, 2003 3480465 January 11, 2002 April 23, 2004 September 8, 2003 Leonard, O'Brien, Wilford, Spencer & Gale Deborah A. Taylor Ramsey Create
No Affidavit October 16, 2003 1458394 August 13, 1999 April 16, 2004 August 29, 2003 Leonard, O'Brien, Wilford, Spencer & Gale Kristian Levi Lind Anoka Create
Search Public Data Criteria
Print
Print Selected Entries
100
1A See Index 00318-1A
1D
Return to Main Menu
Information Deemed Reliable, But Not Guaranteed.
Record Count: 50
Information Deemed Reliable, But Not Guaranteed.
Copyright ©2003-2004 Carper Real Estate, Inc. All rights reserved
The subject matter and/or use of this foreclosure process, parts of the foreclosure process, or its equivalent are encompassed by a pending patent application
Rev X.0.23
Index 00305-1E: Affidavit of Costs and Disbursements
screen 5 of 5
Common site resource
Common site information
Figure #43

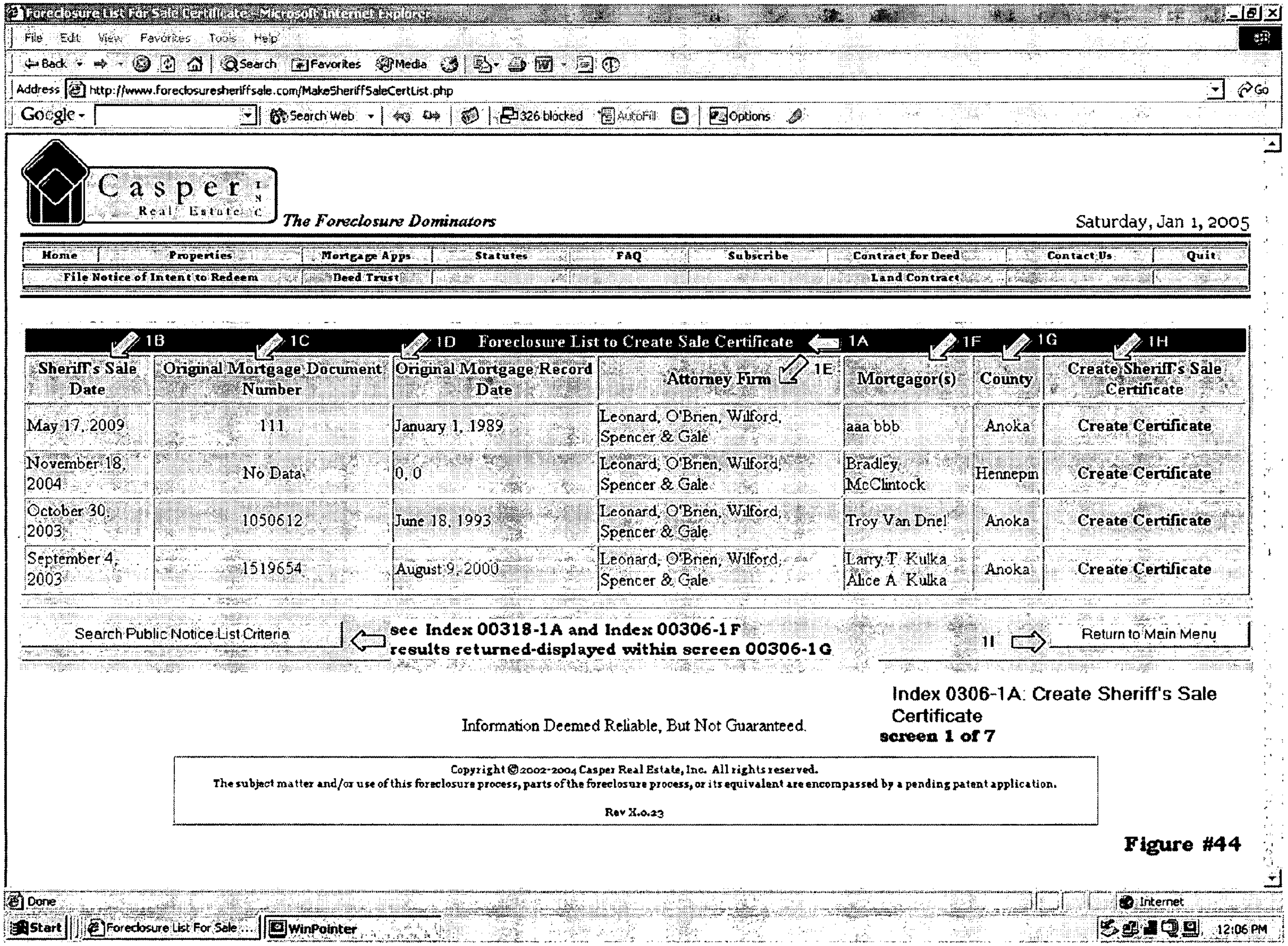

| Sheriff's Sale Date | Original Mortgage Document Number | Original Mortgage Record Date | Attorney Firm | Mortgagor(s) | County | Create Sheriff's Sale Certificate |
|---|---|---|---|---|---|---|
| May 17, 2009 | 111 | January 1, 1989 | Leonard, O'Brien, Wilford, Spencer & Gale | aaa bbb | Anoka | Create Certificate |
| November 18, 2004 | No Data | 0, 0 | Leonard, O'Brien, Wilford, Spencer & Gale | Bradley McClintock | Hennepin | Create Certificate |
| October 30, 2003 | 1050612 | June 18, 1993 | Leonard, O'Brien, Wilford, Spencer & Gale | Troy Van Driel | Anoka | Create Certificate |
| September 4, 2003 | 1519654 | August 9, 2000 | Leonard, O'Brien, Wilford, Spencer & Gale | Larry T Kulka Alice A Kulka | Anoka | Create Certificate |

Figure #44

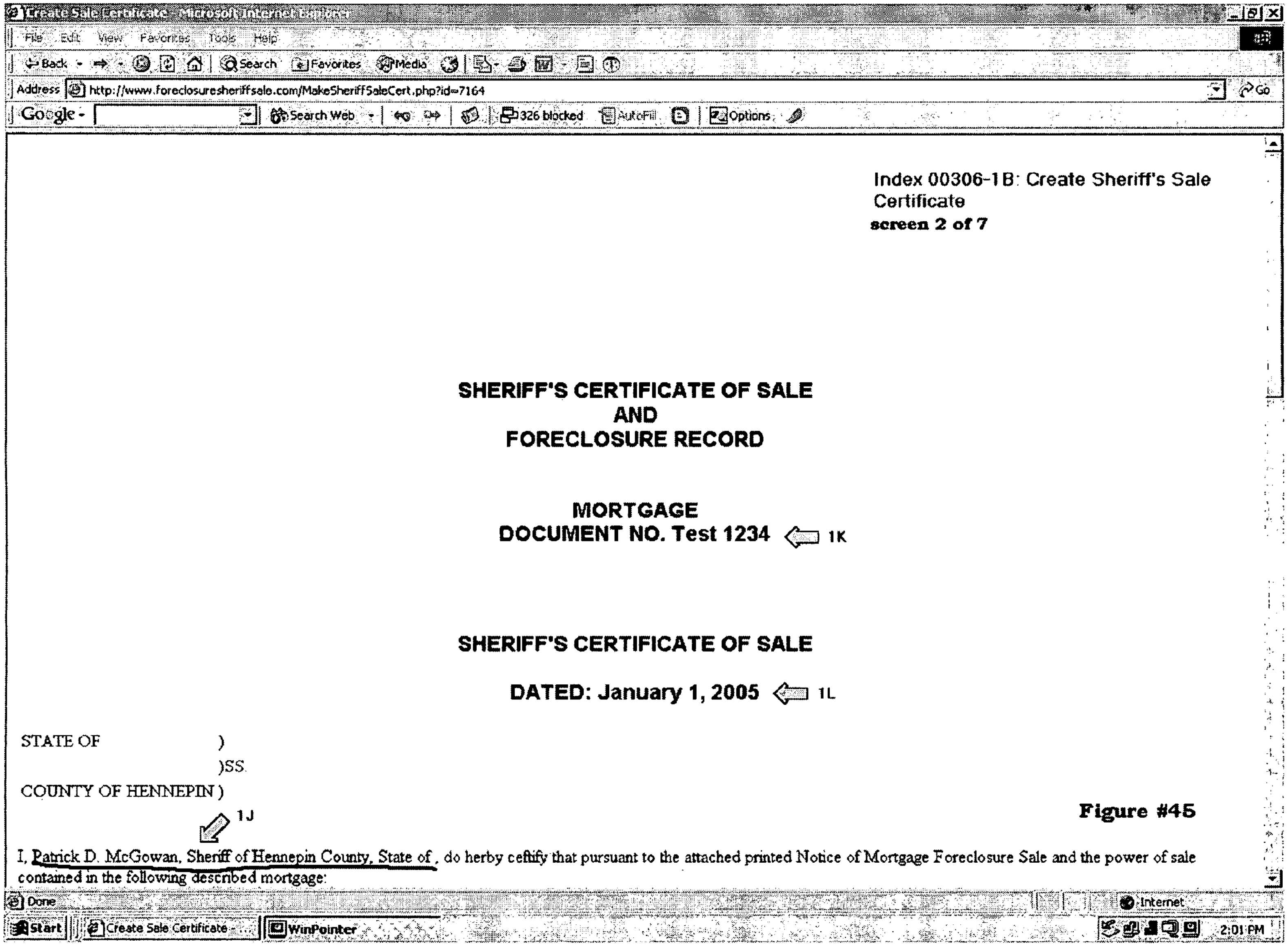
Figure #45

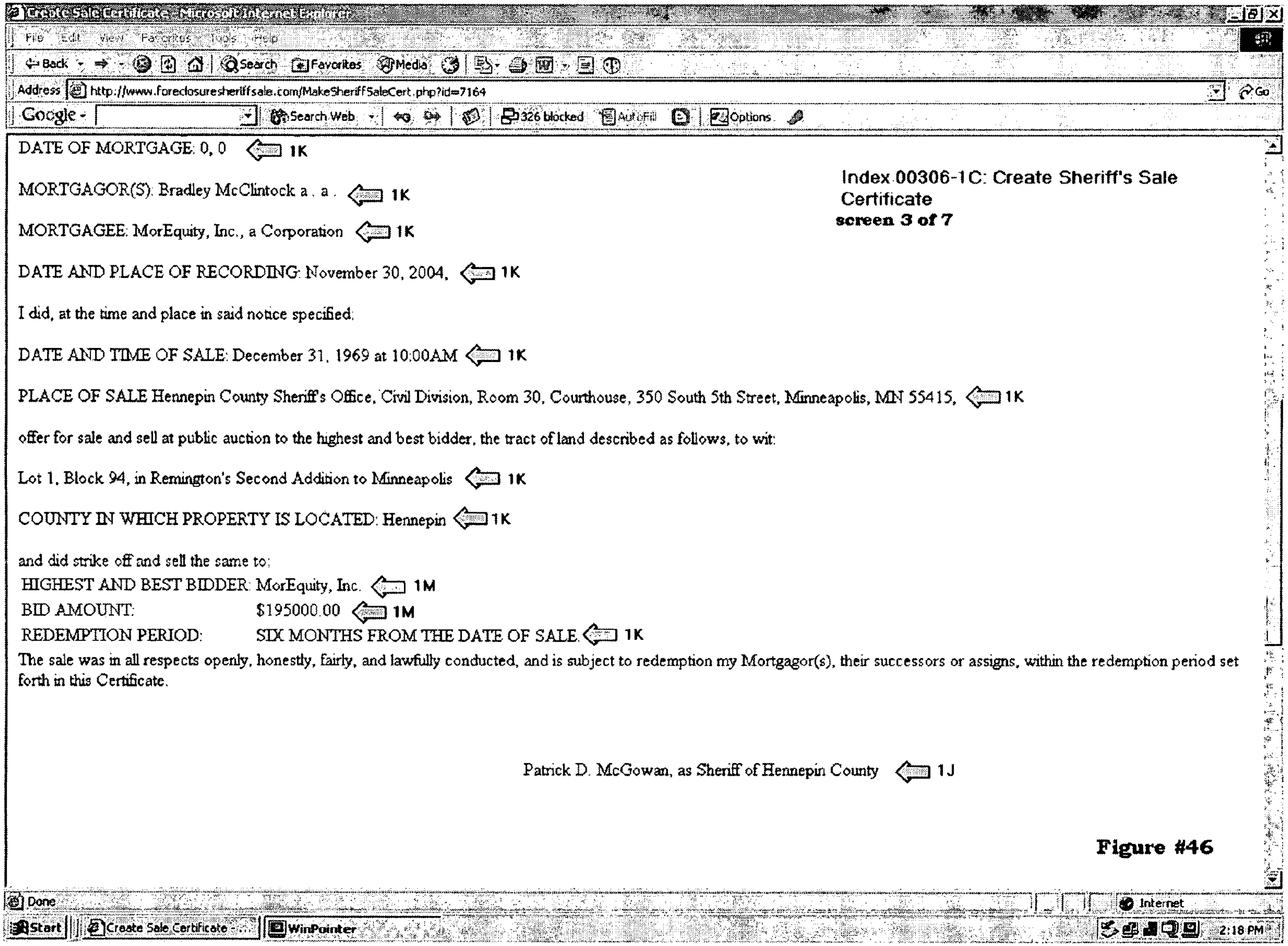
Figure #46

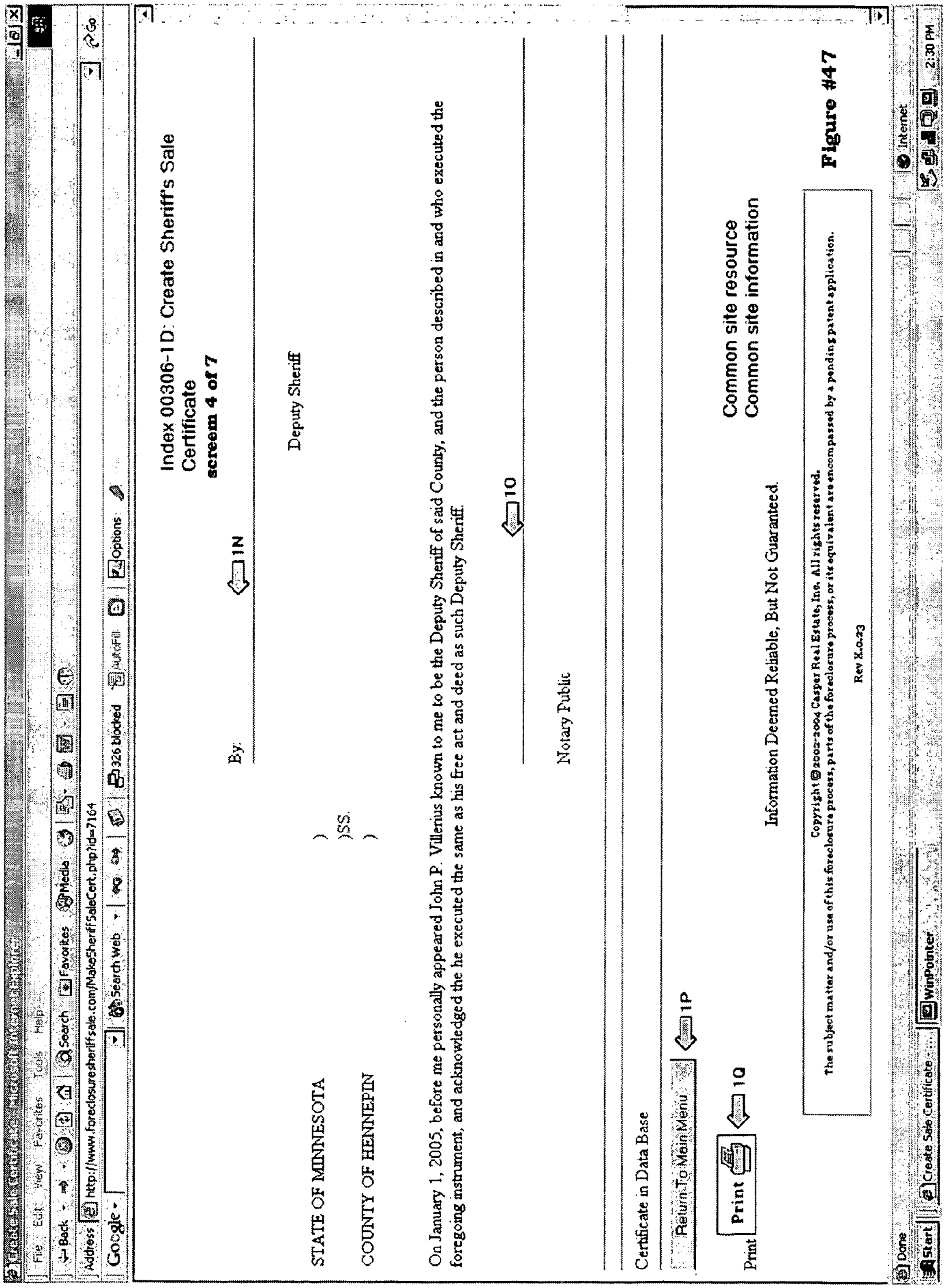
Figure #47

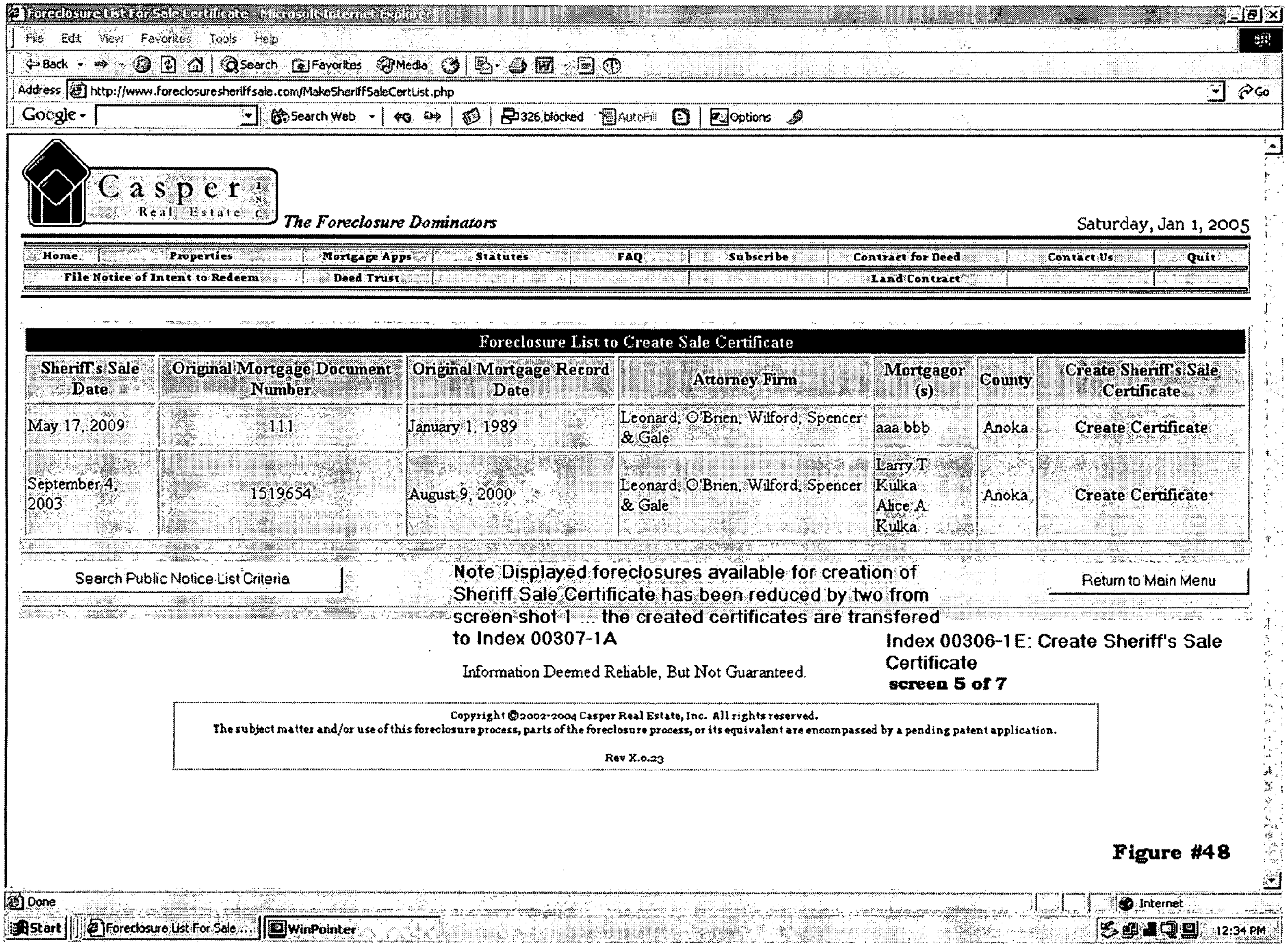
Figure #48

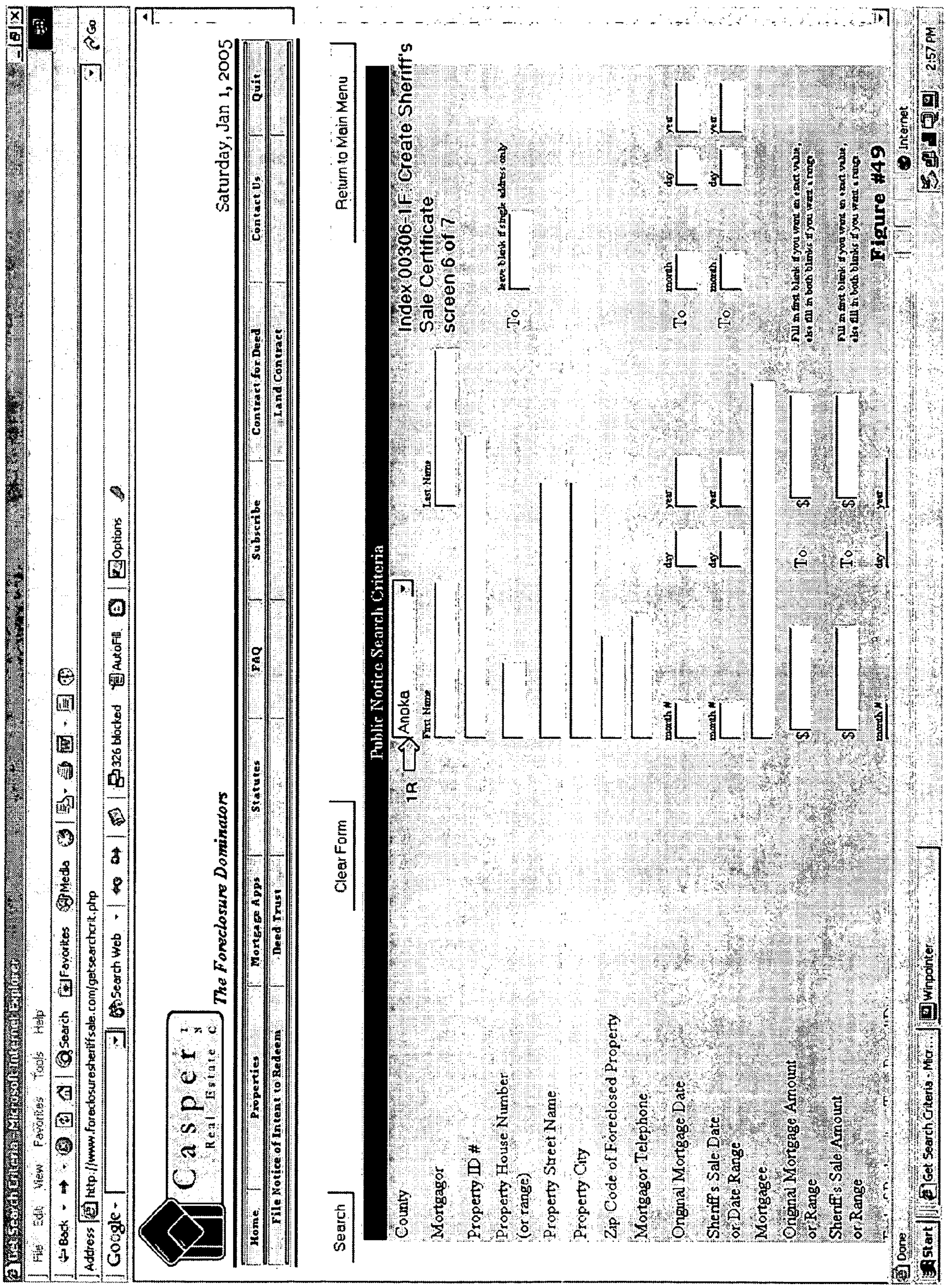
Figure #49

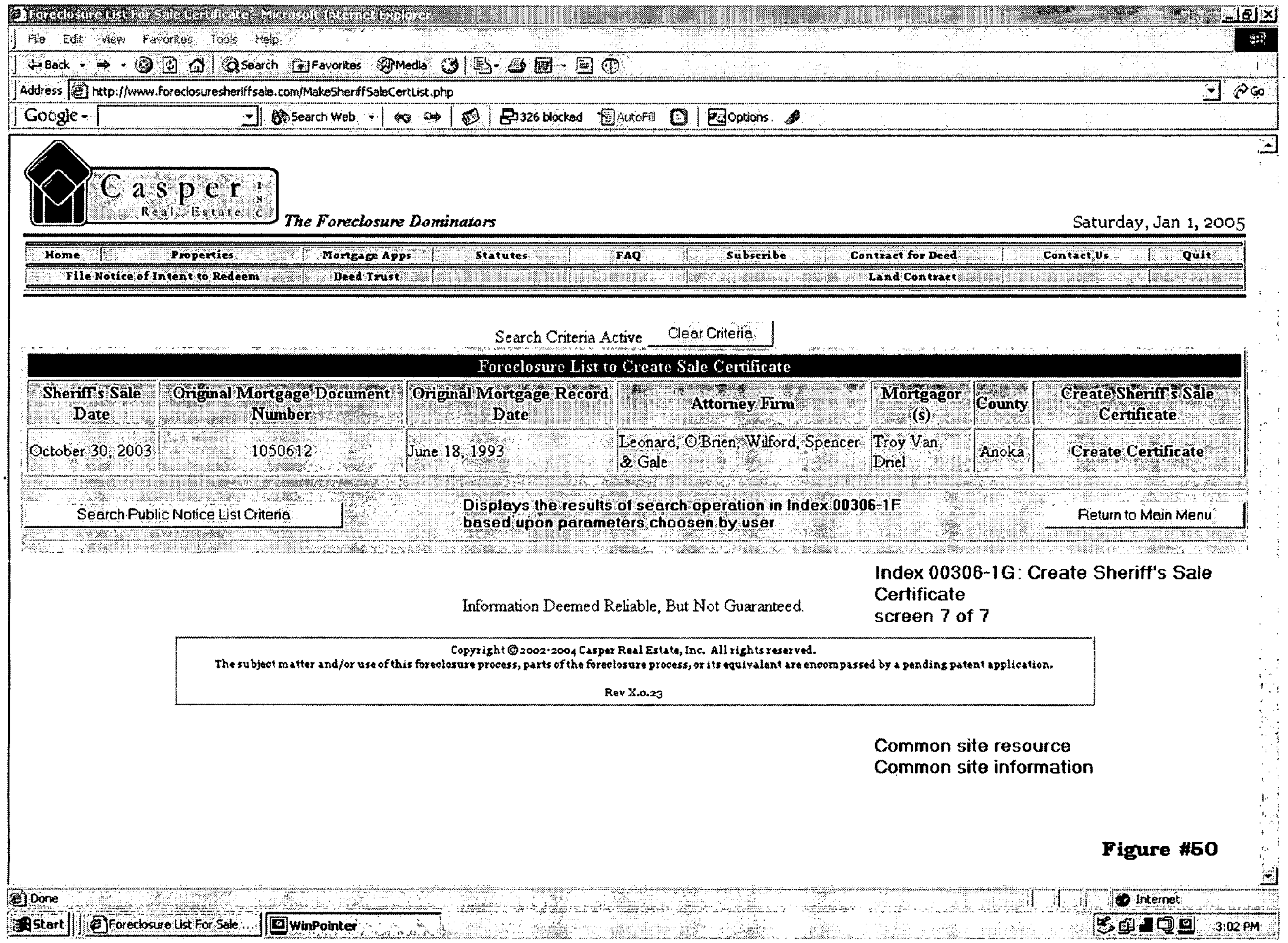
Index 00306-1G: Create Sheriff's Sale Certificate
screen 7 of 7
Common site resource
Common site information
Figure #50

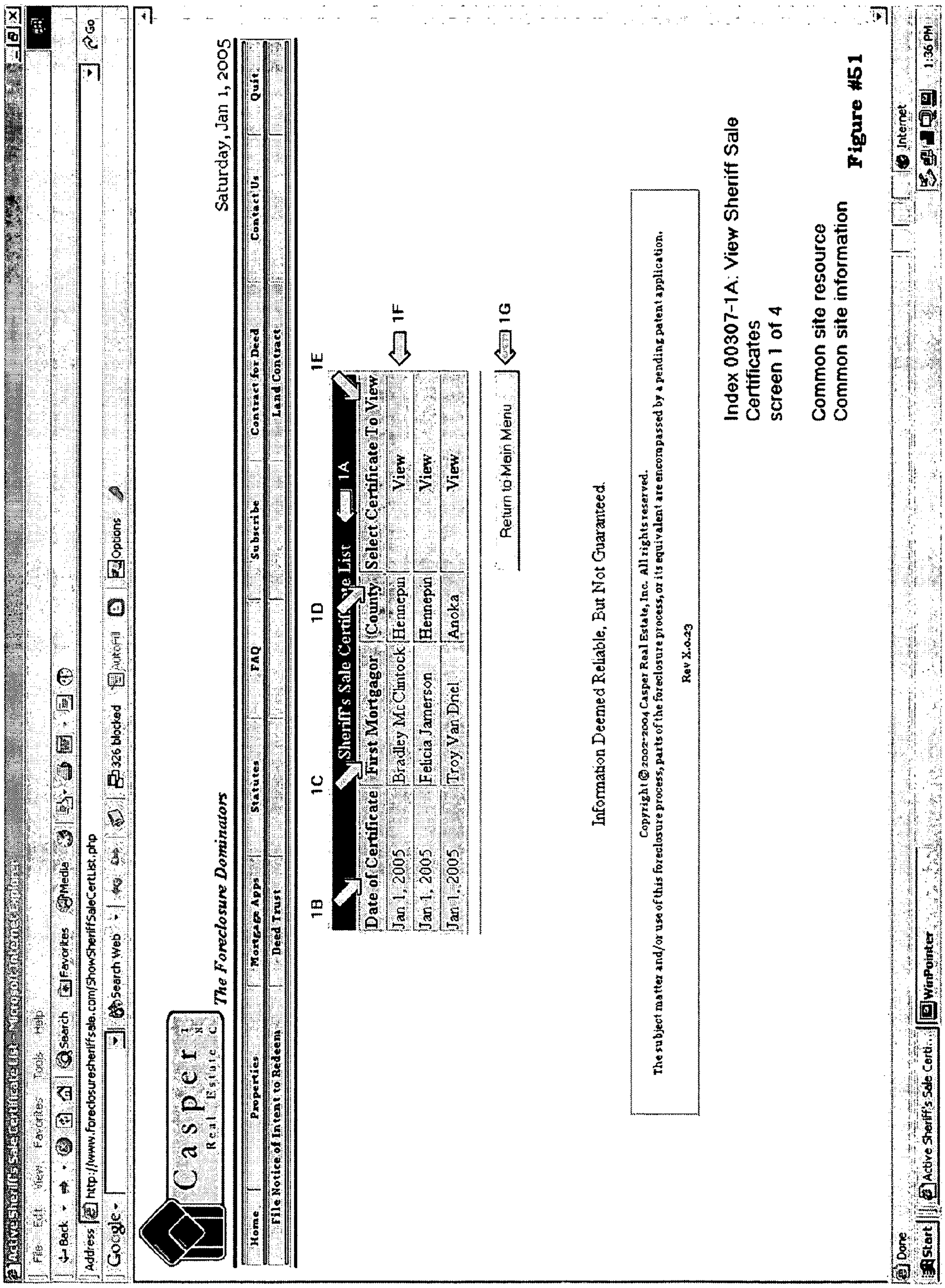
Figure #51

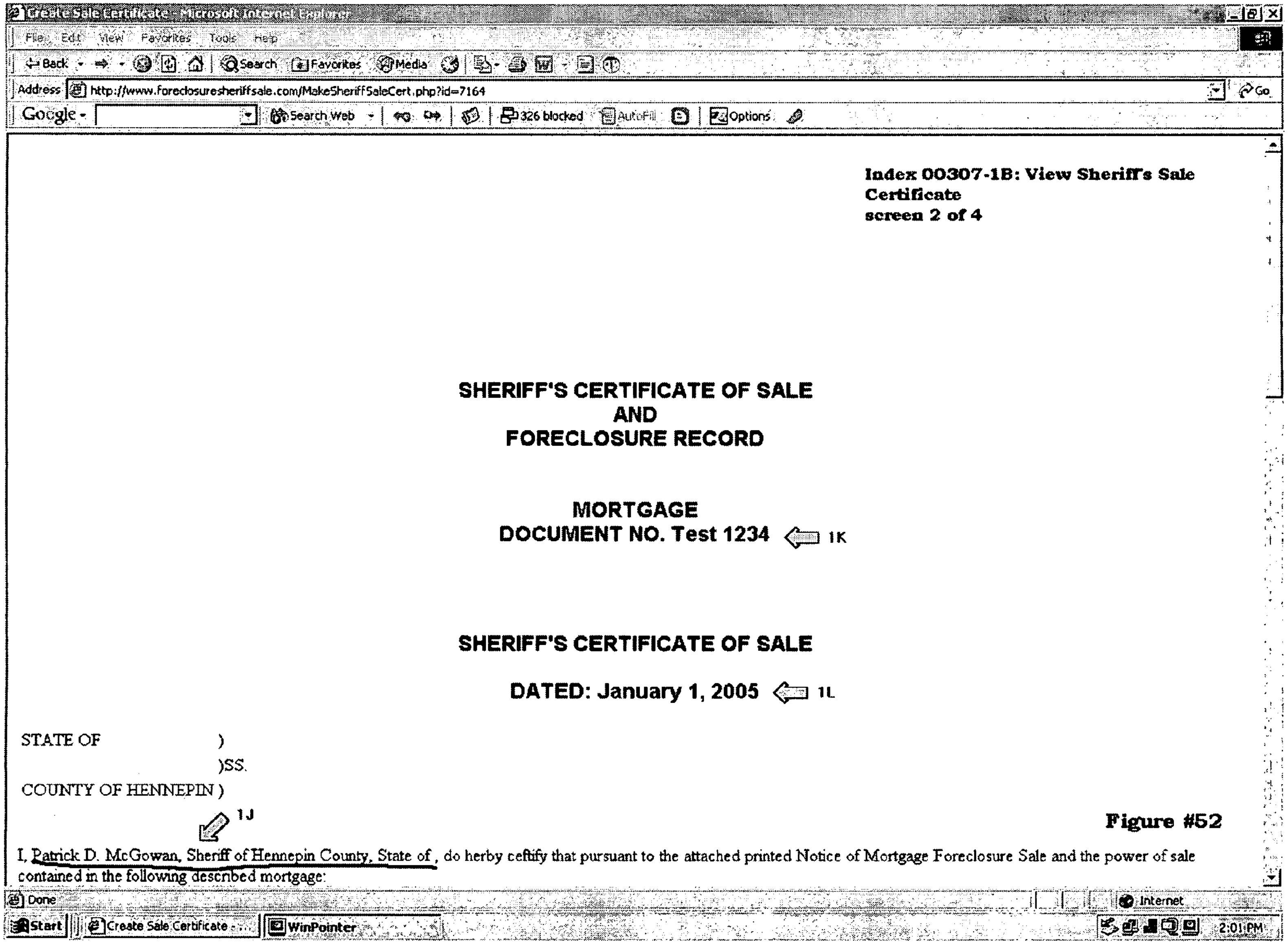
Figure #52

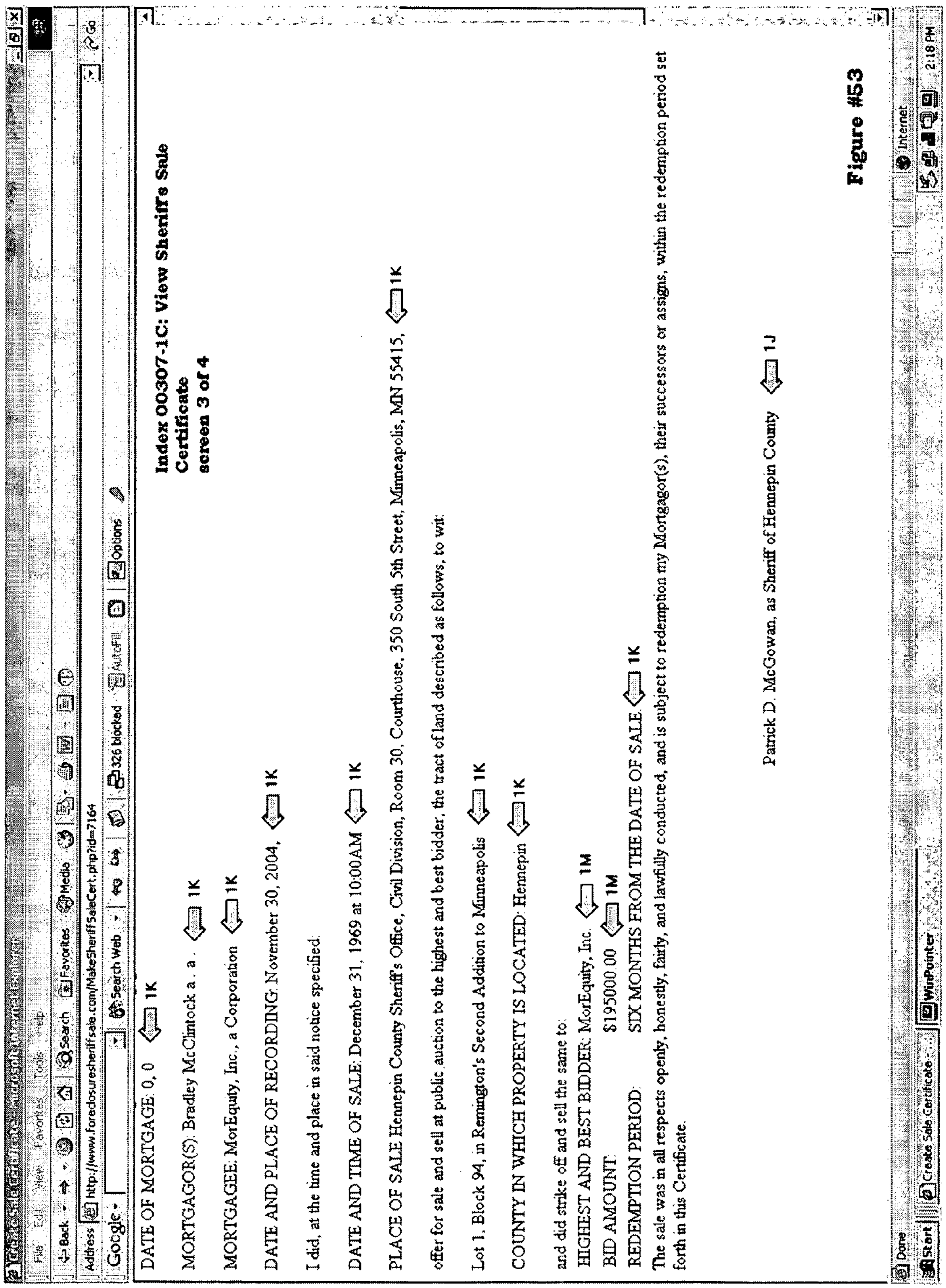
Create Sale Certificates - Microsoft Internet Explorer
File Edit View Favorites Tools Help
Address http://www.foreclosuresheriffsale.com/MakeSheriffSaleCert.php?id=7164
Index 00307-1C: View Sheriff's Sale Certificate
screen 3 of 4
DATE OF MORTGAGE: 0, 0
1K
MORTGAGOR(S): Bradley McClintock a . a .
1K
MORTGAGEE: MorEquity, Inc., a Corporation
1K
DATE AND PLACE OF RECORDING: November 30, 2004,
1K
I did, at the time and place in said notice specified:
DATE AND TIME OF SALE: December 31, 1969 at 10:00AM
1K
PLACE OF SALE Hennepin County Sheriff's Office, Civil Division, Room 30, Courthouse, 350 South 5th Street, Minneapolis, MN 55415,
1K
offer for sale and sell at public auction to the highest and best bidder, the tract of land described as follows, to wit:
Lot 1, Block 94, in Remington's Second Addition to Minneapolis
1K
COUNTY IN WHICH PROPERTY IS LOCATED: Hennepin
1K
and did strike off and sell the same to:
HIGHEST AND BEST BIDDER: MorEquity, Inc.
1M
BID AMOUNT: $195000.00
1M
REDEMPTION PERIOD: SIX MONTHS FROM THE DATE OF SALE
1K
The sale was in all respects openly, honestly, fairly, and lawfully conducted, and is subject to redemption my Mortgagor(s), their successors or assigns, within the redemption period set forth in this Certificate.
Patrick D. McGowan, as Sheriff of Hennepin County
1J
Figure #53
Done
Internet
Start
2:18 PM

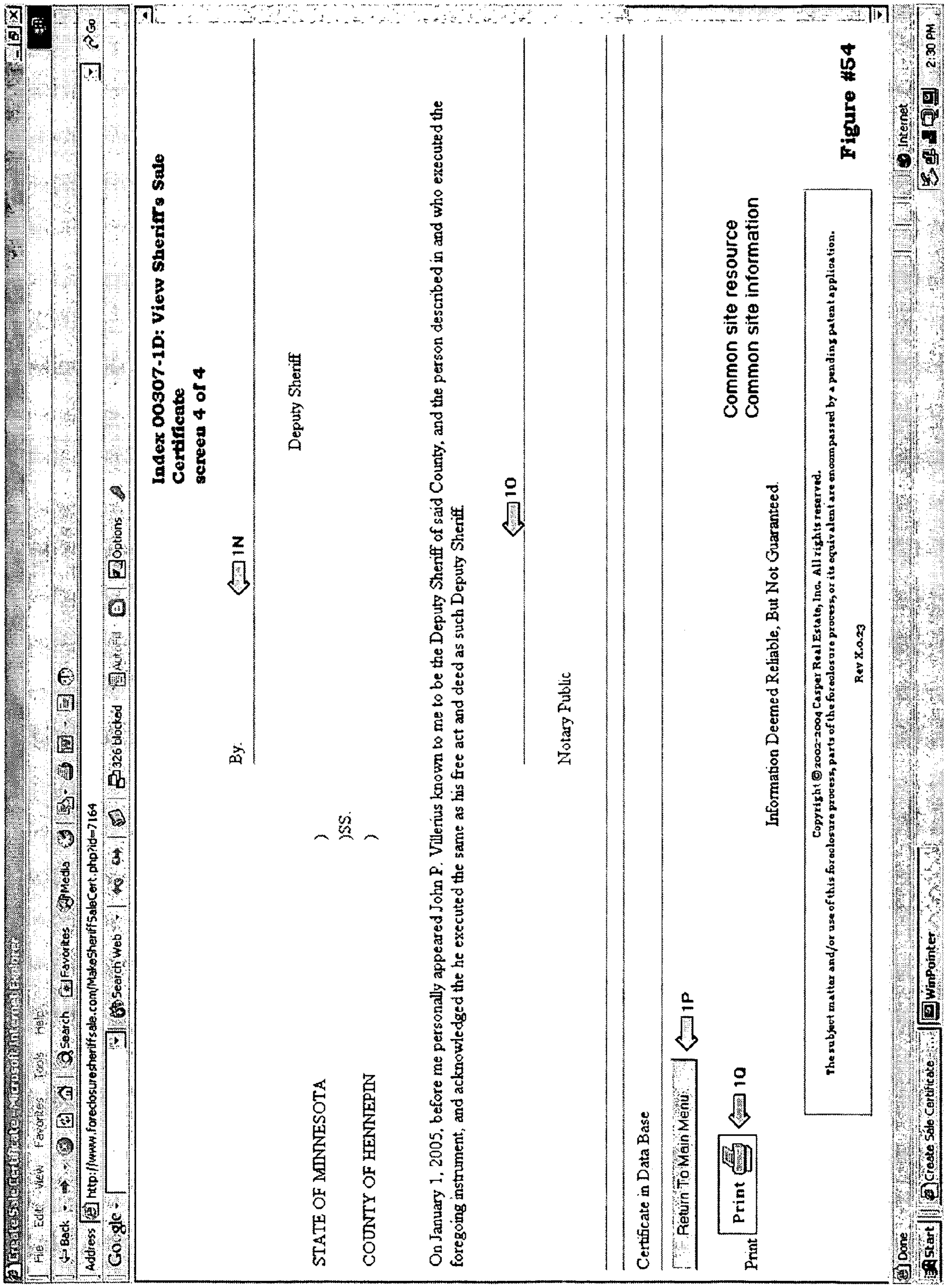
Create Sale Certificate - Microsoft Internet Explorer
File Edit View Favorites Tools Help
Back Search Favorites Media
Address http://www.foreclosuresheriffsale.com/MakeSheriffSaleCert.php?id=7164
Go
Google Search Web 326 blocked AutoFill Options
Index 00307-1D: View Sheriff's Sale Certificate
screen 4 of 4
By
1N
Deputy Sheriff
STATE OF MINNESOTA )
)SS.
COUNTY OF HENNEPIN )
On January 1, 2005, before me personally appeared John P. Villerius known to me to be the Deputy Sheriff of said County, and the person described in and who executed the foregoing instrument, and acknowledged the he executed the same as his free act and deed as such Deputy Sheriff
1O
Notary Public
Certificate in Data Base
Return To Main Menu
1P
Print
Print
1Q
Information Deemed Reliable, But Not Guaranteed.
Common site resource
Common site information
Copyright © 2002-2004 Casper Real Estate, Inc. All rights reserved.
The subject matter and/or use of this foreclosure process, parts of the foreclosure process, or its equivalent are encompassed by a pending patent application.
Rev X.0.23
Figure #54
Done
Internet
Start
Create Sale Certificate
WinPointer
2:30 PM

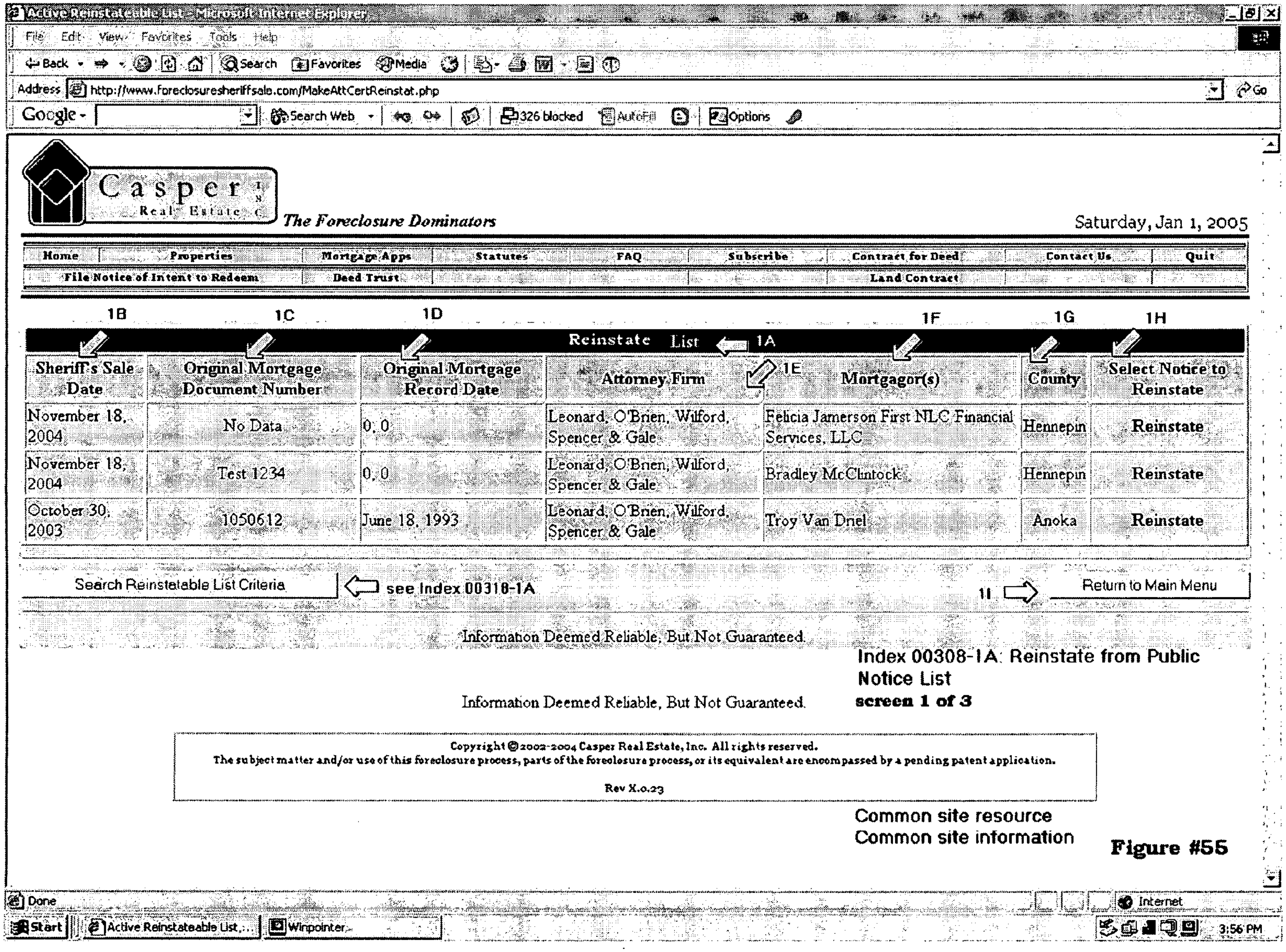
Figure #55

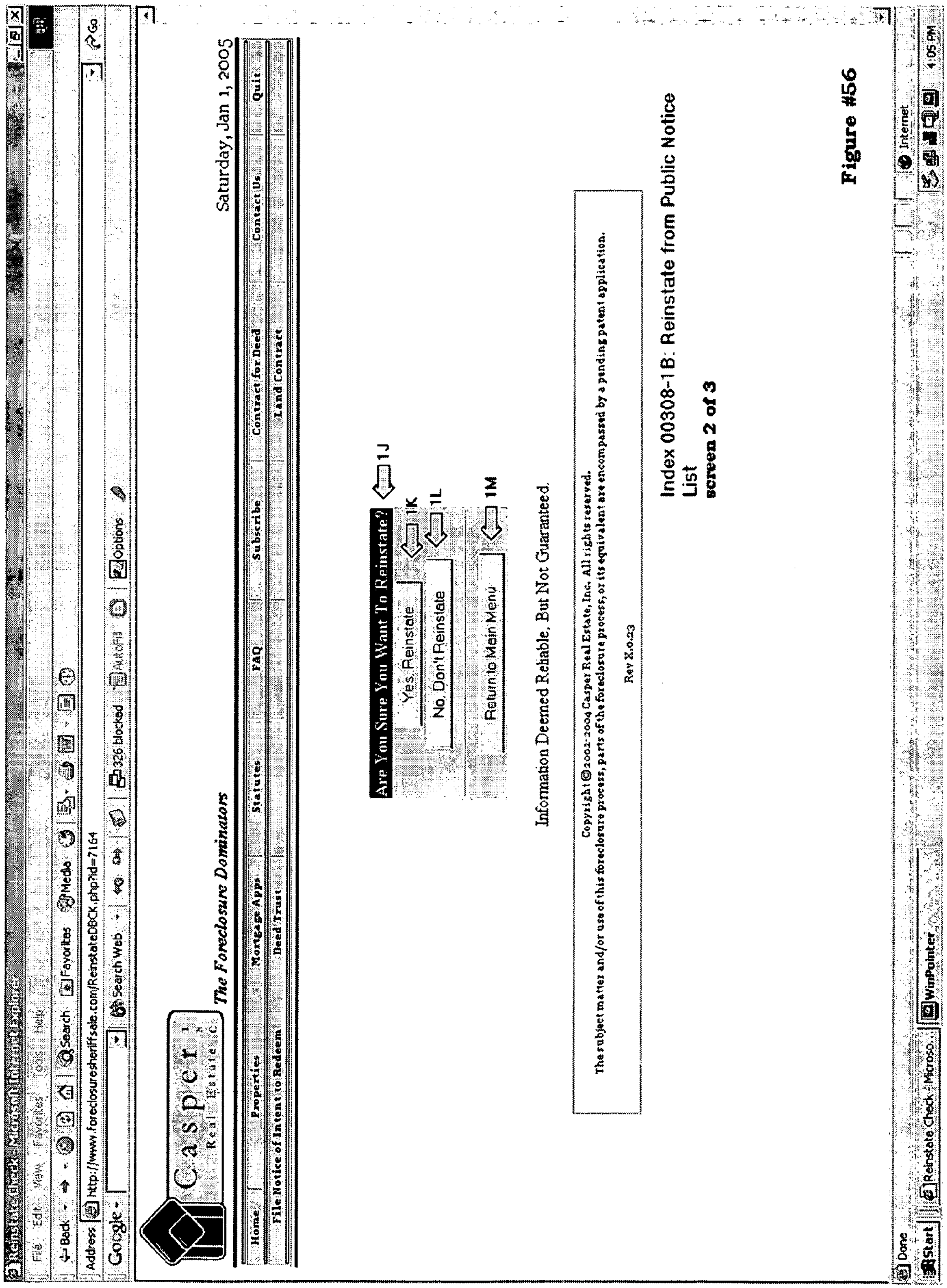
Index 00308-1B: Reinstate from Public Notice List
screen 2 of 3
Figure #56

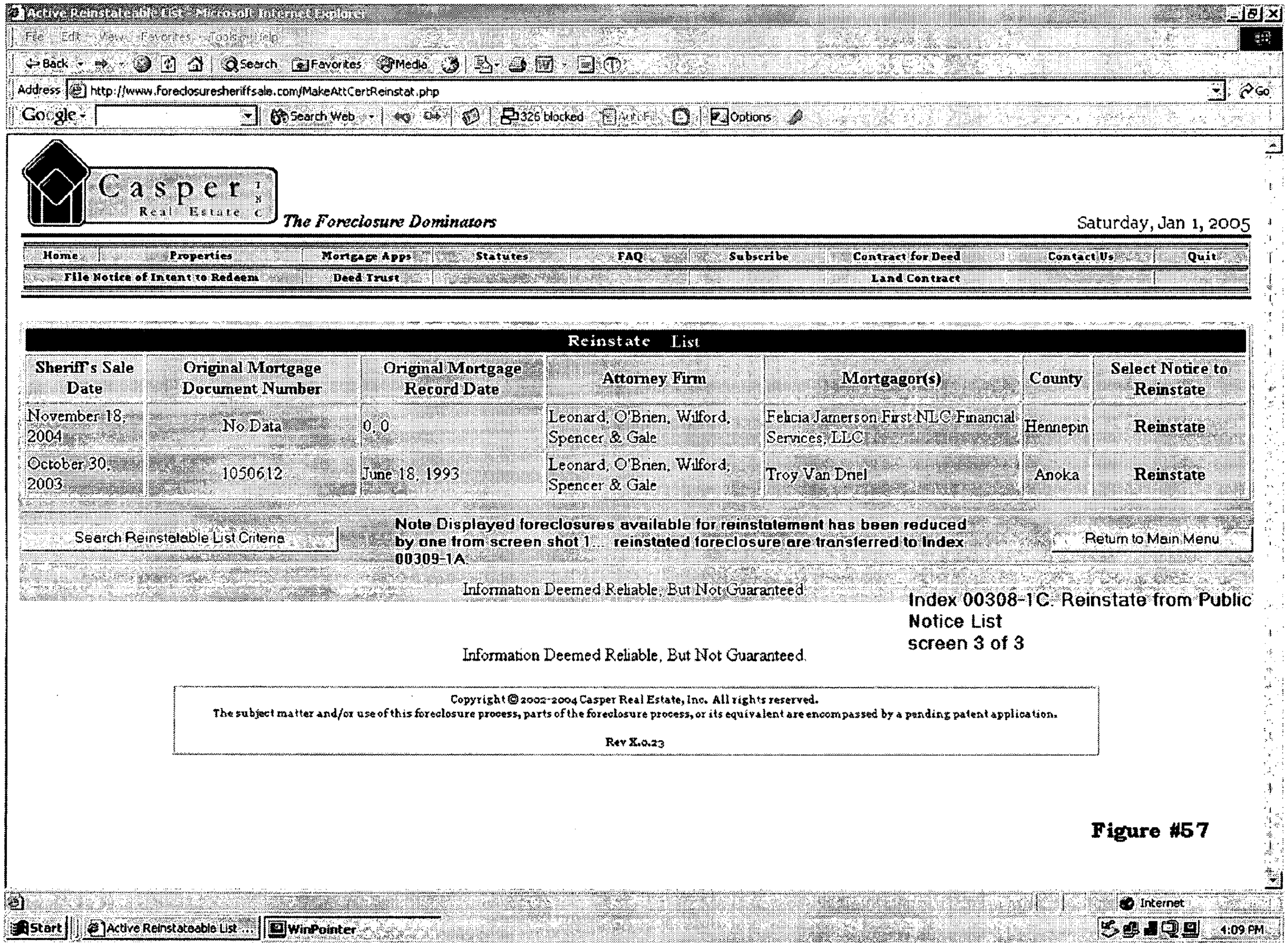
Figure #57

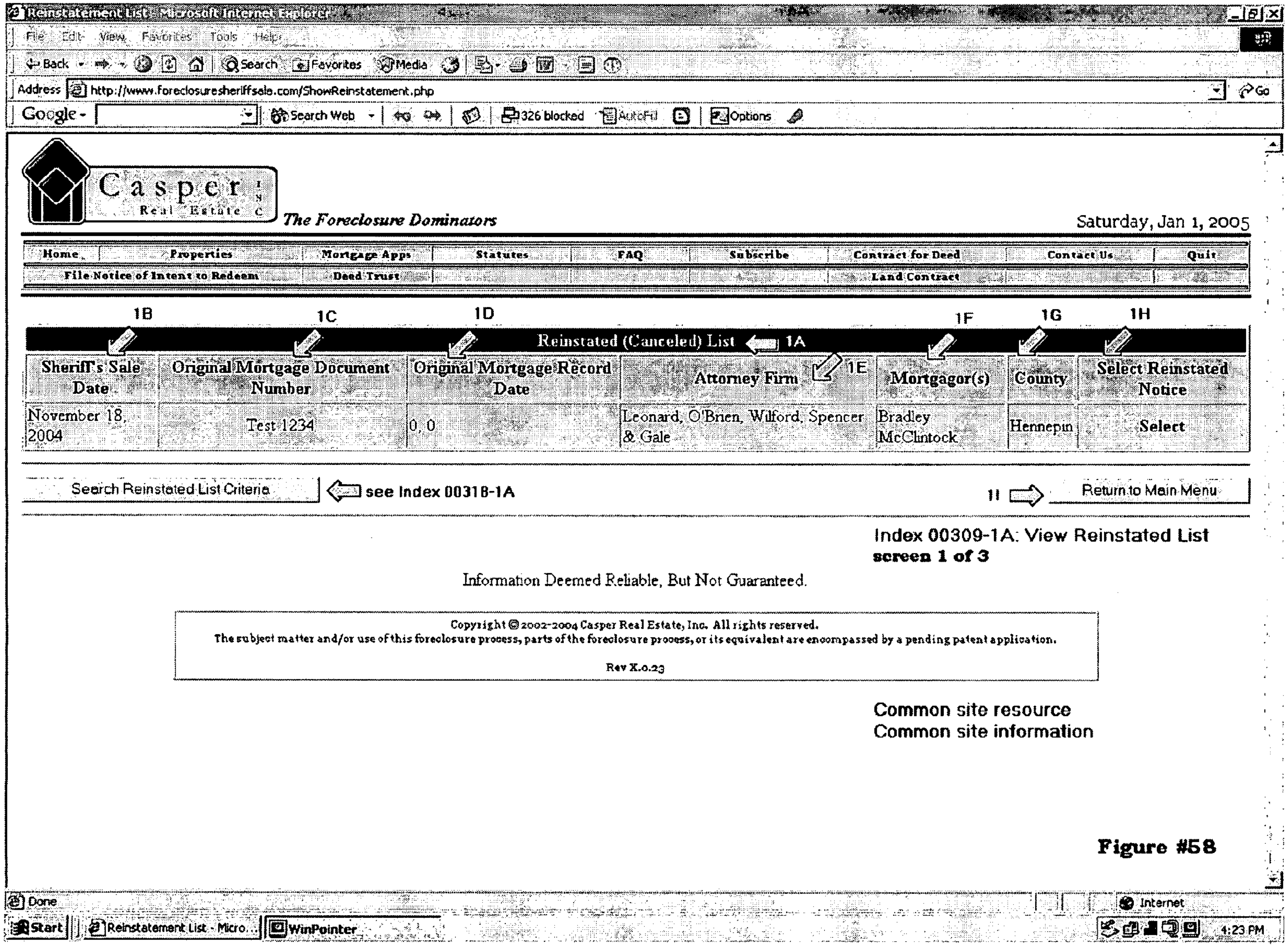
Figure #58

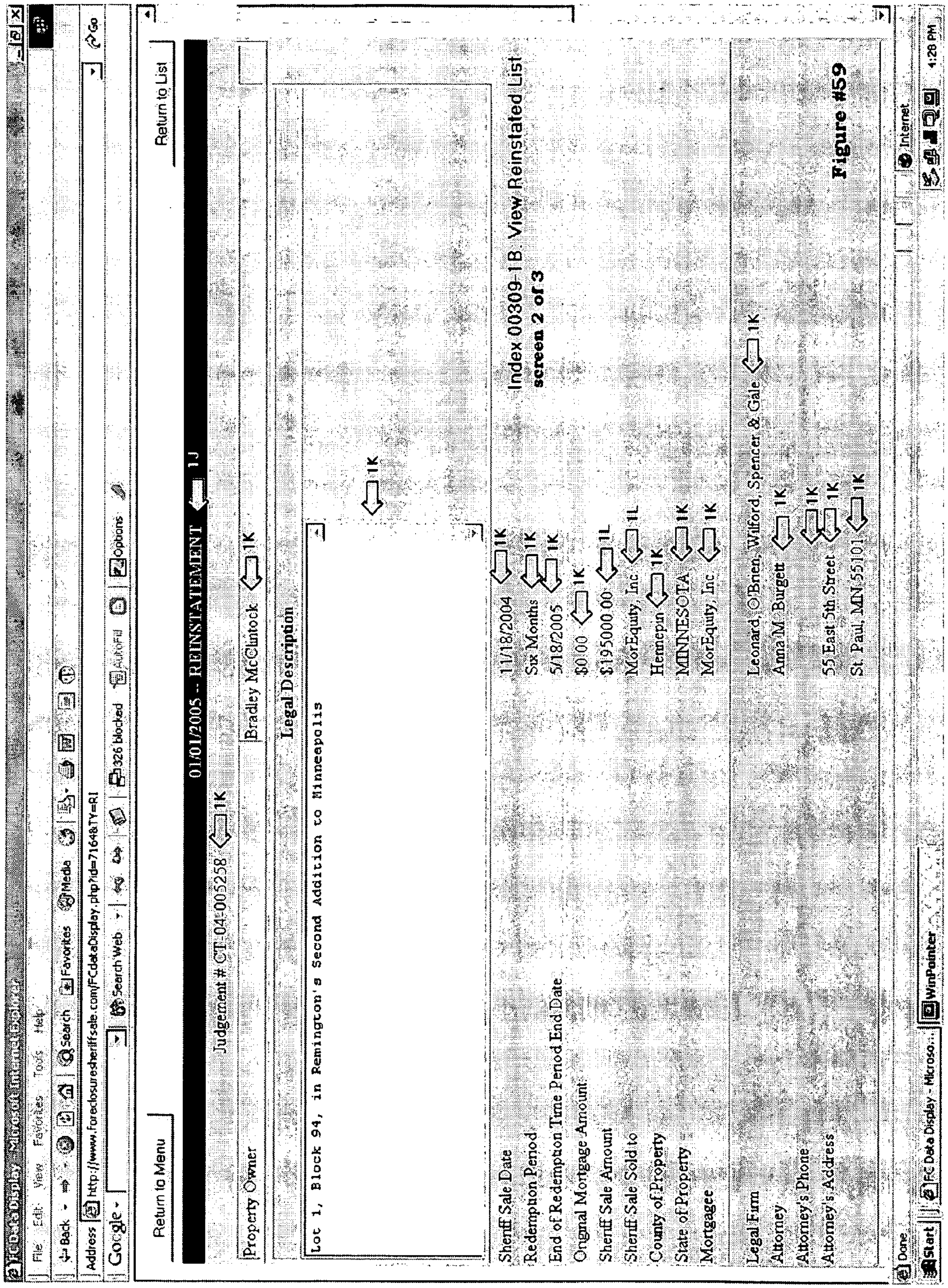
FC Data Display - Microsoft Internet Explorer
http://www.foreclosuresheriffsale.com/FCdataDisplay.php?id=7164&TY=RI
Return to Menu
Return to List
01/01/2005 -- REINSTATEMENT
1J
Judgement # CT-04-005258
1K
Property Owner
Bradley McClintock
Legal Description
Lot 1, Block 94, in Remington's Second Addition to Minneapolis
Sheriff Sale Date
11/18/2004
Redemption Period
Six Months
End of Redemption Time Period End Date
5/18/2005
Original Mortgage Amount
$0.00
Sheriff Sale Amount
$195000.00
1L
Sheriff Sale Sold to
MorEquity, Inc
County of Property
Hennepin
State of Property
MINNESOTA
Mortgagee
MorEquity, Inc
Legal Firm
Leonard, O'Brien, Wilford, Spencer & Gale
Attorney
Anna M. Burgett
Attorney's Phone
Attorney's Address
55 East 5th Street
St. Paul, MN 55101
Index 00309-1B: View Reinstated List
screen 2 of 3
Figure #59

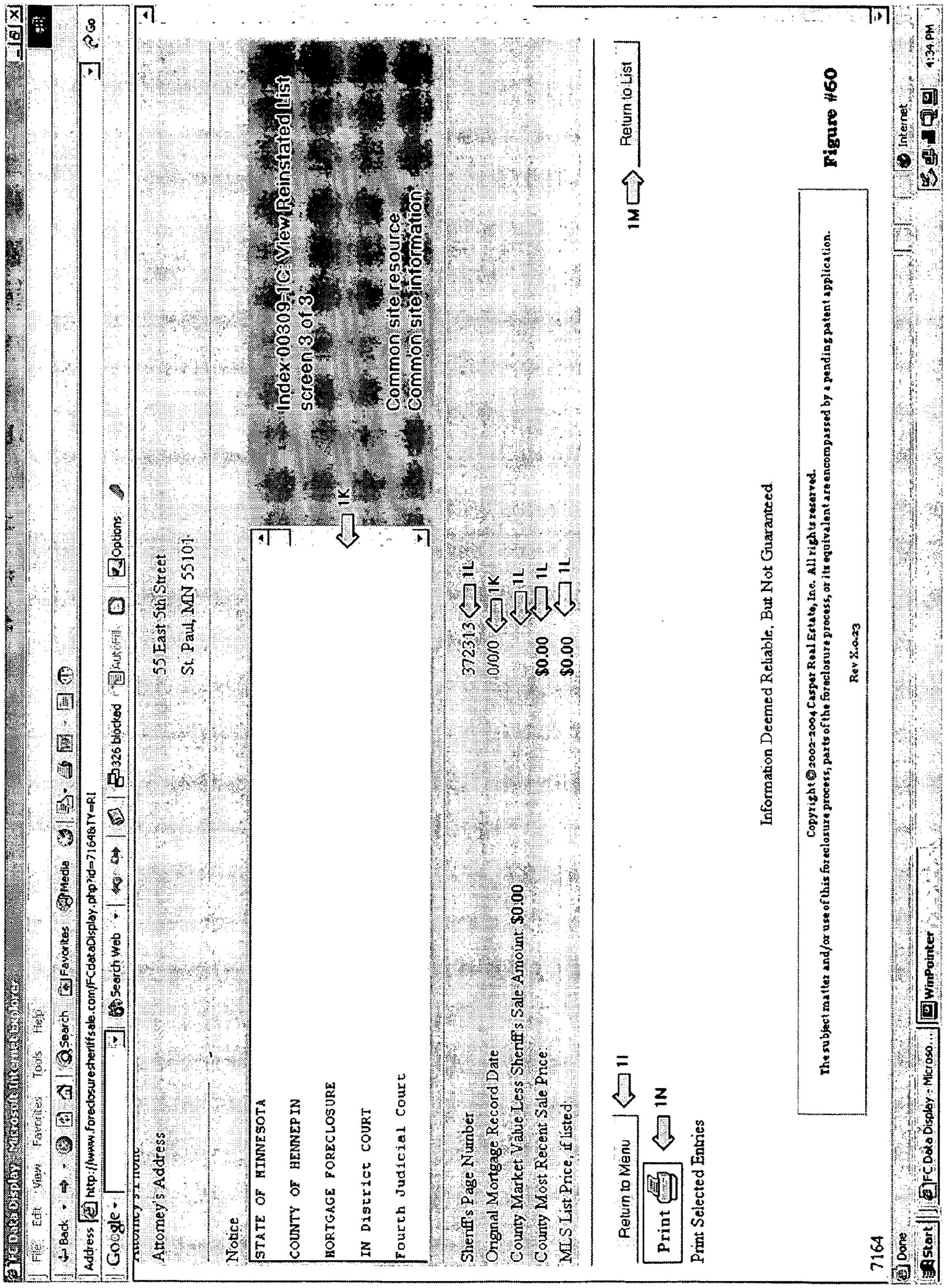
FC Data Display - Microsoft Internet Explorer
File Edit View Favorites Tools Help
Back Search Favorites Media
Address http://www.foreclosuresheriffsale.com/FCdataDisplay.php?id=7164&TY=RI
Go
Google Search Web 326 blocked AutoFill Options
Attorney's Address
55 East 5th Street
St. Paul, MN 55101
Notice
STATE OF MINNESOTA
COUNTY OF HENNEPIN
MORTGAGE FORECLOSURE
IN District COURT
Fourth Judicial Court
1K
Index 00309-1C: View Reinstated List
screen 3 of 3
Common site resource
Common site information
Sheriff's Page Number
372313
1L
Original Mortgage Record Date
0/0/0
1K
County Market Value Less Sheriff's Sale Amount: $0.00
1L
County Most Recent Sale Price:
$0.00
1L
MLS List Price, if listed:
$0.00
1L
Return to Menu
1I
Print
1N
Print Selected Entries
1M
Return to List
Information Deemed Reliable, But Not Guaranteed.
Copyright © 2002-2004 Casper Real Estate, Inc. All rights reserved.
The subject matter and/or use of this foreclosure process, parts of the foreclosure process, or its equivalent are encompassed by a pending patent application.
Rev X.0.23
Figure #60
7164
Done
Internet
Start
FC Data Display - Microso...
WinPointer
4:34 PM

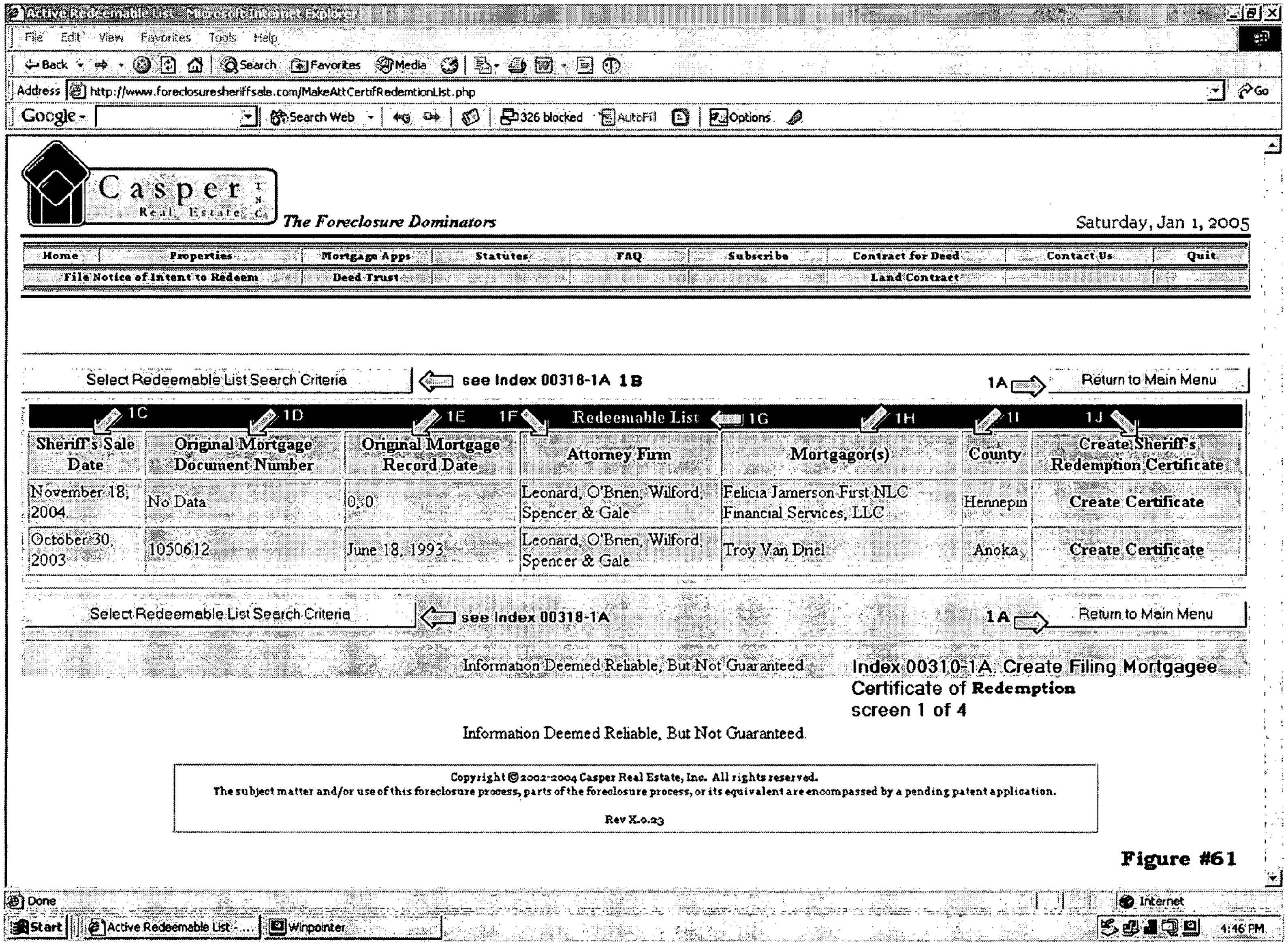
Figure #61

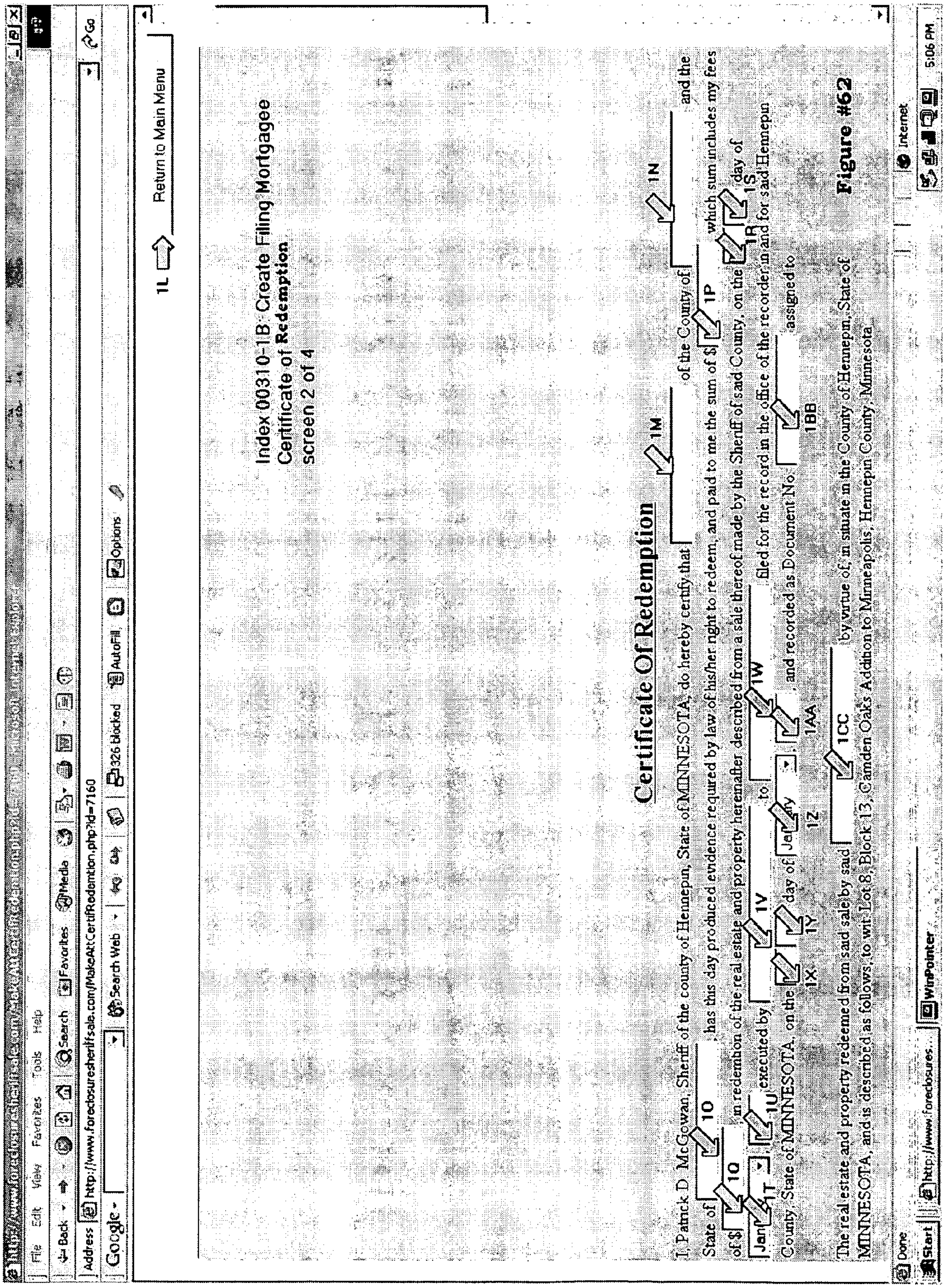

Index 00310-1B: Create Filing Mortgagee
Certificate of Redemption
screen 2 of 4
1L
Return to Main Menu
Certificate Of Redemption
I, Patrick D. McGowan, Sheriff of the county of Hennepin, State of MINNESOTA, do hereby certify that
of the County of
and the State of
has this day produced evidence required by law of his/her right to redeem, and paid to me the sum of $
which sum includes my fees of $
in redemption of the real estate and property hereinafter described from a sale thereof made by the Sheriff of said County, on the
day of
executed by
to
filed for the record in the office of the recorder in and for said Hennepin County, State of MINNESOTA, on the
day of
and recorded as Document No.
assigned to
The real estate and property redeemed from said sale by said
by virtue of, in situate in the County of Hennepin, State of MINNESOTA, and is described as follows, to wit: Lot 8, Block 13, Camden Oaks Addition to Minneapolis, Hennepin County, Minnesota
1M
1N
1O
1P
1Q
1R
1S
1T
1U
1V
1W
1X
1Y
1Z
1AA
1BB
1CC
Figure #62

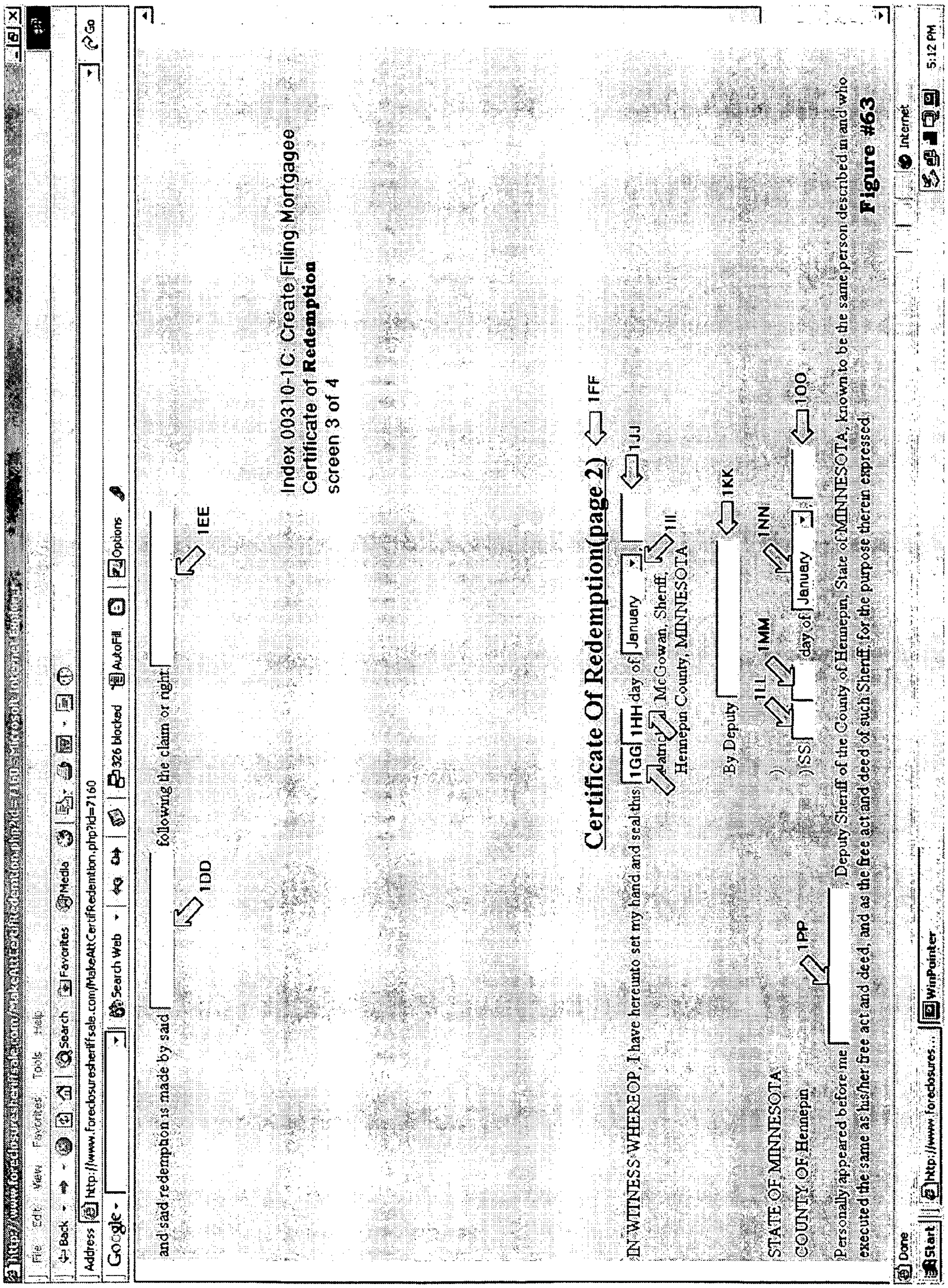
Figure #63

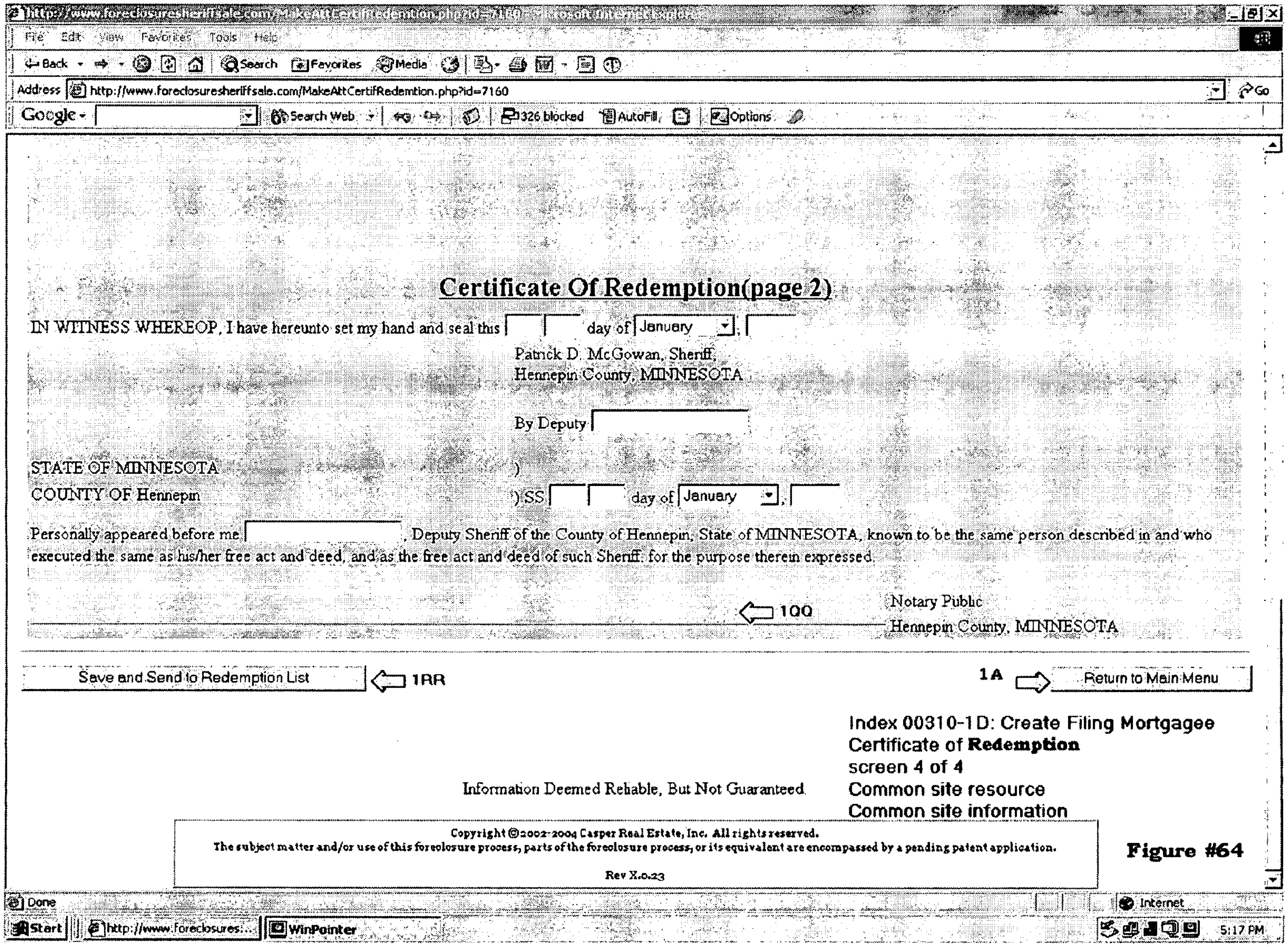
http://www.foreclosuresheriffsale.com/MakeAttCertifRedemtion.php?id=7160 - Microsoft Internet Explorer
File Edit View Favorites Tools Help
Back Search Favorites Media
Address http://www.foreclosuresheriffsale.com/MakeAttCertifRedemtion.php?id=7160
Go
Google Search Web 326 blocked AutoFill Options
Certificate Of Redemption(page 2)
IN WITNESS WHEREOP, I have hereunto set my hand and seal this day of January ,
Patrick D. McGowan, Sheriff,
Hennepin County, MINNESOTA
By Deputy
STATE OF MINNESOTA )
COUNTY OF Hennepin ) SS day of January ,
Personally appeared before me , Deputy Sheriff of the County of Hennepin, State of MINNESOTA, known to be the same person described in and who executed the same as his/her free act and deed, and as the free act and deed of such Sheriff, for the purpose therein expressed.
1QQ
Notary Public
Hennepin County, MINNESOTA
Save and Send to Redemption List
1RR
1A
Return to Main Menu
Index 00310-1D: Create Filing Mortgagee
Certificate of Redemption
screen 4 of 4
Common site resource
Common site information
Information Deemed Reliable, But Not Guaranteed
Copyright ©2002-2004 Casper Real Estate, Inc. All rights reserved.
The subject matter and/or use of this foreclosure process, parts of the foreclosure process, or its equivalent are encompassed by a pending patent application.
Rev X.0.23
Figure #64
Done
Internet
Start
http://www.foreclosures...
WinPointer
5:17 PM

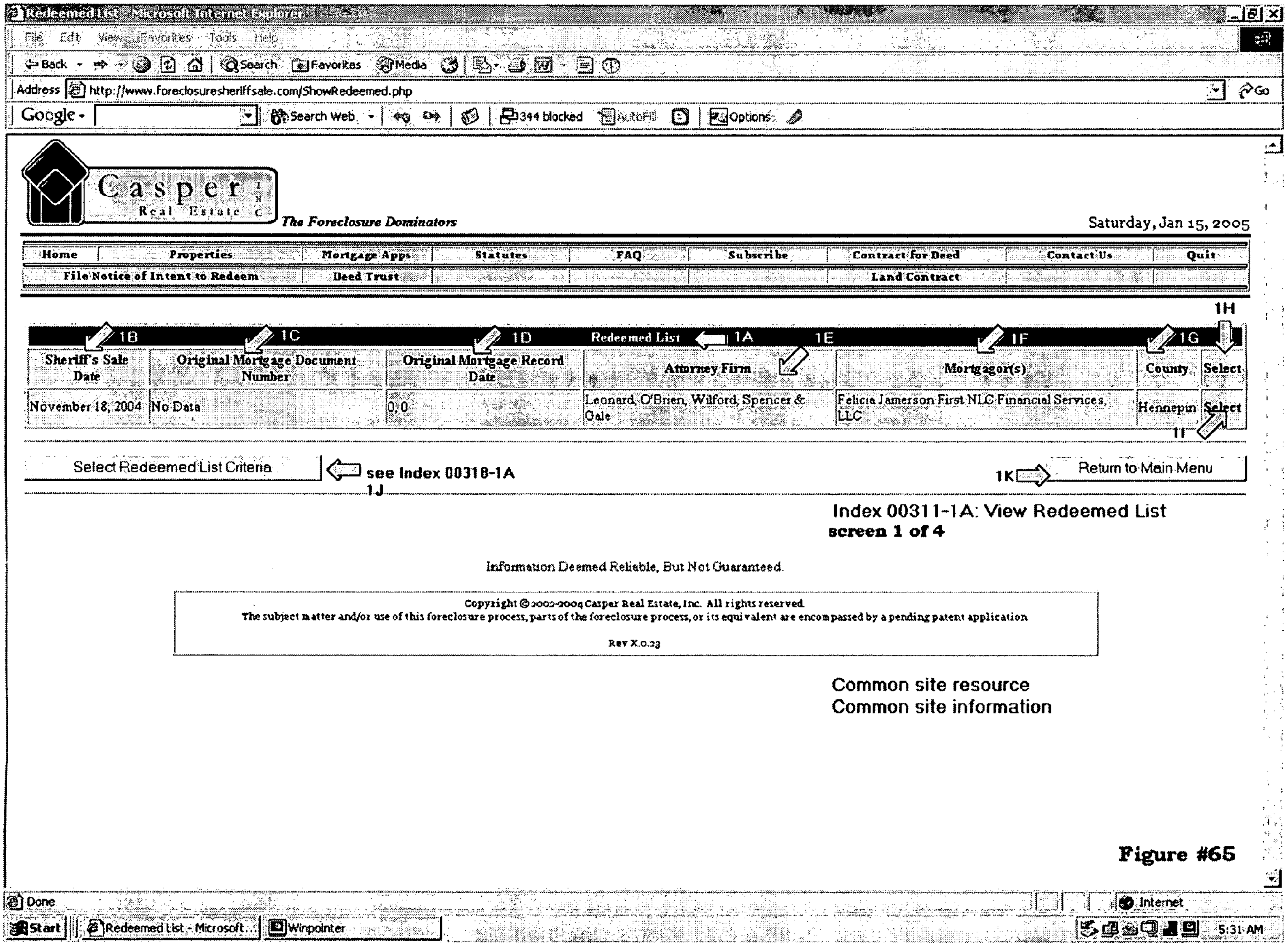
Figure #65

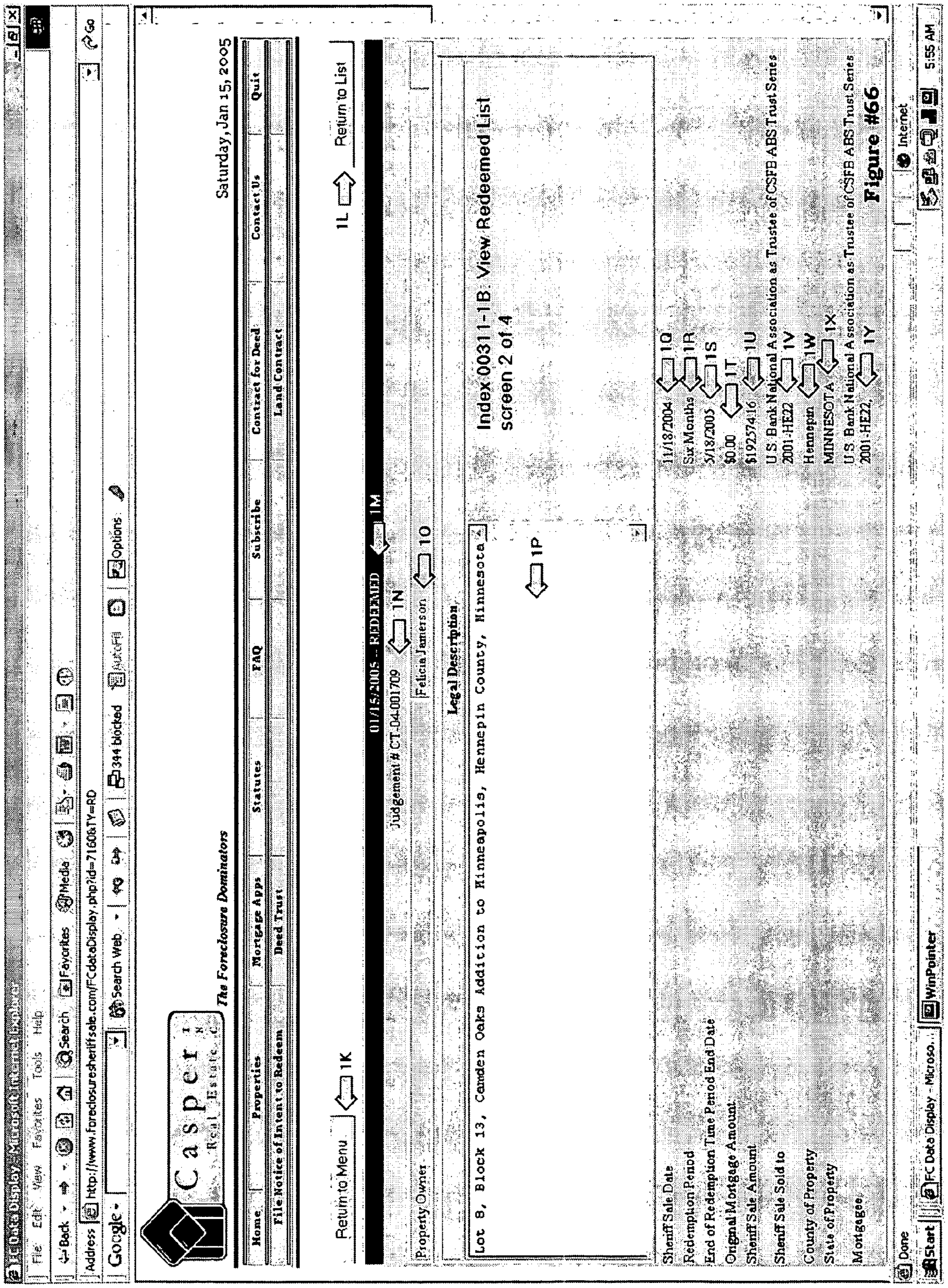
Figure #66

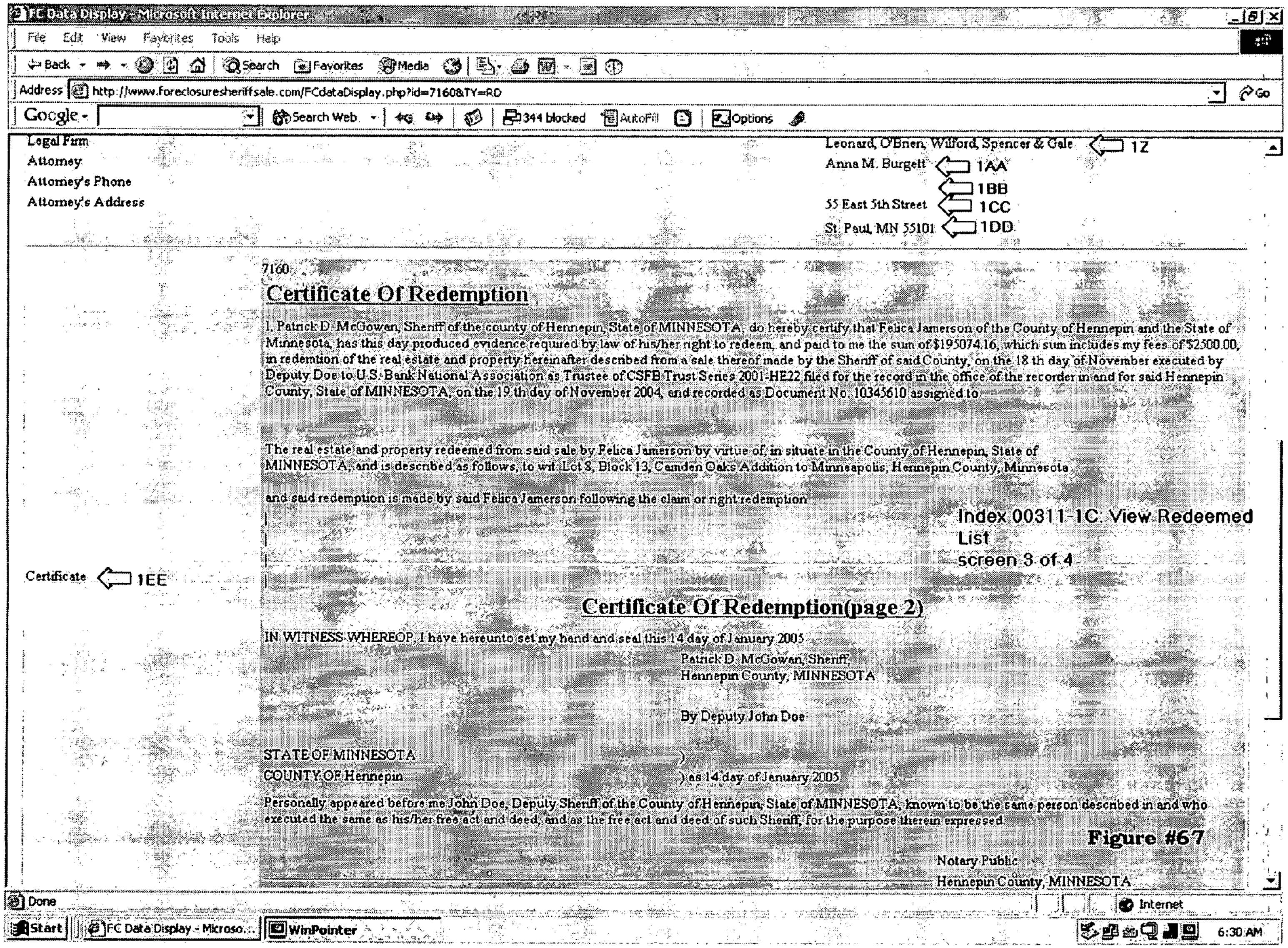
FC Data Display - Microsoft Internet Explorer
File Edit View Favorites Tools Help
Back Search Favorites Media
Address http://www.foreclosuresheriffsale.com/FCdataDisplay.php?id=7160&TY=RD
Go
Google Search Web 344 blocked AutoFill Options
Legal Firm
Attorney
Attorney's Phone
Attorney's Address
Leonard, O'Brien, Wilford, Spencer & Gale
1Z
Anna M. Burgett
1AA
1BB
55 East 5th Street
1CC
St. Paul, MN 55101
1DD
Certificate
1EE
7160
Certificate Of Redemption
I, Patrick D. McGowan, Sheriff of the county of Hennepin, State of MINNESOTA, do hereby certify that Felica Jamerson of the County of Hennepin and the State of Minnesota, has this day produced evidence required by law of his/her right to redeem, and paid to me the sum of $195074.16, which sum includes my fees of $2500.00, in redemtion of the real estate and property hereinafter described from a sale thereof made by the Sheriff of said County, on the 18 th day of November executed by Deputy Doe to U.S. Bank National Association as Trustee of CSFB Trust Series 2001-HE22 filed for the record in the office of the recorder in and for said Hennepin County, State of MINNESOTA, on the 19 th day of November 2004, and recorded as Document No. 10345610 assigned to
The real estate and property redeemed from said sale by Felica Jamerson by virtue of, in situate in the County of Hennepin, State of MINNESOTA, and is described as follows, to wit: Lot 8, Block 13, Camden Oaks Addition to Minneapolis, Hennepin County, Minnesota
and said redemption is made by said Felica Jamerson following the claim or right redemption
Index 00311-1C: View Redeemed List
screen 3 of 4
Certificate Of Redemption(page 2)
IN WITNESS WHEREOP, I have hereunto set my hand and seal this 14 day of January 2005
Patrick D. McGowan, Sheriff,
Hennepin County, MINNESOTA
By Deputy John Doe
STATE OF MINNESOTA )
COUNTY OF Hennepin ) as 14 day of January 2005
Personally appeared before me John Doe, Deputy Sheriff of the County of Hennepin, State of MINNESOTA, known to be the same person described in and who executed the same as his/her free act and deed, and as the free act and deed of such Sheriff, for the purpose therein expressed.
Figure #67
Notary Public
Hennepin County, MINNESOTA
Done
Internet
Start
FC Data Display - Microso...
WinPointer
6:30 AM

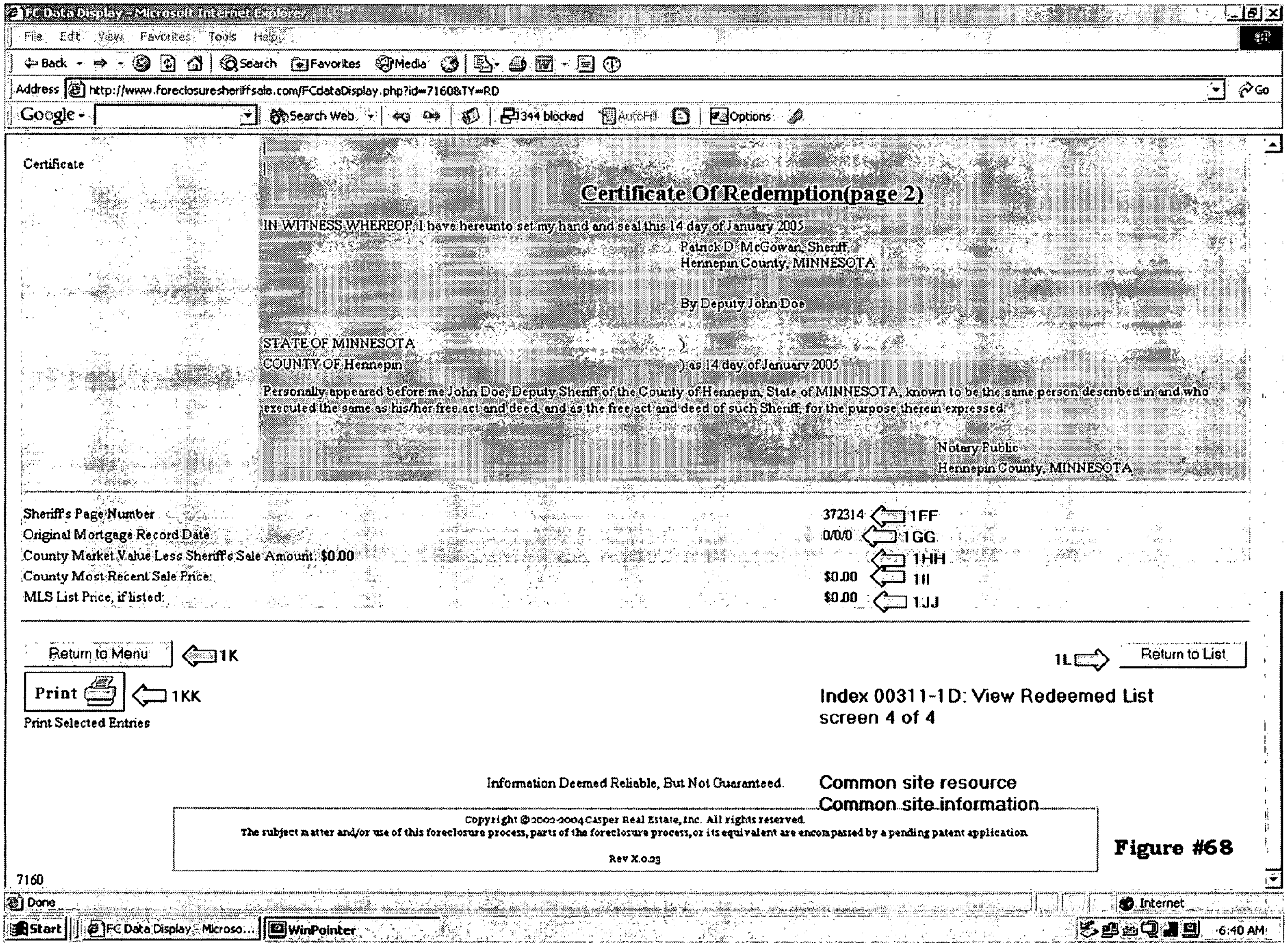
Figure #68

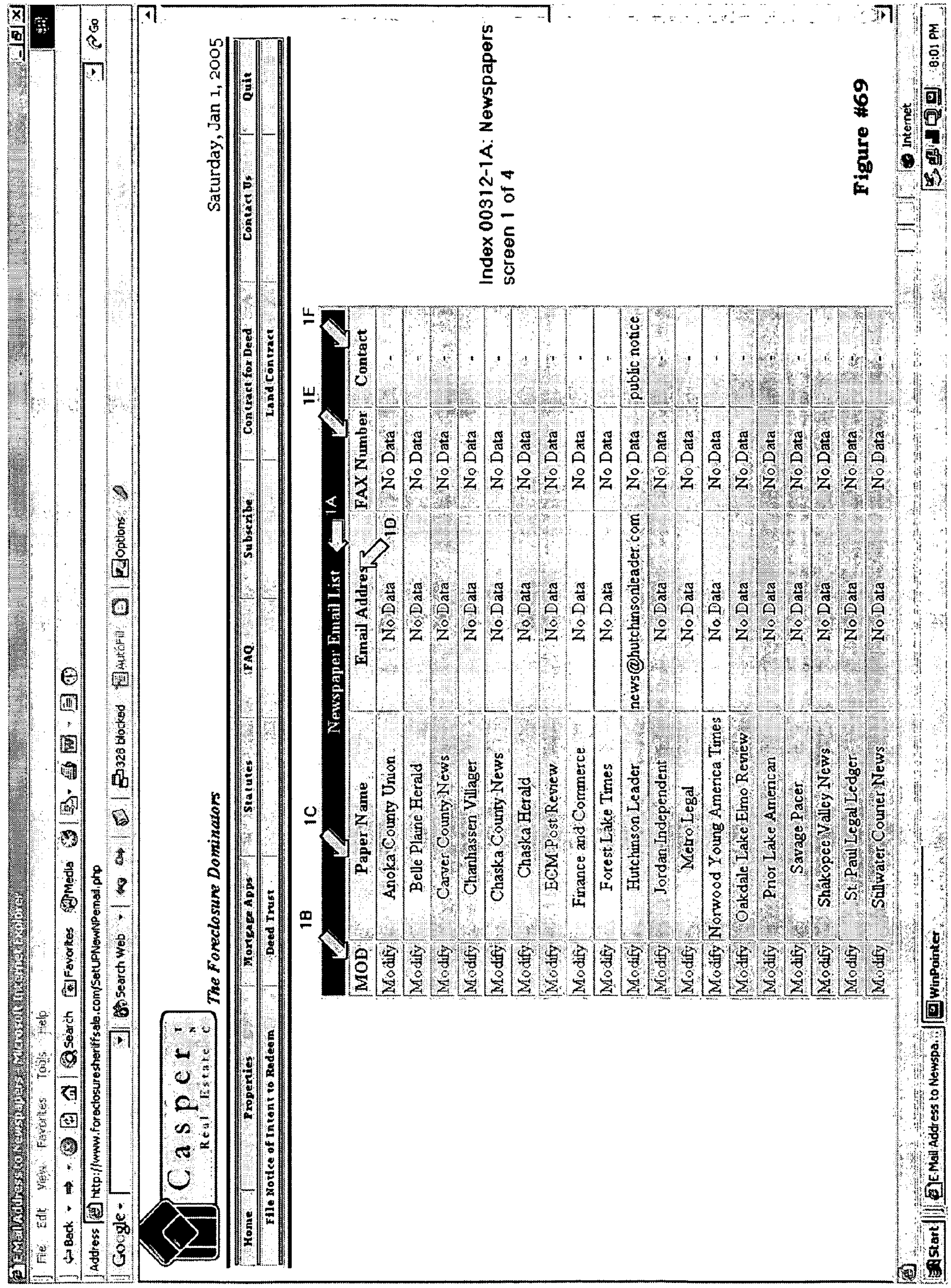
Figure #69

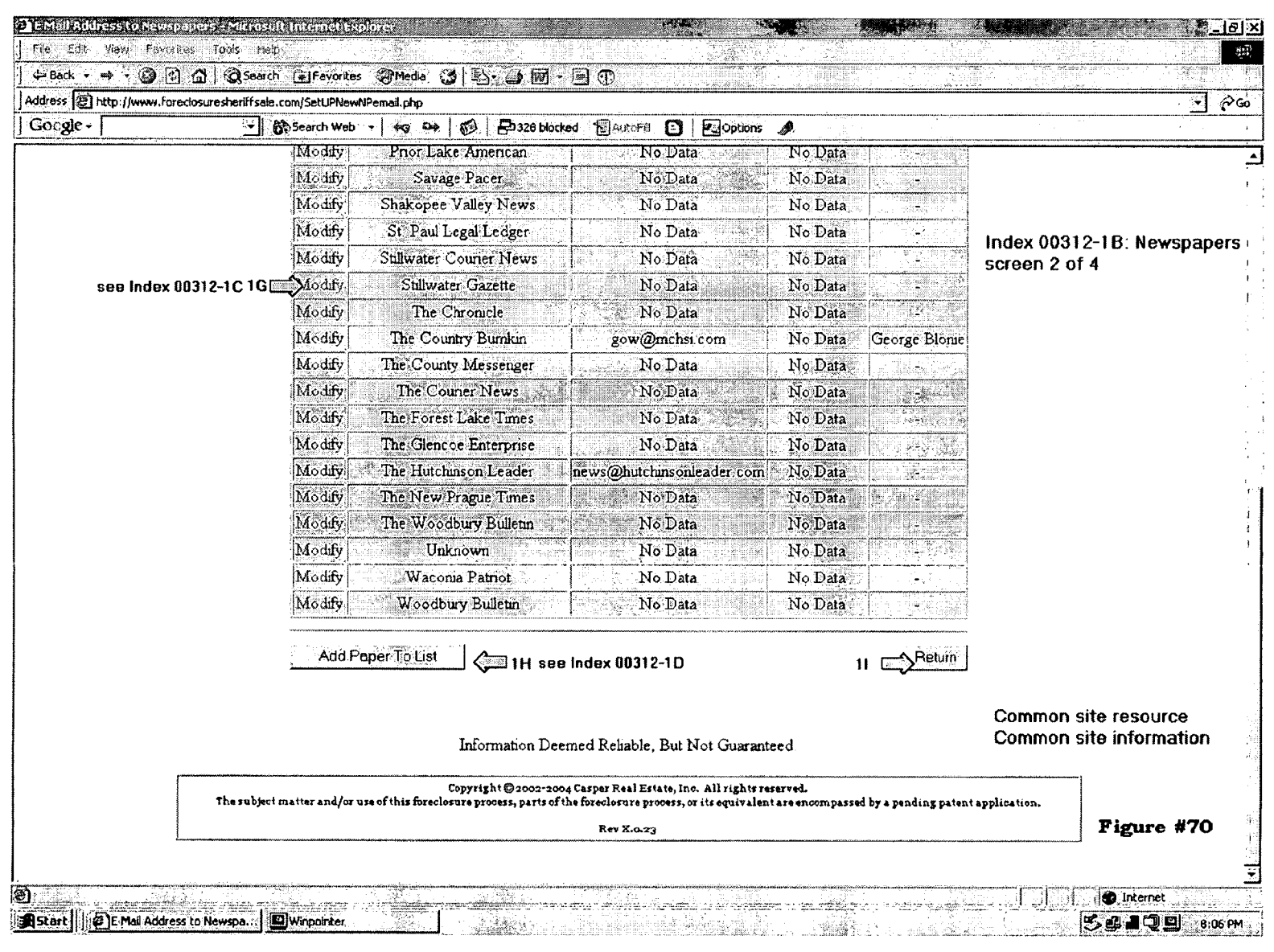

E-Mail Address to Newspapers - Microsoft Internet Explorer

File Edit View Favorites Tools Help

Address http://www.foreclosuresheriffsale.com/SetUPNewNPemail.php

Index 00312-1B: Newspapers screen 2 of 4 see Index 00312-1C 1G (points to the Stillwater Gazette row)

| | | | | |
|---|---|---|---|---|
| Modify | Prior Lake American | No Data | No Data | - |
| Modify | Savage Pacer | No Data | No Data | - |
| Modify | Shakopee Valley News | No Data | No Data | - |
| Modify | St. Paul Legal Ledger | No Data | No Data | - |
| Modify | Stillwater Courier News | No Data | No Data | - |
| Modify | Stillwater Gazette | No Data | No Data | - |
| Modify | The Chronicle | No Data | No Data | - |
| Modify | The Country Bumkin | gow@mchsi.com | No Data | George Blonie |
| Modify | The County Messenger | No Data | No Data | - |
| Modify | The Courier News | No Data | No Data | - |
| Modify | The Forest Lake Times | No Data | No Data | - |
| Modify | The Glencoe Enterprise | No Data | No Data | - |
| Modify | The Hutchinson Leader | news@hutchinsonleader.com | No Data | - |
| Modify | The New Prague Times | No Data | No Data | - |
| Modify | The Woodbury Bulletin | No Data | No Data | - |
| Modify | Unknown | No Data | No Data | - |
| Modify | Waconia Patriot | No Data | No Data | - |
| Modify | Woodbury Bulletin | No Data | No Data | - |

Add Paper To List ⇦ 1H see Index 00312-1D

1I ⇨ Return

Common site resource
Common site information

Information Deemed Reliable, But Not Guaranteed

Copyright © 2002-2004 Casper Real Estate, Inc. All rights reserved.
The subject matter and/or use of this foreclosure process, parts of the foreclosure process, or its equivalent are encompassed by a pending patent application.

Rev X.0.23

Figure #70

Start | E-Mail Address to Newspa... | Winpointer | Internet | 8:06 PM

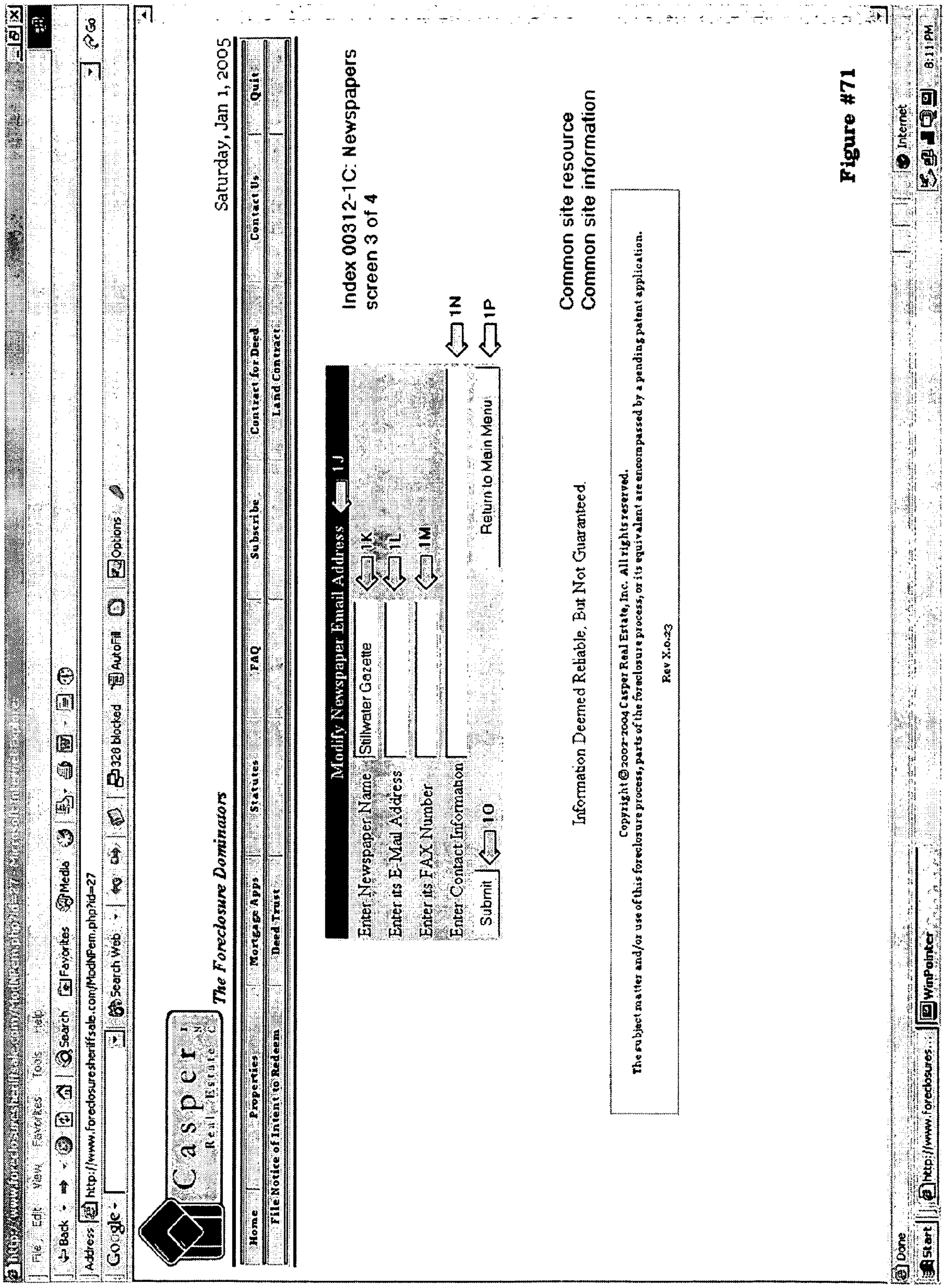
Figure #71

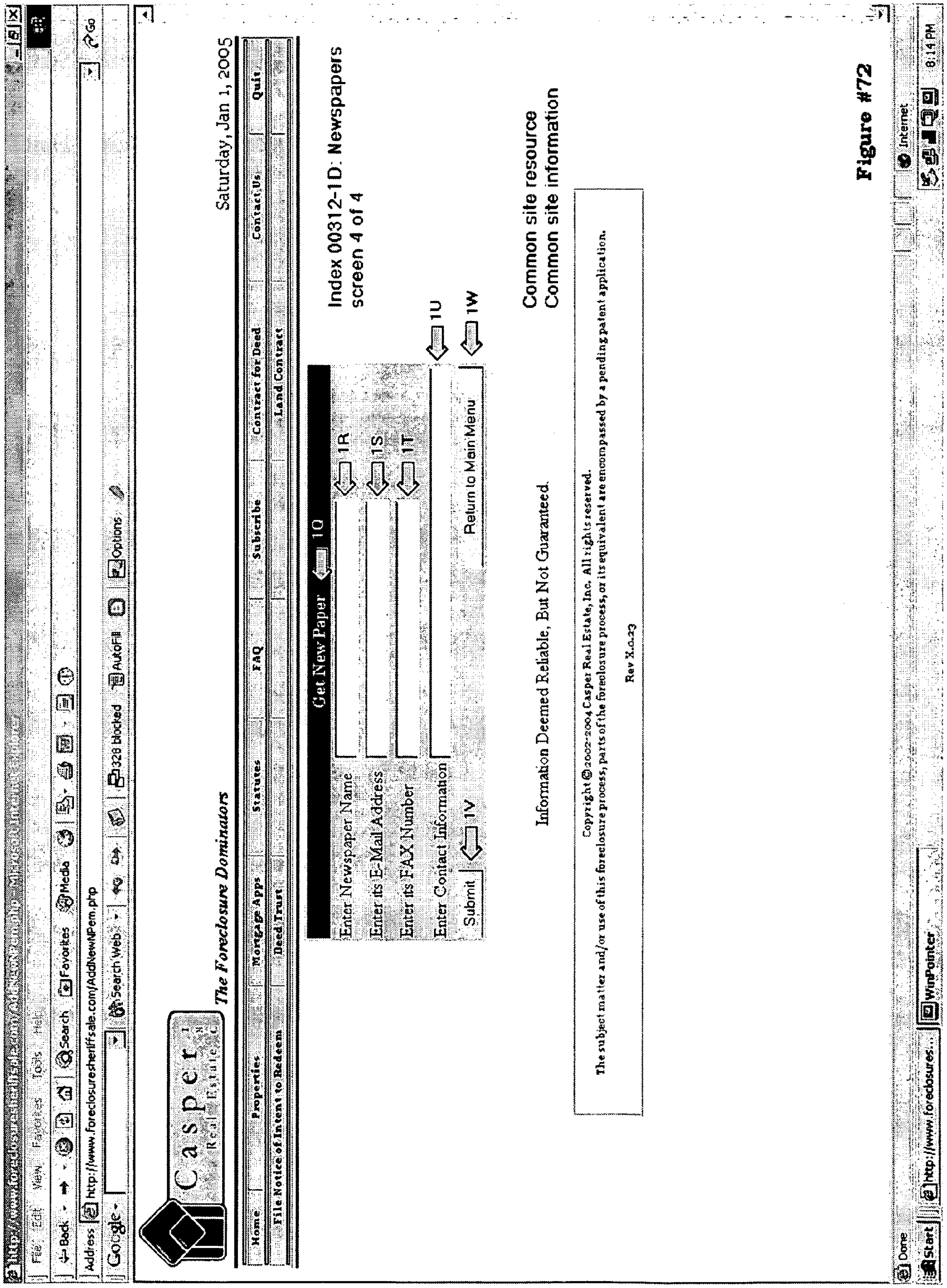
Figure #72

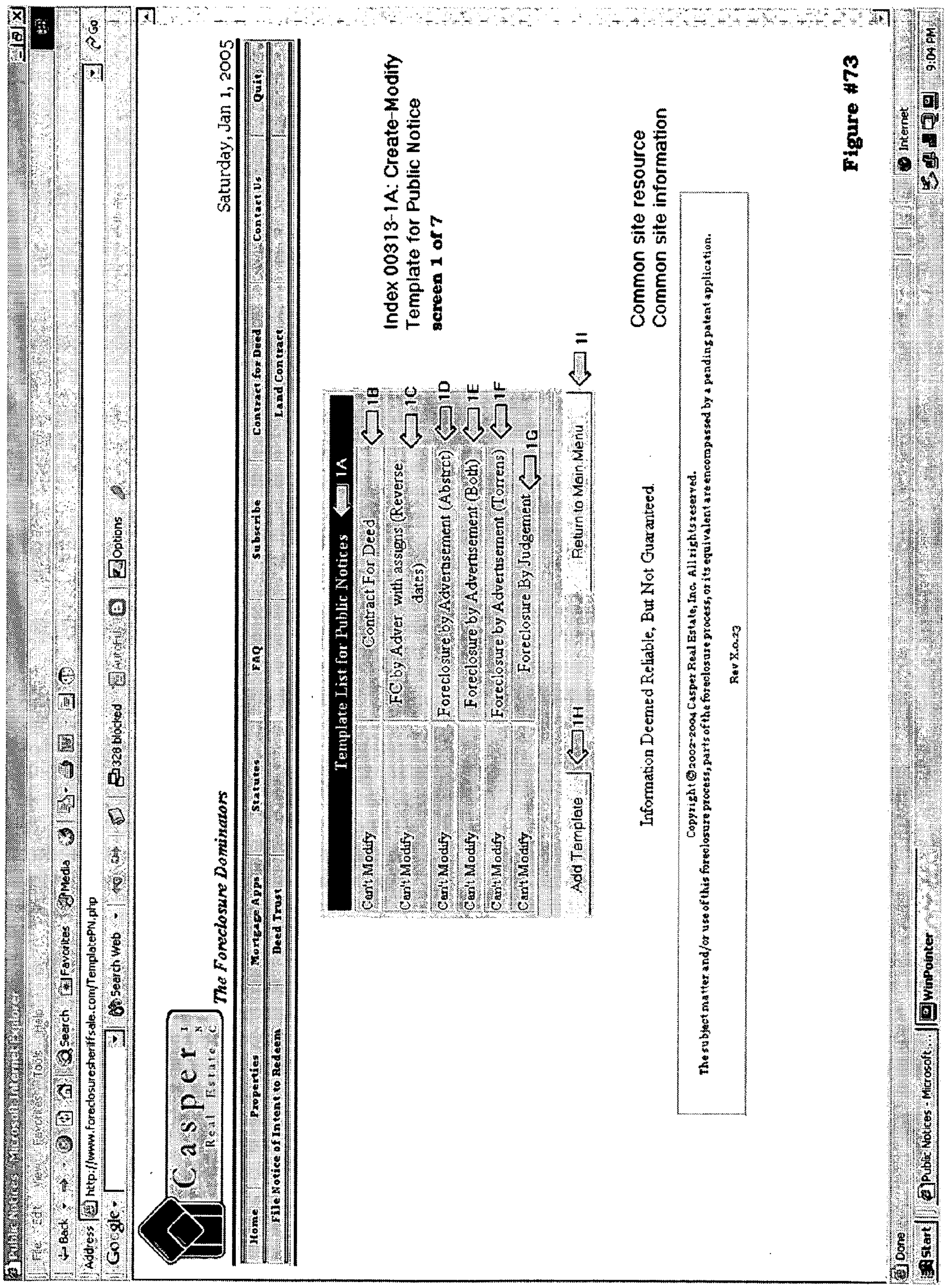
Figure #73

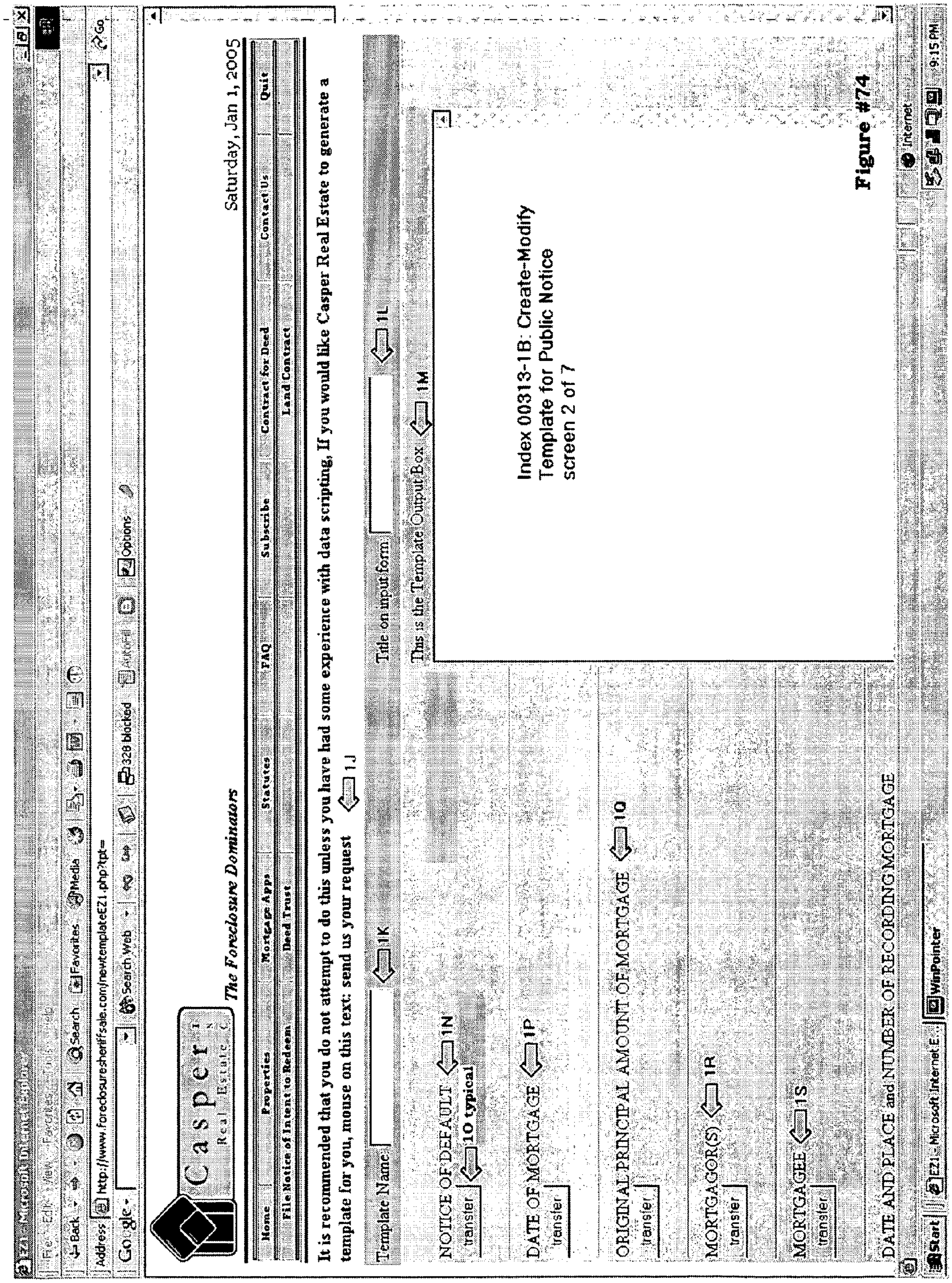
Figure #74

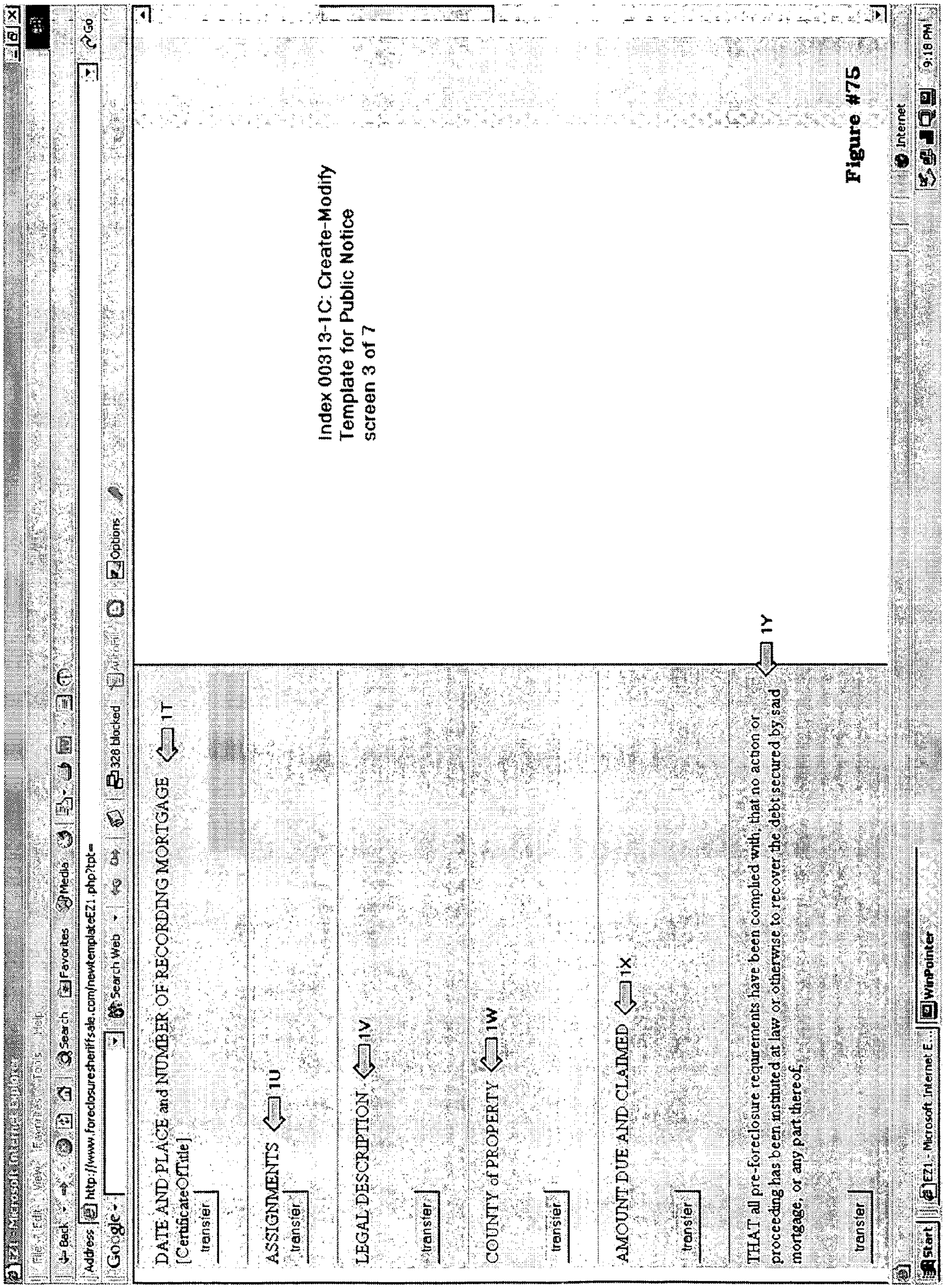
EZ1 - Microsoft Internet Explorer
Address http://www.foreclosuresheriffsale.com/newtemplateEZ1.php?tpt=
DATE AND PLACE and NUMBER OF RECORDING MORTGAGE
1T
[CertificateOfTitle]
transfer
ASSIGNMENTS
1U
transfer
LEGAL DESCRIPTION
1V
transfer
COUNTY of PROPERTY
1W
transfer
AMOUNT DUE AND CLAIMED
1X
transfer
THAT all pre-foreclosure requirements have been complied with; that no action or proceeding has been instituted at law or otherwise to recover the debt secured by said mortgage, or any part thereof,
1Y
transfer
Index 00313-1C: Create-Modify Template for Public Notice screen 3 of 7
Figure #75
Internet
9:18 PM

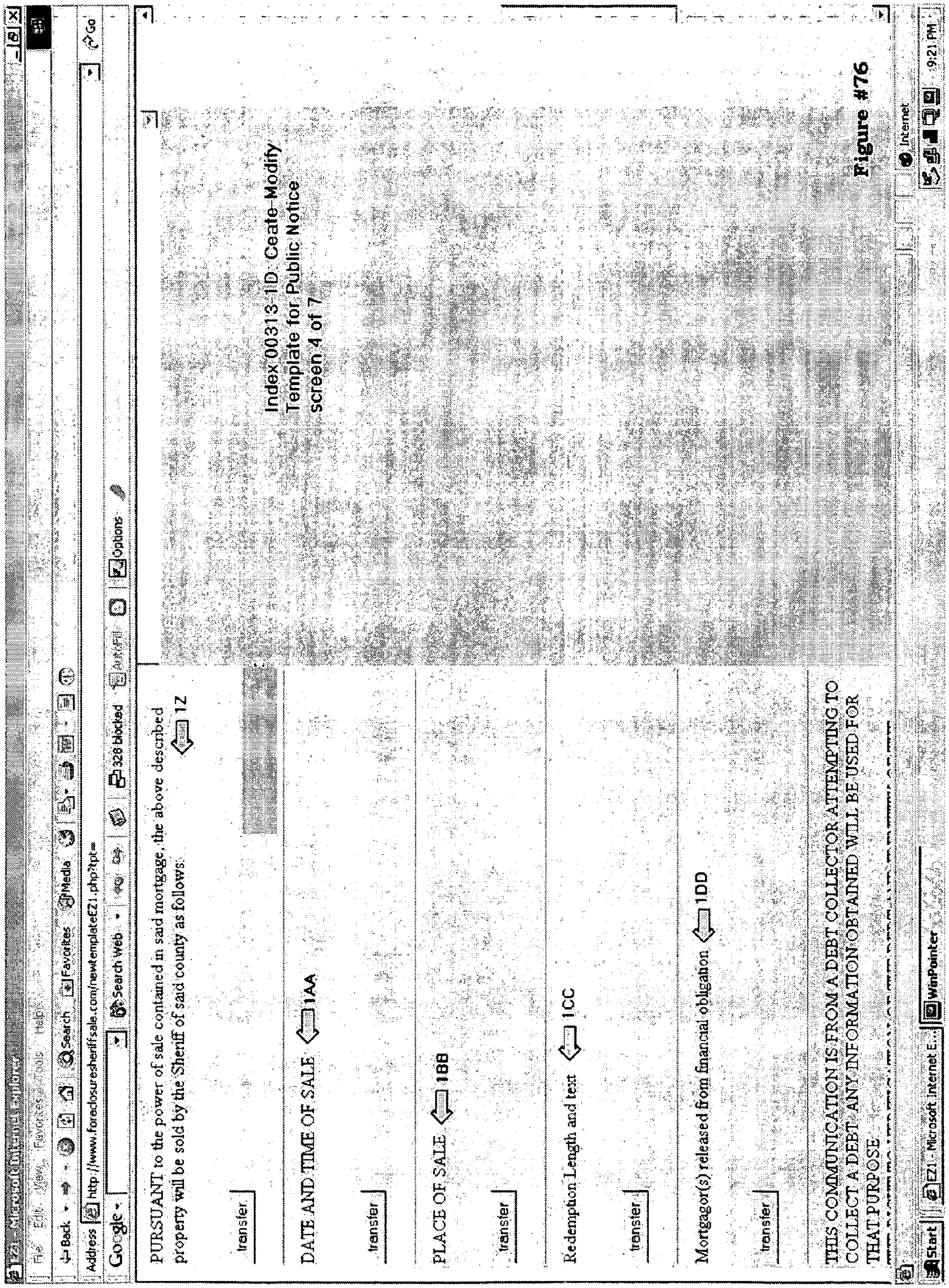
EZ1 - Microsoft Internet Explorer
File Edit View Favorites Tools Help
Address http://www.foreclosuresheriffsale.com/newtemplateEZ1.php?tpt=
PURSUANT to the power of sale contained in said mortgage, the above described property will be sold by the Sheriff of said county as follows:
1Z
transfer
DATE AND TIME OF SALE
1AA
transfer
PLACE OF SALE
1BB
transfer
Redemption Length and text
1CC
transfer
Mortgagor(s) released from financial obligation
1DD
transfer
THIS COMMUNICATION IS FROM A DEBT COLLECTOR ATTEMPTING TO COLLECT A DEBT. ANY INFORMATION OBTAINED WILL BE USED FOR THAT PURPOSE.
Index 00313-1D: Ceate-Modify Template for Public Notice screen 4 of 7
Figure #76
Internet
9:21 PM
Start
EZ1 - Microsoft Internet E...
WinPointer

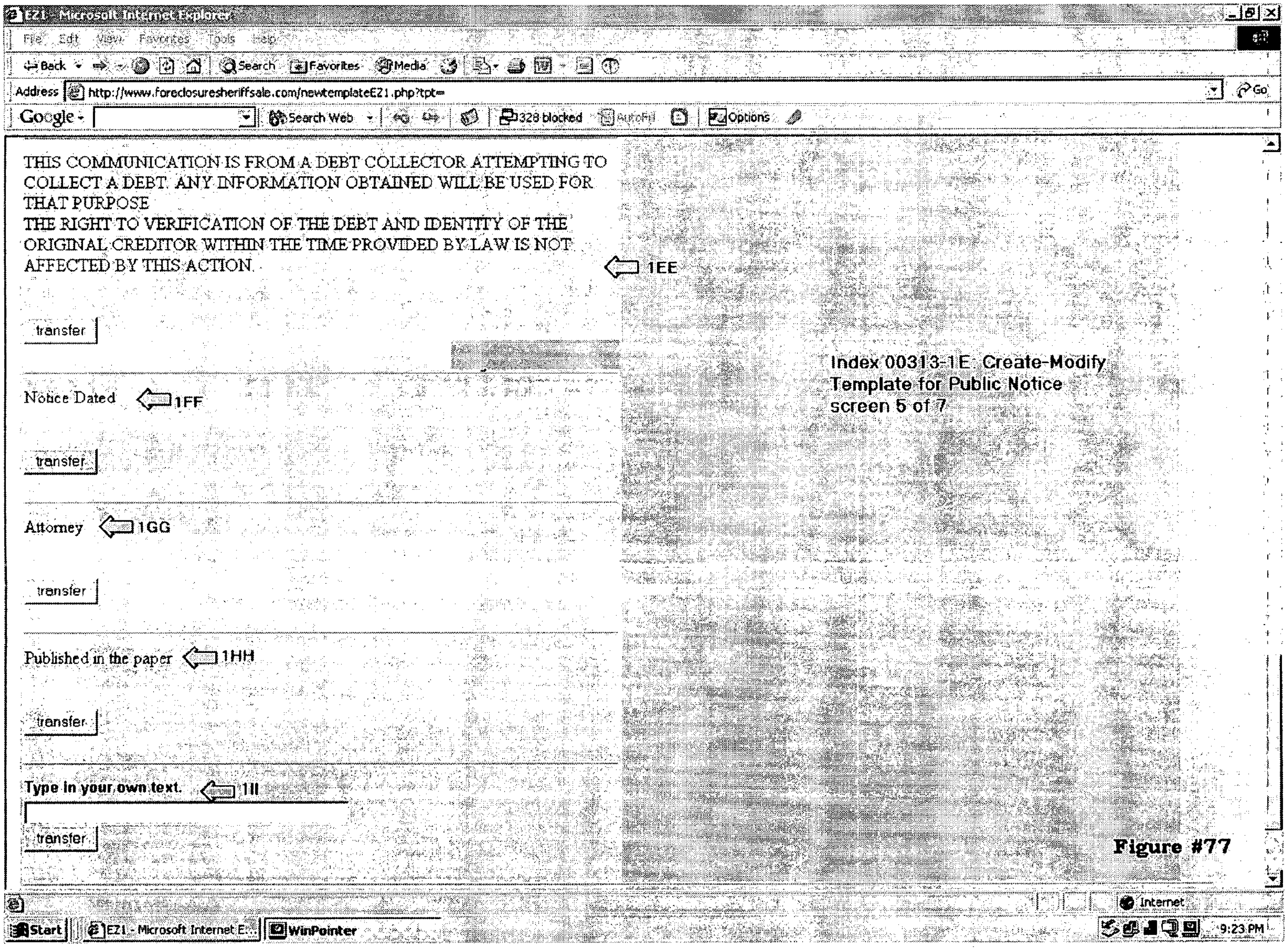
Figure #77

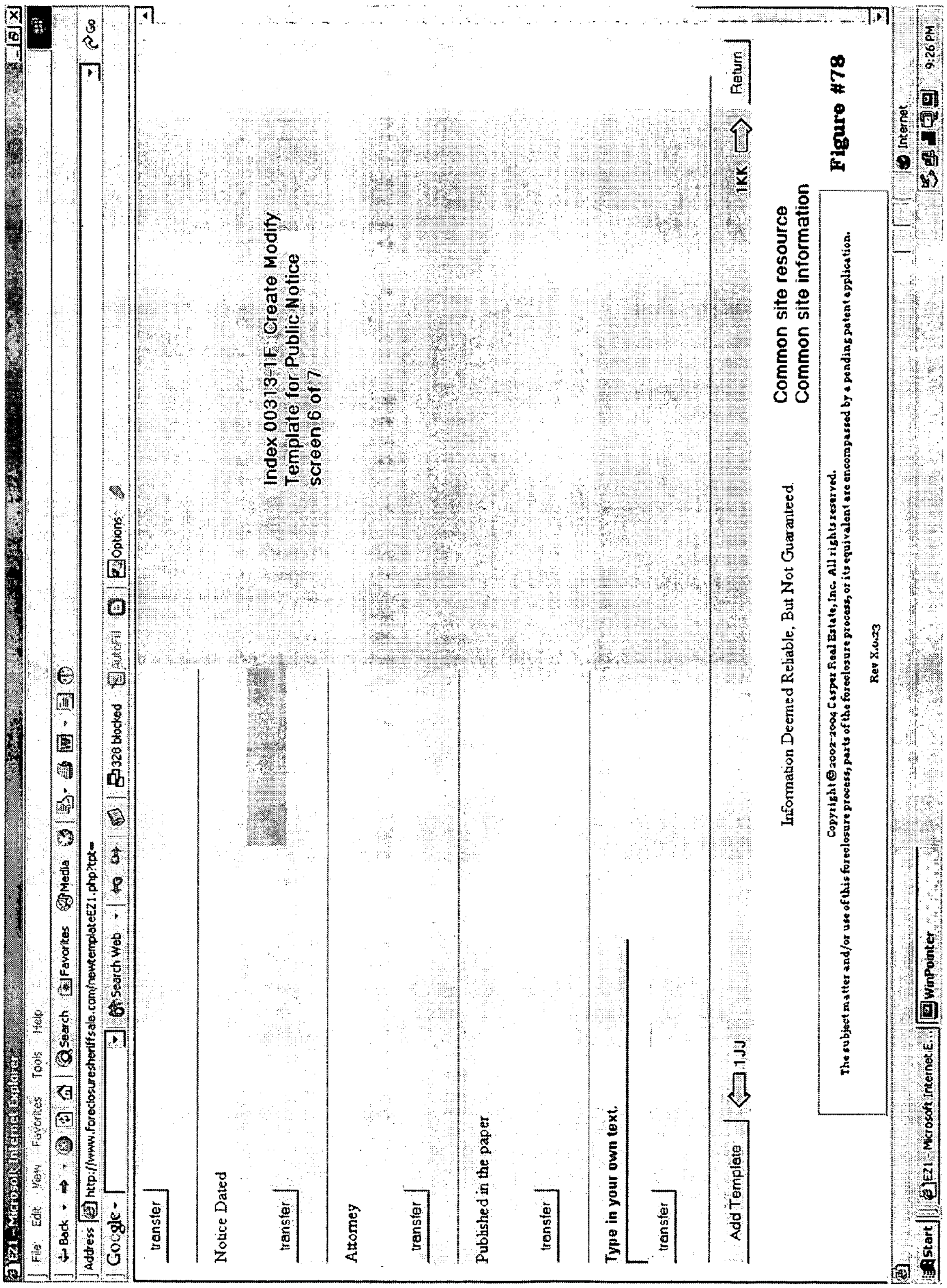
Figure #78

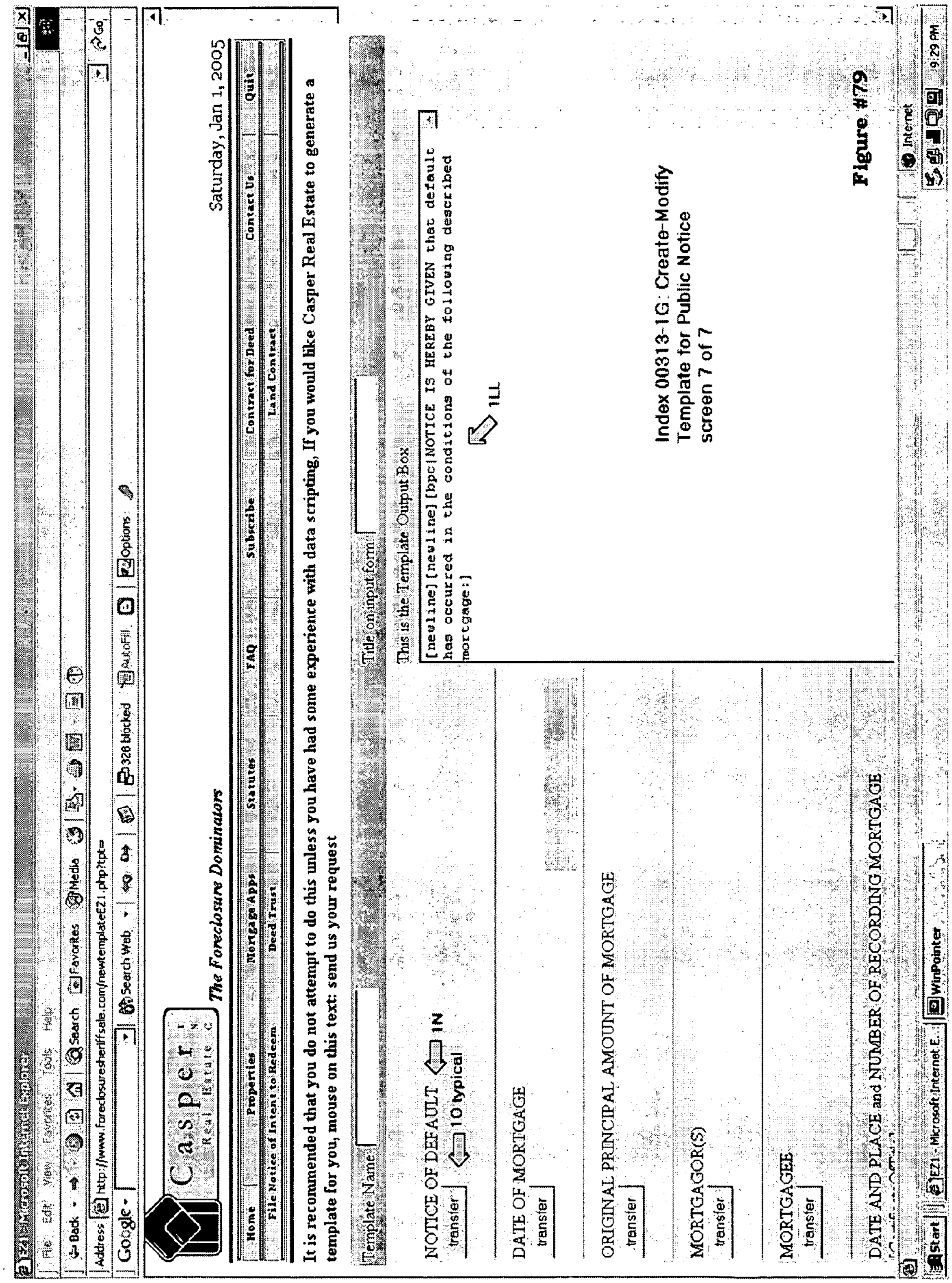
EZ1 - Microsoft Internet Explorer
http://www.foreclosuresheriffsale.com/newtemplateEZ1.php?tpt=
Casper Real Estate
The Foreclosure Dominators
Saturday, Jan 1, 2005
Home
Properties
Mortgage Apps
Statutes
FAQ
Subscribe
Contract for Deed
Contact Us
Quit
File Notice of Intent to Redeem
Deed Trust
Land Contract
It is recommended that you do not attempt to do this unless you have had some experience with data scripting, If you would like Casper Real Estate to generate a template for you, mouse on this text: send us your request
Template Name:
Title on input form:
This is the Template Output Box
[newline][newline][bpc|NOTICE IS HEREBY GIVEN that default has occurred in the conditions of the following described mortgage:]
1LL
NOTICE OF DEFAULT
IN
10 typical
transfer
DATE OF MORTGAGE
ORIGINAL PRINCIPAL AMOUNT OF MORTGAGE
MORTGAGOR(S)
MORTGAGEE
DATE AND PLACE and NUMBER OF RECORDING MORTGAGE
Index 00313-1G: Create-Modify Template for Public Notice screen 7 of 7
Figure #79
Start
EZ1 - Microsoft Internet E...
WinPointer
Internet
9:29 PM

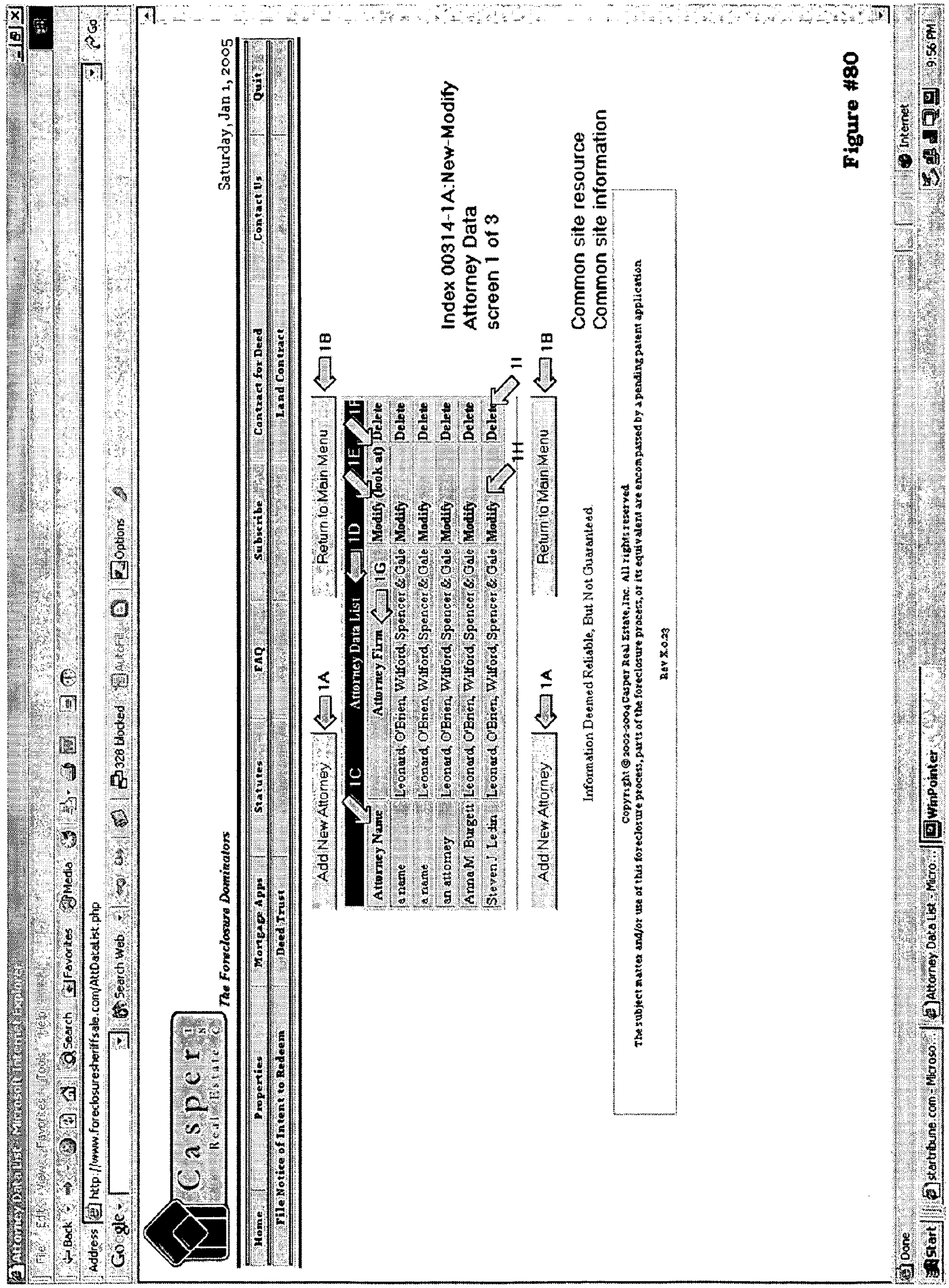
Attorney Data List - Microsoft Internet Explorer
http://www.foreclosuresheriffsale.com/AttDatalist.php
Casper Real Estate, Inc.
The Foreclosure Dominators
Saturday, Jan 1, 2005
Home
Properties
Mortgage Apps
Statutes
FAQ
Subscribe
Contract for Deed
Contact Us
Quit
File Notice of Intent to Redeem
Deed Trust
Land Contract
Add New Attorney
1A
Return to Main Menu
1B
Attorney Data List
1C
1D
1E
1F
1G
1H
1I
Attorney Name
Attorney Firm
Modify (look at)
Delete
a name
an attorney
Anna M. Burgett
Steven J. Levin
Leonard, O'Brien, Wilford, Spencer & Gale
Modify
Index 00314-1A:New-Modify
Attorney Data
screen 1 of 3
Common site resource
Common site information
Information Deemed Reliable, But Not Guaranteed.
Copyright © 2002-2004 Casper Real Estate, Inc. All rights reserved
The subject matter and/or use of this foreclosure process, parts of the foreclosure process, or its equivalent are encompassed by a pending patent application
Rev X.0.23
Figure #80

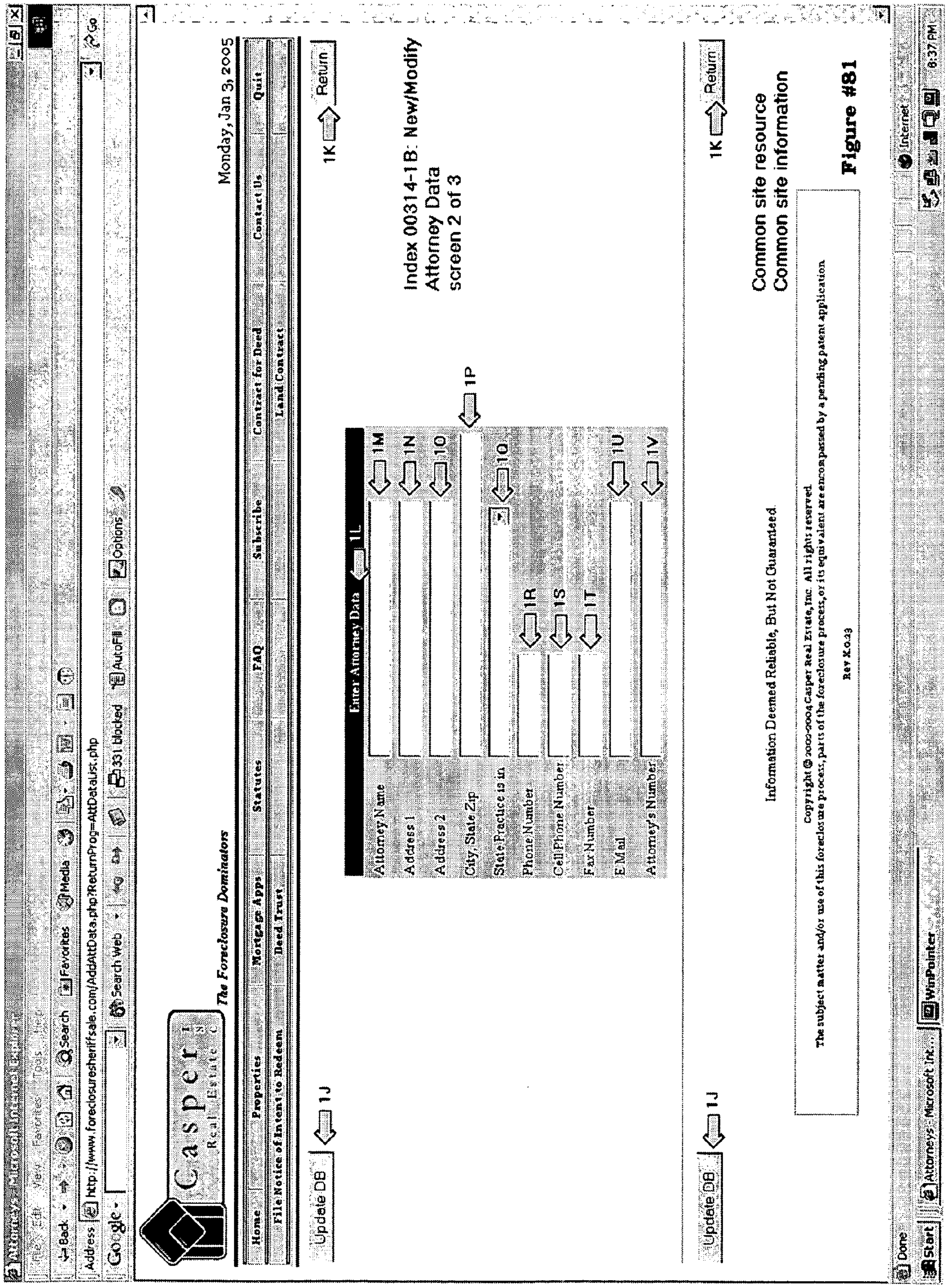
Attorneys - Microsoft Internet Explorer
http://www.foreclosuresheriffsale.com/AddAttData.php?ReturnProg=AttDataList.php
Casper Real Estate
The Foreclosure Dominators
Home
Properties
Mortgage Apps
Statutes
FAQ
Subscribe
Contract for Deed
Contact Us
Quit
File Notice of Intent to Redeem
Deed Trust
Land Contract
Monday, Jan 3, 2005
Update DB
1J
1K
Return
Index 00314-1B: New/Modify Attorney Data screen 2 of 3
Enter Attorney Data
1L
Attorney Name
1M
Address 1
1N
Address 2
1O
City, State Zip
1P
State Practice is in
1Q
Phone Number
1R
Cell Phone Number
1S
Fax Number
1T
E Mail
1U
Attorney's Number
1V
Common site resource
Common site information
Information Deemed Reliable, But Not Guaranteed.
Copyright © 2000-2004 Casper Real Estate, Inc. All rights reserved.
The subject matter and/or use of this foreclosure process, parts of the foreclosure process, or its equivalent are encompassed by a pending patent application.
Rev X.023
Figure #81
Done
Internet
Start
8:37 PM

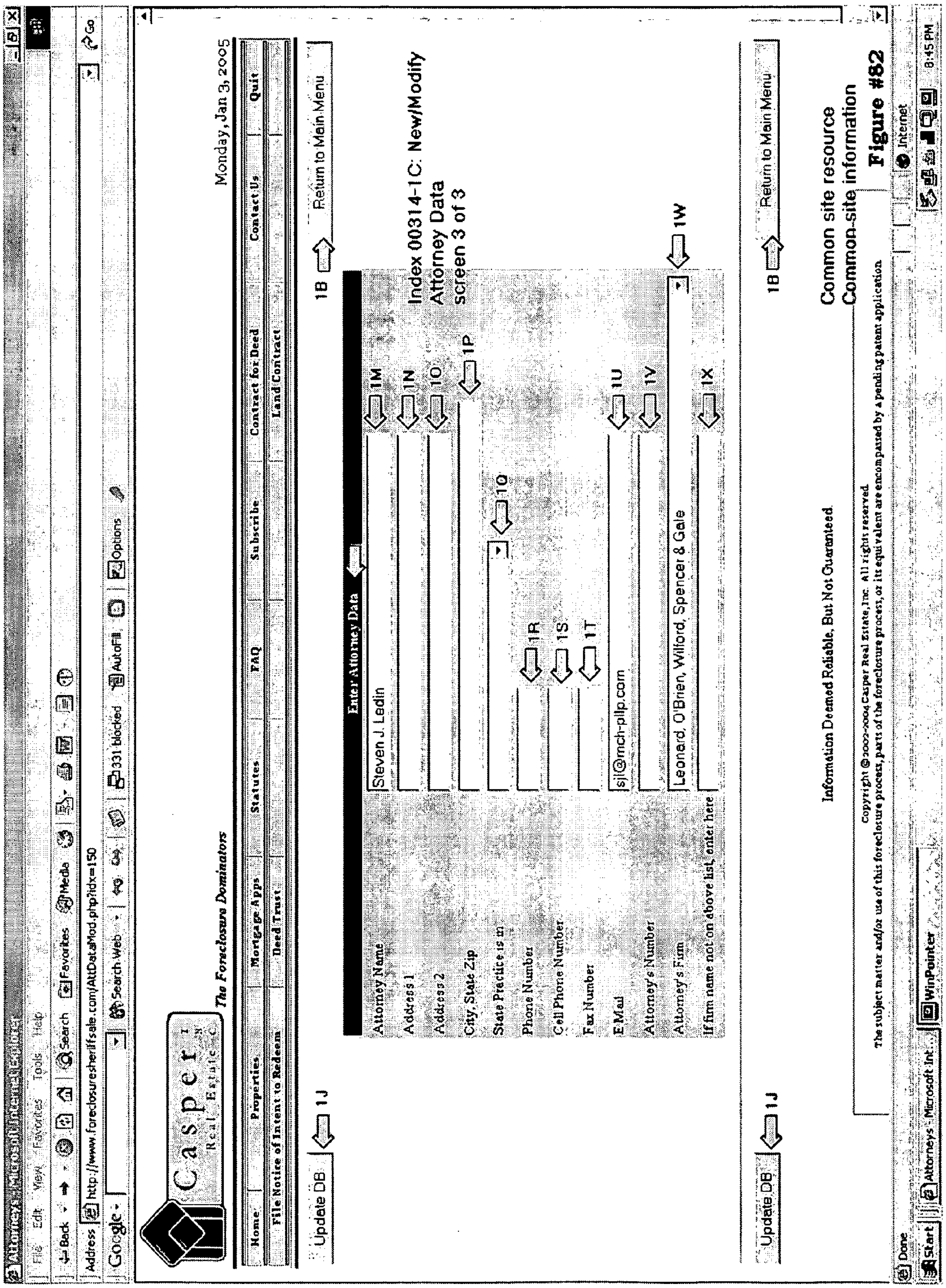
Attorneys - Microsoft Internet Explorer
http://www.foreclosuresheriffsale.com/AttDataMod.php?idx=150
Casper Real Estate Inc.
The Foreclosure Dominators
Home
Properties
Mortgage Apps
Statutes
FAQ
Subscribe
Contract for Deed
Contact Us
Quit
File Notice of Intent to Redeem
Deed Trust
Land Contract
Monday, Jan 3, 2005
Update DB
1J
1B
Return to Main Menu
Enter Attorney Data
Attorney Name
Steven J. Ledin
1M
Address 1
1N
Address 2
1O
City, State Zip
1P
State Practice is in
1Q
Phone Number
1R
Cell Phone Number
1S
Fax Number
1T
E Mail
sjl@mch-pllp.com
1U
Attorney's Number
1V
Attorney's Firm
Leonard, O'Brien, Wilford, Spencer & Gale
1W
If firm name not on above list, enter here
1X
Index 00314-1C: New/Modify
Attorney Data
screen 3 of 3
Information Deemed Reliable, But Not Guaranteed.
Copyright © 2002-2004 Casper Real Estate, Inc. All rights reserved.
The subject matter and/or use of this foreclosure process, parts of the foreclosure process, or its equivalent are encompassed by a pending patent application.
Common site resource
Common-site information
Figure #82
Done
Internet
Start
Attorneys - Microsoft Int...
WinPointer
8:45 PM

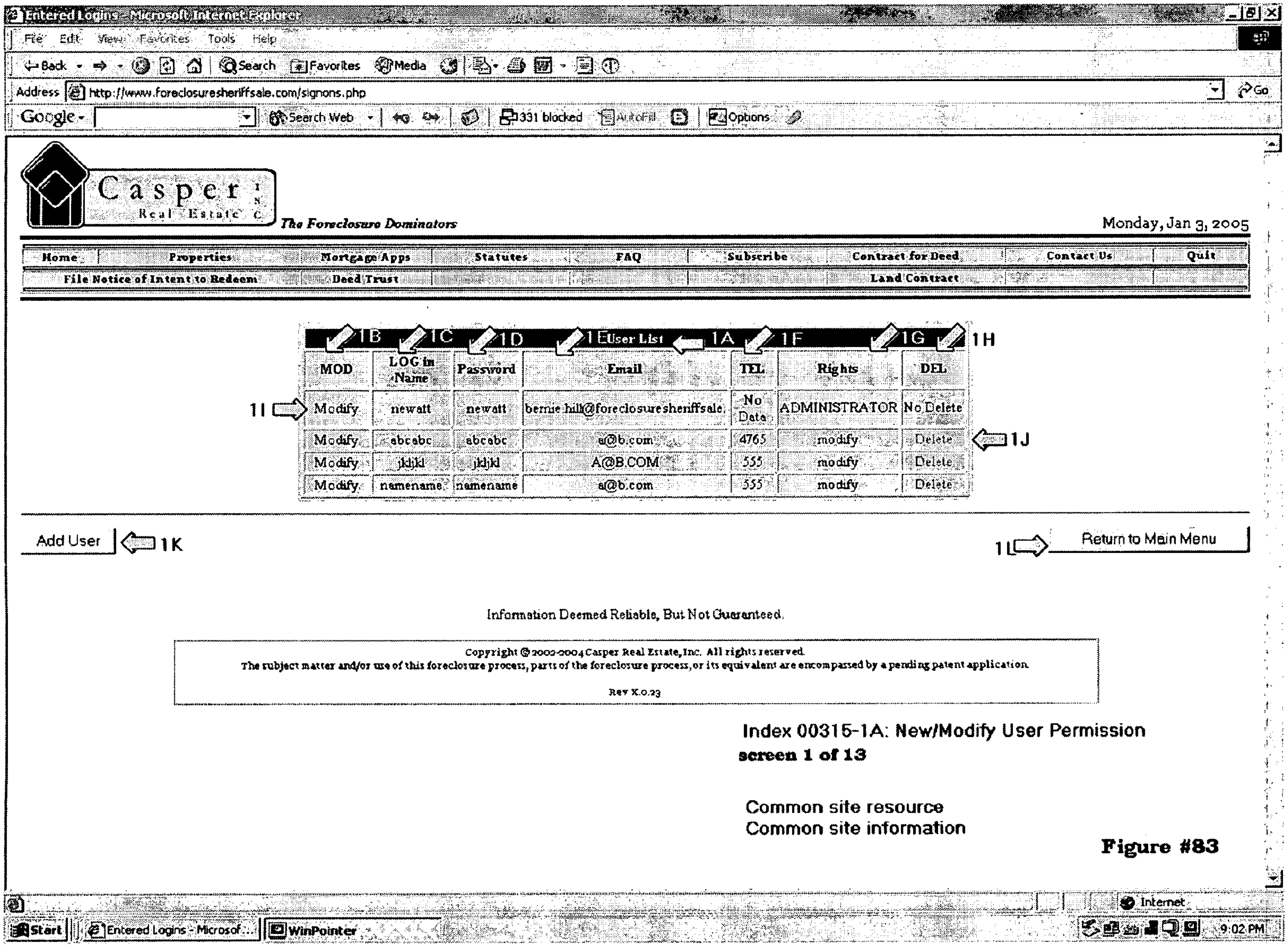
Index 00315-1A: New/Modify User Permission
screen 1 of 13
Figure #83

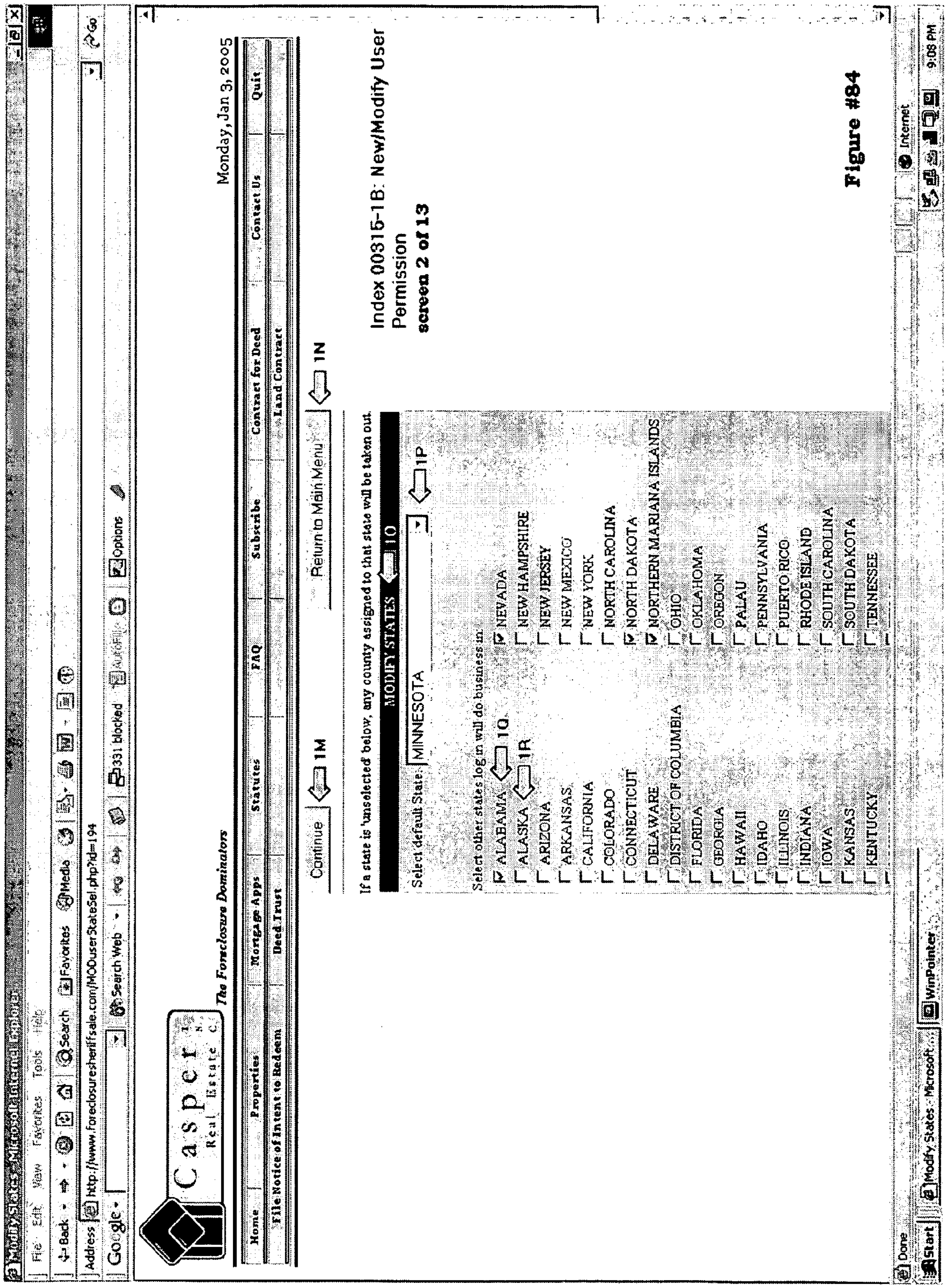
Modify States - Microsoft Internet Explorer
File Edit View Favorites Tools Help
Address http://www.foreclosuresheriffsale.com/MODuserStateSel.php?id=194
Casper Real Estate
The Foreclosure Dominators
Monday, Jan 3, 2005
Home
Properties
Mortgage Apps
Statutes
FAQ
Subscribe
Contract for Deed
Contact Us
Quit
File Notice of Intent to Redeem
Deed Trust
Land Contract
Continue
1M
Return to Main Menu
1N
If a state is 'unselected' below, any county assigned to that state will be taken out.
MODIFY STATES
1O
Select default State: MINNESOTA
1P
Select other states log in will do business in:
ALABAMA
1Q
ALASKA
1R
ARIZONA
ARKANSAS
CALIFORNIA
COLORADO
CONNECTICUT
DELAWARE
DISTRICT OF COLUMBIA
FLORIDA
GEORGIA
HAWAII
IDAHO
ILLINOIS
INDIANA
IOWA
KANSAS
KENTUCKY
NEVADA
NEW HAMPSHIRE
NEW JERSEY
NEW MEXICO
NEW YORK
NORTH CAROLINA
NORTH DAKOTA
NORTHERN MARIANA ISLANDS
OHIO
OKLAHOMA
OREGON
PALAU
PENNSYLVANIA
PUERTO RICO
RHODE ISLAND
SOUTH CAROLINA
SOUTH DAKOTA
TENNESSEE
Index 00315-1B: New/Modify User Permission
screen 2 of 13
Figure #84
Done
Internet
Start
9:08 PM

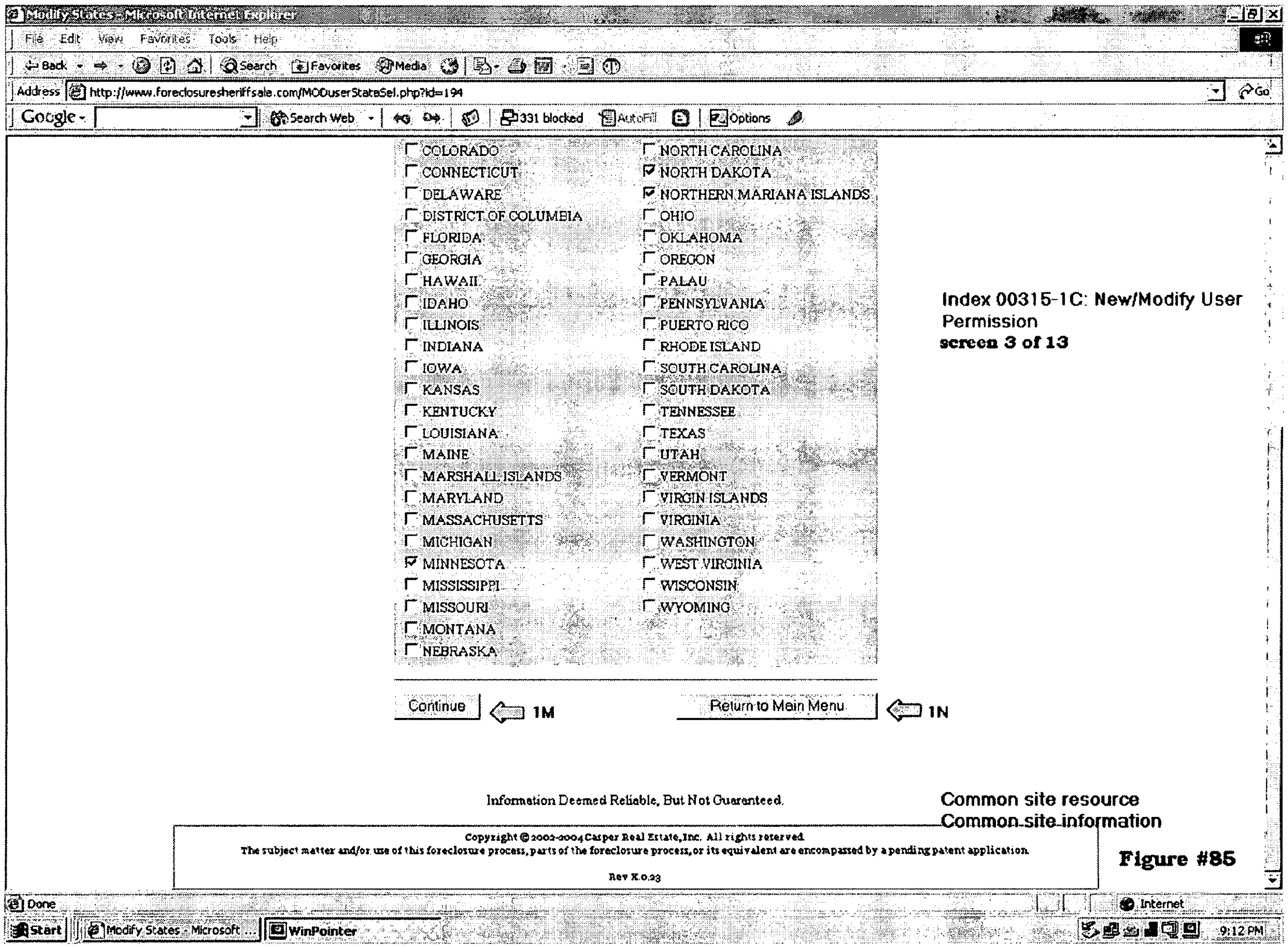
Figure #85

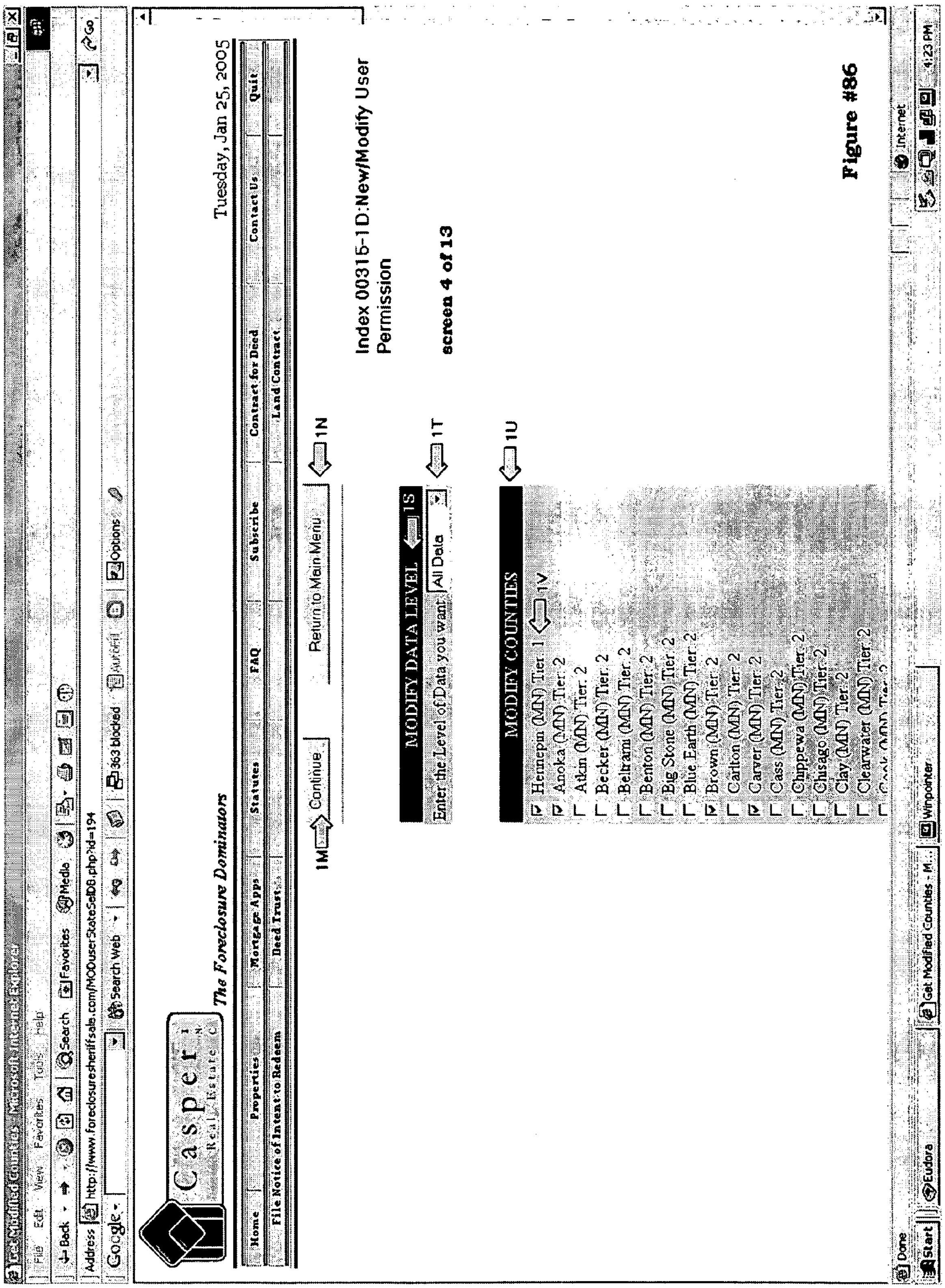
Figure #86

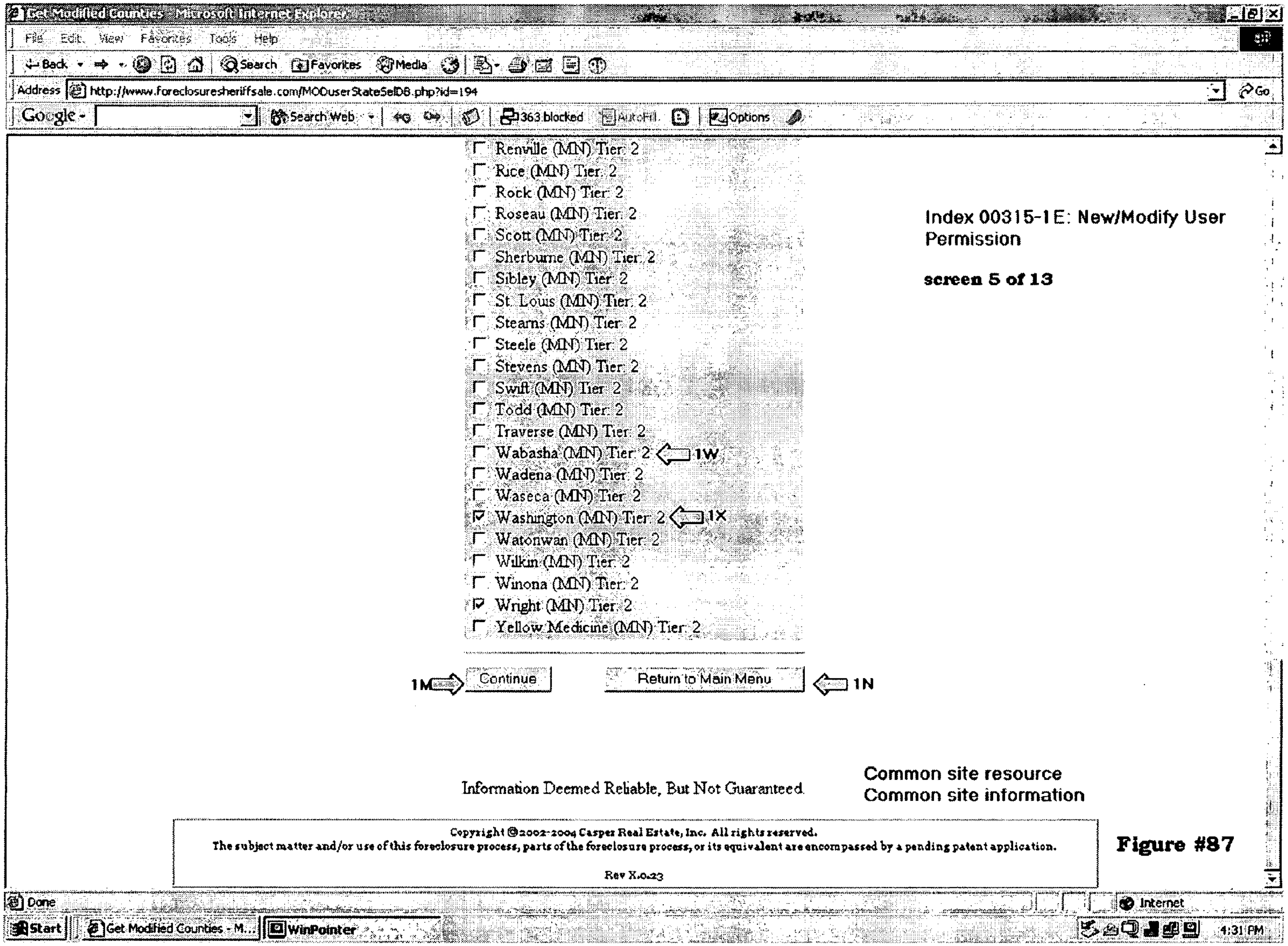
Figure #87

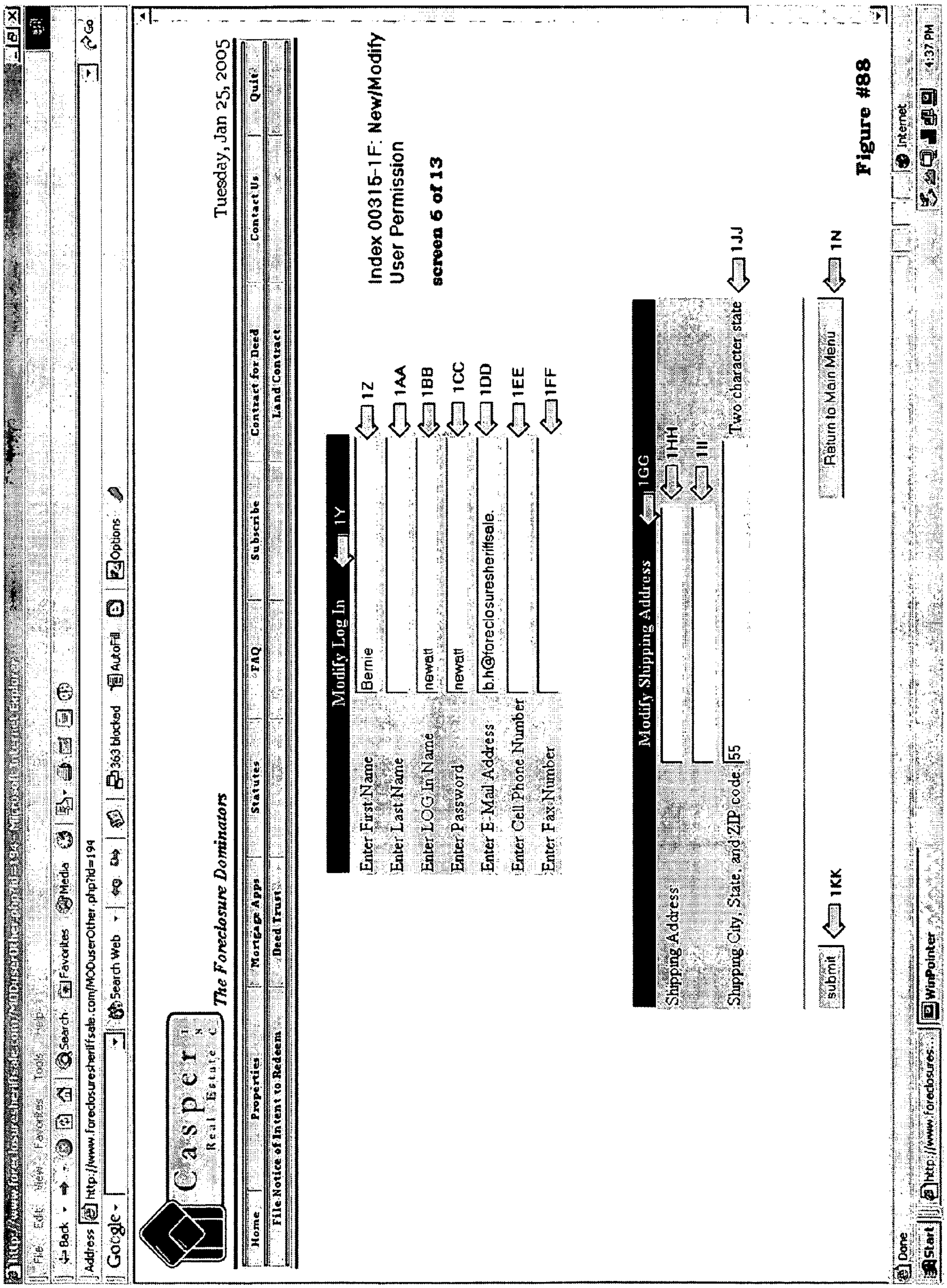
Figure #88

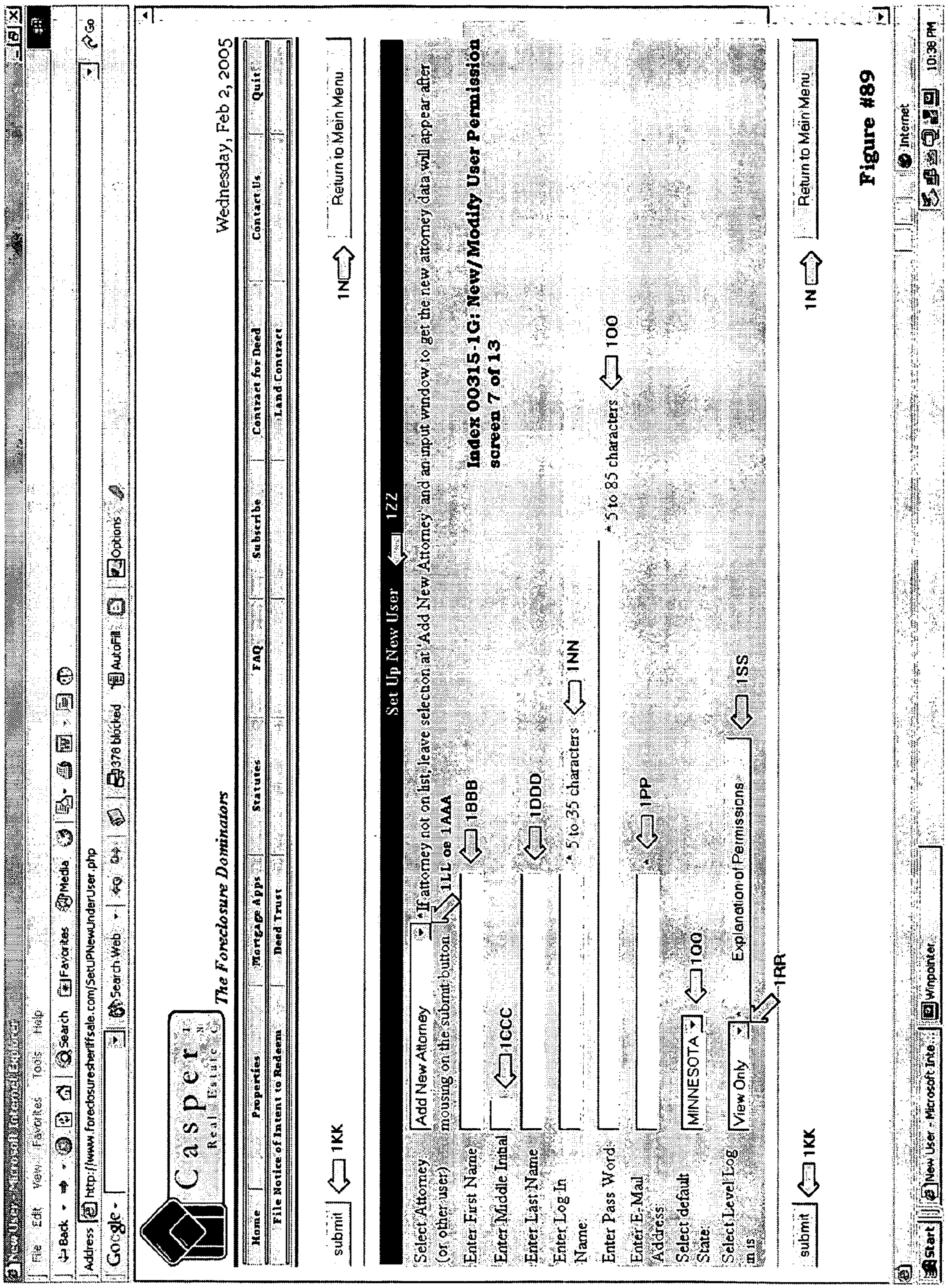
Figure #89

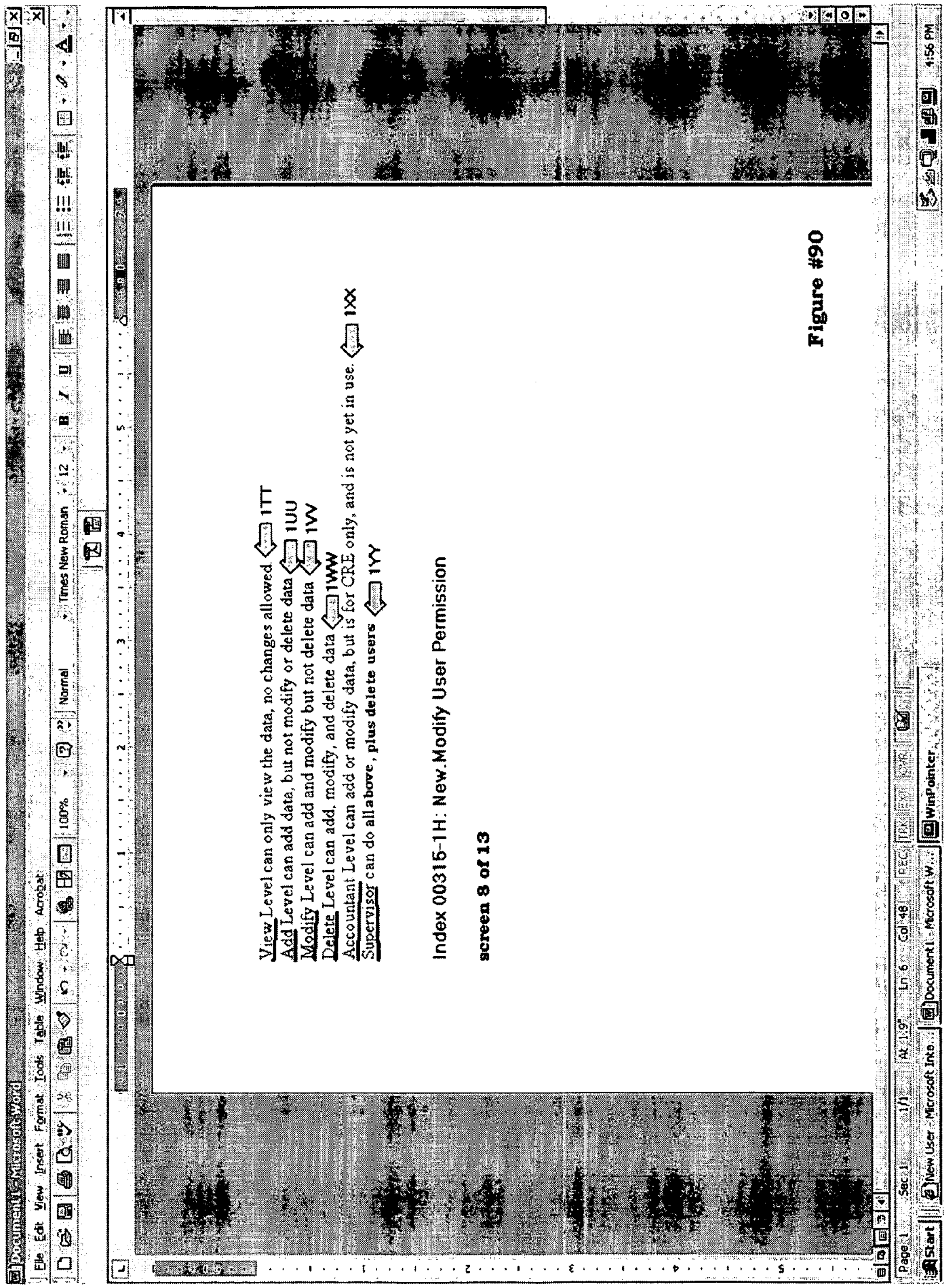
Document1 - Microsoft Word
View Level can only view the data, no changes allowed. 1TT
Add Level can add data, but not modify or delete data 1UU
Modify Level can add and modify but not delete data 1VV
Delete Level can add, modify, and delete data 1WW
Accountant Level can add or modify data, but is for CRE only, and is not yet in use. 1XX
Supervisor can do all above, plus delete users 1YY
Index 00316-1H: New.Modify User Permission
screen 8 of 13
Figure #90

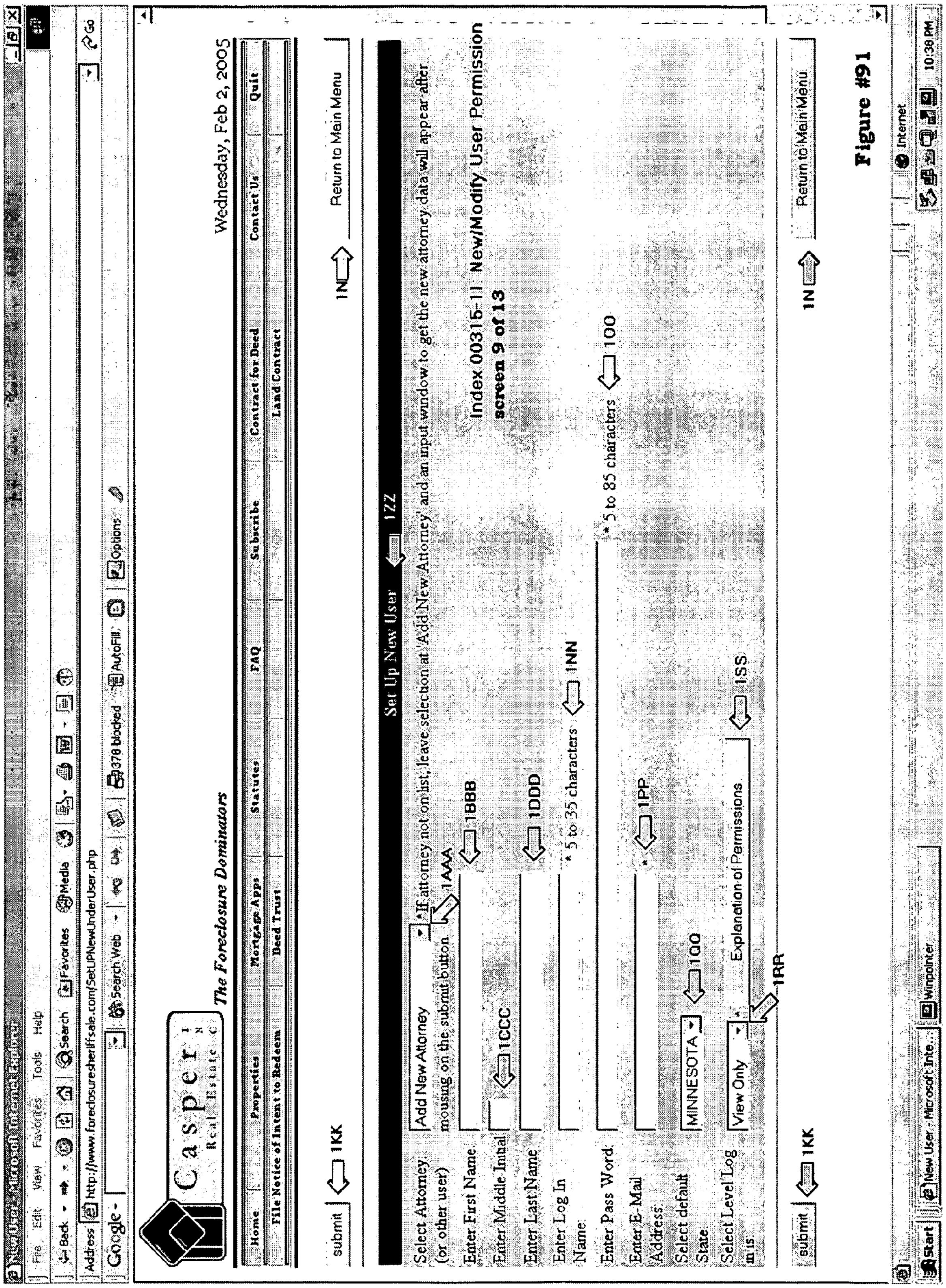
New User - Microsoft Internet Explorer
http://www.foreclosuresheriffsale.com/SetUPNewUnderUser.php
Casper Real Estate
The Foreclosure Dominators
Wednesday, Feb 2, 2005
Home
Properties
Mortgage Apps
Statutes
FAQ
Subscribe
Contract for Deed
Contact Us
Quit
File Notice of Intent to Redeem
Deed Trust
Land Contract
submit
1KK
1N
Return to Main Menu
Set Up New User
1ZZ
Select Attorney (or other user)
Add New Attorney
*If attorney not on list, leave selection at 'Add New Attorney' and an input window to get the new attorney data will appear after mousing on the submit button
1AAA
Enter First Name
1BBB
Enter Middle Intial
1CCC
Enter Last Name
1DDD
Enter Log In Name:
* 5 to 35 characters
1NN
Enter Pass Word
* 5 to 85 characters
1OO
Index 00316-11 New/Modify User Permission
screen 9 of 13
Enter E-Mail Address:
1PP
Select default State:
MINNESOTA
1QQ
Select Level Log in is:
View Only
Explanation of Permissions.
1RR
1SS
Figure #91
Internet

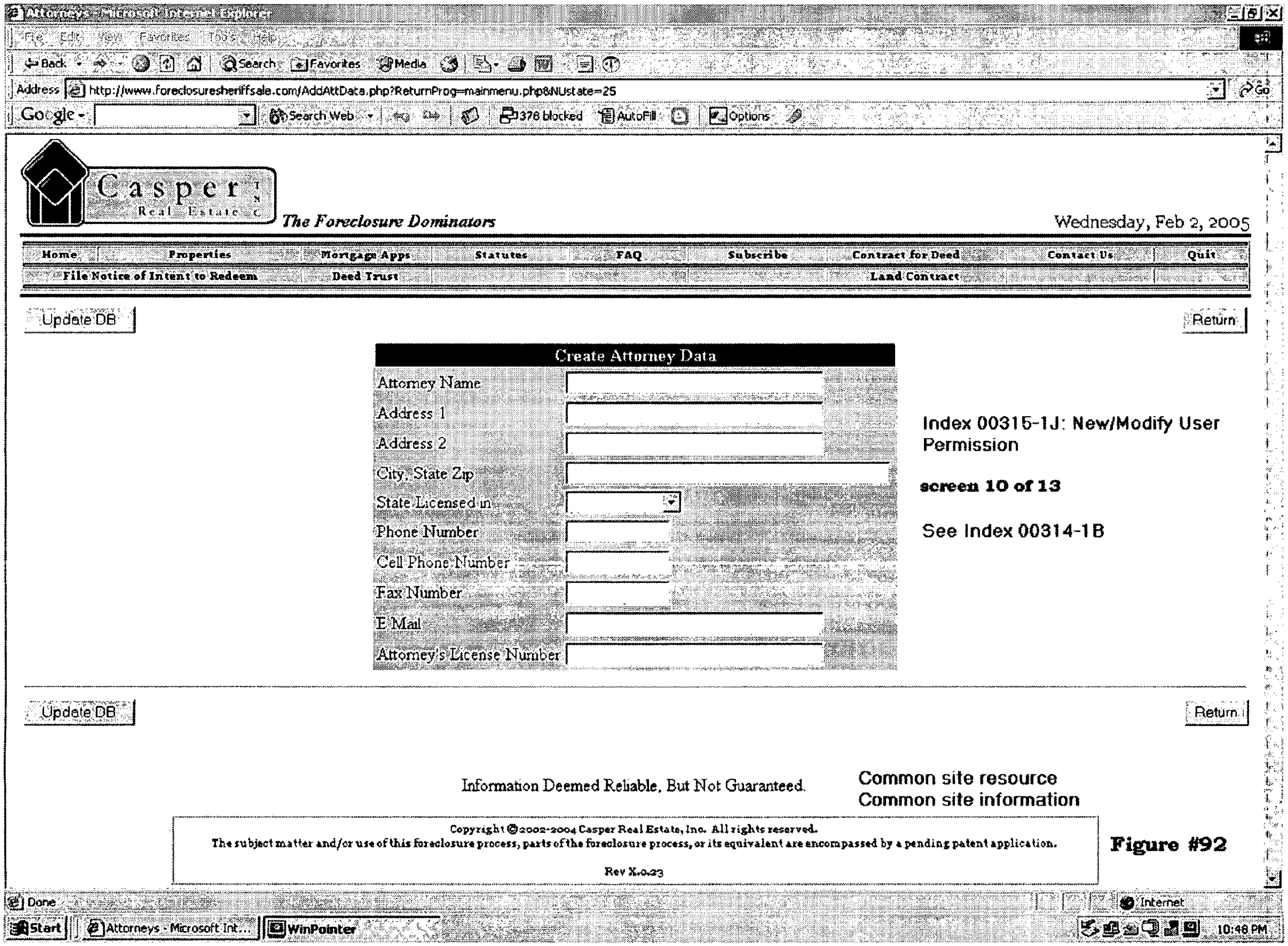
Figure #92

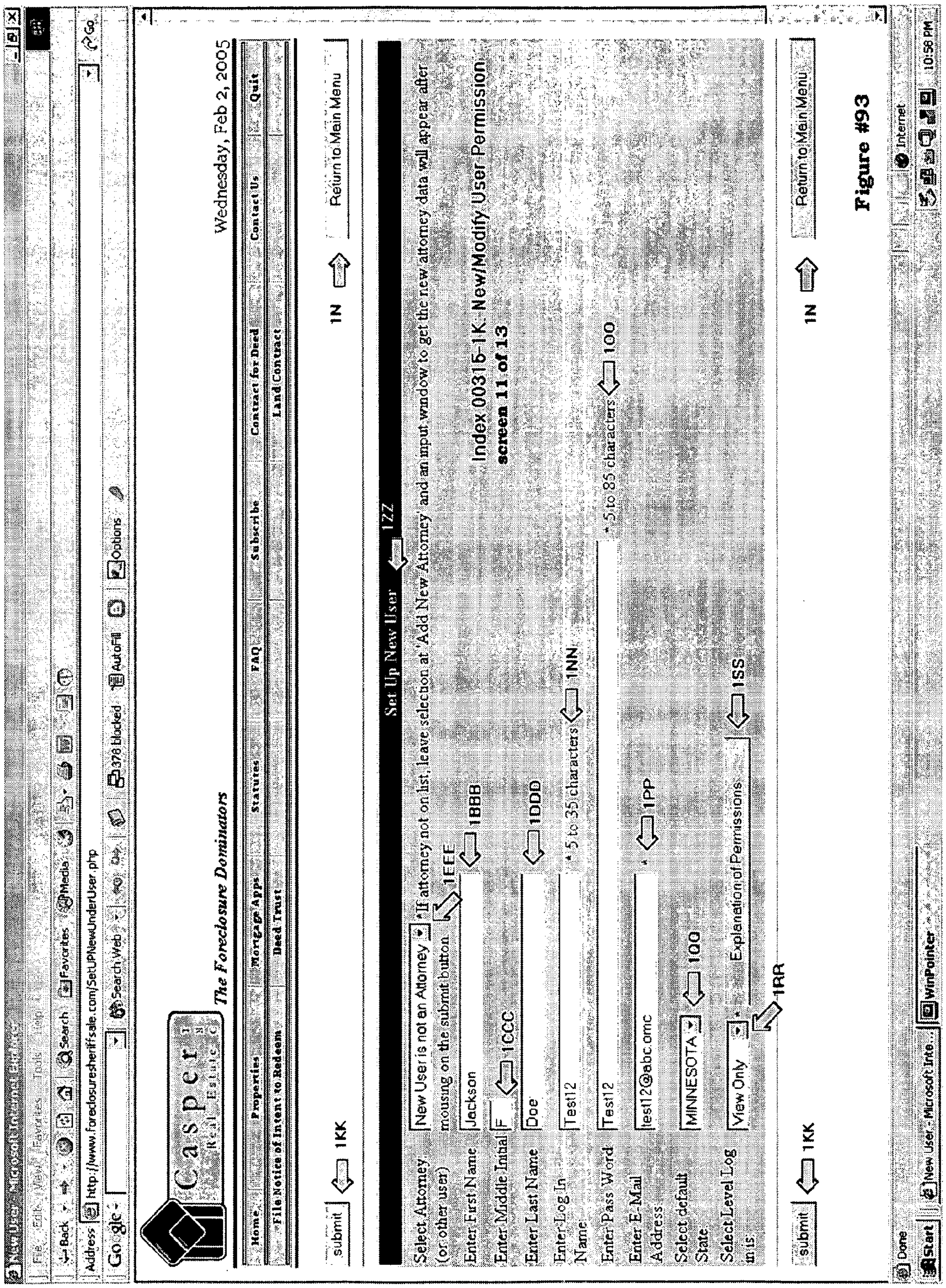
Figure #93

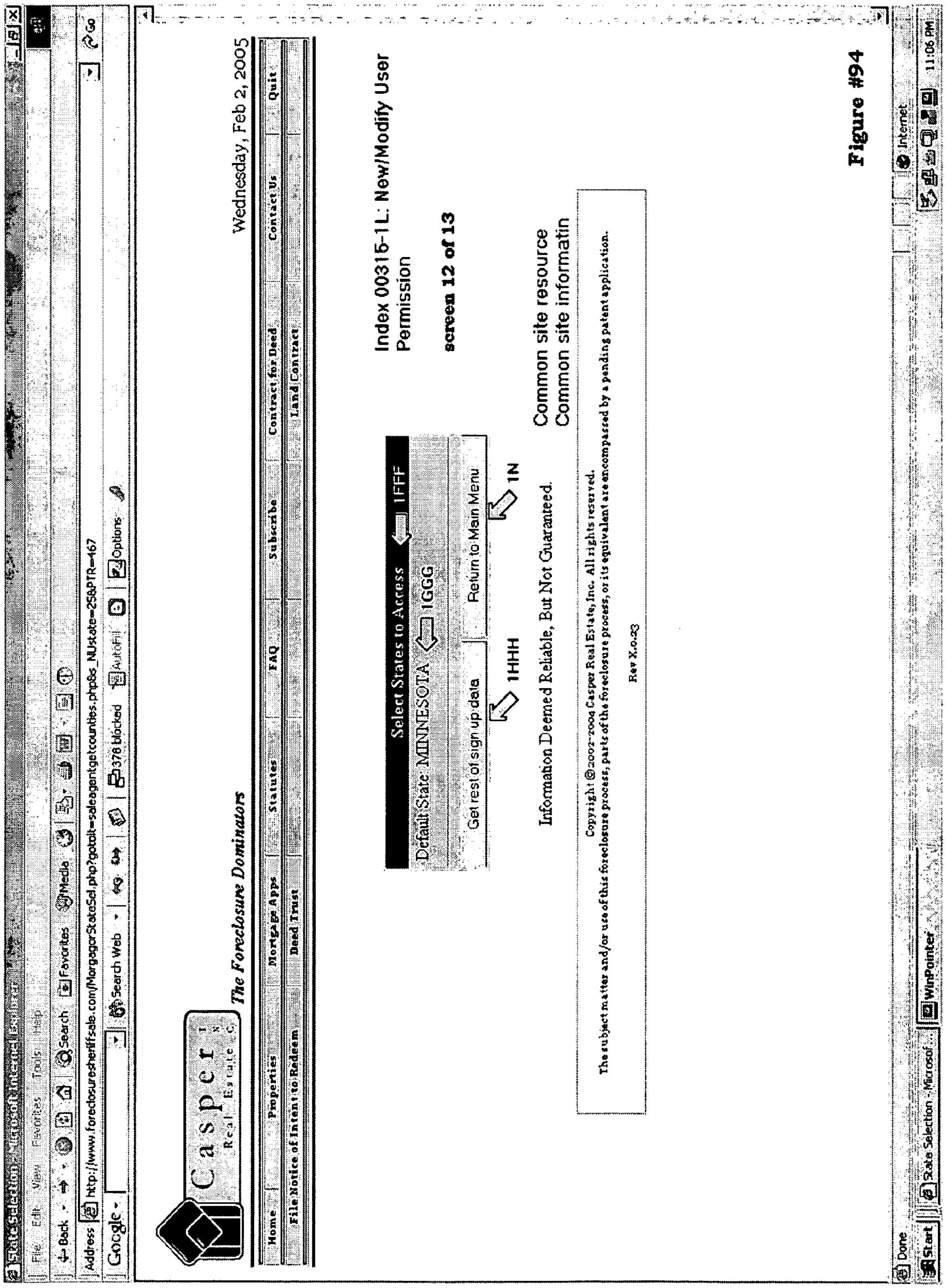
Figure #94

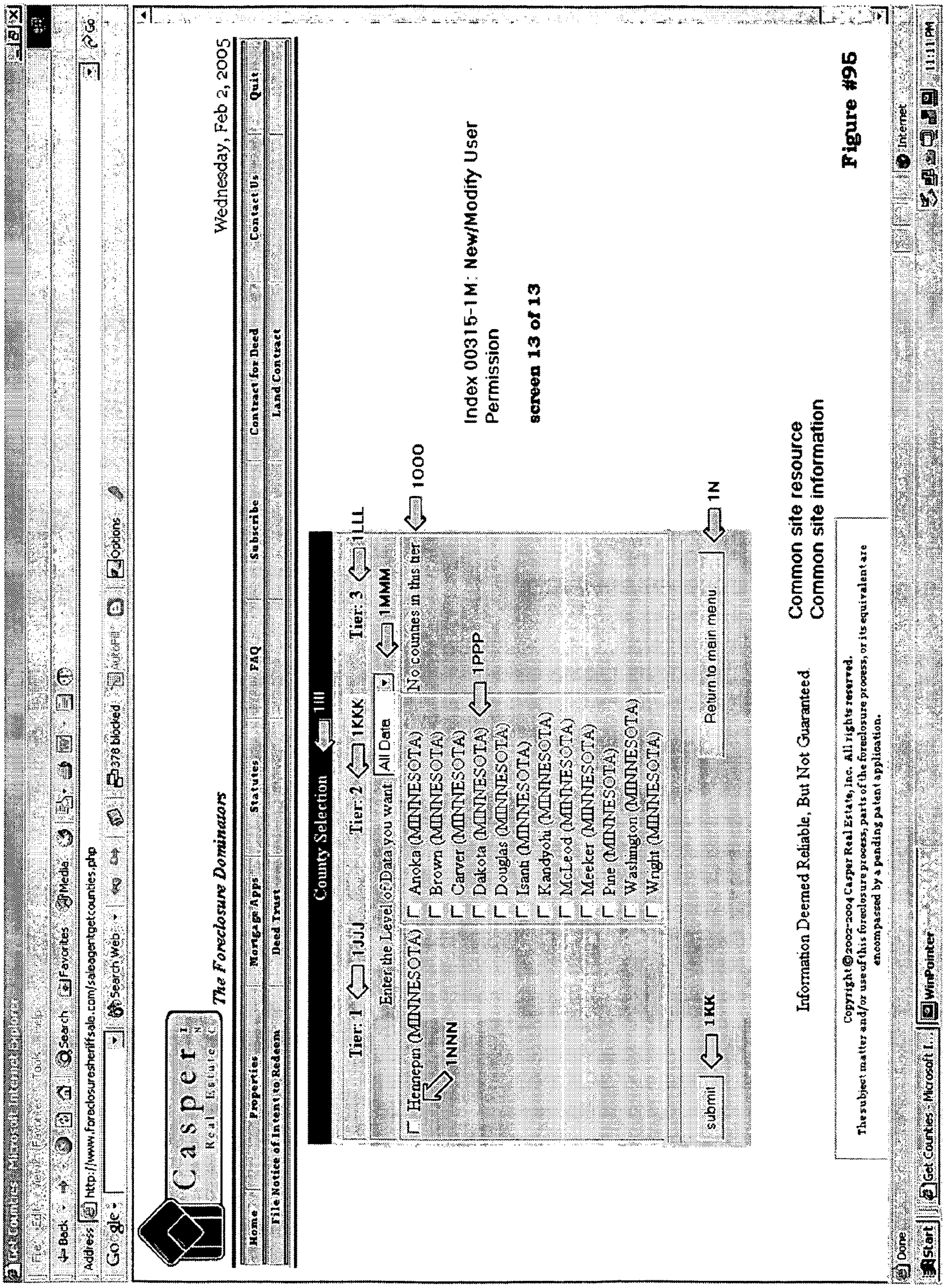
Get Counties - Microsoft Internet Explorer
http://www.foreclosuresheriffsale.com/saleagent/getcounties.php
Casper Real Estate Inc.
The Foreclosure Dominators
Wednesday, Feb 2, 2005
Home
Properties
Mortgage Apps
Statutes
FAQ
Subscribe
Contract for Deed
Contact Us
Quit
File Notice of Intent to Redeem
Deed Trust
Land Contract
County Selection
1III
Tier: 1
1JJJ
Tier: 2
1KKK
Tier: 3
1LLL
Enter the Level of Data you want
All Data
1MMM
Hennepin (MINNESOTA)
1NNN
Anoka (MINNESOTA)
Brown (MINNESOTA)
Carver (MINNESOTA)
Dakota (MINNESOTA)
Douglas (MINNESOTA)
Isanti (MINNESOTA)
Kandiyohi (MINNESOTA)
McLeod (MINNESOTA)
Meeker (MINNESOTA)
Pine (MINNESOTA)
Washington (MINNESOTA)
Wright (MINNESOTA)
1PPP
No counties in this tier
1000
submit
1KK
Return to main menu
1N
Information Deemed Reliable, But Not Guaranteed.
Copyright ©2002-2004 Casper Real Estate, Inc. All rights reserved.
The subject matter and/or use of this foreclosure process, parts of the foreclosure process, or its equivalent are encompassed by a pending patent application.
Common site resource
Common site information
Index 00315-1M: New/Modify User Permission
screen 13 of 13
Figure #95

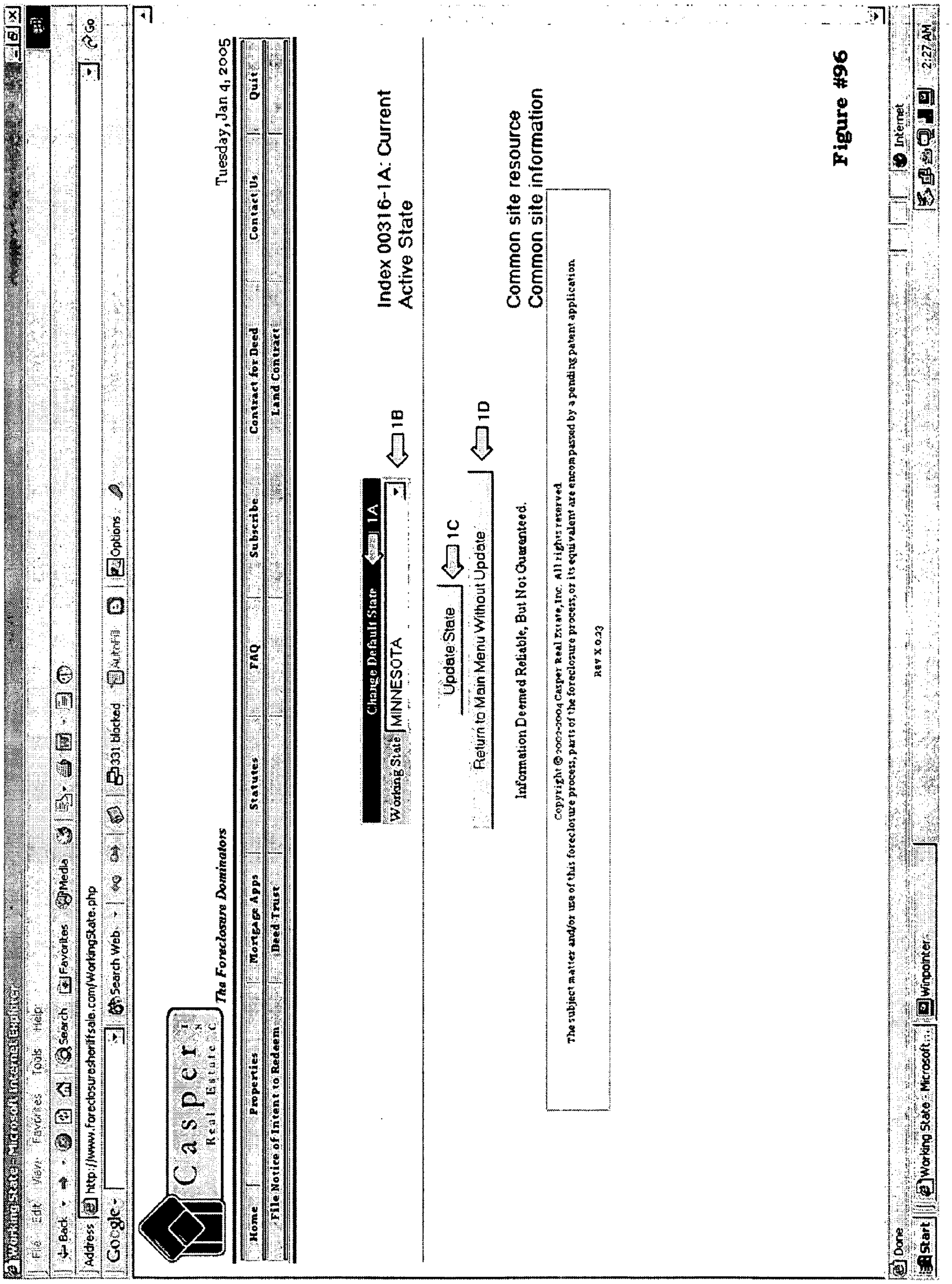
Figure #96

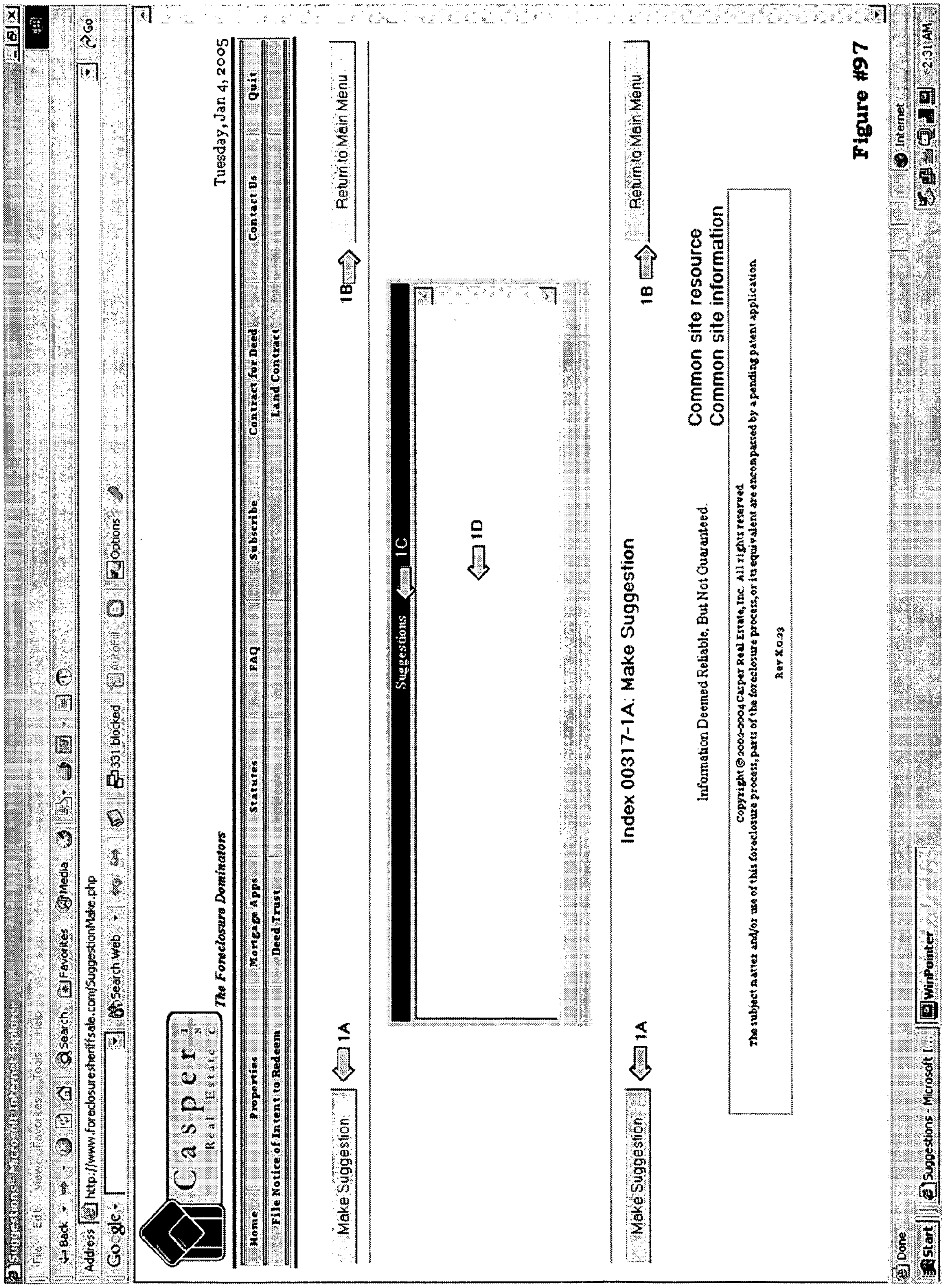
Suggestions - Microsoft Internet Explorer
File Edit View Favorites Tools Help
Address http://www.foreclosuresheriffsale.com/SuggestionMake.php
Casper Real Estate
The Foreclosure Dominators
Tuesday, Jan 4, 2005
Home
Properties
Mortgage Apps
Statutes
Subscribe
FAQ
Contract for Deed
Contact Us
Quit
File Notice of Intent to Redeem
Deed Trust
Land Contract
Make Suggestion
1A
1B
Return to Main Menu
Suggestions
1C
1D
Index 00317-1A. Make Suggestion
Common site resource
Common site information
Information Deemed Reliable, But Not Guaranteed.
Copyright © 2000-2004 Casper Real Estate, Inc. All rights reserved.
The subject matter and/or use of this foreclosure process, parts of the foreclosure process, or its equivalent are encompassed by a pending patent application.
Figure #97

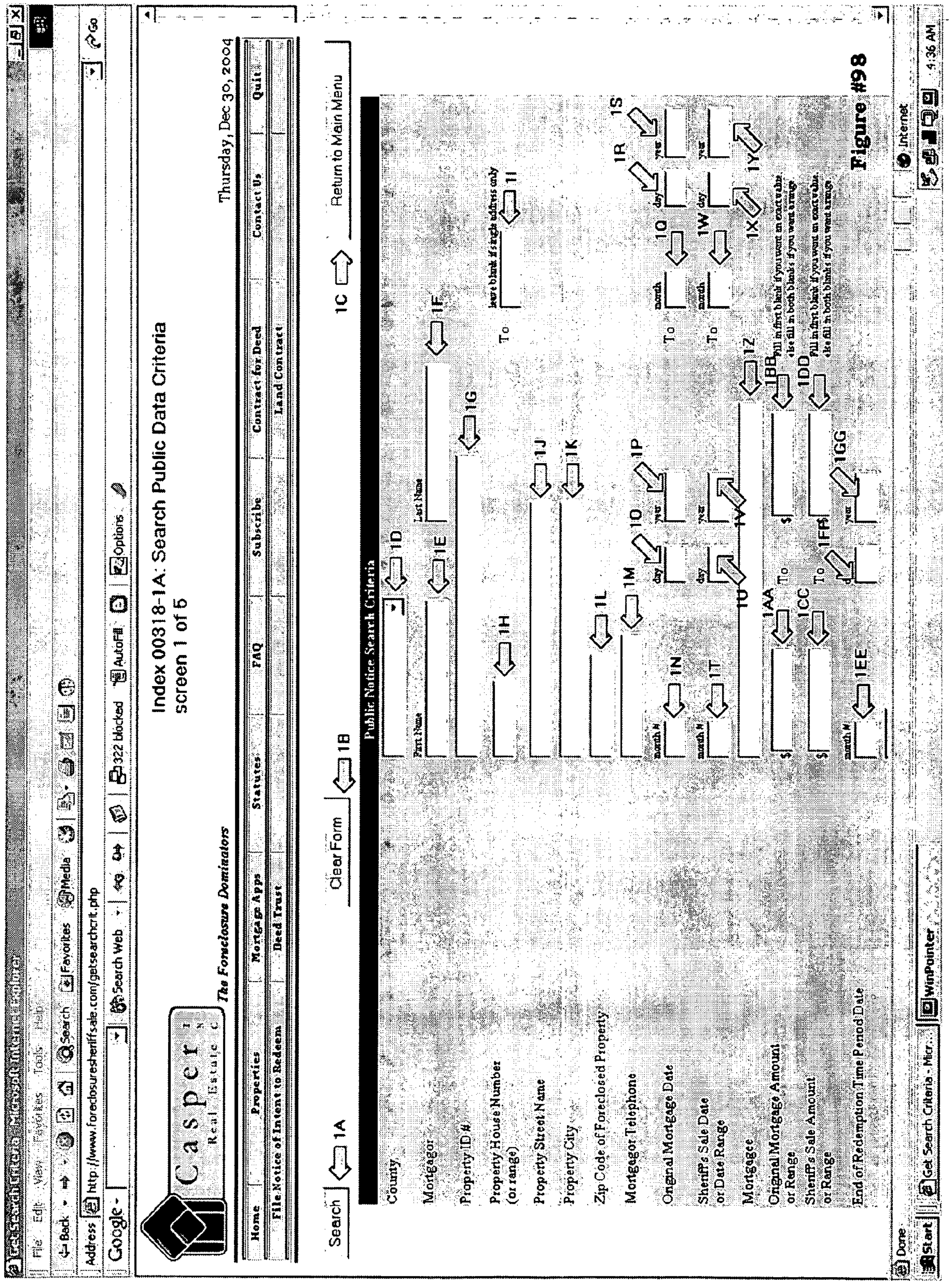
Figure #98

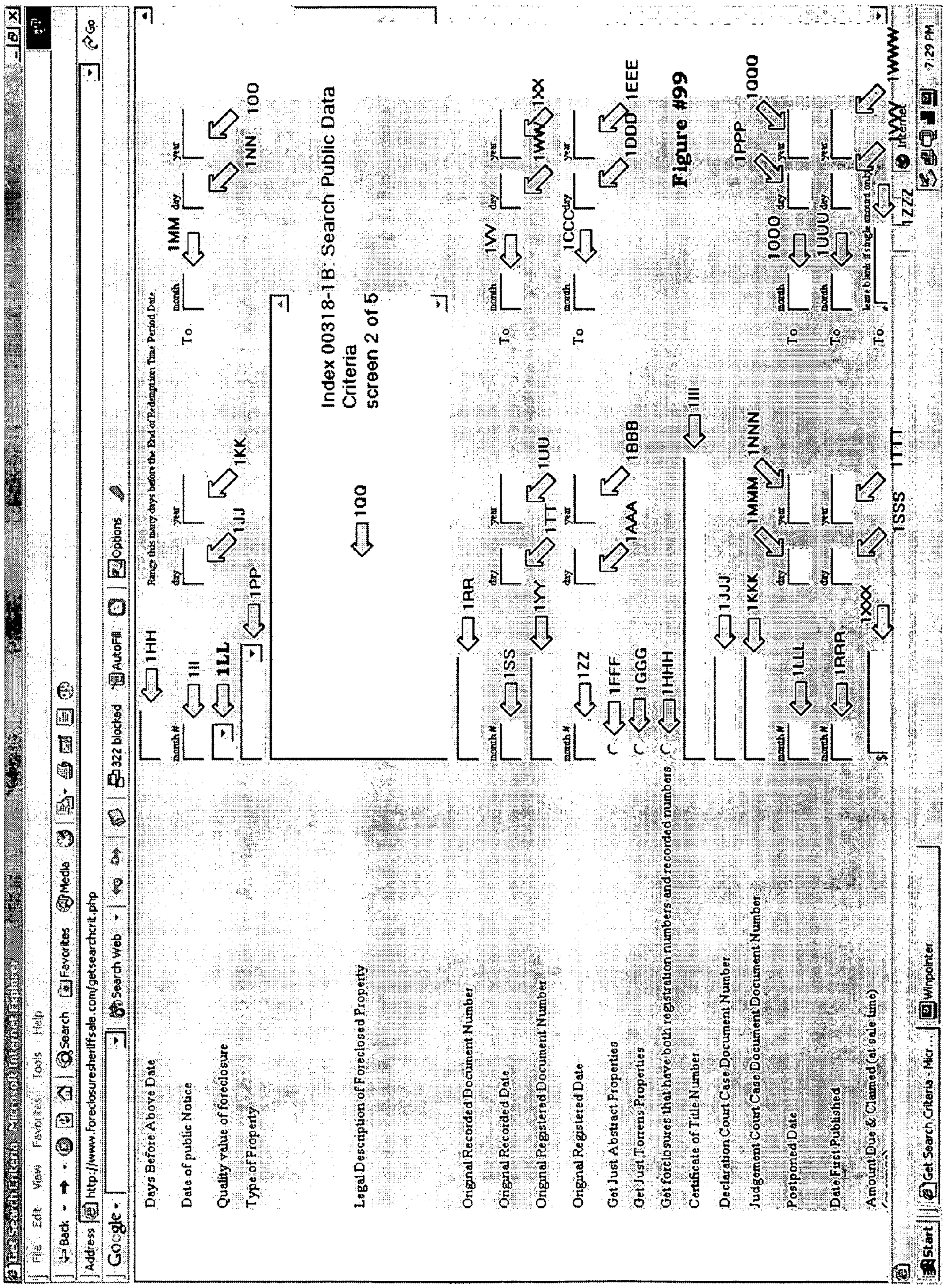
Get Search Criteria - Microsoft Internet Explorer
http://www.foreclosuresheriffsale.com/getsearchcrit.php
Index 00318-1B Search Public Data Criteria screen 2 of 5
Days Before Above Date
Date of public Notice
Quality value of foreclosure
Type of Property
Legal Description of Foreclosed Property
Original Recorded Document Number
Original Recorded Date
Original Registered Document Number
Original Registered Date
Get Just Abstract Properties
Get Just Torrens Properties
Get foreclosures that have both registration numbers and recorded numbers
Certificate of Title Number
Declaration Court Case Document Number
Judgement Court Case Document Document Number
Postponed Date
Date First Published
Amount Due & Claimed (at sale time)
Range this many days before the End of Redemption Time Period Date.
leave blank if single amount only
Figure #99

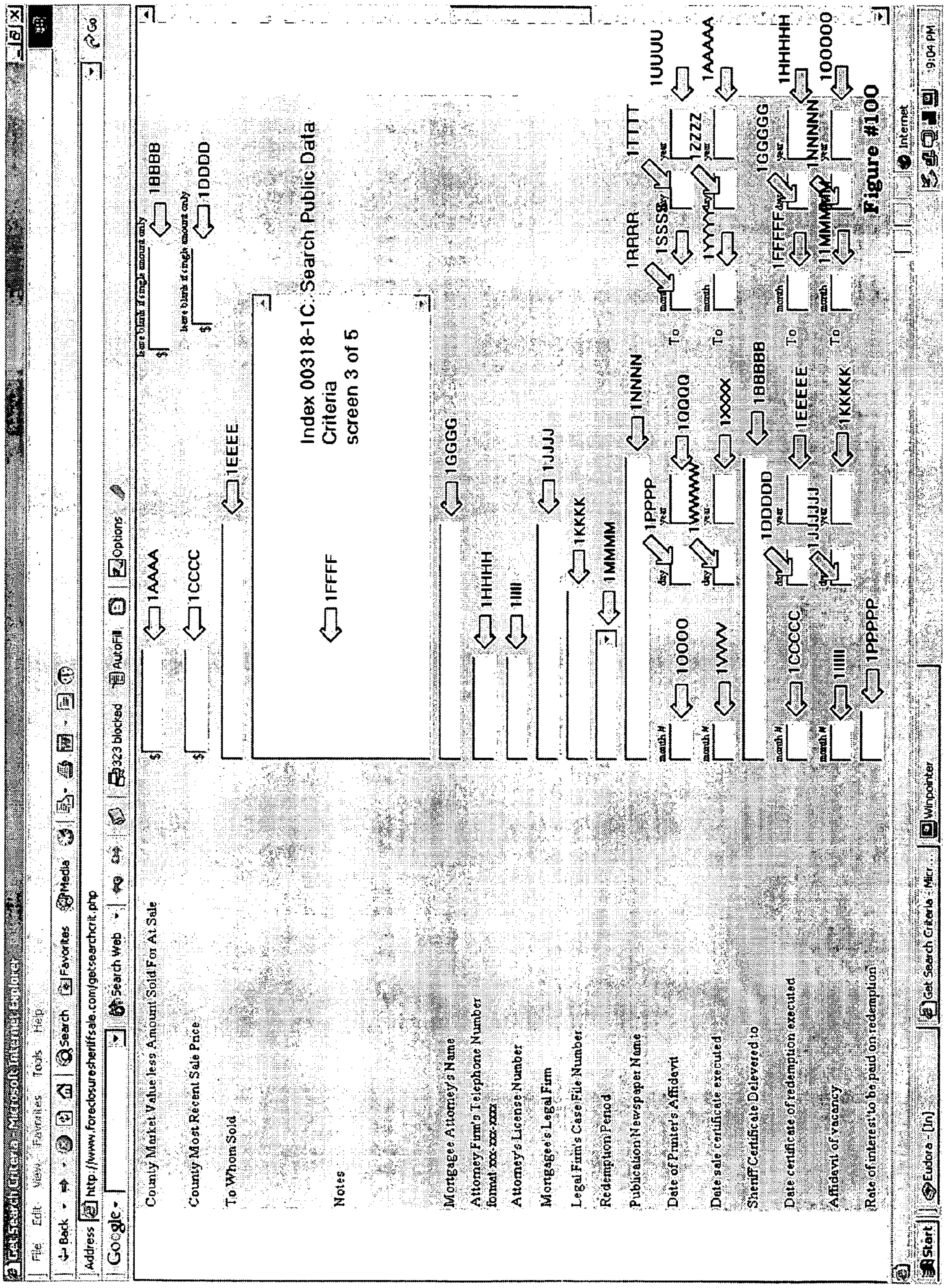
Figure #100

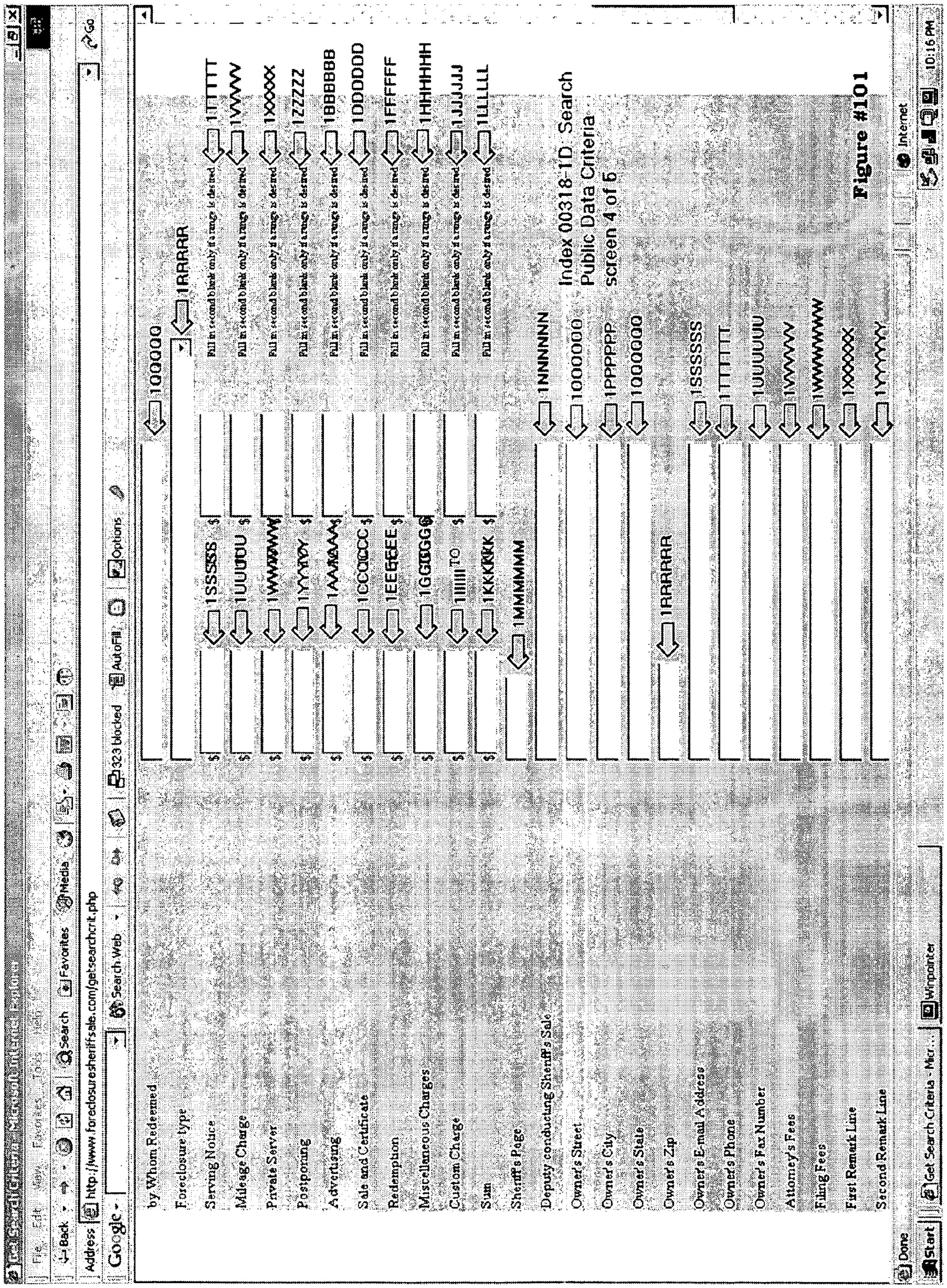
Figure #101

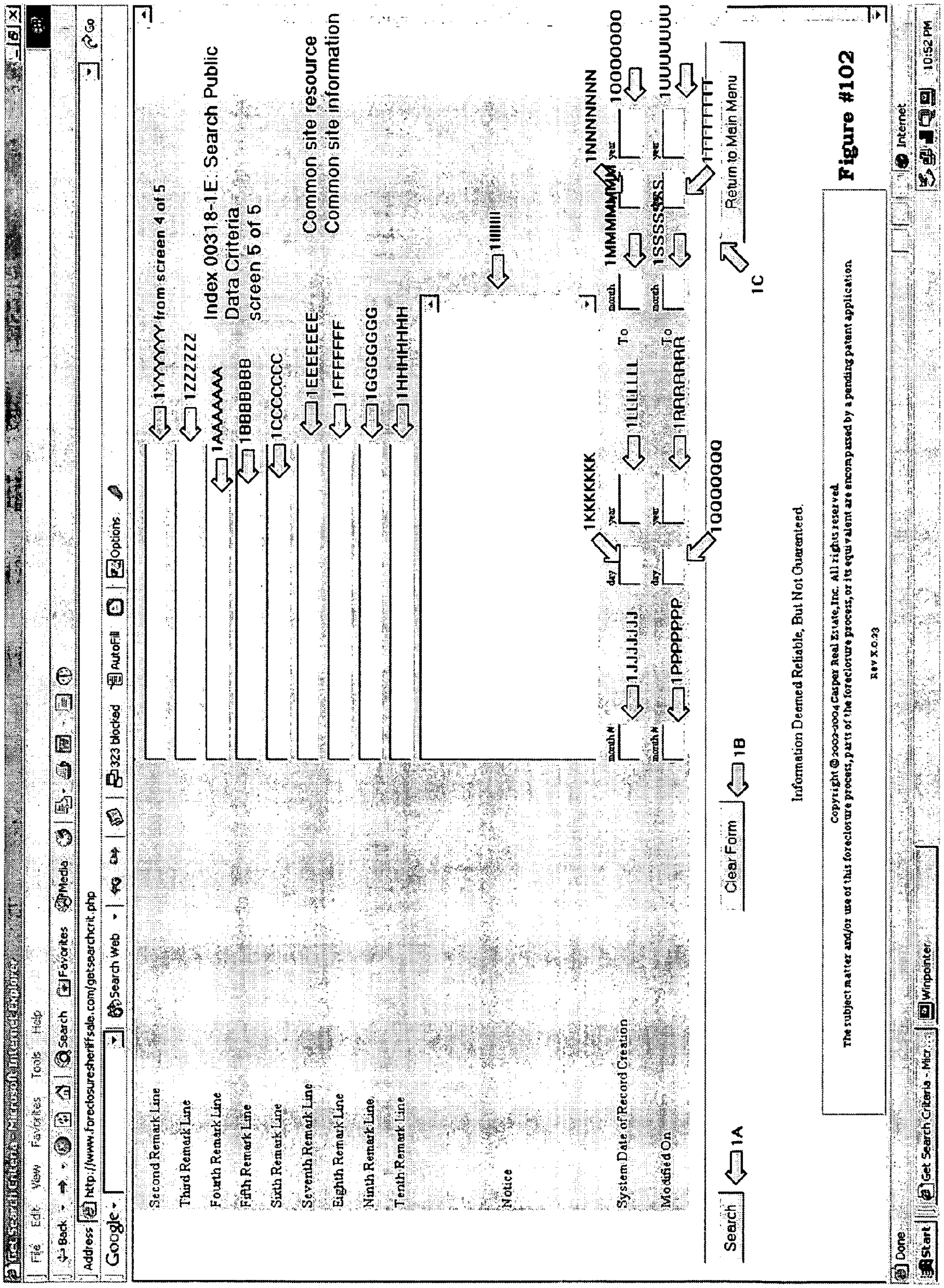
Get Search Criteria - Microsoft Internet Explorer
http://www.foreclosuresheriffsale.com/getsearchcrit.php
Second Remark Line
Third Remark Line
Fourth Remark Line
Fifth Remark Line
Sixth Remark Line
Seventh Remark Line
Eighth Remark Line
Ninth Remark Line
Tenth Remark Line
Notice
System Date of Record Creation
Modified On
1YYYYYY from screen 4 of 5
1ZZZZZZ
1AAAAAAA
1BBBBBBB
1CCCCCCC
1EEEEEEE
1FFFFFFF
1GGGGGGG
1HHHHHHH
1IIIIIII
1JJJJJJJ
1KKKKKK
1LLLLLLL
1MMMMMMM
1NNNNNNN
1OOOOOOO
1PPPPPPP
1QQQQQQ
1RRRRRRR
1SSSSSSS
1TTTTTTT
1UUUUUUU
Index 00318-1E: Search Public Data Criteria screen 5 of 5
Common site resource
Common site information
Search
Clear Form
Return to Main Menu
1A
1B
1C
Information Deemed Reliable, But Not Guaranteed.
Figure #102

INTEGRATED ON-LINE SYSTEM FOR IDENTIFYING AND VALUING FORECLOSURE PROPERTIES

RELATED APPLICATION DATA

This application claims priority from U.S. Provisional Patent Application Ser. No. 60/543,795, filed Feb. 11, 2004.

BACKGROUND OF THE INVENTION

1. Field of the Invention

The present invention relates to the field of real property, particularly ownership of real property and legal process such as foreclosure applied against interests in real property and on-line services for assisting in economic participation in foreclosures.

2. Background of the Art

Four percent of all homes sold in the United States will eventually go to foreclosure. There are several types of conditions that lead to foreclosures and several types of foreclosures. Divorce, loss of employment or loss of life, are the most common reasons for a foreclosure to occur. A foreclosure is what happens when the lender of the money to buy the home is not paid back in a timely way. When one of the three situations listed above transpires and the homeowner is not adequately prepared, a foreclosure is most likely to be the end result. Soon after one of the big three occur the homeowner is several months behind and the mortgage holder will not negotiate with the homeowner as special exemptions cannot be made for every home owner going through difficult times. It seems evil and possibly oppressive but very often a foreclosure can be the best thing for the homeowner. Removing the pressure and allowing the homeowner to potentially live in the house for several months free of charges.

After the homeowner has vacated the home, it is given to the government agency that insured (FHA) or guaranteed (VA) the mortgage. This agency will begin the process of cleaning and appraising the property. The fact that these houses are so plentiful does not allow the federal government to determine the debt of each house independently. The homes are sold for the appraised value at the time of sale. When a property is under appraised it is given a list price below the market value. These under appraised homes are not a rarity.

In truth the vast number of these properties can produce a numbers of under valued properties. Appraisers are asked to perform ten to twenty appraisals in a single week, far more appraisals than can be performed with the degree of accuracy normally associated with a normal appraisal. These appraisers bid on the job of appraising thousands of properties at once and rely on volume in order to make a profit. With volume come mistakes. These mistakes can and do go both ways. There are no available systems that assist in both listing properties prior to actual foreclosure and valuing the individual properties to assist purchasers and governmental organizations in the successful economic treatment of these properties.

Public notices such as notices of foreclosure, notices of public sale, notices relating to class action law suits, legal notices and the like are frequently required by law to be published or otherwise made available to the public. Such notices are frequently published in a newspaper, magazine, gazette, journal or the like which may be made available to the public. Various newspapers, for example, have carried legal and other public notices for many years. All such notices must comply with the local legal standards, and when a federal agency is involved in the property or the loan, with the federal standard of notice.

By themselves, newspapers, journals, magazines and the like typically exhibit a number of marked disadvantages, however. First, newspapers are typically made of paper and therefore require physical resources (trees, dyes, and the like) that may be scarce, expensive and/or environmentally unsound. Moreover, paper journals are characterized by numerous disadvantages relating to distribution and information retrieval. For a member of the public to gain access to a particular notice, for example, he or she must purchase the journal (which may or may not be readily available in that person's area) and then manually scan the pubic notices section for public notices of interest. Because many journals routinely publish dozens, hundreds or even thousands of public notices over relatively short periods of time, it can be extremely difficult for relevant members of the public to locate and read those notices that may affect them.

U.S. Published patent application 2004/0010443 describes a quarterly index projects geographic market risk for 200 MSA's (metropolitan statistical areas) over the next four to eight quarters. The index ratings use a grading scale that ranges from 1 to 10. A score of 1 indicates that an MSA is very unlikely to experience further decline in the model variables, which include home prices, local economy, population stability, and mortgage delinquency trends. A grade of 10 indicates the greatest chance for future decline. For example, a score of a 10 would indicate that it would be a good time to pull out of a market; whereas, a score of a 1 indicates a market that is a good investment.

There are also hundreds of websites that can lead individuals to lists of foreclosed properties, and provide manuals for purchasing such properties, but these address properties much further down the foreclosure stream than is necessary for good business direction.

SUMMARY OF THE INVENTION

The present system relates to an online business process system for the niche real estate market involving foreclosures and the associated real estate transaction options available to various interested parties as a consequence of the foreclosure. The process will be generally referred to as the CRE process. The CRE online process begins at the start of the foreclosure process and terminates at different junctures or decision points in the foreclosure process depending upon the actions of the Mortgagor, Mortgagee, Junior Lien holders, or interested third parties. The process includes the ability to input all information required by governmental jurisdictions, as may be required by local (city or county ordinances, and state and federal statutes within the various states. All statutory information that the Mortgagee's attorney is required to submit, together with links to additional informational and filing sites and/or the processes required by local or federal governmental units necessary to complete the foreclosure process can be included in the process. The CRE process also includes options for the participants in the foreclosure process or interested third parties to pursue at various junctures or decision points for a specific individual real property that is in foreclosure. But in general the business process provides a means to connect all the foreclosure processes in a central location and through such centralization provide the participants and interested third parties access to the sum total of the various processes that make up the foreclosure process while providing viable options within the foreclosure process for the participants and interested third parties.

BRIEF DESCRIPTION OF THE FIGURES

FIGS. 1-102 show various screen shots viewed with on-line access to a central networked connection to a CRE process according to the invention. The screen shots in the Figures are not necessarily in the order in which the screen shots must appear during performance of the CRE process.

DETAILED DESCRIPTION OF THE INVENTION

Figure 103:
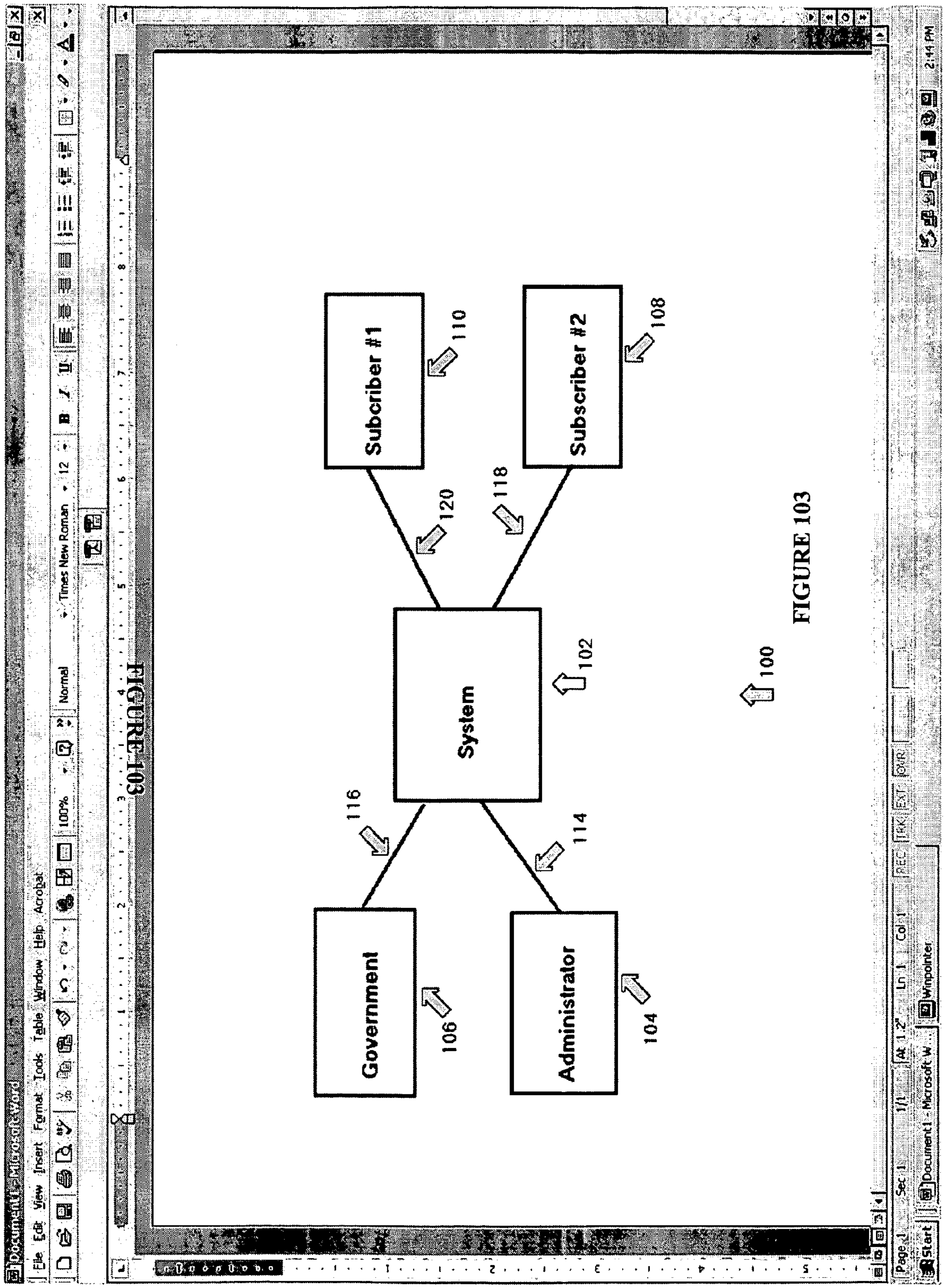
FIG. 103 shows a schematic of an arrangement of communicating elements that can be used to implement the process and system described herein.

The present process and system relates to a system for coordinating data and providing information to an external subscriber to the system, the data and information relating to at least one foreclosure real estate transaction. The system comprises: (a) a centralized transaction coordination system for accessing a transaction database; (b) at least one interface device for accessing said transaction coordination system, each interface device associated with a party to said real estate transaction; (c) information relevant to said real estate transaction being provided directly to said transaction coordination system by at least one information originating party originating said information; (d) said information being stored in said transaction database; and (e) said information being accessible by at least one party having registered access to said real estate transaction database using said at least one interface device to access said transaction coordination system, the system comprising software enabling the creation and transmission of jurisdictionally required notice of a foreclosure based upon information input to the data base by authorized sources. The system is more than a mere compilation of data, and can actually perform noticing functions and valuations of potential transactions.

For example, the software system collects data and information relating to real estate and mortgage transactions input by authorized users. When sufficient information and data is received that indicates that an official notice of foreclosure or other legal process is needed, and the data and information provide all necessary information for a legally required notice within a specific jurisdiction, the software can in certain embodiments of the invention complete a stored notice form and automatically send the completed form by electronic transmission to an appropriate (legally sufficient) publishing source. There may be an established account with the publishing source (e.g., the newspaper, sheriff's redbook account, department of housing or department of finance, etc.) so that publication can be effected as both a publishing and economic transaction between the system and the publishing authority. The system may comprise a centralized coordination system of a distributed computing network.

Similarly, when the system is accessed by an authorized party, form documents may be prepared at the request of the authorized party by the system. Many documents required for participation in a foreclosure can be prepared by translating authorized party information to appropriate blank areas in the forms. These completed forms can be provided to the authorized party for execution, if execution is needed or directly transmitted if authorized.

The system may also provide the function of evaluating specific foreclosure possibilities according to predetermined criteria. For example, as a minimal test, the system can evaluate what is the market value (from realtor input or city records or quality estimates based on information and passage of time) and reduce that amount by the proposed sheriff's sale price or actual sheriff's sale price to determine an absolute "potential profit" margin (PPM). This PPM can be provided as a ratio to either sheriff's price to provide an economic indicator of potential profit. This value can be adjusted by parameters in the software indicating that the market valuation is old or out of date (effectively raising the ratio), recent changes in local real estate values, recent assessments pending in the local, recent weather or natural event damage in the region, known damage to the property, etc. Using this information in a rational and simple manner, an evaluation of the potential profit and potential margin of profit for purchase of the property can be provided by the software system.

The at least one interface device may be selected from a group consisting of: (a) a computer; (b) a laptop computer; (c) a PDA; and (d) any networkable interface device. The system may be accessed by such information originating parties other than just the system operators and technical staff and my, by way of non-limiting examples, be selected from a group consisting of: (a) a real estate attorney; (b) a real estate agent; (c) a court or governmental administrative body; (d) a sheriff; (e) a lender; (f) a real estate broker; (g) an escrow company; (h) a title company; (i) a lending institution; (j) an escrow agent; (k) a warranty provider; (l) an appraiser; (m) an inspector; (n) an insurance company; (o) an appraisers; (p) a government entity; (q) any authorized system service provider; and (r) an agent and or staff member of (a)-(q).

In the practice of the present invention, several conventional definitions are to be understood.

Deed of Trust: an instrument used in many states in lieu of a MORTGAGE. Legal title to the property is vested in one or more TRUSTEES to secure the repayment of the loan.

Foreclosure: a termination of the EQUITY OF REDEMPTION of a MORTGAGOR or the GRANTEE in the property covered by the MORTGAGE. STATUTORY FORECLOSURE is effected without recourse to courts, but must conform to laws (statutes).

Judgment: a decree of a court stating that one individual is indebted to another and fixing the amount of indebtedness.

Judgment Creditor: one who has received a court decree or judgment for money due from the judgment debtor.

Judgment Lien: the claim upon the property of a debtor resulting from a judgment Lien: a charge against property making it SECURITY for the payment of a DEBT, JUDGMENT, MORTGAGE, or taxes; it is a type of ENCUMBRANCE. A SPECIFIC LIEN is against certain property only. A GENERAL LIEN is against all of the property owned by the debtor.

Lienholder: one who holds, or benefits form, a lien.

Lien-Theory States: states whose laws give a LIEN on property to secure debt. Contrasted with TITLE THEORY STATES in which the lender becomes the TITLE owner. In either case the borrower has the right to use and enjoy the property in the absence of DEFAULT; in the event of default, lenders may FORECLOSE.

Trust: an arrangement whereby property is transferred to a trust THIRD PARTY (trustee) by a GRANTOR (trustor). The TRUSTEE holds the property for the benefit of another (BENEFICIARY).

Trust Deed: a CONVEYANCE of real estate to a THIRD PARTY to be held for the benefit of another. Commonly used in some states in place of MORTGAGES that conditionally convey TITLE to the lender.

Trustee: one who holds property in TRUST for another to secure performance of an obligation; the neutral party in a TRUST DEED transaction.

Trustee's Sale: a FORECLOSURE SALE conducted by a trustee under the stipulations of a Deed of Trust.

The CRE business process is transacted as electronic commerce over the Internet. The business process is programmed as a client/server application hosted upon the servers owned by CRE or those suitable for the purpose by third party entities providing such hosting. Each participant must be authenticated by the system prior to utilizing the business process, and is thereafter granted rights associated with the participant's user subscription level. Users garner access to the online business process through subscription and the payment of fees to CRE, which are valued and charged solely at CRE's option.

The terms "computer", "computer system", or "server" as used herein should be broadly construed to include any device capable of receiving, transmitting and/or using information including, without limitation, a processor, microprocessor or similar device, a personal computer, such as a laptop, palm PC, desktop, workstation, or word processor, a network server, a mainframe, an electronic wired or wireless device, such as for example, a telephone, an interactive television, such as for example, a television adapted to be connected to the Internet or an electronic device adapted for use with a television, a cellular telephone, a personal digital assistant, an electronic pager, a digital watch and the like. Further, a computer, computer system, or system of the invention may operate in communication with other systems over a communication network, such as, for example, the Internet, an intranet, or an extranet, or may operate as a stand-alone system.

The invention may be implemented through the use of a computer network, such as the Internet, and more particularly, the World Wide Web (the "Web"). While the invention disclosed herein depicts a preferred embodiment of the invention as deployed over the Internet using a Web browser, those of ordinary skill in the art will appreciate that the invention is not limited thereto and may be deployed using other means computer-based or otherwise, such as for example, thin client applications, and may be deployed over a closed network, Virtual Private Network, and any other securable or unsecurable internetworked system.

The Web allows users to interact with each other and access content through a graphical user interface, or "GUI." The most commonly used GUI's are Web browsers, which are software applications that allow users to access and view electronic documents in a browser window. Web documents are created using Hypertext Markup Language ("HTML"), which allows authors to add special format tags to plain text documents to control the appearance of the text in the Web browser. HTML tags also allow for the insertion of additional components into the Web document, such as image files, audio files, and applets. Applets are small pieces of programming code that are run on the user's computer when downloaded. Applets allow for such effects as scrolling text and animation, and for use in the secure transfer of information across the Internet. To enhance security, an information server may use Secure Socket Layer ("SSL") technology, which is widely known by those skilled in the art and is integrated into most commercially acceptable Web browsers. One of ordinary skill in the art will appreciate that other, similar technology is also capable of being used in the invention, such as, for example, Visual Basic, Java/Java script, Active Server Pages ("ASP"), extensible Markup Language ("XML"), and Simple Object Access Protocol ("SOAP").

The business process is a computer-based system used to communicate between a central location and distant locations to allow transmission and submission of foreclosure information pertaining to real property and lists the specific rights and interests in the real property. A foreclosure initiator, a private or public entity, mortgagee, tax lien holder, judgment lien holder or other junior lien holder establishes access to the CRE online website where detailed information is input on specific foreclosed real property. The foreclosure's statutory requirements and associated information are submitted in a defined format that is set out on the CRE site enabling the further transmission and/or display of the information to third parties during the foreclosure process. The system organizes individual foreclosures according to the specific rights and interests in the real property. Additional information pertaining to the foreclosure may be input by the foreclosing party or may be imported by access to third party sources or inputted manually from third party sources. The system can categorize and organize foreclosed real property information for the parties' with statutory rights, interests and obligations as well as interested third parties. The system can transmit categorized and organized real property foreclosure information to third parties, as such notice is required by statutory regulation for placement with individual newspapers, the IRS, the State Departments of Revenue, or other entities either by manual user choice or user setup to automatically send such information. The system allows additional options to the foreclosure initiator, other parties with rights, interests or obligations in the real property, and/or interested third parties in a foreclosure process to access the system or through the system, access third party subscribers that provide common real estate services such as property listing services for multiple real property types to assist in the sale or marketing of the property. These services will allow the user to transfer pertinent user inputted information to specific third party online and linked site subscribers with the expectation of the user benefiting from such services which related sites or links may from time to time be established for the purpose of providing such services to the sites users.

Each interacting party must enter appropriate login information (e.g. user name, password) or otherwise activate a secure connection. Once the party's identification has been established, he may be connected to an appropriate screen from which he may access portions of the transaction coordination system to which he has clearance. If the party enters a user name and password, the transaction coordination system scans the transaction database to determine whether the party has clearance to enter the transaction coordination system and what level of clearance he should be given. The user is then connected to the appropriate party interface screens based on their access level. If the user is not found in the transaction database, an error occurs and the user is not allowed to access the transaction database. In one preferred embodiment, a user who is denied access is given the option of establishing an account, given information on how to contact the appropriate person so that an account may be established, or is given access to a very limited subsystem established for "guests."

The process and apparatus of the present invention may be alternatively described as follows. There is a first centralized electronic data collection and distribution system for receiving foreclosure data. For4eclosure data is any data that bears a direct relationship to foreclosure of a specific property within a specific jurisdiction, such as any information required for legal forms involved in the foreclosure, economic forms, notices, economic data (e.g., valuations of the property or related or nearby properties), legal status data, and the like. The system not only may collect a portion of data for purposes such as the sale of specific properties, but our system also collects and can distribute data (even automatically) for all the properties that enter the foreclosure process (within one or more jurisdictions), even those that do not go to sale or which do not have enough equity to be of interest for third party acquisition.). This data and information may be collected through online standardized forms for the collection of said data and may be distributed in form format electronically. The business process can create customized online forms for the collection of the data. The organization of the data is designed according to the needs of the parties involved through statutory requirement or through third party interest. The categorization of the data can also be according to the interest of the parties involved through statutory requirement or through third party interest. Display or general public access to the data may be provided through governmental units that may be participants within the system of the data in the system. The system may feed a governmental website or publication system automatically for display or publication. The recorder's office and the sheriff's office, housing administration, and the like may be singly or multiply provided with the displayable information and may be automatically displayed.

The system on which the process of collection and display may be effected can be any system that supports such processes, such as a centralized coordination system that is a distributed computing network. Interface devices for communication and display from the system may be, by way of non-limiting examples, be selected from a group consisting of: (a) a computer; (b) a laptop computer; (c) a midsized computer; (d) a large computer (e) a another network (f) a PDA; (g) telephone (h) a cell phone; and (i) any networkable device. An information originating party may be selected from a group consisting of: (a) mortgagee; (b) trustee; (c) mortgagee's attorney; (d) trustee's attorney; (a court or governmental administrative body; (e) sheriff; (f) a lender; (g) state governmental body; (h) federal governmental body; (i) a real estate broker; (j) a real estate agent; (k) an escrow company; (l) a title company; (m) a warranty provider; (n) a lending institution; (o) a insurance company; (p) a appraiser; (q) a inspector; (r) an appraisers; (s) a governmental entity; (t) any authorized system service provider; and (u) an agent and or staff member of a-t.

The information received from authorized outside providers can be converted by an algorithm to provide a measure of economic merit in analyzing the foreclosure. This is described in greater detail herein. The specifics of the algorithm are not important as long as the result of the mathematical treatment provides a meaningful or comprehensible value or standard, even if it is a scholastic (e.g., A, B, C, D and F) standard or rating standard (e.g., AA+, A+, AA, A, B+, B, C+, etc.) rather than a specific value having more specific economic intent (e.g., potential return on investment, etc.). The system may provide the economic merit in literal monetary terms of possible return on a foreclosure sale price, or foreclosure purchase price. The system may archive the data so that it remains searchable for perpetuity through assorted media such as: (1) hard drive; (2) Storage Area Network (SAN); (3) Network Storage Area (NSA); (4) tape; (5) Cd-Rom; (6) DVD; (6) any networkable storage device; and (7) any detachable storage device. The property related to the data maybe "For Sale" online, with electronic bids and/or purchases enabled through the system. A queue listing of potential purchasers may be created when users declare their interest in acquiring such property as the data may describe and the purchaser may enter into a bid on-line.

Foreclosures are: an act or instance of foreclosing; specifically: a legal proceeding that bars or extinguishes a mortgagor's right, title, and/or interest in mortgaged real estate. Foreclosures are initiated when there is a default in the terms of the mortgage given by a mortgagor to a mortgagee. The basic foreclosure terms are generally defined as follows: (1) Mortgagor: A Mortgagor is one who grants a conveyance of or lien against real property that is satisfied upon payment or performance according to stipulated terms in the mortgage. Mortgagors are people or entities that mortgage the real property and are most often referred to as home owner(s), but can be anyone holding a fee title interest in real property; (2) Mortgagee: Mortgagee(s) are people or entities that accept mortgages or similar documents, and are most often called lenders, but can be referred to as trust holders, deed holders, land contract holders, and contract for deed holders. (3) Mortgage: A Mortgage is a document or instrument containing the terms and conditions agreed to between the Mortgagor and Mortgagee and creates a lien in real property; and can be in the form of deeds of trust, trust deed, contracts for deed, or land contract. As a foreclosure is a legal proceeding governed by the statutes of the state within which the real property is located, the foreclosure of real property must be strictly completed according to the specific state's statutes. Although the foreclosure process is generally similar from state to state, CRE business process will be built out seamlessly on a state-by-state basis to account for the differences in each individual state's statutes. CRE will begin the process with the state of Minnesota. Although Minnesota is used extensively throughout the text, CRE online business process can be applied to all states.

Simply put, Mortgagor's grant Mortgages to Mortgagees as collateral when obtaining monetary funds to refinance or acquire real property. The Mortgage is satisfied and the lien or encumbrance created by the Mortgage is extinguished in the real property upon the successful completion of the Mortgage's terms and conditions including full repayment of the debt evidenced by the Mortgage.

Different conditions can effect a default in the Mortgage. A typical real estate Mortgage includes terms requiring the Mortgagor to do more than make the necessary periodic payments. For example, the Mortgagor is usually required to maintain insurance on the premises, pay all real estate taxes, and maintain the premises for the benefit of both the Mortgagor and the Mortgagee. In addition, Mortgages may include a provision prohibiting the sale of all or any portion of the real property without the prior written consent of the Mortgagee. Such provisions are known as due on sale clauses. If the Mortgagor fails to abide by any of the terms in the Mortgage, they are deemed in default. After a default has occurred, in the State of Minnesota the Mortgagee has several options, set forth by state statute or common law, to compel the Mortgagor to cure a default. The Mortgagee can negotiate an arrangement with the Mortgagor by which the Mortgagor conveys the premises to the Mortgagee in satisfaction of the underlying debt. Such a procedure is known as the Mortgagor giving the Mortgagee a deed in lieu of foreclosure. When a Mortgagor undertakes such action, he or she is voluntarily surrendering redemption or reinstatement rights. Because such an action results in the transfer of ownership and the right to possession, Minnesota courts have long held that such transactions are subject to close scrutiny to protect the Mortgagor from oppression by the Mortgagee. For such an agreement to be upheld in court, it must not result from any oppressive means or overreaching on the part of the Mortgagee, and adequate consideration must be given.

The next option available to the Mortgagee is to initiate a foreclosure action. Under Minnesota law, there are two methods of foreclosing a real estate Mortgage. They are foreclosure by advertisement, which is the most common, and foreclosure by action, which is more rarely used and requires the Mortgagee to bring an action in court to determine its right to foreclose prior to any foreclosure sale. Foreclosure by action is more costly and time consuming for the Mortgagee and is therefore, not used as often. When a Mortgage encumbers agricultural real estate, Minnesota's farmer-lender mediation statute generally requires the lender to offer mediation of the debt to the Mortgagor prior to beginning foreclosure proceedings. The farmer-lender mediation statute began requiring mediation in 1986. Generally, the statute requires, among other things, that a Mortgagee seeking to enforce a Mortgage on agricultural real estate, either by advertisement or action, first send notice to the Mortgagor and offer the Mortgagor the opportunity to mediate a resolution to the debt prior to beginning such action. If the Mortgagor elects to mediate the debt, the Mortgagee's enforcement of the Mortgage can be suspended for a period of up to 90 days pending completion of the mediation. If the Mortgagor has scheduled the debt involved in a bankruptcy or involved in a previous farmer-lender mediation, the debt is not subject to the farmer-lender mediation statute and the Mortgagee can enforce its Mortgage without first offering mediation.

The requirements of a foreclosure by advertisement may be generally described as: To initiate foreclosure by advertisement, the Mortgagee must prepare a notice of mortgage foreclosure sale. Such a notice must specify the name of the Mortgagor and the Mortgagee, the original principal amount secured by the Mortgage, the date of the Mortgage, when and where it was recorded, the amount claimed to be due under the Mortgage including taxes paid by the Mortgagee, a description of the mortgaged premises, the time and place of sale, and the time allowed by law for redemption by the Mortgagor. Once the Mortgagee has prepared the notice, it must be published in a qualified newspaper in the county where the mortgaged real property is located for a period of six weeks prior to the sale. The notice must be personally served upon the person in possession of the mortgaged premises at least four weeks before the sale. It must be served in a manner similar to that required for service of a summons initiating a civil action. If the real property is homestead property, a homestead designation notice must be served. If the real property is agricultural, an agricultural designation notice must be served. These notices disclose the rights of the mortgagor to designate for separate sale and redemption the homestead area of the total real property, and to similarly designate one or more separate tracts of agricultural real property within the total real property.

After the foreclosure notice has been prepared and publication has begun, the debtor may reinstate the Mortgage. This right to reinstate is guaranteed by Minnesota law even though the creditor may have accelerated the balance due under the Mortgage prior to the initiation of foreclosure proceedings. To reinstate the Mortgage, the debtor must pay to the Mortgagee the amount constituting the default at the time the mortgage foreclosure proceedings were initiated and all costs of foreclosure to the date of reinstatement, including half of any attorney's fees allowed by law or $150, whichever is greater. If the Mortgagor reinstates the Mortgage, the foreclosure proceeding is annulled and the Mortgage is reinstated. To reinstate the mortgage, however, the required payment must be made prior to the date of the sheriffs sale, which is provided for in the foreclosure proceeding notices and any junior lien rights in the property are revived.

Following publication and service of the required notice of mortgage foreclosure sale, the sheriff of the county in which the mortgaged premises are located conducts the foreclosure sale. The sheriffs sale is conducted as an auction. The Mortgagee is the seller; the sheriff acts as the auctioneer. If a party other than the Mortgagee bids at the foreclosure sale, he must pay cash. The sale is made to the highest bidder. In most cases, the highest bidder at the foreclosure sale will be the Mortgagee, and in many cases, the Mortgagee will bid the amount due the Mortgagee. Following the sale, the Mortgagee's costs of sale are reimbursed and the debt owed to Mortgagee is paid to the extent covered by the sale price. Any bid in excess of the amount owed the Mortgagee is a surplus and may be paid to junior lien holders. If no such holders exist, the surplus must be returned to the Mortgagor. Any shortage is a deficiency. When, as in most cases involving agricultural real property, the redemption period is twelve months, the Mortgagee can obtain a deficiency judgment in the amount of the difference between the fair market value of the real property and the amount remaining unpaid on the mortgage by initiating a lawsuit within 90 days following the foreclosure sale. Otherwise if the redemption period is six months no deficiency judgment can be obtained.

Upon completion of the sale, the sheriff prepares a certificate of sale, which operates as a conditional conveyance of the mortgaged premises subject to the Mortgagor's rights of redemption. This certificate must be recorded within 20 days of the sale.

Normally the Mortgagor must redeem within six months of the date of the sale unless one or more of the following applies, in which case the redemption period is twelve months:

1. The mortgage was executed prior to Jul. 1, 1967.
2. The amount claimed due and owing as of the date of the notice of foreclosure sale is less than 66-⅔ percent of the original principal amount secured by the mortgage.
3. The mortgage was executed prior to Jul. 1, 1987, and the mortgaged real property, as of the date of the execution of the mortgage, exceeded ten acres in size.
4. The mortgage was executed prior to Aug. 1, 1994, and the mortgaged real property, as of the date of the execution of the mortgage, exceeded ten acres but did not exceed 40 acres in size and was in agricultural use as defined by Minnesota statute.
5. The mortgaged real property, as of the date of the execution of the mortgage, exceeded 40 acres in size.
6. The mortgage was executed on or after Aug. 1, 1994, and the mortgaged real property, as of the date of the execution of the mortgage, exceeded ten acres but did not exceed 40 acres in size and was in agricultural use, as defined by Minnesota statute.

To redeem from the sale, the Mortgagor must pay to the Mortgagee the sum of money for which the mortgaged premises were sold, with interest from the sale date at the rate provided in the Mortgage, plus additional amounts advanced by the Mortgagee for expenses, including insurance, taxes, and assessments.

During the redemption period, the Mortgagor is entitled to remain in possession of the real property. He is therefore entitled to the rents, income, and profits from the real property unless he has made an assignment of an interest in them. No assignment of rents and profits contained in a Mortgage is enforceable under Minnesota law unless it was executed after Aug. 1, 1977; it secured an original loan in excess of $100,000; and it is not a lien on real property entirely homesteaded.

In the case of farming operations, it is common for a single real estate Mortgage to cover several separate tracts of land. If the mortgaged premises consist of separate and distinct farms or tracts, the sheriff must, upon demand of the Mortgagor, sell such tracts separately. If the mortgaged premises include the homestead, upon demand by the Mortgagor, the sheriff must first sell the non-homestead premises.

When the foreclosed real estate is agricultural and the Mortgagee is a government agency, limited partnership, or corporation, Minnesota law provides the Mortgagor with certain rights of first refusal upon the resale of the real property by the Mortgagee. The Mortgagee cannot offer the real property for sale or lease until it has provided written notice to the Mortgagor at least 14 days in advance. When a third party buyer or lessee is found, the Mortgagee must then offer to sell or lease the real property to the Mortgagor upon the same terms as the offer made by such third party. The Mortgagor has a defined period of time within which to exercise his or her right of first refusal to either buy or lease the real property on such terms. For leases, it is within 15 days of the Mortgagee's written offer to the Mortgagor. For sales, it is within 65 days of the Mortgagee's written offer to the Mortgagor. If the Mortgagor exercises right of first refusal, he or she must fully perform the terms of the sale or lease within ten days of such exercise.

The Mortgagor can elect to purchase or lease a portion of the total real property involved, but only when the portion is of a size, configuration, and location that does not unreasonably reduce access to or the value of the remaining real property. The Mortgagor is not allowed to resell the real property if the sale was arranged prior to his or her exercise of the right of first refusal. When the Mortgagor resells the real property within 270 days of exercising the right of first refusal, there is a presumption, subject to proof to the contrary, that the sale was arranged ahead of the exercise of the right of first refusal. When violating this prohibition, the Mortgagor is liable for damages and attorneys' fees. In addition to Minnesota law's provision for rights of first refusal, applicable federal law creates similar rights of first refusal in certain circumstances. The Mortgagee must be part of the Farm Credit Services system. 1996 changes to this federal law have significantly limited the applicability of the federal law rights of first refusal.

A second course of foreclosure action for the Mortgagee is to bring a lawsuit on the underlying debt based on the promises of the Mortgagor contained in the underlying promissory note. A Mortgage generally will be legally enforced upon a Mortgagor to secure the performance of the promises of payment contained in a promissory note. If the value of the real property is less than the amount due under the Mortgage, the Mortgagee may elect to bring an action seeking the payment of the amount due under the promissory note and request the court to enforce the validity of a Mortgage against the real property. Such a course of action, however, may not be attractive to a Mortgagee unless the Mortgagor has other nonexempt assets that can be reached to satisfy the underlying debt.

What are the requirements of foreclosure by action? Foreclosure by action may be required in certain instances. No foreclosure by advertisement may be maintained unless the Mortgage itself authorizes, by means of a power of sale clause, such a foreclosure proceeding. If a power of sale clause is not part of the Mortgage, foreclosure by action is required. Foreclosure by action also may be elected by the Mortgagee for technical reasons such as erroneous descriptions, mistaken release of the Mortgage, or if an issue of priority with another lien holder must be resolved. To initiate a foreclosure by action, a summons and complaint must be served according to the Minnesota Rules of Civil Procedure (or the Uniform Code of Civil Procedure). The complaint will name as defendants, all present owners or parties with an interest in the real property, other lien holders, and those with a right to possession of all or a portion of the premises. If no party defends the action, the Mortgagee may obtain a determination from the court that it has a valid Mortgage. If, however, any of the defendants objects, a trial may be necessary to establish the right of the Mortgagee to foreclose.

Once the court has made its decision, the sheriff will publish a notice of sale for a six-week period. In addition, if the Mortgagor is a resident of the county in which the mortgaged premises are located, a copy of the judgment of the court and the sheriff's notice of sale must be served upon the Mortgagor. Finally, after serving the notice of sale on the Mortgagor, the sheriff must post the notice of sale for six weeks. At the sale, the sheriff may sell the real property to cash bidders only, except for the Mortgagee, which can bid its total debt. Following the sale, the sheriff reports the sale to the court, which will then confirm the sale. Once the court has confirmed the sale, the statutory period of redemption for the debtor begins. The time periods for redemption are the same as for foreclosure by advertisement. If the amount realized at the sale is less than the amount due on the underlying debt, the creditor may be able to obtain a deficiency judgment against the mortgagor. Finally, a deficiency judgment can be sought against any guarantors of the promissory note.

Under either method of foreclosure, junior lien holders may redeem from the foreclosure sale if the Mortgagor fails to do so. Such junior lien holders may redeem if, before the expiration of the Mortgagor's redemption period, they have filed for record a notice of intention to redeem. The junior lien holders are each given a period of five days within which to redeem, based on the priority of their claims or liens, against the real property.

Following the expiration of the redemption period, the Mortgagor's ownership rights in the real property are terminated. However, with respect to certain foreclosures of agricultural real property, the Mortgagor retains certain rights of first refusal upon resale of the real property by the Mortgagee, as discussed above with respect to foreclosure by advertisement.

The aforementioned process is typical of the foreclosure process within the state of Minnesota, and as noted previously other states will have different statutory requirements, consequently, CRE will build out the process for each state according to the statutes of each individual state.

In general, the CRE online business process begins with a user navigating to the "home page" for Casper Real Estate, Inc.'s registered domain name foreclosuresheriffsale.com, as well as the additional domain extensions known as .tv, .bs. .org, .net. Its URL (Uniform Resource Locator) using the "http" (HyperText Transfer Protocol) scheme is <URL:http://www. foreclosuresheriffsale.com>. By accessing the "home page" a user can navigate to the type of resource they are attempting to access either input or obtain information regarding specific real property that is in foreclosure. It is a standard Internet protocol method of accessing resources. Upon entering our URL into their WWW client or browser's "location" box, selecting "go", "search", or the enter key, the user is given access to our system's "home page". Access to CRE's home page does not require authentication, but access to additional web pages to input, view, or submit information does require authentication, see index 00100-1A. This is a brief breakdown of the business process system that has been developed by Casper Real Estate, Inc.

Casper Real Estate, Inc. (CRE) has developed an online business process system for the niche real estate market involving the legal process of foreclosures, trusts, and the associated real estate transaction options available to various interested parties as a consequence of the foreclosure or trust actions. CRE's online process begins at the start of the foreclosure or trust process and terminates at different junctures or decision points in the foreclosure or trust process depending upon the actions of the Mortgagor, Mortgagee, Junior Lien holders, or interested third parties. It includes the ability to input pertinent data required by state and federal statutes within the various states, data inputs require of local governmental units, statutory data that the Mortgagee or Mortgagee's attorney is required to submit/publish, and links to additional pertinent online data sites. It also includes options for the participants in the foreclosure process or interested third parties to pursue specific opportunities at various junctures or decision points within the process for a specific individual real property that are in foreclosure. But in general the business process provides a means to connect all the parties to a foreclosure or trust processes in a central location and through such centralization provide the participants and interested third parties access to the sum total of the various processes that make up the foreclosure and trust processes, while providing viable options within the foreclosure or trust process for the participants and interested third parties.

CRE's business process is transacted as electronic commerce over the Internet. It's business process is programmed as a client/server application hosted upon the servers owned by CRE or those suitable for the purpose by third party entities providing such hosting. Each participant must be authenticated by the system prior to utilizing the business process, and is thereafter granted rights associated with the participant's user or subscription level. Users garner access to the online business process through subscription and the payment of fees to CRE, which are determined and charged solely at CRE's option.

The business process is a computer-based system utilized to communicate between a central location and distant locations to allow transmission and submission of foreclosure data pertaining to real property and lists the specific rights and interests in the real property. A foreclosure or trust initiator, a private or public entity, mortgagee, tax lien holder, judgment lien holder, other junior lien holder, or third party establishes access to CRE's online website where detailed information is either inputted or accessed on specific foreclosed real property. The foreclosure or trust's statutory requirements and associated data are submitted in a defined format that is set out on the CRE site enabling the further transmission and/or display of the information to third parties during the foreclosure or trust process. The system organizes individual foreclosures or trusts according to the specific rights and interests in the real property. Additional information pertaining to the foreclosure or trusts may be inputted by the foreclosing or trust closing entities or individuals, may be imported by access to third party sources, or inputted manually from third party sources. The system can categorize and organize foreclosed or trust real property information for the parties' with statutory rights, interests and obligations as well as interested third parties. The system can transmit categorized and organized real property foreclosure information to third parties, as such notice may be required by statutory regulation for placement with individual newspapers, the IRS, the State Departments of Revenue, or other entities either by manual user choice or user setup to automatically send such information. The system allows additional options to the foreclosure or trust initiator, other parties with rights, interests or obligations in the real property, and/or interested third parties in a foreclosure or trust process to access the system or through the system access third party subscribers that provide common real estate services such as property listing services for multiple real property types to assist in determining the market valuation, sale or marketing of the property. These services may be onsite or linked sites to local real estate associations commonly known as Multiply Listing Services ("MLS"). These services will allow the user to transfer pertinent user inputted information to specific third party online and linked site subscribers with the expectation of the user benefiting from such services, related sites, or links that may from time to time be established for the purpose of providing such services to the sites users.

There are differences between a mortgage and a trust. To aid in understanding this determination may be helpful to consider the difference between a Title Theory state and a Lien Theory state. Ms. Sandy Gadow states the differences as follows: "When financing is involved in a real estate purchase, it is important to understand if you will be subject to the title or lien theory of mortgages. The way in which a state will interpret how mortgage law is followed will be determined by which type of theory is practiced in your state."

Each type of theory has special considerations on who will hold title and how foreclosure proceedings would take place if they were to become necessary. In title theory states, the borrower does not actually keep title to the property during the loan term. The seller gives the buyer/borrower a deed to the property but when the borrower signs the mortgage for the loan the borrower gives the title back to the mortgage holder. The lender then holds title to the property, as security only, until all loan payments have been made. During that time the borrower has the right to possession of the property, and the lender delivers the deed back to the borrower only after the loan obligation has been satisfied.

In a lien theory state, the buyer holds the deed to the property during the mortgage term. The buyer promises to make all payments to the lender and the mortgage becomes a lien on the property, but title remains with the buyer. The lender's lien is removed once the payment of all loan payments have been completed. Foreclosure proceedings in a lien theory state may be more difficult for the lender than in a title theory state, due to the fact that the buyer is holding title to the land and not the lender.

There is another type of mortgage custom which is referred to as the Deed of Trust theory. Under a Deed of Trust, the seller gives title to the buyer, and the buyer then signs a Deed of Trust which makes the lender the beneficiary in the Deed of Trust. A third-party trustee typically holds the title to the property in trust, with the power to foreclose on the buyer if there is a default. The buyer owns the property and has all rights of ownership and possession, subject only to the conditions in the deed of trust. When the loan has been paid off, the lender will give clear the title by way of recording a Deed of Reconveyance. The Deed of Reconveyance removes the lender's interest in the property.

Some states have modified the title and lien theories, and these states are referred to as "intermediary theory" states. In these states, the title remains with the borrower, but the lender may take back title to the property if the borrower defaults on the loan." Foreclosures (lien theory state: mortgages) and trust foreclosures (land theory state: deed or trust) are legal processes by which the provider of purchase funds in a real estate transaction may recover the purchase funds in the event of default in the terms in either the mortgagee or deed of trust document by the borrowing party. Whether the legal action pertains to a mortgage or deed of trust the process to recover the funds is typically referred to as a foreclosure. When determining the requirements of a foreclosure action the first point of reference is to determine the state in which the property exist, as each state's statutes vary as to the exact process to be followed. But in general, as defined by Merriam-Webster's Online dictionary, foreclosures are: an act or instance of foreclosing; specifically: a legal proceeding that bars or extinguishes a mortgagor's right, title, and/or interest in mortgaged real estate. Foreclosures are initiated when there is a default in the terms of the mortgage given by a mortgagor to a mortgagee or the terms of the deed of trust given by a trustor to a trust.

The online process begins with the determination of the state in which the property is located by user choice of state to enable the system to display the appropriate forms. Generally the user determines their state choice during the subscription process with certain alterations opportunities availably after the subscription process has been completed by the user. Each state has similar but not exact statutes. Consequently, the forms presented to the users are state specific and will be coded/formatted specifically to each state's statutes and there specific definitions. Upon determination of the state by the user the appropriate forms are presented for the specified state. In general the following basic foreclosure terms are defined as follows: (1) Mortgagor: A Mortgagor is one who grants a conveyance of or lien against real property that is satisfied upon payment or performance according to stipulated terms in the mortgage. Mortgagors are people or entities that mortgage the real property and are most often referred to as home owner(s), but can be anyone holding a fee title interest in real property; (2) Mortgagee: Mortgagee(s) are people or entities that accept mortgages or similar documents, and are most often called lenders, but can be referred to as trust holders, deed holders, land contract holders, and contract for deed holders. (3) Mortgage: A Mortgage is a document or instrument containing the terms and a condition agreed to between the Mortgagor and Mortgagee and creates a lien in real property; and can be in the form of deeds of trust, trust deed, contracts for deed, or land contract. As a foreclosure is a legal proceeding governed by the statutes of the state within which the real property is located, the foreclosure of real property must be strictly completed according to the specific state's statutes. Although the foreclosure process is generally similar from state to state, CRE's business process will be built out seamlessly on a state-by-state basis to account for the differences in each individual state's statutes. CRE will begin the process with the state of Minnesota. Although Minnesota is used extensively throughout the text, CRE's online business process will be applied to all states.

Simply put, Mortgagors grant Mortgages to Mortgagees as collateral when obtaining monetary funds to refinance or acquire real property. The Mortgage is satisfied and the lien or encumbrance created by the Mortgage is extinguished in the real property upon the successful completion of the Mortgage's terms and conditions including full repayment of the debt evidenced by the Mortgage.

A default in the Mortgage can be caused by various events. A typical real estate Mortgage includes terms requiring the Mortgagor to do more than make the necessary periodic payments. For example, the Mortgagor is usually required to maintain insurance on the premises, pay all real estate taxes, and maintain the premises for the benefit of both the Mortgagor and the Mortgagee. In addition, Mortgages may include a provision prohibiting the sale of all or any portion of the real property without the prior written consent of the Mortgagee. Such provisions are known as due on sale clauses. If the Mortgagor fails to abide by any of the terms in the Mortgage, they are deemed in default. There are a number of processes after a default has occurred. In the State of Minnesota, for example, the Mortgagee has several options, set forth by state statute or common law, to compel the Mortgagor to cure a default.

The Mortgagee can negotiate an arrangement with the Mortgagor by which the Mortgagor conveys the premises to the Mortgagee in satisfaction of the underlying debt. Such a procedure is known as the Mortgagor giving the Mortgagee a deed in lieu of foreclosure. When a Mortgagor undertakes such action, he or she is voluntarily surrendering redemption or reinstatement rights. Because such an action results in the transfer of ownership and the right to possession, Minnesota courts have long held that such transactions are subject to close scrutiny to protect the Mortgagor from oppression by the Mortgagee. For such an agreement to be upheld in court, it must not result from any oppressive means or overreaching on the part of the Mortgagee, and adequate consideration must be given.

The next option available to the Mortgagee is to initiate a foreclosure action. Under Minnesota law, there are two methods of foreclosing a real estate Mortgage. They are foreclosure by advertisement, which is the most common, and foreclosure by action, which is more rarely used and requires the Mortgagee to bring an action in court to determine its right to foreclose prior to any foreclosure sale. Foreclosure by action is more costly and time consuming for the Mortgagee and is therefore, not used as often.

When a Mortgage encumbers agricultural real estate, Minnesota's farmer-lender mediation statute generally requires the lender to offer mediation of the debt to the Mortgagor prior to beginning foreclosure proceedings. The farmer-lender mediation statute began requiring mediation in 1986. Generally, the statute requires, among other things, that a Mortgagee seeking to enforce a Mortgage on agricultural real estate, either by advertisement or action, first send notice to the Mortgagor and offer the Mortgagor the opportunity to mediate a resolution to the debt prior to beginning such action. If the Mortgagor elects to mediate the debt, the Mortgagee's enforcement of the Mortgage can be suspended for a period of up to 90 days pending completion of the mediation. If the Mortgagor has scheduled the debt involved in a bankruptcy or involved in a previous farmer-lender mediation, the debt is not subject to the farmer-lender mediation statute and the Mortgagee can enforce its Mortgage without first offering mediation.

The requirements of a foreclosure by advertisement are in general as follows: To initiate foreclosure by advertisement, the Mortgagee must prepare a notice of mortgage foreclosure sale. Such a notice must specify the name of the Mortgagor and the Mortgagee, the original principal amount secured by the Mortgage, the date of the Mortgage, when and where it was recorded, the amount claimed to be due under the Mortgage including taxes paid by the Mortgagee, a description of the mortgaged premises, the time and place of sale, and the time allowed by law for redemption by the Mortgagor. Once the Mortgagee has prepared the notice, it must be published in a qualified newspaper in the county where the mortgaged real property is located for a period of six weeks prior to the sale. The notice must be personally served upon the person in possession of the mortgaged premises at least four weeks before the sale. It must be served in a manner similar to that required for service of a summons initiating a civil action. If the real property is homestead property, a homestead designation notice must be served. If the real property is agricultural, an agricultural designation notice must be served. These notices disclose the rights of the mortgagor to designate for separate sale and redemption the homestead area of the total real property, and to similarly designate one or more separate tracts of agricultural real property within the total real property.

After the foreclosure notice has been prepared and publication has begun, the debtor may reinstate the Mortgage. This right to reinstate is guaranteed by Minnesota law even though the creditor may have accelerated the balance due under the Mortgage prior to the initiation of foreclosure proceedings. To reinstate the Mortgage, the debtor must pay to the Mortgagee the amount constituting the default at the time the mortgage foreclosure proceedings were initiated and all costs of foreclosure to the date of reinstatement, including half of any attorney's fees allowed by law or a fixed amount (e.g., $150), whichever is greater. If the Mortgagor reinstates the Mortgage, the foreclosure proceeding is annulled and the Mortgage is reinstated. To reinstate the mortgage, however, the required payment must be made prior to the date of the sheriffs sale, which is provided for in the foreclosure proceeding notices and any junior lien rights in the property are revived.

Following publication and service of the required notice of mortgage foreclosure sale, the sheriff of the county in which the mortgaged premises are located conducts the foreclosure sale. The sheriffs sale is conducted as an auction. The Mortgagee is the seller; the sheriff acts as the auctioneer. If a party other than the Mortgagee bids at the foreclosure sale, he must pay cash. The sale is made to the highest bidder. In most cases, the highest bidder at the foreclosure sale will be the Mortgagee, and in many cases, the Mortgagee will bid the amount due the Mortgagee. Following the sale, the Mortgagee's costs of sale are reimbursed and the debt owed to Mortgagee is paid to the extent covered by the sale price. Any bid in excess of the amount owed the Mortgagee is a surplus and may be paid to junior lien holders. If no such holders exist, the surplus must be returned to the Mortgagor. Any shortage is a deficiency. When, as in most cases involving agricultural real property, the redemption period is twelve months, the Mortgagee can obtain a deficiency judgment in the amount of the difference between the fair market value of the real property and the amount remaining unpaid on the mortgage by initiating a lawsuit within 90 days following the foreclosure sale. Otherwise if the redemption period is six months no deficiency judgment can be obtained.

Upon completion of the sale, the sheriff prepares a certificate of sale, which operates as a conditional conveyance of the mortgaged premises subject to the Mortgagor's rights of redemption. This certificate must be recorded within 20 days of the sale.

Normally the Mortgagor must redeem within six months of the date of the sale unless one or more of the following applies, by way of non-limiting examples, in which case the redemption period is twelve months:

1. The mortgage was executed prior to Jul. 1, 1967.
2. The amount claimed due and owing as of the date of the notice of foreclosure sale is less than 66-⅔ percent of the original principal amount secured by the mortgage.
3. The mortgage was executed prior to Jul. 1, 1987, and the mortgaged real property, as of the date of the execution of the mortgage, exceeded ten acres in size.
4. The mortgage was executed prior to Aug. 1, 1994, and the mortgaged real property, as of the date of the execution of the mortgage, exceeded ten acres but did not exceed 40 acres insize and was in agricultural use as defined by Minnesota statute.
5. The mortgaged real property, as of the date of the execution of the mortgage, exceeded 40 acres in size.
6. The mortgage was executed on or after Aug. 1, 1994, and the mortgaged real property, as of the date of the execution of the mortgage, exceeded ten acres but did not exceed 40 acres in size and was in agricultural use, as defined by Minnesota statute.

To redeem from the sale, the Mortgagor must pay to the Mortgagee the sum of money for which the mortgaged premises were sold, with interest from the sale date at the rate provided in the Mortgage, plus additional amounts advanced by the Mortgagee for expenses, including insurance, taxes, and assessments.

During the redemption period, the Mortgagor is entitled to remain in possession of the real property. He is therefore entitled to the rents, income, and profits from the real property unless he has made an assignment of an interest in them. No assignment of rents and profits contained in a Mortgage is enforceable under Minnesota law unless it was executed after Aug. 1, 1977; it secured an original loan in excess of $100,000; and it is not a lien on real property entirely homesteaded.

In the case of farming operations, it is common for a single real estate Mortgage to cover several separate tracts of land. If the mortgaged premises consist of separate and distinct farms or tracts, the sheriff must, upon demand of the Mortgagor, sell such tracts separately. If the mortgaged premises include the homestead, upon demand by the Mortgagor, the sheriff must first sell the nonhomestead premises.

When the foreclosed real estate is agricultural and the Mortgagee is a government agency, limited partnership, or corporation, Minnesota law provides the Mortgagor with certain rights of first refusal upon the resale of the real property by the Mortgagee. The Mortgagee cannot offer the real property for sale or lease until it has provided written notice to the Mortgagor at least 14 days in advance. When a third party buyer or lessee is found, the Mortgagee must then offer to sell or lease the real property to the Mortgagor upon the same terms as the offer made by such third party. The Mortgagor has a defined period of time within which to exercise his or her right of first refusal to either buy or lease the real property on such terms. For leases, it is within 15 days of the Mortgagee's written offer to the Mortgagor. For sales, it is within 65 days of the Mortgagee's written offer to the Mortgagor. If the Mortgagor exercises right of first refusal, he or she must fully perform the terms of the sale or lease within ten days of such exercise.

The Mortgagor can elect to purchase or lease a portion of the total real property involved, but only when the portion is of a size, configuration, and location that does not unreasonably reduce access to or the value of the remaining real property. The Mortgagor is not allowed to resell the real property if the sale was arranged prior to his or her exercise of the right of first refusal. When the Mortgagor resells the real property within 270 days of exercising the right of first refusal, there is a presumption, subject to proof to the contrary, that the sale was arranged ahead of the exercise of the right of first refusal. When violating this prohibition, the Mortgagor is liable for damages and attorneys' fees. In addition to Minnesota law's provision for rights of first refusal, applicable federal law creates similar rights of first refusal in certain circumstances. The Mortgagee must be part of the Farm Credit Services system. 1996 changes to this federal law have significantly limited the applicability of the federal law rights of first refusal.

A second course of foreclosure action for the Mortgagee is to bring a lawsuit on the underlying debt based on the promises of the Mortgagor contained in the underlying promissory note. A Mortgage generally will be legally enforced upon a Mortgagor to secure the performance of the promises of payment contained in a promissory note. If the value of the real property is less than the amount due under the Mortgage, the Mortgagee may elect to bring an action seeking the payment of the amount due under the promissory note and request the court to enforce the validity of a Mortgage against the real property. Such a course of action, however, may not be attractive to a Mortgagee unless the Mortgagor has other nonexempt assets that can be reached to satisfy the underlying debt.

What are the requirements of foreclosure by action? Foreclosure by action may be required in certain instances. No foreclosure by advertisement may be maintained unless the Mortgage itself authorizes, by means of a power of sale clause, such a foreclosure proceeding. If a power of sale clause is not part of the Mortgage, foreclosure by action is required. Foreclosure by action also may be elected by the Mortgagee for technical reasons such as erroneous descriptions, mistaken release of the Mortgage, or if an issue of priority with another lien holder must be resolved. To initiate a foreclosure by action, a summons and complaint must be served according to the Minnesota Rules of Civil Procedure. The complaint will name as defendants, all present owners or parties with an interest in the real property, other lien holders, and those with a right to possession of all or a portion of the premises. If no party defends the action, the Mortgagee may obtain a determination from the court that it has a valid Mortgage. If, however, any of the defendants objects, a trial may be necessary to establish the right of the Mortgagee to foreclose.

Once the court has made its decision, the sheriff will publish a notice of sale for a six-week period. In addition, if the Mortgagor is a resident of the county in which the mortgaged premises are located, a copy of the judgment of the court and the sheriff's notice of sale must be served upon the Mortgagor. Finally, after serving the notice of sale on the Mortgagor, the sheriff must post the notice of sale for six weeks. At the sale, the sheriff may sell the real property to cash bidders only, except for the Mortgagee, which can bid its total debt. Following the sale, the sheriff reports the sale to the court, which will then confirm the sale. Once the court has confirmed the sale, the statutory period of redemption for the debtor begins. The time periods for redemption are the same as for foreclosure by advertisement. If the amount realized at the sale is less than the amount due on the underlying debt, the creditor may be able to obtain a deficiency judgment against the mortgagor. Finally, a deficiency judgment can be sought against any guarantors of the promissory note.

Under either method of foreclosure, junior lien holders may redeem from the foreclosure sale if the Mortgagor fails to do so. Such junior lien holders may redeem if, before the expiration of the Mortgagor's redemption period, they have filed for record a notice of intention to redeem. The junior lien holders are each given a period of five days within which to redeem, based on the priority of their claims or liens, against the real property.

Following the expiration of the redemption period, the Mortgagor's ownership rights in the real property are terminated. However, with respect to certain foreclosures of agricultural real property, the Mortgagor retains certain rights of first refusal upon resale of the real property by the Mortgagee, as discussed above with respect to foreclosure by advertisement.

The aforementioned process is typical of the foreclosure process within the state of Minnesota, and as noted previously other states will have different statutory requirements, consequently, CRE will build out the process for each state according to the statutes of each individual state. CRE's online application may make available the sharing of information relative to numerous parties that have interest in the foreclosure process. These parties will be the Mortgagees, Attorneys, Local Governmental Units, Real Estate Organizations, Investors/Buyers, Mortgage Brokers, and Guest/Public. Though system generated generic forms and custom forms CRE's online application will provide the opportunity for key data once share data with many, as well as provide core working forms to provide working documents thereby providing efficiency through time savings and better personnel asset management to the various interested parties. CRE may provide the online services under a membership basis, and may charge for such membership services.

In general, the CRE online business process may begin with a user navigating to the "home page" for Casper Real Estate, Inc.'s registered domain name foreclosuresheriffsale.com, as well as the additional domain extensions known as .tv, .bs, .org, and .net. Its URL (Uniform Resource Locator) using the "http" (HyperText Transfer Protocol) scheme is <URL:http://www.foreclosuresheriffsale.com>. CRE anticipates the creation and registration of additional domain names and subsequent "home pages" for each domain name to be potential utilized by the various categories or interested users. Although multiple domain name maybe created and accessed, all data will be linked to and inputted into a server or multiple server clusters. By accessing a "home page" a user can navigate to the type of resource they are attempting to access to either input or obtain information regarding specific real property that is in foreclosure. It is a standard Internet protocol method of accessing resources. Upon entering one of our URLs into their WWW client or browser's "location" box, selecting "go," "search," or the enter key, the user is given access to our system's "home page." Note terms such as location, go, and search may have different descriptors within different browsers. This text utilizes the terms found within Internet Explorer, a product of Microsoft. Access to CRE's home page does not require authentication, but access to additional web pages to input, view, or submit information may require authentication, see index 00100-1A.

CRE Provisional Patent Screen Text

Note: each Index number is unique to specific screen shot, but figure numbers are not unique throughout this text. Figure numbers are unique only within the specific Index.

Index 00100-1A is the "Home Page" for Casper Real Estate, Inc.'s registered domain name foreclosuresheriffsale.com. Its URL (Uniform Resource Locator) using the "http" (HyperText Transfer Protocol) scheme is <URL: http://www. foreclosuresheriffsale.com>, which informs the user or the user's application of the type of resource they are attempting to access, and/or the mechanism to use to obtain the resource. It is a standard Internet protocol method of accessing resources. Upon entering our URL into their WWW client or browser's "location" box, selecting "go", "search", or the enter key, the user is given access to our systems "home page". CRE's "Home Page" also provides a "home" navigation button within the application. Use or selection of this button within the application will link or return the user to the site's "Home Page". Use of the home button for navigation provides the user a navigation option value of higher order in most cases then utilizing their browser's back button to return to the site's "Home Page". In order to access the displayed "Home Page" specific system services, as noted in FIG. 1 on Index 00100-1A, each user may be required to utilize authentication in order to access the desired service. The exceptions to authentication are site visitors who desire online access to applications for mortgage, trust deed, contract for deed, or land contract (see the appropriate index discussions that are displayed within additional screen shots for additional information germane to these items, as well as the Home Page disclosures noted in Item 2C herein).

There are five (5) distinct areas visible on our home page screen shot in FIG. 1. Each unique area and its associated items are discussed hereafter.

Our first discussion refers to FIG. 1 referenced on site as CRE's "Recommended Vendors" section. This section allow for links to specific vendor web sites. These links may be with vendor with whom we have established a verified business relationship; and/or that add value; and/or that have potential common interests CRE has determined may benefit our onsite visitors and user categories (note—such business or value added links may require a contractual relationship in order to be displayed herein). Item 1A is an example of a link to a title company's web site. This link may provide value through the services a title company might offer to the purchaser/mortgagor and/or lender/mortgagee user of our site. This link is an example of a verified business relationship. Item 1B is an example link to a commonly utilized search engine. This example might provide our site's users with a search tool to assist our users in determining additional information relevant to real property in general or foreclosures specifically. This link is an example of a value added link. Item 1C is an example of a link to commonly utilized online news service that may from time to time have pertinent news reports that are relevant to our application's services. This is example of a common interest link. Item 1D provides site users pertinent information pertaining to CRE as an organization. Display of vendors and About Us within the Recommended Vendors section is variable and is determined solely by CRE.

Our second discussion refers to screen shot FIG. 1 area 2. This figure refers to a series of paragraphs displayed in descending order on CRE's Home Page. The descending order designators are from 2A thru 2D.

The beginning paragraph "Item 2A" states "If you are not a member of this site, we welcome you as a guest to our site. As a guest, please select and create a guest log on. There is no charge to create a log on. After completing the guest log on process, your online permissions will permit you to view our "For Sale Properties" properties information found in our Properties section." This text informs the user of a specific action they may take on our site (create a guest logon), and informs the user of the specific access they will be granted upon completion of the specific action (access to CRE's Properties section). For additional information regarding CRE's "Properties" section see Index 03000-1A described hereafter.

The second paragraph in area 2 of FIG. 1 is Item 2B. Item 2B states "The information supplied by you for a guest log on is exclusively for our use, and will not be sold or given to any third party." This text instructs the potential Guest user as to CRE's privacy policy regarding the log on data the CRE accumulates for its purposes during the "Create Guest Logon" action (see Index 01000-1A described hereafter).

The third paragraph is area 3 of FIG. 1, indicated as Item 2C. Item 2C states "Creation of a guest log on is not required to complete the online mortgage application, but by completing an online mortgage application you give Casper Real Estate permission to share the application with third party mortgage brokers." This text instructs the potential user(s) as to CRE's privacy policy regarding CRE's online mortgage application process, states the permission granted by the user(s) to CRE, and to whom CRE may share the completed online mortgage application.

The fourth paragraph in FIG. 1 is Item 2D. Item 2D states "You also may subscribe as an Associate or as a Mortgage Broker by "selecting: the Subscribe button in the header". This text informs the user(s) of additional subscription options, in the event the user(s) desire to subscribe within these user categories. These categories may require the user(s) payment of a subscription fee to access the application services available to these categories. For additional information regarding CRE's Associate user category see our area 3 general discussion and Index 00700-1A described hereafter. For additional information regarding CRE's Mortgage Broker user category see our area 3 general discussion and Index 00800-1A described hereafter. For information regarding online subscription see our area 3 of FIG. 1 general discussion and Index 07000-1A "Subscribe" (Note this Index title is not displayed within the Index 00100-1A screen shot, but is displayed within Index 00100-2A: Common Site Navigation buttons).

Our third discussion refers to area 3 of FIG. 1 referenced on site as the "Logon" section. This section displays in general CRE's user categories. At this time CRE has identified certain users that maybe the prime utilizers of the category of services to be provided. The Logon buttons have been named for these utilizers, but such categorization by naming will not preclude additional entities or third parties from being granted utilization of the application's category services. In general, a specific User gains access through selecting the appropriate User's button within the displayed menu. User(s) to our site are required to authenticate to the system in order to access the services available or provided to user(s) upon the completion of the authentication process. Our system authentication consists of a unique userid noted online as Log in Name (Index 00201-1A), and a unique password noted online as Pass Word (Index 00201-2A). These are reached by link forwarding (also known as a jump) upon the user's selection/clicking of a specific user category (e.g. Mortgagee, Attorney, Sheriff, etc). Upon linking the user is provide a screen with form to input their Log in Name (Index 00201-1A) and a submit button. Upon selecting the submit button the system links to another screen with a form to input their Pass Word (Index 00201-2A) and a submit button. If the user has correctly entered their authentication they are forwarded to the user category they have subscribed to upon their selection of the submit button. In the event the authenticator incorrectly enters either authentication requirement, they are returned to the home page, and no indication is given to the user regarding the nature of the authentication error. These common index authentication category screen shots will be provided within the discussion of the Attorney user category (see Index 00300-1A "Attorney" and Indexes 00201-1A and 00201-2A), that are common to each category displayed within the "Logon" section.

Authentication validates the user by comparison against information archived within the system during the subscription process for the initial designated user, who then becomes by default the administrator for the account. This defined administrator user may be changed, but it cannot be deleted by user interaction with the system. In general each administrator user creates and grants permissions to each subsequent account user. Appropriate Indexes are provided with each User category's Main Menu to accomplish both New User creation and modifications to Existing Users, if any. Please see the appropriate User creation Indexes described hereafter herein. Although user(s) are not required to authenticate to access CRE's on site Mortgage Apps section (item 1B within Index 00100-2A), they are required to input sufficient data information through online forms to later determine certain validation parameters to system administrators (see discussion of Index 07000-1A "Subscribe" hereafter). Additional common rational for authentication is to determine appropriate service payments required for the access to the online application services, and to determine the user(s) permitted uses within the online application. The system records and logs the Internet Protocol (IP) address of the authenticator or Internet Service Provider (ISP), the time, and date of each authentication attempt. The system records the success or failure of each authentication attempted. Although it is not a part of the main discussion here, it is important to note that designation of a Default or Active State is also a specific part of the Subscription process to be described hereafter.

Upon successful authentication the user is linked to the service(s) within the application they have subscribed for. For a discussion and definition of each category see the following indexes: see, see Index 00300-1A for Attorney, see Index 00400-1A for Sheriff, Index 00500-1A for Mortgagees, see Index 00600-1A for Casper Real Estate, see Index 00700-1A for Associate, see Index 00800-1A for Mortgage Broker, see Index 00900-1A for REO (Real Estate Owned), see Index 01000-1A for Sales Agent, see Index 02000-1A for Guest, and see Index 02100-1A for Create Guest Logon.

Our fourth discussion refers to area 4 of FIG. 1. Area 4 displays a common site resource. A common site resource appears on each screen within the application. A common site resource provides a useful resource to the user. In the case of area 4, the resource displays the current day of the week, current date, and current year. This resource provides user information appropriate to the services found within the application.

Our fifth discussion refers to area 5 of FIG. 1. Area 5 displays common site information. Common site information appears on each screen within the application. Common site information displays text that instructs, educates, or provides information about the site to the user. Area 5 instructs, educates, and informs the user regarding the patent status of the site and the copyright status of the site.

Index 00100-2A: Common Site Navigation, FIG. 21 displays the following items that appear on all screens within the CRE online application. Item 1A Properties is Index 03000-1A. Item 1B is Index 04000-1A: Mortgage Apps. Item 1C is Index 05000-1A: Statutes. Item 1D is Index 06000-1A: FAQ (Frequently Asked Questions). Item 1E is Index 07000-1A: Subscribe. Item 1F is Index 08000-1A: Contract for Deed. Item 1G is Index 09000-1A: Contact Us. Item 1H is Index 10000-1A: Quit. Item 1I is Index 11000-1A: File Notice of Intent to Redeem. Item 1J is Index 12000-1A: Deed Trust. Item 1K is Index 13000-1A: Land Contract. Additional buttons are displayed but are not active at this time and are not linked to Indexes. As common site navigation buttons these Indexes are displayed on all screens within the site, and allow the users to link to the Index's resource, information, service, or forms. Each Index may provide the various users with information about the online application and values within the application that may aid the various users in subscribing, utilizing, or garnering assistance from CRE or assistance from third parties that make their use of CRE's site efficient, effective, and easy to use.

The first index we discuss is Index 00300-1A: Mortgagee. Upon the user's selection of this "Attorney" user category button they are linked to Index 00201-1A: Typical Userid authentication input box for the user to enter their userid into CRE's typical userid entry screen. Upon entering a user id into 6C text entry box indicated by 6A indicator "Enter Log In Name" text and selecting the 6B submit button; they are linked to Index 00201-2A: Password Input.

FIG. 2 Index 00201-2A: Password Input authentication for the user to enter their password into CRE's typical password entry screen. Upon entering a password into 7C text entry box indicated by 7A indicator "Enter Pass Word" text and selecting 7B submit button they are linked to Index 00301-1A: Attorney category Main Menu screen. In the event the user has entered either a non-valid userid or a non-valid password they are returned to the home page with no error message or indication of the nature of their error upon their selection of the 7B submit button. This process is typical of all user categories, except the Index to which they are linked upon a successful authentication.

Again, upon valid authentication the user is linked to Index 00301-1A: Attorney category Main Menu screen.

The first index we discuss is FIG. 3 Index 00300-1A: Attorney. Upon user selection of the Attorney button indicated as Index 00300-1A and successful authentication the user is linked to Attorney user to Index 00301-1A: Attorney User Category Main Menu. At this time the specific user can verify their success through observation of the display noted as Item 2A "Good Morning, Good Afternoon, or Good Evening (userid name)", and as noted in Item 3B's dialog box "Your are logged in as (userid name). These visual displays instruct the user of their logon success and provide a system welcome to the individual user. From this user specific main menu index Attorney Users can navigate to assorted indexes that provide functionality for the tasks necessary to initiate, execute, and complete a foreclosure process for their clients (see Indexes 00302-1A 00303-2A thru 00319-1A display under the section designator Attorney's Main Menu). In general their clients are the user group we have designate as mortgagees, although in some states they will be titled Trustees or other third parties. Although the foreclosure process is similar throughout the all the States of the United States there is enough dissimilarity that each State requires input and form changes within the online foreclosure application to address each State's specific statutes and regulations. Consequently, users must be made aware by display of the specific Active State noted as Item 3C and have the ability to change the current state as provided hereafter within Index 00316-1A: Current Active State, if they or their firm have subscribed for additional states. Item 2B provides instructive text to the user instructing them "Please select from the menu options at left" or the Attorney's Main Menu. Item 2C provides instructive text to the user regarding exiting the online application. Item 3A is marked by the note to see Index 00319-1A that is titled "Log Out" under the Attorney's Main Menu. Item 3D displays the permissions the user has chosen during the subscription process and has been granted by the system.

One of the first functions the user might utilize is FIG. 3 Index 00303-2A "Create New Public Notice." Creating a Public Notice generally occurs after an Attorney/Attorney Firm or similar third party has been granted "Power of Attorney" by a specific Mortgagee. Power of Attorney is a publicly recorded Instrument between the Mortgagee and an Attorney that grants the Attorney the legal ability to act for the Mortgagee as an agent in the foreclosure process. Although this Instrument is referred to as being between a Mortgagee and an Attorney or Attorney Firm, it is often utilized by other parties to provide legal ability to act as an agent for a name party. The Instrument and recording of same may be provided by CRE's online application. Upon execution and recording of the Power of Attorney at the appropriate government unit within the County/State in which the real property is located, an encumbrance search may be authorized by the Attorney User (often referred to as an "O & E"). This action is often taken to determine Junior Mortgagees, Judgments, Liens, State Tax Liens, Federal Tax Liens, unpaid Property Taxes, unpaid Special Assessments, or any other encumbrances, which may affect the foreclosure process. These "Junior" encumbrances may need to be notified as a part of the foreclosure process, if in fact any exist. Such encumbrances must have recorded their interest at the appropriate government unit within the County that the real property to be foreclosed upon is located. These types of searches may be made available within CRE's online application. Such encumbrance must have been recorded by their holder/makers with the appropriate governmental units in order to establish priority in the foreclosure process; the exceptions being Property Taxes, State Tax Liens, and Federal Tax Liens. CRE's online application may provide such Junior holder's online recording of their interest in real property through online input box within forms to be forwarded to appropriate County governmental units that include a time, date stamp, and agreed upon digital signature. The data inputted herein will be general inputted by individual Attorneys or their legal secretaries on the behalf of a Mortgagee. It is important to note the aforementioned Attorneys maybe employed directly or indirectly by the various Mortgagee. Attorneys must comply within the parameters set by the state statutes wherein the foreclosed property is located. They must also be licensed to practice within the state were the foreclosed property is located. Consequently, most Mortgagee utilize third party Attorney through the legal process known as "Power of Attorney" to represent their rights under the governing state statutes wherein the foreclosed property is located due to the licensure requirements and the Attorneys specific knowledge of the individual states' statutes. This Index most frequently will be utilized by third party Attorney firms and their associated Attorneys. The Attorneys directly employed by the Mortgage will utilized the index within their user category. The specific underlying principal behind this category separation is found in the privacy and permissions granted within the application to the categories for these operations which are the same within each state wherein the foreclosure will be brought. Therefore, the input forms have many duplicated items within them, but category separation is accomplished through authentication between Mortgagees and their third party Attorneys' who have been contracted for the process through Power of Attorney. A summary of these functions is found within their common usage of the generic and/or custom forms for input of the required data and subsequently the sharing of the data inputted within in these process by all user categories of the "public" and non-public data inputted by the various parties more over known as keying the data input once thereby resulting in common efficiencies for all users. Thereafter, upon completion of an encumbrance and title search our Attorney Users in most cases select the "Create New Public Notice" button under the Attorney's Main Menu whereby they are linked to FIG. 4 Index 00303-2A—Attorney Input Template list.

FIGS. 5, 6 and 7, Index 00303-2A—Attorney Input Template List FIG. 7 displays the Template List window table title noted as item 2C. Within this window, column headings are noted as items 2B—Template Name, item 2D—Entity Name, and item 2E—Select are displayed. Outside of the window item 2A—Return to Main Menu is displayed. Items 2B, 2D, and 2E are descriptive column heading that describe functions within them. Item 2A is a user choice button that upon selection returns the user to Index 00301-1A—Attorney's Main Menu. Column Item 2B lists various input forms the user may choose to input specific types of foreclosure processes. Column Item 2D lists the originator of the specific input form. The descriptive "Generic" term indicates the form is a common site resource default data input form generated within the application. As there are no Attorney user members at this time there are no user generated data input forms displayed or user forms generated on their behalf by CRE. To create or modify a custom data input form the user might utilize the Attorney's Main Menu to select Index 00313-1A—Create/Modify Template for Public Notice (see this index for the discussion of the create/modify template process). Upon user completion of Index 00313-1A, their custom template title would display within item 2D. Column item 2E provides individual "Select" button for each data input form found in Template Name column. Selection of a specific Select button links the user to the specific data input form listed within the Template Name column noted as item 2B. Items 2F thru 2K are examples of the application default "generic" data input forms for various foreclosure types. These examples will vary by state, as previously noted herein we are using the state of Minnesota as our example state and will continue that format hereunder.

FIGS. 8, 9, 10, and 11 display within the online form as one scrollable screen. For the required screen shot herein the index will be extended from Index 00303-3A: Contract for Deeds screen 1 of 4 to include Index 00303-3B screen 2 of 4, Index 00303-3C screen 3 of 4, and Index 00303-3D screen 4 of 4. This methodology will be utilized consistently herein to depict online screens that are scrollable, but that require multiple indexes and screen shots to display herein.

Upon user selection of the "Select" button for "Contract for Deed" item 2F the user is linked to Index 00303-3A: Contract for Deed input form FIG. 8. [Contracts for Deed are referred to in some states as Land Contracts. As previously noted we are using the state of Minnesota as our demonstration state, consequently, we will detail the generic Contract for Deed input form herein.]

FIG. 8 is displayed within the Index upon screen 1 thru 4 (Indexes 00303-3A screen 1, Index 00303-3B screen 2, Index 00303-3C screen 3, and Index 00303-3D screen 4).

FIG. 8, item 1A—submit button is displayed in screen 1 and screen 4 of 4 (FIGS. 8, 9 10 and 11). Please note this button position at the top left of the screen is provide as convenience to the user and its use at this point may not be appropriate until the user has input the requisite data into the form. Upon the user's selection of the button the data inputted by the user is imported into Index 00303-3E: Submit button and Index 00303-3F: Submit button.

Index 00303-3E: Submit Button

Therein the imported data is displayed within FIG. 12, item 1RR in the manner in which it will display within the body of an email to the newspaper directing the newspaper to publish said Public Notice. Herein the user may make additional modification to the imported data display.

FIG. 12, item 1SS provides the user an input text entry box for the newspapers email address.

FIG. 12, item 1TT provides the user an input text entry box for the entry of the appropriate State Tax official to which the State Statutes may require notification of the foreclosure action.

FIG. 12, item 1UU provides the user an input text entry box for the entry of the appropriate Federal Tax official to which the Federal Statutes or Regulations may require notification of the foreclosure action.

FIG. 12, item 1VV provides the user an input text entry box for the entry "Other" third parties the user may have cause to notification of the foreclosure action.

FIG. 12, item 1WW displays a check box that upon checking enables the user to cause return to Index 00302-2A: Attorney Input Template List rather than Index 00301-1A: Attorney category Main Menu.

FIG. 12, item 1XX displays the "Submit & Email to Paper" button for user selection. Upon the user's selection the display text is saved within the application for display within the user's "View All Completed Public Notices" category, and emails the Public Notice to the email addresses provided for the newspaper, state tax entity, federal tax entity, and other interested party by the user.

FIG. 12, item 1ZZ displays the "Submit (just save)" button for user selection. Upon the user's selection the displayed text is saved within the application for display with the user's "View All Completed Public Notices" category.

Index 00303-3F: Submit Button

FIG. 17, item 1AAA displays the "Return to the Create Public Notice Screen to Modify or Correct items within this Specific Notice". Upon user selection the user is returned to input screen displayed before the user selected item 1A "Submit" button.

FIG. 17, item 1BBB provides instructions to the user regarding the user's selection of item 1AAA. It states "Any manual entered data will be destroyed and will have to be re-entered if return is made". This refers to text entered or modified within item 1RR.

FIG. 18, item 1B: Return to Main Menu is displayed within screen 1 and screen 4 of 4 (FIGS. 18, 19, 20 and 21). Upon user selection, the user is linked to Index 00301-1A: Attorney category Main Menu. Note there is no direct return to Index 00303-2A: Attorney Input Template list except to return to Index 00301-1A and thereafter the user's reselection of Index 00303-2A (This assumes the user has not check the box noted above as item 1WW).

Index 00303-3A: Contract for Deed FIGS. 8, 9, 10 and 11, item 1C is a common site information item instructing the user that the text displayed in the color of items 1C's text are for display comments only and will not be inserted into the notice sent to the selected newspaper for publication.

FIG. 8, items 1D, 1E, and 1F provide the user an input text entry box to enter the Month from a drop down menu, the specific day of the month chosen, and the specific year the Contract for Deed was signed by the parties to the Contract for deed.

FIG. 8, item 1G displays the title given to this form either by the system (generic) default or the user's (custom) creation. FIG. 8, items 1H, 1I, and 1J provide the user an input text entry box to enter the Month from a drop down menu, the specific day of the month chosen, and the specific year the Contract for Deed was filed for record within the county in which the property is located.

FIG. 8, item 1K provides the user an input text entry box to input the Document Number assigned the Contract for Deed by the County Recorder as chosen from the county drop down noted in user designated item 1L of the active state the user has chosen (see Index 00316-1A for a discussion of the active state).

FIG. 8, item 1M provide the user an input text entry box to input the seller(s')'s name(s) while item 1N provides a user choice drop down menu that indicates the relationship of individual or multiple sellers, the type of ownership, or the entity type of the seller (Single person, Husband and Wife, Wife and Husband, Married person, Unmarried person, as Joint Tenants, As Tenants in Common, Single Proprietor, Limited Liability Corporation, Partnership, Corporation, or Governmental Unit).

FIG. 8, item 1D provides the user an input text entry box to input the purchaser(s')'s name(s) while 1P duplicates input item 1N.

FIG. 8, item Q provides the user an input text entry box to input the legal description of the subject property.

FIG. 8, item 1R provides the user an input text entry box to input the default that caused the foreclosure.

Index 00303-3B: Contract for Deed FIG. 9, item 1S provides the user an input text entry box to input the purchase price paid by the purchaser. FIG. 9, item 1T provides the user an input text entry box to input the amount of the purchase price paid by the purchaser (the common term is down payment for this item). FIG. 9, item 1U is an input text entry box for the percentage of the amount paid by the purchaser to the sale price. Note item 1S, 1T, and 1U apply to the time period Aug. 1, 1976 to Aug. 1, 1985.

FIG. 9, item 1V provides the user an input text entry box to input the amount the purchaser owes (balance due) upon the date of filing the Contract for Deed, item 1W provides an input text entry box for the user to input the cost of service for the foreclosure process, item 1X provides an input text entry box for the user to input the dollar value of the attorney fees actually expended or incurred and if after May 1, 1980, any additional payments becoming due under the contract to the seller after this notice was served. Plus the input item 1Y dollar value for contracts, other than earnest money contracts, purchase agreements, and exercised options executed after Aug. 1, 1985.

Index 00303-3C: Contract for Deed FIG. 10, item 1Z provides the user an input text entry box for the entry of the name, mailing address, street address or location and telephone number of the sellers or item 1AA of an attorney authorized by the sellers to accept payments pursuant to this notice. Items 1Z and 1AA may in some cases be the one and the same.

FIG. 10, item 1BB provides the user a choice drop down menu of newspapers the user has previously entered within Index 000312-1A: Newspapers in which the notice will be published, or item 1CC that provides the user a text box to enter the newspaper name if not available within item 1BB's drop down menu.

FIG. 11, Index 00303-3D: Contract for Deed

FIG. 11, item 1DD displays the common site resource input title "Other Pertinent Data" not in the public notice. Items 1EE thru 1QQ provide text entry boxes for data useful to the parties involved in the foreclosure or third parties having either responsibilities within the foreclosure process or interest in the process. These items are also searchable parameters within Index 00318-1A: Search Public Data Criteria.

FIG. 11, item 1EE provides the user an input text entry box for the Property ID (Identification) Number. FIG. 11, item 1FF provides the user an input text entry box for the Property House Number. FIG. 11, item 1GG provides the user an input text entry box for the Property Street Name. FIG. 11, item 1HH provides the user an input text entry box for the Property City. FIG. 11, item 1II provides the user an input text entry box for the Property Zip code. FIG. 11, item 11JJ provides the user an input text entry box for the Owner's Street Address. FIG. 11, item 1KK provides the user an input text entry box for the Owner's City. FIG. 11, item 1LL provides the user an input text entry box for the Owner's State. FIG. 11, item 1MM provides the user an input text entry box for the Owner's Zip code. FIG. 11, item 1NN provides the user an input text entry box for the Owner's E-mail address. FIG. 11, item 1OO provides the user an input text entry box for the Owner's Phone Number. FIG. 1, item 1PP provides the user an input text entry box for the Owner's Fax Number. FIG. 11, item 1QQ provides the user a drop down menu to chose the Type of Property (Single Family, Commercial, Industrial, Land, Farm). FIG. 11, item 1A—submit button is displayed in screen 1 and screen 4 of 4. Upon the user's selection of the button the data inputted by the user is imported into Index 00303-3E: Submit button and Index 00303-3F: Submit button.

FIG. 12 Index 00303-3E: Submit button. Therein the imported data is displayed within FIG. 12, item 1RR in the manner in which it will display within the body of an email to the newspaper directing the newspaper to publish said Public Notice. Herein the user may make additional modification to the imported data display. FIG. 12, item 1SS provides the user an input text entry box for the newspapers email address. FIG. 12, item 1TT provides the user an input text entry box for the entry of the appropriate State Tax official to which the State Statutes may require notification of the foreclosure action. FIG. 12, item 1UU provides the user an input text entry box for the entry of the appropriate Federal Tax official to which the Federal Statutes or Regulations may require notification of the foreclosure action. FIG. 12, item 1VV provides the user an input text entry box for the entry "Other" third parties the user may have cause to notification of the foreclosure action. FIG. 12, item 1WW displays a check box that upon checking enables the user to cause return to Index 00302-2A: Attorney Input Template List rather than Index 00301-1A: Attorney category Main Menu. FIG. 12, item 1XX displays the "Submit & Email to Paper" button for user selection. Upon the user's selection the display text is saved within the application for display within the user's "View All Completed Public Notices" category, and emails the Public Notice to the email addresses provided for the newspaper, state tax entity, federal tax entity, and other interested party by the user. FIG. 12, item 1ZZ displays the "Submit (just save)" button for user selection. Upon the user's selection the displayed text is saved within the application for display with the user's "View All Completed Public Notices" category.

FIG. 13, Index 00303-3F: Submit button, item 1AAA displays the "Return to the Create Public Notice Screen to Modify or Correct items within this Specific Notice". Upon user selection the user is returned to input screen displayed before the user selected item 1A "Submit" button. FIG. 13, item 1BBB provides instructions to the user regarding the user's selection of item 1AAA. It states "Any manual entered data will be destroyed and will have to be re-entered if return is made". This refers to text entered or modified within item 1RR.

FIG. 14, item 1B: Return to Main Menu is displayed within screen 1 and screen 4 of 4 (FIGS. 14, 15, 16 and 17). Upon user selection, the user is linked to Index 00301-1A: Attorney category Main Menu. Note there is no direct return to Index 00303-2A: Attorney Input Template list except to return to Index 00301-1A and thereafter the user's reselection of Index 00303-2A (This assumes the user has not check the box noted above as item 1WW). Upon the user's return to Index 00303-2A: Attorney Input Template list the user may elect to select item 2G whereupon they are linked to Index 00303-4A: Foreclosure by Advertisement (Abstract) that is specific to an abstract property type. An Abstract property designation refers to the type of property history [Abstract title property is the most common form of title found in the United States. An abstract of title is a condensed history of all deeds, mortgages and other documents relating to a particular piece of land, which affect the title. Recorded homestead documents are listed at the beginning of many abstracts. If parts of the original parcel of land have been sold, the deeds are included in the abstract.

When property is sold or mortgaged the lending institution or new owner wants to be sure the title is clear. If the title isn't clear the lending institution may not be able to foreclose, if need be. An attorney or title insurance firm is hired to review the abstract. This is done by following the various lines of ownership from person to person and deed to deed over the years, matching mortgages with releases, etc. A "Title Opinion" concludes who owns the land and what liens or encumbrances are still valid and in force. An "Owners & Encumbrance Report" (O & E) is a report listing current owners and open mortgages or liens. An O & E does not state the title is clear or if the mortgages are valid and in force. An O & E can be obtained from an abstractor (O & E entry will be available only for combined data entry and display within the Mortgagee, Attorney, and CRE user categories, and for display within the Associates category).] This index may contain a text box for the entry of O & E by the Attorney, CRE, or system/application generated input. The online application may provide a text entry box wherein the user may cut and paste the O & E for future reference in the event of changes after the date the O & E was completed.

The specific purpose of the Foreclosure by Advertisement (Abstract) input form is to provide copy to forward to a specific Newspaper for publication according to the State Statutes for such Public Notification. It is also served upon the Mortgagor or resident of the foreclosed property by either Sheriff Service or Private Service (see Index 00400-1A for additional details regarding service).

Again, after the user's selection of the "Select" button for Foreclosure by Advertisement (Abstract) item 2G the user is linked to Index 00303-4A: Foreclosure by Advertisement (Abstract) user input form FIG. 1.

FIGS. 14, 15, 16 and 17, Index 00303-4A: Foreclosure by Advertisement (Abstract) is displayed within the Index upon screens 1 thru 4 (Indexes 00303-4A screen 1, Index 00303-4B screen 2, Index 00303-4C screen 3, and Index 00303-4D screen 4).

FIG. 14, item 1A—submit button is displayed in screen 1 and screen 4 of 4. Please note this button position at the top left of the screen is provide as convenience to the user and its use at this point may not be appropriate until the user has input the requisite data into the form. Upon the user's selection of the button the data inputted by the user is imported into Index 00303-3E: Submit button and Index 00303-3F: Submit button.

FIG. 16, Index 00303-3E: Submit button. Therein the imported data is displayed within FIG. 16, item 1RR in the manner in which it will display within the body of an email to the newspaper directing the newspaper to publish said Public Notice. Herein the user may make additional modification to the imported data display. FIG. 16, item 1SS provides the user an input text entry box for the newspapers email address.

FIG. 16, item 1TT provides the user an input text entry box for the entry of the appropriate State Tax official to which the State Statutes may require notification of the foreclosure action.

FIG. 16, item 1UU provides the user an input text entry box for the entry of the appropriate Federal Tax official to which the Federal Statutes or Regulations may require notification of the foreclosure action. FIG. 16, item 1VV provides the user an input text entry box for the entry "Other" third parties the user may have cause to notification of the foreclosure action. FIG. 16, item 1WW displays a check box that upon checking enables the user to cause return to Index 00302-2A: Attorney Input Template List rather than Index 00301-1A: Attorney category Main Menu. FIG. 17, item 1XX displays the "Submit & Email to Paper" button for user selection. Upon the user's selection the display text is saved within the application for display within the user's "View All Completed Public Notices" category, and emails the Public Notice to the email addresses provided for the newspaper, state tax entity, federal tax entity, and other interested party by the user. FIG. 17, item 1ZZ displays the "Submit (just save)" button for user selection. Upon the user's selection the displayed text is saved within the application for display with the user's "View All Completed Public Notices" category.

FIG. 13, Index 00303-3F: Submit button, item 1AAA displays the "Return to the Create Public Notice Screen to Modify or Correct items within this Specific Notice". Upon user selection the user is returned to input screen displayed before the user selected item 1A "Submit" button.

FIG. 13, item 1BBB provides instructions to the user regarding the user's selection of item 1AAA. It states "Any manual entered data will be destroyed and will have to be re-entered if return is made". This refers to text entered or modified within item 1RR in FIG. 12. FIG. 13, item 1B: Return to Main Menu is displayed within screen 1 and screen 4 of 4 (FIGS. 14, 15, 16 and 17). Upon user selection, the user is linked to Index 00301-1A: Attorney category Main Menu. Note there is no direct return to Index 00303-2A: Attorney Input Template list except to return to Index 00301-1A and thereafter the user's reselection of Index 00303-2A (This assumes the user has not check the box noted above as item 1WW).

FIG. 14, item 1C displays the title given to this form either by the system's (generic) default or the user's (custom) creation. FIG. 14, item 1D provides the user a drop down menu to select the Month of Mortgage's signature by the parties. FIG. 14, item 1E provides the user an input text entry box to enter the day of the month of the Mortgage's signature by the parties. FIG. 14, item 1F provides the user an input text entry box to enter the year of the Mortgage's signature by the parties. FIG. 14, item 1G provides the user an input text entry box to enter the Original Principal Amount of the Mortgage. FIG. 14, item 1H provides the user an input text entry box to enter either the Mortgagee's First Name and middle initial or the Company Name. Item 1I provides the user an input text entry box to input the Mortgagee's Last Name (surname). FIG. 14, item 1J provides the user an input text entry box to input the Spouse's First Name and middle initial. FIG. 14, item 1K provides the user an input text entry box to input the Spouse's Last Name. FIG. 14, item 1L provides the user a choice drop down menu that indicates the relationship of individual or multiple sellers, the type of ownership, or the entity type of the seller (Single person, Husband and Wife, Wife and Husband, Married person, Unmarried person, as Joint Tenants, As Tenants in Common, Single Proprietor, Limited Liability Corporation, Partnership, Corporation, or Governmental Unit). FIG. 14, item 1M provide the user an input text entry box to input the Mortgagee's name while item 1N provides a user choice drop down menu that indicates the entity type of the Mortgagee (Single person, Husband and Wife, Wife and Husband, Married person, Unmarried person, as Joint Tenants, As Tenants in Common, Single Proprietor, Limited Liability Corporation, Partnership, Corporation, or Governmental Unit). FIG. 14, item 1O provides the user a drop down menu to select the Month of Mortgage's recording. FIG. 14, item 1P provides the user an input text entry box to enter the day of the month of the Mortgage's recording. FIG. 14, item 1Q provides the user an input text entry box to enter the year of the Mortgage's recording. FIG. 14, item 1R provides the user an input text entry box to enter the governmental unit where the recording took place; most often the County Recorder's Office. FIG. 14, item 1S provides the user an input text entry box to enter the Document assign to the mortgage by the local Governmental unit, most often the County Recorder.

FIG. 15, Index 00303-4B: Foreclosure by Advertisement (Abstract), item 1T provides the user instructive regarding the utilization of the application. FIG. 15, item 1U provides the user an input text entry box to enter the name of an Assigned Mortgagee. Assigned Mortgagees are Mortgagees that have acquired the mortgage thru purchase or assignment by Federal Authorities and thereunder perform the duties of the Mortgagee according to the terms of the mortgage. FIG. 15, item 1V provides the user an input text entry box to enter the Month the mortgage was received thru assignment. FIG. 15, item 1W provides the user an input text entry box to enter the day of the month the mortgage was received thru assignment. FIG. 15, item 1X provides the user an input text entry box to enter the year the mortgage was received thru assignment. FIG. 15, item 1Y provides the user an input text entry box to enter the Month the mortgage was either recorded or registered. FIG. 15, item 1Z provides the user an input text entry box to enter the day of the month the mortgage was either recorded or registered. FIG. 15, item 1AA provides the user an input text entry box to enter the year the mortgage was either recorded or registered. FIG. 15, item 1BB provides the user an input text entry box to enter the Document Number assigned to the mortgage upon recording or registering. FIG. 15, item 1CC provides the user an input text entry box to enter where the Document was either recorded or registered. Notes item numbers 1U thru 1CC are repeated as often as the mortgage has been assigned. FIG. 15, item 1DD provides the user an input text entry box to enter the legal description of the foreclosed property. FIG. 15, item 1EE provides the user a drop down menu choice to indicate and display the county in which the property is located within the current active state (this function is specific to each state). FIG. 15, item 1FF provides the user an input text entry box to enter the dollar value of the Amount due and claimed to be due as of the date of notice, including taxes, if any, paid by the mortgagee.

FIG. 16, Index 00303-4C: Foreclosure by Advertisement (Abstract), item 1GG provides the user an input text entry box to enter the Month the mortgage will go to Sheriff Sale. FIG. 16, item 1HH provides the user an input text entry box to enter the day of the month the mortgage will go to Sheriff Sale. FIG. 16, item 1II provides the user an input text entry box to enter the year the mortgage will go to Sheriff Sale. FIG. 16, "Sheriff Calendar" button is indexed to Index 00303-9A: Sheriff's Calendar and details concerning this function will be inscripted therein. FIG. 16, item 1JJ provides the user an input text entry box to enter the time of the Sheriff Sale for the foreclosed property. FIG. 16, item 1KK provides the user a drop down menu to choose the morning or afternoon designations for the Sheriff Sale time indicated in item 1JJ. FIG. 16, item 1LL provides the user an input text entry box to enter the Place of Sale for the Sheriff Sale. FIG. 16, item 1MM provides the user an input text entry box to enter the City of the Place of Sale indicated in item 1LL. FIG. 16, item 1MMM provides the user a drop down menu to choose the redemption time period (six months, twelve months, five weeks, thirty days, forty-five days, sixty days, or ninety days as provided for within the mortgage document terms, according to state statute parameters or terms decreed by an authoritative court). [Note this is a major difference item between a title theory state and a lien theory state. Minnesota is a lien theory state and as such state statutes provide a specific time period after the Sheriff Sale during which the Mortgagor or their assigns may by statute redeem the property out of foreclosure (the Mortgagor or their assigns must pay the mortgagee the funds due it under the terms of the Mortgage along with such costs as may be allowed for recovery payment to the Mortgagee under the specific lien title theory states statutes in cash or funds provided by a source other then the filing Mortgagee). In title theory states there is no provision for a redemption period within state statutes, consequently, the action is finalized at the conclusion of the Sheriff Sale. Title theory states provide the Mortgagor with fewer options than lien theory states. Conversely, title theory states provide the Mortgagee with a determined date by which they may recover their funds under the terms of the mortgage due to the title theory state statutes the mortgage is enacted under.] FIG. 16, item 1NN provides the user an input text entry box to enter a Mortgagor's Name who has been released from financial obligation within the mortgage for the foreclosed property. FIG. 16, item 1OO provides the user an input text entry box to enter the Month the notice was created. FIG. 16, item 1PP provides the user an input text entry box to enter the day of the month the notice was created. FIG. 16, item 1QQ provides the user an input text entry box to enter the year the notice was created. FIG. 16, item 1RR provides the user a drop down menu to select the name of the attorney who will be filing the foreclosure action. FIG. 16, item 1SS provides the user an input text entry box to enter the individual attorney firm's file number, in the event the attorney or attorney firm utilizes such a file number. FIG. 16, item 1KKK provides the user a drop down menu choice to indicate and display the Newspaper the Public Notice will be published in. FIG. 16 item 1TT provides the user a drop down menu choice box to select the Month the notice will be first published. FIG. 16 item 1UU provides the user an input text entry box to enter the day of the month the notice will be first published. FIG. 16 item 1VV provides the user an input text entry box to enter the year the notice will be first published.

FIG. 17, Index 303-4D: Foreclosure by Advertisement (Abstract) items 1TT, 1UU, and 1VV are required by state statute within the state of Minnesota and indicate the first date of publication for a time period of six weeks of publication as defined by state statute for a mortgage that is Foreclosed by Advertisement term within the mortgage documents. Other foreclosure actions may require different publication lengths. FIG. 17 item 1WW displays the common site resource input title "Other Pertinent Data" not in the public notice. Items 1XX thru 1JJJ provide text entry boxes for data useful to the parties involved in the foreclosure or third parties having either responsibilities within the foreclosure process or interest in the process. These items are also searchable parameters within Index 00318-1A: Search Public Data Criteria.

FIG. 17, item 1XX provides the user an input text entry box for the Property ID (Identification) Number. FIG. 17, item 1YY provides the user an input text entry box for the Property House Number. FIG. 17, item 1ZZ provides the user an input text entry box for the Property Street Name. FIG. 17, item 1AAA provides the user an input text entry box for the Property City. FIG. 17, item 1BBB provides the user an input text entry box for the Property Zip code. FIG. 17, item 1CCC provides the user an input text entry box for the Owner's Street Address. FIG. 17 item 1DDD provides the user an input text entry box for the Owner's City. FIG. 17 item 1EEE provides the user an input text entry box for the Owner's State. FIG. 17 item 1FFF provides the user an input text entry box for the Owner's Zip code. FIG. 17, item 1GGG provides the user an input text entry box for the Owner's E-mail address. FIG. 17, item 1HHH provides the user an input text entry box for the Owner's Phone Number. FIG. 17, item 1III provides the user an input text entry box for the Owner's Fax Number. FIG. 17, item 1JJJ provides the user a drop down menu to chose the Type of Property (Single Family, Commercial, Industrial, Land, Farm). FIG. 17, item 1A—submit button is displayed in screen 1 and screen 4 of 4 (FIGS. 14, 15, 16 and 17). Upon the user's selection of the button the data inputted by the user is imported into Index 00303-3E: Submit button and Index 00303-3F: Submit button.

FIG. 12, Index 00303-3E: Submit button Therein the imported data is displayed within FIG. 12, item 1RR in the manner in which it will display within the body of an email to the newspaper directing the newspaper to publish said Public Notice. Herein the user may make additional modification to the imported data display. FIG. 12 (and FIGS. 21, 22, 23, and 24), item 1SS provides the user an input text entry box for the newspapers email address. FIG. 22, item 1TT provides the user an input text entry box for the entry of the appropriate State Tax official to which the State Statutes may require notification of the foreclosure action. FIG. 22, item 1UU provides the user an input text entry box for the entry of the appropriate Federal Tax official to which the Federal Statutes or Regulations may require notification of the foreclosure action. FIG. 22, item 1VV provides the user an input text entry box for the entry "Other" third parties the user may have cause to notification of the foreclosure action. FIG. 2, item 1WW displays a check box that upon checking enables the user to cause return to Index 00302-2A: Attorney Input Template List rather than Index 00301-1A: Attorney category Main Menu.

FIGS. 12 and 22, item 1XX displays the "Submit & Email to Paper" button for user selection. Upon the user's selection the display text is saved within the application for display within the user's "View All Completed Public Notices" category, and emails the Public Notice to the email addresses provided for the newspaper, state tax entity, federal tax entity, and other interested party by the user.

FIGS. 12, and 22 item 1ZZ displays the "Submit (just save)" button for user selection. Upon the user's selection the displayed text is saved within the application for display with the user's "View All Completed Public Notices" category.

FIG. 13, Index 00303-3F: Submit button, item 1AAA displays the "Return to the Create Public Notice Screen to Modify or Correct items within this Specific Notice". Upon user selection the user is returned to input screen displayed before the user selected item 1A "Submit" button. FIG. 13, item 1BBB provides instructions to the user regarding the user's selection of item 1AAA. It states "Any manual entered data will be destroyed and will have to be re-entered if return is made". This refers to text entered or modified within item 1RR. FIG. 13, item 1B: Return to Main Menu is displayed within screen 1 and screen 4 of 4. Upon user selection, the user is linked to Index 00301-1A: Attorney category Main Menu. Note there is no direct return to Index 00303-2A: Attorney Input Template list except to return to Index 00301-1A and thereafter the user's reselection of Index 00303-2A (This assumes the user has not check the box noted above as item 1WW).

Upon the user's reselection of the New Public Notice within Index 00301-1A: Attorney category Main Menu the user is again linked to Index 00303-2A: Attorney Input Template list. Therein the user may select the Foreclosure by Judgment template "Select" button noted as item 2H. The user's selection of this button links them to Index FIG. 15, Foreclosure by Judgment input screens. All templates for Foreclosure by Judgment must be regarded as custom templates, and extreme caution should executed by user to assess their specific judgment notice requirement before utilizing this generic Judgment input form (consideration should be made and given to the creation of a specific input template for the specific judgment at hand either by the user or by user's request made to CRE). Consequently, before beginning the discussion of the generic input screens herein a short discussion about Judgments is necessary. Note that we will again utilize our base state of Minnesota to provide our initial input screens. First the potential Judgment must be obtained through the judicial process whereby a creditor obtains a court decree that the debtor is indebted to them and fixes the amount of the indebtedness to the creditor. The court decree creates a Judgment in favor of the Judgment creditor in the form of a claim upon the property of the Judgment debtor. Thereafter the Judgment creditor must docket the Judgment in the county in which the property is located creating a Judgment Lien. The docketing process is termed perfecting the Judgment. Once docketed the Judgment Lien attaches to all real property of the Judgment debtor within the docketing county. Thereafter the Judgment creditor must obtain a "Writ of Execution" from the court administrator for the county in which the property is located. Thereafter the sheriff of the county where the property is located must serve the Judgment debtor with the Wirt of Execution and the Notice of Sale before the Notice of Sale (Public Notice) is displayed through posting or publishing. The Judgment process listed previously depicts only a partial discussion of the Judgment process and is not intended to be complete, but rather a mean to typify the process to the point of Public Notice wherein the application process can be utilized to execute the Public Notice and execute the application strategy of sharing relevant data amongst the interested parties to such actions.

Again, upon the user's selection of the Foreclosure by Judgment select button noted as item 2H they are linked to FIG. 5, 303-5A: Foreclosure by Judgment screen. This index is again a portion of the scrollable online screen depicted within FIG. 1 and its associated items. FIG. 15 item 1A—submit button is displayed in screen 1 and screen 4 of 4 (FIGS. 15, 16, 17 and 18). Please note this button position at the top left of the screen is provide as convenience to the user and its use at this point may not be appropriate until the user has input the requisite data into the form. Upon the user's selection of the button the data inputted by the user is imported into Index 00303-3E: Submit button and Index 00303-3F: Submit button.

FIG. 12, Index 00303-3E: Submit button. Therein the imported data is displayed within FIG. 12, item 1RR in the manner in which it will display within the body of an email to the newspaper directing the newspaper to publish said Public Notice. Herein the user may make additional modification to the imported data display. FIG. 12, item 1SS provides the user an input text entry box for the newspapers email address. FIG. 12, item 1TT provides the user an input text entry box for the entry of the appropriate State Tax official to which the State Statutes may require notification of the foreclosure action. FIG. 12, item 1UU provides the user an input text entry box for the entry of the appropriate Federal Tax official to which the Federal Statutes or Regulations may require notification of the foreclosure action. FIG. 12, item 1VV provides the user an input text entry box for the entry "Other" third parties the user may have cause to notification of the foreclosure action. FIG. 12, item 1WW displays a check box that upon checking enables the user to cause return to Index 00302-2A: Attorney Input Template List rather than Index 00301-1A: Attorney category Main Menu. FIG. 12, item 1XX displays the "Submit & Email to Paper" button for user selection. Upon the user's selection the display text is saved within the application for display within the user's "View All Completed Public Notices" category, and emails the Public Notice to the email addresses provided for the newspaper, state tax entity, federal tax entity, and other interested party by the user. FIG. 12, item 1ZZ displays the "Submit (just save)" button for user selection. Upon the user's selection the displayed text is saved within the application for display with the user's "View All Completed Public Notices" category.

FIG. 13, Index 00303-3F: Submit button, item 1AAA displays the "Return to the Create Public Notice Screen to Modify or Correct items within this Specific Notice". Upon user selection the user is returned to input screen displayed before the user selected item 1A "Submit" button. FIG. 13, item 1BBB provides instructions to the user regarding the user's selection of item 1AAA. It states "Any manual entered data will be destroyed and will have to be re-entered if return is made". This refers to text entered or modified within item 1RR. FIG. 13, item 1B: Return to Main Menu is displayed within screen 1 and screen 4 of 4. Upon user selection, the user is linked to Index 00301-1A: Attorney category Main Menu. Note there is no direct return to Index 00303-2A: Attorney Input Template list except to return to Index 00301-1A and thereafter the user's reselection of Index 00303-2A (This assumes the user has not check the box noted above as item 1WW).

Upon the user's reselection of New Public Notice Main Menu item they are re-linked to Index 00303-2A (FIG. 7): Attorney Input Template list wherein they may select the Foreclosure by Judgment select button and re-link to Index 00303-5A: Foreclosure by Judgment. At this point we begin our Figure and item discussion again.

FIG. 18, Index 00303-5A: Foreclosure by Judgment, item 1C displays the screen title as Foreclosure by Judgment. FIG. 18, item 1D provides the user a drop down menu choice to indicate the county in which the Judgment property is located. FIG. 18, item 1E provides the user an input text entry box for entry of the type of judicial court that issued the decree (District or Federal). FIG. 18, item 1F provides the user an input text entry box for the entry of the service area of the named court type (First Judicial District). FIG. 18, item 1G provides the user an input text entry box for the entry of the court docketing number. FIG. 18, item 1H provides the user an input text entry box for the entry of the plaintiffs name (Judgment Creditor). FIG. 18, item 1I provides the user a drop down menu to chose and indicate the plaintiffs relationship, ownership, or entity type (Single Person, Husband and Wife, Wife and Husband, Married Person, Unmarried Person, as Joint Tenants, as Tenants in Common, Single Proprietor, Limited Liability Corporation, Corporation, or Governmental Unit). FIG. 18, item 1J provides the user an input text entry box for the entry of either the plaintiff's first name and/or middle initial or the corporate name. FIG. 18, item 1K provides the user an input text entry box for the entry of the plaintiff's last name. FIG. 18, item 1L provides the user an input text entry box for the entry of the plaintiff's spouses first name and/or middle initial. FIG. 18, item 1M provides the user an input text entry box for the entry of the plaintiff's spouses last name. FIG. 18, item 1N provides the user a drop down menu choice of relationship, ownership, or entity type (Single Person, Husband and Wife, Wife and Husband, Married Person, Unmarried Person, as Joint Tenants, as Tenants in Common, Single Proprietor, Limited Liability Corporation, Corporation, or Governmental Unit).

FIG. 19, Index 00303-5B: Foreclosure by Judgment; item 1R provides the user a drop down menu choice of the month the Judgment was decreed. FIG. 19, item 1S provides the user an input text entry box of the entry for the day of the month the Judgment was decreed. FIG. 19, item 1T provides the user an input text entry box for the entry of the year the Judgment was decreed. FIG. 19, item 10 provides the user a drop down menu choice of the month the Judgment is to be auctioned. FIG. 19, item 1P provides the user an input text entry box of the entry for the day of the month the Judgment is to be auctioned. FIG. 19, item 1Q provides the user an input text entry box for the entry of the year the Judgment is to be auctioned. FIG. 19, item 1Q1 provides the user an input text entry box for the entry of the time the auction will conducted at. FIG. 19, item 1Q2 provides the user a drop down menu choice to indicate the morning (AM) or afternoon (PM) designation for the time in item 1Q1. FIG. 19, item 1U provides the user an input text entry box for the entry of the address of the Sheriff Sale where the auction will be conducted. FIG. 19, item 1V provides the user an input text entry box for the entry of the City in which the auction will take place. [Note the system will input the County where the auction will take place within the textural comments of the input form after the user entry of the City.] FIG. 19, item 1W provides the user an input text entry box for the entry of the legal description of the foreclosed property. FIG. 19, item 1X provides the user an input text entry box for the entry of the Sheriff's Deputy that conducted the auction. FIG. 19, item 1Y provides the user a drop down menu choice to designate the individual attorney who has prosecuted the action. FIG. 19, item 1Z provide the user a drop down menu choice to designate the Newspaper in which the Public Notice will be published. FIG. 19, item 1AA provides the user a drop down menu choice to designate the month the Public Notice will first be published within. FIG. 19, item 1BB provides the user an input text box for the entry of the day of the month the Public Notice will first be published on. FIG. 19, item 1CC provides the user an input text box for the entry of the year the Public Notice will first be published in. FIG. 19, item 1DD provides the user an input text box for the entry of the affidavit of publication number.

FIG. 20, Index 00305-5C: Foreclosure by Judgment, item 1EE displays the common site resource input title "Other Pertinent Data" not in the public notice. Items 1FF thru 1RR provide text entry boxes for data useful to the parties involved in the foreclosure or third parties having either responsibilities within the foreclosure process or interest in the process. These items are also searchable parameters within Index 00318-1A: Search Public Data Criteria, FIG. 98.

FIG. 20, item 1FF provides the user an input text entry box for the Property ID (Identification) Number. Item 1GG provides the user an input text entry box for the Property House Number. Item 1HH provides the user an input text entry box for the Property Street Name. Item 1II provides the user an input text entry box for the Property City. Item 1JJ provides the user an input text entry box for the Property Zip code. Item 1KK provides the user an input text entry box for the Owner's Street Address. FIG. 20, item 1LL provides the user an input text entry box for the Owner's City. Item 1MM provides the user an input text entry box for the Owner's State. Item 1NN provides the user an input text entry box for the Owner's Zip code. Item 100 provides the user an input text entry box for the Owner's E-mail address. Item 1PP provides the user an input text entry box for the Owner's Phone Number. Item 1QQ provides the user an input text entry box for the Owner's Fax Number. Item 1RR provides the user a drop down menu to chose the Type of Property (Single Family, Commercial, Industrial, Land, Farm). Item 1A—submit button is displayed in screen 1 and screen 4 of 4. Upon the user's selection of the button the data inputted by the user is imported into Index 00303-3E (FIG. 12): Submit button and Index 00303-3F (FIG. 13): Submit button.

FIG. 13, Index 00303-3E: Submit button. Therein the imported data is displayed within FIG. 12, item 1RR in the manner in which it will display within the body of an email to the newspaper directing the newspaper to publish said Public Notice. Herein the user may make additional modification to the imported data display. FIG. 12, item 1SS provides the user an input text entry box for the newspapers email address. Item 1TT provides the user an input text entry box for the entry of the appropriate State Tax official to which the State Statutes may require notification of the foreclosure action. Item 1UU provides the user an input text entry box for the entry of the appropriate Federal Tax official to which the Federal Statutes or Regulations may require notification of the foreclosure action. Item 1VV provides the user an input text entry box for the entry "Other" third parties the user may have cause to notification of the foreclosure action. Item 1WW displays a check box that upon checking enables the user to cause return to Index 00302-2A: Attorney Input Template List rather than Index 00301-1A: Attorney category Main Menu. FIG. 12, item 1XX displays the "Submit & Email to Paper" button for user selection. Upon the user's selection the display text is saved within the application for display within the user's "View All Completed Public Notices" category, and emails the Public Notice to the email addresses provided for the newspaper, state tax entity, federal tax entity, and other interested party by the user. Item 1ZZ displays the "Submit (just save)" button for user selection. Upon the user's selection the displayed text is saved within the application for display with the user's "View All Completed Public Notices" category.

FIG. 14, Index 00303-3F: Submit button, item 1AAA displays the "Return to the Create Public Notice Screen to Modify or Correct items within this Specific Notice". Upon user selection the user is returned to input screen displayed before the user selected item 1A "Submit" button. FIG. 14, item 1BBB provides instructions to the user regarding the user's selection of item 1AAA. It states "Any manual entered data will be destroyed and will have to be re-entered if return is made". This refers to text entered or modified within item 1RR. FIG. 14, item 1B: Return to Main Menu is displayed within screen 1 and screen 4 of 4. Upon user selection, the user is linked to Index 00301-1A: Attorney category Main Menu. Note there is no direct return to Index 00303-2A: Attorney Input Template list except to return to Index 00301-1A and thereafter the user's reselection of Index 00303-2A (This assumes the user has not check the box noted above as item 1WW).

Upon return to Index 00301-1A: Attorney category Main Menu the user must reselect New Public Notice to return to Index 00303-2A: Attorney Input Template list. The user may at this point select the Foreclosure by Advertisement with Assigns (reverse) "Select" button. Upon this selection the user is linked to Index 00303-6A: Foreclosure by Advertisement with Assigns (reverse) input screen and thereon and associated item numbers.

FIG. 21, Index 00303-6A: Foreclosure by Advertisement with Assigns (reverse). FIG. 21, item 1A—submit button is displayed in screen 1 and screen 4 of 4. Please note this button position at the top left of the screen is provide as convenience to the user and its use at this point may not be appropriate until the user has input the requisite data into the form. Upon the user's selection of the button the data inputted by the user is imported into Index 00303-3E: Submit button and Index 00303-3F: Submit button.

FIG. 12, Index 00303-3E: Submit button. Therein the imported data is displayed within FIG. 12, item 1RR in the manner in which it will display within the body of an email to the newspaper directing the newspaper to publish said Public Notice. Herein the user may make additional modification to the imported data display. Item 1SS provides the user an input text entry box for the newspapers email address. Item 1TT provides the user an input text entry box for the entry of the appropriate State Tax official to which the State Statutes may require notification of the foreclosure action. FIG. 12, item 1UU provides the user an input text entry box for the entry of the appropriate Federal Tax official to which the Federal Statutes or Regulations may require notification of the foreclosure action. FIG. 12, item 1VV provides the user an input text entry box for the entry "Other" third parties the user may have cause to notification of the foreclosure action. Item 1WW displays a check box that upon checking enables the user to cause return to Index 00302-2A: Attorney Input Template List rather than Index 00301-1A: Attorney category Main Menu. FIG. 12, item 1XX displays the "Submit & Email to Paper" button for user selection. Upon the user's selection the display text is saved within the application for display within the user's "View All Completed Public Notices" category, and emails the Public Notice to the email addresses provided for the newspaper, state tax entity, federal tax entity, and other interested party by the user. FIG. 12, item 1ZZ displays the "Submit (Oust save)" button for user selection. Upon the user's selection the displayed text is saved within the application for display with the user's "View All Completed Public Notices" category.

FIG. 13, Index 00303-3F: Submit button, item 1AAA displays the "Return to the Create Public Notice Screen to Modify or Correct items within this Specific Notice". Upon user selection the user is returned to input screen displayed before the user selected item 1A "Submit" button. Item 1BBB provides instructions to the user regarding the user's selection of item 1AAA. It states "Any manually entered data will be destroyed and will have to be re-entered if return is made". This refers to text entered or modified within item 1RR. Item 1B: Return to Main Menu is displayed within screen 1 and screen 4 of 4. Upon user selection, the user is linked to Index 00301-1A: Attorney category Main Menu. Note there is no direct return to Index 00303-2A: Attorney Input Template list except to return to Index 00301-1A and thereafter the user's reselection of Index 00303-2A (This assumes the user has not checked the box noted above as item 1WW).

Upon the user's reselection of New Public Notice Main Menu item they are re-linked to (FIG. 7) Index 00303-2A: Attorney Input Template list wherein they may select the Foreclosure by Advertisement with Assigns (reverse) select button and re-link to Index 00303-6A: Foreclosure by Advertisement with Assigns (reverse). At this point we begin our Figure and item discussion again.

In the system, read only access to the data base may be allowed for only subscribers to the system FIG. 21, Index 00303-6A: Foreclosure by Advertisement with Assigns (reverse) FIG. 21, item 1C displays the input form title as Foreclosure by Advertisement with Assigns (reverse). FIG. 21, item 1D provides the user a drop down menu choice to designate the month the mortgage was signed by the parties. Item 1E provides the user an input text entry box for the user to enter the day of the month the mortgage was signed by the parties. Item 1F provides the user an input text entry box for the entry of the year the mortgage was signed by the parties. Item 1G provides the user an input text entry box for the user to enter the dollar value amount of the original principal amount of the mortgage. Item 1H provides the user an input text entry box to enter either the first name and/or middle initial or the company name of the mortgagor. Item 1I provides the user an input text entry box to enter the last name of the mortgagor. Item 1J provides the user an input text entry box to enter the first name and/or middle initial of the mortgagor's spouse. Item 1K provides the user an input text entry box to enter the last name of the mortgagor's spouse. Item 1L provides the user a drop down menu choice to designate the relationship, ownership, or entity type of the mortgagor (Single Person, Husband and Wife, Wife and Husband, Married Person, Unmarried Person, as Joint Tenants, as Tenants in Common, Single Proprietor, Limited Liability Corporation, Corporation, or Governmental Unit). Item 1M provides the user an input text entry box to enter the name of the mortgagee. Item 1N provides the user a drop down menu choice to designate the relationship, ownership, or entity type of the mortgagee (Single Person, Husband and Wife, Wife and Husband, Married Person, Unmarried Person, as Joint Tenants, as Tenants in Common, Single Proprietor, Limited Liability Corporation, Corporation, or Governmental Unit). Item 1O provides the user an input text entry box to enter the document number assigned by the local governmental unit most likely the county recorder. Item 1P provides the user a drop down menu choice to designate the month the mortgage was recorded at the local governmental unit most often the county recorder. Item 1Q provides the user an input text entry box to enter the day of the month the mortgage was recorded at the local governmental unit most often the county recorder. Item 1R provides the user an input text entry box to enter the year the mortgage was to recorded at the local governmental unit most often the county recorder. Item 1S provides the user an input text entry box to designate the Place of Recording the mortgage most likely the county recorder. Item 1T provides the user a drop down menu choice to designate the county the mortgage was recorded in.

FIG. 22, Index 00303-6B: Foreclosure by Advertisement with Assigns (reverse) FIG. 22, item 1U provides an input text entry box to enter the Mortgagee to whom the assignment of the mortgage has been made to. Item 1V provides the user an input text entry box for the user to enter the month of the assignment of the mortgage. Item 1W provides the user an input text entry box for the user to enter the day of the month of the assignment of the mortgage. Item 1X provides the user an input text entry box for the user to enter the year of the assignment of the mortgage. Item 1Y provides the user an input text entry box for the user to enter the month the assignment of mortgage was recorded. Item 1Z provides the user an input text entry box for the user to enter the day of the month the assignment of mortgage was recorded. Item 1AA provides the user an input text entry box for the user to enter the year the assignment of mortgage was recorded. Item 1BB provides the user an input text entry box for the user to enter the Document number given to the assignment of mortgage by the recording authority. Item 1CC provides the user an input text entry box for the user to enter the Place where the assignment of mortgage was recorded. Note the mortgage may be assigned (transfer of ownership of the executed mortgage) many times in the course of the mortgage's term. Consequently, there may be many assignments of the mortgage, but only the current mortgagee holder of the mortgage may file for foreclosure under the terms of the mortgage. The process within this item provides a methodology for the transfer, the recording of same, and the public disclosure of the current mortgage holder. FIG. 22, item 1DD provides the user an input text entry box for the entry of the legal description of the foreclosed property. Item 1EE provides the user an input text entry box for the entry of the dollar value Amount due and claimed as of the date of the Notice, including taxes, if any, paid by the mortgagee. Item 1FF provides the use a drop down menu choice to designate the month the Sheriff Sale in to take place. Item 1GG provides the user an input text entry box for the entry of the day of the month the Sheriff Sale is to take place. Item 1HH provides the user an input text entry box for the entry of the year the Sheriff Sale is to take place. Item 1II provides the user an input text entry box for the entry of the time the Sheriff Sale is to take place. Item 1JJ provides the user an input text entry box for the entry of the morning (AM) or afternoon (PM) designation for the time the Sheriff Sale is to take place. Item 1KK provides the user an input text entry box for the entry of the place or street address the Sheriff Sale is to take place. FIG. 22, item 1LL provides the user an input text entry box for the entry of the City the Sheriff Sale is to take place.

FIG. 23, Index 00303-6C: Foreclosure by Advertisement with Assigns (reverse) FIG. 23, item 1MM provides the user a drop down menu choice to designate the time period for redemption within of the Sheriff Sale by the mortgagee or their assigns from the date of said sale. Note FIG. 23 items 1D thru 1LL are common to Foreclosure by Advertisement actions or Lien Title Theory and to Trust actions or Land Title Theory, but FIG. 23, item 1MM is not an option available to the mortgagor in Trust actions or Land Title Theory. In fact options available to the mortgagor end with the Sheriff Sale. FIG. 23, item 1NN provides the user an input text entry box to enter the name of a mortgagor that has been release from financial obligation. FIG. 23, item 1OO provide the user a drop down menu choice to designate execution month of the Notice. Item 1PP provides the user an input text entry box to enter the day of the month the Notice was executed. Item 1QQ provides the user an input text entry box to enter the year the Notice was executed. Item 1RR provide the user an input text entry box to enter either current mortgage as the filing mortgagee of the notice. Item 1SS provides the user an input text entry box to enter the individual attorney and/or their firm that under their power of attorney agreement with the filing mortgagee has created and is executing the Public Notice for publication. Item 1TT provides the user an input text entry box to enter the attorney firm's file number relevant to the foreclosure action. Item 1UU provides the user a drop down menu choice to designate the Newspaper the Notice will be published in. Item 1VV provides the user a drop down menu choice to designate the month the notice will be published in. Item 1WW provides the user an input text entry box to designate the day of the month the notice will be published on. Item 1XX provides the user an input text entry box to designate the year the notice will be published in. Item 1YY provides the user an input text entry box to enter the Affidavit of publication number. FIG. 23, item 1ZZ displays the common site resource input title "Other Pertinent Data" not in the public notice. Items 1AAA thru 1MMM provide text entry boxes for data useful to the parties involved in the foreclosure or third parties having either responsibilities within the foreclosure process or interest in the process. These items are also searchable parameters within Index 00318-1A: Search Public Data Criteria.

FIG. 23, item 1AAA provides the user an input text entry box for the Property ID (Identification) Number. FIG. 23, item 1BBB provides the user an input text entry box for the Property House Number. Item 1CCC provides the user an input text entry box for the Property Street Name. Item 1DDD provides the user an input text entry box for the Property City. Item 1EEE provides the user an input text entry box for the Property Zip code. Item 1FFF provides the user an input text entry box for the Owner's Street Address. Item 1GGG provides the user an input text entry box for the Owner's City. Item 1HHH provides the user an input text entry box for the Owner's State. FIG. 23, item 1III provides the user an input text entry box for the Owner's Zip code. Item 1JJJ provides the user an input text entry box for the Owner's E-mail address. Item 1KKK provides the user an input text entry box for the Owner's Phone Number.

FIG. 24, Index 00303-6D: Foreclosure by Advertisement with Assigns (Reverse)

FIG. 24, item 1LLL provides the user an input text entry box for the Owner's Fax Number. FIG. 24, item 1MMM provides the user a drop down menu to chose the Type of Property (Single Family, Commercial, Industrial, Land, Farm). Item 1A—submit button is displayed in screen 1 and screen 4 of 4. Upon the user's selection of the button the data inputted by the user is imported into Index 00303-3E: Submit button and Index 00303-3F: Submit button.

FIG. 12, Index 00303-3E: Submit button Therein the imported data is displayed within FIG. 12, item 1RR in the manner in which it will display within the body of an email to the newspaper directing the newspaper to publish said Public Notice. Herein the user may make additional modification to the imported data display. FIG. 12, item 1SS provides the user an input text entry box for the newspapers email address. FIG. 12, item 1TT provides the user an input text entry box for the entry of the appropriate State Tax official to which the State Statutes may require notification of the foreclosure action. FIG. 12, item 1UU provides the user an input text entry box for the entry of the appropriate Federal Tax official to which the Federal Statutes or Regulations may require notification of the foreclosure action. Item 1VV provides the user an input text entry box for the entry "Other" third parties the user may have cause to notification of the foreclosure action. Item 1WW displays a check box that upon checking enables the user to cause return to Index 00302-2A: Attorney Input Template List rather than Index 00301-1A: Attorney category Main Menu. Item 1XX displays the "Submit & Email to Paper" button for user selection. Upon the user's selection the display text is saved within the application for display within the user's "View All Completed Public Notices" category, and emails the Public Notice to the email addresses provided for the newspaper, state tax entity, federal tax entity, and other interested party by the user. FIG. 12, item 1ZZ displays the "Submit (just save)" button for user selection. Upon the user's selection the displayed text is saved within the application for display with the user's "View All Completed Public Notices" category.

FIG. 13, Index 00303-3F: Submit button. FIG. 13, item 1AAA displays the "Return to the Create Public Notice Screen to Modify or Correct items within this Specific Notice". Upon user selection the user is returned to input screen displayed before the user selected item 1A "Submit" button. Item 1BBB provides instructions to the user regarding the user's selection of item 1AAA. It states "Any manual entered data will be destroyed and will have to be re-entered if return is made". This refers to text entered or modified within item 1RR. Item 1B: Return to Main Menu is displayed within screen 1 and screen 4 of 4. Upon user selection, the user is linked to Index 00301-1A: Attorney category Main Menu. Note there is no direct return to Index 00303-2A: Attorney Input Template list except to return to Index 00301-1A and thereafter the user's reselection of Index 00303-2A (This assumes the user has not checked the box noted above as item 1WW). Upon return to Index 00301-1A (FIG. 3): Attorney category Main Menu the user must reselect New Public Notice to return to Index 00303-2A: Attorney Input Template list. The user may at this point select the Foreclosure by Advertisement (Torrens) "Select" button item 2J. Upon this selection the user is linked to (FIG. 25) Index 00303-7A: Foreclosure by Advertisement (Torrens) input screen and thereon FIGS. 24 and 25 and associated item numbers.

FIG. 25, Index 00303-7A: Foreclosure by Advertisement (Torrens).

FIG. 25, item 1A—submit button is displayed in screen 1 and screen 4 of 4. Please note this button position at the top left of the screen is provide as convenience to the user and its use at this point may not be appropriate until the user has input the requisite data into the form. Upon the user's selection of the button the data inputted by the user is imported into Index 00303-3E: Submit button and Index 00303-3F: Submit button.

FIG. 12, Index 00303-3E: Submit button. Therein the imported data is displayed within FIG. 12, item 1RR in the manner in which it will display within the body of an email to the newspaper directing the newspaper to publish said Public Notice. Herein the user may make additional modification to the imported data display. Item 1SS provides the user an input text entry box for the newspapers email address. FIG. 12, item 1TT provides the user an input text entry box for the entry of the appropriate State Tax official to which the State Statutes may require notification of the foreclosure action. FIG. 12, item 1UU provides the user an input text entry box for the entry of the appropriate Federal Tax official to which the Federal Statutes or Regulations may require notification of the foreclosure action. Item 1VV provides the user an input text entry box for the entry "Other" third parties the user may have cause to notification of the foreclosure action. Item 1WW displays a check box that upon checking enables the user to cause return to Index 00302-2A: Attorney Input Template List rather than Index 00301-1A: Attorney category Main Menu. Item 1XX displays the "Submit & Email to Paper" button for user selection. Upon the user's selection the display text is saved within the application for display within the user's "View All Completed Public Notices" category, and emails the Public Notice to the email addresses provided for the newspaper, state tax entity, federal tax entity, and other interested party by the user. FIG. 12, item 1ZZ displays the "Submit (just save)" button for user selection. Upon the user's selection the displayed text is saved within the application for display with the user's "View All Completed Public Notices" category.

FIG. 13, Index 00303-3F: Submit button. FIG. 13, item 1AAA displays the "Return to the Create Public Notice Screen to Modify or Correct items within this Specific Notice". Upon user selection the user is returned to input screen displayed before the user selected item 1A "Submit" button. Item 1BBB provides instructions to the user regarding the user's selection of item 1AAA. It states "Any manual entered data will be destroyed and will have to be re-entered if return is made". This refers to text entered or modified within item 1RR. Item 1B: Return to Main Menu is displayed within screen 1 and screen 4 of 4. Upon user selection, the user is linked to Index 00301-1A: Attorney category Main Menu. Note there is no direct return to Index 00303-2A: Attorney Input Template list except to return to Index 00301-1A and thereafter the user's reselection of Index 00303-2A (This assumes the user has not check the box noted above as item 1WW). Upon the user's reselection of New Public Notice Main Menu item they are re-linked to Index 00303-2A: Attorney Input Template list wherein they may select the Foreclosure by Advertisement (Torrens) select button and re-link to Index 00303-7A: Foreclosure by Advertisement (Torrens). At this point we begin our Figure and item discussion again.

FIG. 25, Index 00303-7A: Foreclosure by Advertisement (Torrens).

FIG. 25, item 1C displays the input form title as Foreclosure by Advertisement (Torrens). FIG. 25, item 1D provides the user a drop down menu choice to designate the month the mortgage was signed by the parties. Item 1E provides the user an input text entry box for the user to enter the day of the month the mortgage was signed by the parties. Item 1F provides the user an input text entry box for the entry of the year the mortgage was signed by the parties. Item 1G provides the user an input text entry box for the user to enter the dollar value amount of the original principal amount of the mortgage. FIG. 25, item 1H provides the user an input text entry box to enter either the first name and/or middle initial or the company name of the mortgagor. Item 1I provides the user an input text entry box to enter the last name of the mortgagor. Item 1J provides the user an input text entry box to enter the first name and/or middle initial of the mortgagor's spouse. Item 1K provides the user an input text entry box to enter the last name of the mortgagor's spouse. Item 1L provides the user a drop down menu choice to designate the relationship, ownership, or entity type of the mortgagor (Single Person, Husband and Wife, Wife and Husband, Married Person, Unmarried Person, as Joint Tenants, as Tenants in Common, Single Proprietor, Limited Liability Corporation, Corporation, or Governmental Unit). Item 1M provides the user an input text entry box to enter the name of the mortgagee. Item 1N provides the user a drop down menu choice to designate the relationship, ownership, or entity type of the mortgagee (Single Person, Husband and Wife, Wife and Husband, Married Person, Unmarried Person, as Joint Tenants, as Tenants in Common, Single Proprietor, Limited Liability Corporation, Partnership, Corporation, Governmental Unit). FIG. 25, item 10 provides the user a drop down menu choice to designate the month the mortgage was registered. Item 1P provides the user an input text entry box for entry of the day of the month the mortgage was registered. Item 1Q provides the user an input text entry box for the entry of the year the mortgage was registered. Item 1R provides the user an input text entry box for the entry of Place of registration of the mortgage. Item 1S provides the user an input text entry box for the entry of the document number assigned to the registration.

FIG. 26, Index 00303-7B: Foreclosure by Advertisement (Torrens).

FIG. 26, item 1T provides an input text entry box to enter the Mortgagee to whom the assignment of the mortgage has been made to. FIG. 26, item 1U provides the user an input text entry box for the user to enter the month of the assignment of the mortgage. Item 1V provides the user an input text entry box for the user to enter the day of the month of the assignment of the mortgage. Item 1W provides the user an input text entry box for the user to enter the year of the assignment of the mortgage. Item 1X provides the user an input text entry box for the user to enter the month the assignment of mortgage was recorded or registered. Item 1Y provides the user an input text entry box for the user to enter the day of the month the assignment of mortgage was recorded or registered. FIG. 26, item 1Z provides the user an input text entry box for the user to enter the year the assignment of mortgage was recorded or registered. Item 1AA provides the user an input text entry box for the user to enter the Certificate of Title Document number given to the assignment of mortgage by the registering authority. Item 1BB provides the user an input text entry box for the user to enter the Place where the assignment of mortgage was registered. Note the mortgage may be assigned (transfer of ownership of the executed mortgage) many times in the course of the mortgage's term. Consequently, there may be many assignments of the mortgage, but only the current mortgagee holder of the mortgage may file for foreclosure under the terms of the mortgage. The process within this item provides a methodology for the transfer, the recording of same, and the public disclosure of the current mortgage holder. FIG. 26, item 1CC provides the user an input text entry box for the entry of the legal description of the foreclosed property. Item 1EE provides the user a drop down menu choice to designate the county in which the foreclosed property is located (system may also input this data). Item 1FF provides the user an input text entry box for the entry of the dollar value Amount due and claimed as of the date of the Notice, including taxes, if any, paid by the mortgagee.

FIG. 27, Index 00303-7C: Foreclosure by Advertisement (Torrens).

FIG. 27, item 1GG provides the use a drop down menu choice to designate the month the Sheriff Sale in to take place. FIG. 27, item 1HH provides the user an input text entry box for the entry of the day of the month the Sheriff Sale is to take place. Item 1II provides the user an input text entry box for the entry of the year the Sheriff Sale is to take place. FIG. 27, "Sheriff Calendar" button is indexed to Index 00303-9A: Sheriff's Calendar and details concerning this function will be inscripted therein.

FIG. 27, item 1JJ provides the user an input text entry box for the entry of the time the Sheriff Sale is to take place. Item 1KK provides the user an input text entry box for the entry of the morning (AM) or afternoon (PM) designation for the time the Sheriff Sale is to take place. Item 1LL provides the user an input text entry box for the entry of the place or street address the Sheriff Sale is to take place. Item 1MM provides the user an input text entry box for the entry of the City the Sheriff Sale is to take place. Item 1NN provides the user a drop down menu choice to designate the time period for redemption within of the Sheriff Sale by the mortgagee or their assigns from the date of said sale. Note FIG. 27 items 1D thru 1LL are common to Foreclosure by Advertisement actions or Lien Title Theory and to Trust actions or Land Title Theory, but FIG. 27, item 1NN is not an option available to the mortgagor in Trust actions or Land Title Theory. In fact options available to the mortgagor end with the Sheriff Sale.

FIG. 27, item 1OO provides the user an input text entry box to enter the name of a mortgagor that has been release from financial obligation Item 1PP provide the user a drop down menu choice to designate execution month of the Notice. Item 1QQ provides the user an input text entry box to enter the day of the month the Notice was executed.

FIG. 27, item 1RR provides the user an input text entry box to enter the year the Notice was executed. Item 1SS provides the user an input text entry box to enter the individual attorney and/or their firm that under their power of attorney agreement with the filing mortgagee has created and is executing the Public Notice for publication. Item 1TT provides the user an input text entry box to enter the attorney firm's file number relevant to the foreclosure action. Item 1UU provides the user a drop down menu choice to designate the Newspaper the Notice will be published in. Item 1VV provides the user a drop down menu choice to designate the month the notice will be published in. Item 1WW provides the user an input text entry box to designate the day of the month the notice will be published on. Item 1XX provides the user an input text entry box to designate the year the notice will be published in.

FIG. 28, Index 00303-7D: Foreclosure by Advertisement (Torrens).

FIG. 28, item 1YY displays the common site resource input title "Other Pertinent Data" not in the public notice. Items 1AAA thru 1MMM provide text entry boxes for data useful to the parties involved in the foreclosure or third parties having either responsibilities within the foreclosure process or interest in the process. These items are also searchable parameters within FIG. 99, Index 00318-1A: Search Public Data Criteria. FIG. 28, item 1ZZ provides the user an input text entry box for the Property ID (Identification) Number. FIG. 28, item 1AAA provides the user an input text entry box for the Property House Number. Item 1BBB provides the user an input text entry box for the Property Street Name. Item 1CCC provides the user an input text entry box for the Property City. Item 1DDD provides the user an input text entry box for the Property Zip code. Item 1EEE provides the user an input text entry box for the Owner's Street Address. Item 1FFF provides the user an input text entry box for the Owner's City. Item 1GGG provides the user an input text entry box for the Owner's State. Item 1HHH provides the user an input text entry box for the Owner's Zip code. FIG. 28, item 1III provides the user an input text entry box for the Owner's E-mail address. Item 1JJJ provides the user an input text entry box for the Owner's Phone Number. Item 1KKK provides the user an input text entry box for the Owner's Fax Number. Item 1LLL provides the user a drop down menu to chose the Type of Property (Single Family, Commercial, Industrial, Land, Farm). Item 1A—submit button is displayed in screen 1 and screen 4 of 4. Upon the user's selection of the button the data inputted by the user is imported into Index 00303-3E: Submit button and Index 00303-3F: Submit button.

FIG. 12, Index 00303-3E: Submit button. Therein the imported data is displayed within FIG. 12, item 1RR in the manner in which it will display within the body of an email to the newspaper directing the newspaper to publish said Public Notice. Herein the user may make additional modification to the imported data display. FIG. 12, item 1SS provides the user an input text entry box for the newspapers email address. FIG. 12, item 1TT provides the user an input text entry box for the entry of the appropriate State Tax official to which the State Statutes may require notification of the foreclosure action. FIG. 12, item 1UU provides the user an input text entry box for the entry of the appropriate Federal Tax official to which the Federal Statutes or Regulations may require notification of the foreclosure action. Item 1VV provides the user an input text entry box for the entry "Other" third parties the user may have cause to notification of the foreclosure action. Item 1WW displays a check box that upon checking enables the user to cause return to Index 00302-2A: Attorney Input Template List rather than Index 00301-1A: Attorney category Main Menu. FIG. 12, item 1XX displays the "Submit & Email to Paper" button for user selection. Upon the user's selection the display text is saved within the application for display within the user's "View All Completed Public Notices" category, and emails the Public Notice to the email addresses provided for the newspaper, state tax entity, federal tax entity, and other interested party by the user. FIG. 12, item 1ZZ displays the "Submit (just save)" button for user selection. Upon the user's selection the displayed text is saved within the application for display with the user's "View All Completed Public Notices" category.

FIG. 13, Index 00303-3F: Submit button. FIG. 13, item 1AAA displays the "Return to the Create Public Notice Screen to Modify or Correct items within this Specific Notice". Upon user selection the user is returned to input screen displayed before the user selected item 1A "Submit" button. Item 1BBB provides instructions to the user regarding the user's selection of item 1AAA. It states "Any manual entered data will be destroyed and will have to be re-entered if return is made". This refers to text entered or modified within item 1RR. Item 1B: Return to Main Menu is displayed within screen 1 and screen 4 of 4. Upon user selection, the user is linked to Index 00301-1A: Attorney category Main Menu. Note there is no direct return to Index 00303-2A: Attorney Input Template list except to return to Index 00301-1A and thereafter the user's reselection of Index 00303-2A (This assumes the user has not check the box noted above as item 1WW).

Upon return to Index 00301-1A: Attorney category Main Menu the user must reselect New Public Notice to return to Index 00303-2A: Attorney Input Template list. The user may at this point select the Foreclosure by Advertisement (both) "Select" button item 2K. Upon this selection the user is linked to FIG. 29, Index 00303-8A: Foreclosure by Advertisement (both [Abstract & Torrens]) input screen and thereon FIG. 29 and associated item numbers. FIG. 29, Index 00303-8A: Foreclosure by Advertisement (both [Abstract & Torrens]). FIG. 29, item 1A—submit button is displayed in screen 1 and screen 4 of 4. Please note this button position at the top left of the screen is provide as convenience to the user and its use at this point may not be appropriate until the user has input the requisite data into the form. Upon the user's selection of the button the data inputted by the user is imported into Index 00303-3E: Submit button and Index 00303-3F: Submit button.

FIG. 12, Index 00303-3E: Submit button. Therein the imported data is displayed within FIG. 12, item 1RR in the manner in which it will display within the body of an email to the newspaper directing the newspaper to publish said Public Notice. Herein the user may make additional modification to the imported data display. FIG. 13, item 1SS provides the user an input text entry box for the newspapers email address. FIG. 13, item 1TT provides the user an input text entry box for the entry of the appropriate State Tax official to which the State Statutes may require notification of the foreclosure action. FIG. 13, item 1UU provides the user an input text entry box for the entry of the appropriate Federal Tax official to which the Federal Statutes or Regulations may require notification of the foreclosure action. Item 1VV provides the user an input text entry box for the entry "Other" third parties the user may have cause to notification of the foreclosure action. Item 1WW displays a check box that upon checking enables the user to cause return to Index 00302-2A: Attorney Input Template List rather than Index 00301-1A: Attorney category Main Menu. Item 1XX displays the "Submit & Email to Paper" button for user selection. Upon the user's selection the display text is saved within the application for display within the user's "View All Completed Public Notices" category, and emails the Public Notice to the email addresses provided for the newspaper, state tax entity, federal tax entity, and other interested party by the user. FIG. 13, item 1ZZ displays the "Submit (just save)" button for user selection. Upon the user's selection the displayed text is saved within the application for display with the user's "View All Completed Public Notices" category.

FIG. 13, Index 00303-3F: Submit button. FIG. 13, item 1AAA displays the "Return to the Create Public Notice Screen to Modify or Correct items within this Specific Notice". Upon user selection the user is returned to input screen displayed before the user selected item 1A "Submit" button. FIG. 13, item 1BBB provides instructions to the user regarding the user's selection of item 1AAA. It states "Any manual entered data will be destroyed and will have to be re-entered if return is made". This refers to text entered or modified within item 1RR. Item 1B: Return to Main Menu is displayed within screen 1 and screen 4 of 4. Upon user selection, the user is linked to Index 00301-1A: Attorney category Main Menu. Note there is no direct return to Index 00303-2A: Attorney Input Template list except to return to Index 00301-1A and thereafter the user's reselection of Index 00303-2A (This assumes the user has not check the box noted above as item 1WW).

Upon the user's reselection of New Public Notice Main Menu item they are re-linked to Index 00303-2A: Attorney Input Template list wherein they may select the Foreclosure by Advertisement (Torrens) select button and re-link to Index 00303-8A: Foreclosure by Advertisement (both [Abstract &Torrens]). At this point we begin our Figure and item discussion again.

FIG. 29, Index 00303-8A: Foreclosure by Advertisement (both [Abstract & Torrens]). FIG. 29, item 1C displays the input form title as Foreclosure by Advertisement (both). FIG. 29, item 1D provides the user a drop down menu choice to designate the month the mortgage was signed by the parties. FIG. 29, item 1E provides the user an input text entry box for the user to enter the day of the month the mortgage was signed by the parties. Item 1F provides the user an input text entry box for the entry of the year the mortgage was signed by the parties. Item 1G provides the user an input text entry box for the user to enter the dollar value amount of the original principal amount of the mortgage. Item 1H provides the user an input text entry box to enter either the first name and/or middle initial or the company name of the mortgagor. Item 1I provides the user an input text entry box to enter the last name of the mortgagor. Item 1J provides the user an input text entry box to enter the first name and/or middle initial of the mortgagor's spouse. Item 1K provides the user an input text entry box to enter the last name of the mortgagor's spouse.

Item 1L provides the user a drop down menu choice to designate the relationship, ownership, or entity type of the mortgagor (Single Person, Husband and Wife, Wife and Husband, Married Person, Unmarried Person, as Joint Tenants, as Tenants in Common, Single Proprietor, Limited Liability Corporation, Corporation, or Governmental Unit). Item 1M provides the user an input text entry box to enter the name of the mortgagee. Item 1N provides the user a drop down menu choice to designate the relationship, ownership, or entity type of the mortgagee (Single Person, Husband and Wife, Wife and Husband, Married Person, Unmarried Person, as Joint Tenants, as Tenants in Common, Single Proprietor, Limited Liability Corporation, Partnership, Corporation, Governmental Unit). FIG. 19, item 1O provides the user a drop down menu choice to designate the month the mortgage was recorded. Item 1P provides the user an input text entry box for entry of the day of the month the mortgage was recorded. Item 1Q provides the user an input text entry box for the entry of the year the mortgage was recorded. Item 1R provides the user an input text entry box for the entry of Place of recording of the mortgage. Item 1S provides the user an input text entry box for the entry of the document number assigned to the recording. Item 1T provides the user a drop down menu choice to designate the month the mortgage was registered. Item 1U provides the user an input text entry box for entry of the day of the month the mortgage was registered. Item 1V provides the user an input text entry box for the entry of the year the mortgage was registered. Item 1W provides the user an input text entry box for the entry of Place of registering of the mortgage. Item 1X provides the user an input text entry box for the entry of the document number assigned to the registration.

FIG. 30, Index 00303-8B: Foreclosure by Advertisement (both [Abstract & Torrens]). FIG. 30, Item 1Y not used. FIG. 30, item 1Z provides an input text entry box to enter the Mortgagee to whom the assignment of the mortgage has been made to. Item 1AA provides the user an input text entry box for the user to enter the month of the assignment of the mortgage. Item 1B provides the user an input text entry box for the user to enter the day of the month of the assignment of the mortgage. Item 1CC provides the user an input text entry box for the user to enter the year of the assignment of the mortgage. FIG. 30, item 1DD provides the user an input text entry box for the user to enter the month the assignment of mortgage was recorded or registered. Item 1EE provides the user an input text entry box for the user to enter the day of the month the assignment of mortgage was recorded or registered. Item 1FF provides the user an input text entry box for the user to enter the year the assignment of mortgage was recorded or registered. Item 1GG provides the user an input text entry box for the user to enter the Certificate of Title Document number given to the assignment of mortgage by the registering authority. Item 1HH provides the user an input text entry box for the user to enter the Place where the assignment of mortgage was registered. Note the mortgage may be assigned (transfer of ownership of the executed mortgage) many times in the course of the mortgage's term. Consequently, there may be many assignments of the mortgage, but only the current mortgagee holder of the mortgage may file for foreclosure under the terms of the mortgage. The process within this item provides a methodology for the transfer, the recording of same, and the public disclosure of the current mortgage holder. FIG. 30, item 1II provides the user an input text box for entry of the Certificate of Title Document number. Item 1JJ provides the user an input text entry box for the entry of the legal description of the foreclosed property. Item 1KK provides the user a drop down menu choice to designate the county in which the foreclosed property is located (system may also input this data). Item 1LL provides the user an input text entry box for the entry of the dollar value Amount due and claimed as of the date of the Notice, including taxes, if any, paid by the mortgagee.

FIG. 31, Index 00303-8C: Foreclosure by Advertisement (both [Abstract & Torrens]). FIG. 30, item 1MM provides the use a drop down menu choice to designate the month the Sheriff Sale in to take place. Item 1NN provides the user an input text entry box for the entry of the day of the month the Sheriff Sale is to take place. Item 1OO provides the user an input text entry box for the entry of the year the Sheriff Sale is to take place. FIG. 31, "Sheriff Calendar" button is indexed to Index 00303-9A: Sheriff's Calendar and details concerning this function will be inscripted therein.

FIG. 31, item 1PP provides the user an input text entry box for the entry of the time the Sheriff Sale is to take place. Item 1QQ provides the user an input text entry box for the entry of the morning (AM) or afternoon (PM) designation for the time the Sheriff Sale is to take place. Item 1RR provides the user an input text entry box for the entry of the place or street address the Sheriff Sale is to take place. Item 1SS provides the user an input text entry box for the entry of the City the Sheriff Sale is to take place. Item 1TT provides the user a drop down menu choice to designate the time period for redemption within of the Sheriff Sale by the mortgagee or their assigns from the date of said sale. Note FIG. 1 items 1D thru 1LL are common to Foreclosure by Advertisement actions or Lien Title Theory and to Trust actions or Land Title Theory, but Item 1NN is not an option available to the mortgagor in Trust actions or Land Title Theory. In fact options available to the mortgagor end with the Sheriff Sale. Item 1UU provides the user an input text entry box to enter the name of a mortgagor that has been release from financial obligation. Item 1VV provide the user a drop down menu choice to designate execution month of the Notice.

FIG. 31, item 1WW provides the user an input text entry box to enter the day of the month the Notice was executed. Item 1XX provides the user an input text entry box to enter the year the Notice was executed. Item 1YY provides the user an input text entry box to enter the individual attorney and/or their firm that under their power of attorney agreement with the filing mortgagee has created and is executing the Public Notice for publication. FIG. 31, 1ZZ provides the user an input text entry box to enter the attorney firm's file number relevant to the foreclosure action. FIG. 31, 1AAA provides the user a drop down menu choice to designate the Newspaper the Notice will be published in. FIG. 31, item 1BBB provides the user a drop down menu choice to designate the month the notice will be published in. Item 1CCC provides the user an input text entry box to designate the day of the month the notice will be published on. Item 1DDD provides the user an input text entry box to designate the year the notice will be published in.

FIG. 32, Index 00303-8D: Foreclosure by Advertisement (both [Abstract & Torrens]). FIG. 32, Item 1EEE displays the common site resource input title "Other Pertinent Data" not in the public notice. Items 1AAA thru 1RRR provide text entry boxes for data useful to the parties involved in the foreclosure or third parties having either responsibilities within the foreclosure process or interest in the process. These items are also searchable parameters within Index 00318-1A: Search Public Data Criteria. Item 1FFF provides the user an input text entry box for the Property ID (Identification) Number. Item 1GGG provides the user an input text entry box for the Property House Number. Item 1HHH provides the user an input text entry box for the Property Street Name. Item 1III provides the user an input text entry box for the Property City. Item 1JJJ provides the user an input text entry box for the Property Zip code. Item 1KKK provides the user an input text entry box for the Owner's Street Address. Item 1LLL provides the user an input text entry box for the Owner's City. Item 1MMM provides the user an input text entry box for the Owner's State. Item 1NNN provides the user an input text entry box for the Owner's Zip code. Item 1OOO provides the user an input text entry box for the Owner's E-mail address. Item 1PPP provides the user an input text entry box for the Owner's Phone Number. Item 1QQQ provides the user an input text entry box for the Owner's Fax Number. Item 1RRR provides the user a drop down menu to chose the Type of Property (Single Family, Commercial, Industrial, Land, Farm). Item 1A—submit button is displayed in screen 1 and screen 4 of 4. Upon the user's selection of the button the data inputted by the user is imported into Index 00303-3E: Submit button and Index 00303-3F: Submit button.

FIG, 12, Index 00303-3E: Submit button. Therein the imported data is displayed within Item 1RR in the manner in which it will display within the body of an email to the newspaper directing the newspaper to publish said Public Notice. Herein the user may make additional modification to the imported data display. Item 1SS provides the user an input text entry box for the newspapers email address. Item 1TT provides the user an input text entry box for the entry of the appropriate State Tax official to which the State Statutes may require notification of the foreclosure action. Item 1UU provides the user an input text entry box for the entry of the appropriate Federal Tax official to which the Federal Statutes or Regulations may require notification of the foreclosure action. Item 1VV provides the user an input text entry box for the entry "Other" third parties the user may have cause to notification of the foreclosure action. Item 1WW displays a check box that upon checking enables the user to cause return to Index 00302-2A: Attorney Input Template List rather than Index 00301-1A: Attorney category Main Menu. Item 1XX displays the "Submit & Email to Paper" button for user selection. Upon the user's selection the display text is saved within the application for display within the user's "View All Completed Public Notices" category, and emails the Public Notice to the email addresses provided for the newspaper, state tax entity, federal tax entity, and other interested party by the user. Item 1ZZ displays the "Submit (just save)" button for user selection. Upon the user's selection the displayed text is saved within the application for display with the user's "View All Completed Public Notices" category.

FIG. 13, Index 00303-3F: Submit button. FIG. 13, Item 1AAA displays the "Return to the Create Public Notice Screen to Modify or Correct items within this Specific Notice". Upon user selection the user is returned to input screen displayed before the user selected item 1A "Submit" button. Item 1BBB provides instructions to the user regarding the user's selection of item 1AAA. It states "Any manual entered data will be destroyed and will have to be re-entered if return is made". This refers to text entered or modified within item 1RR. Item 1B: Return to Main Menu is displayed within screen 1 and screen 4 of 4. Upon user selection, the user is linked to Index 00301-1A: Attorney category Main Menu. Note there is no direct return to Index 00303-2A: Attorney Input Template list except to return to Index 00301-1A and thereafter the user's reselection of Index 00303-2A (This assumes the user has not check the box noted above as item 1WW). Upon return to Index 00301-1A: Attorney category Main Menu the user must reselect New Public Notice to return to Index 00303-2A: Attorney Input Template list. At this point we discuss Index 00303-9A: Sheriff Cal, a common index within Indexes 00303-3A: Foreclosure by Advertisement (Abstract), Index 00303-7A: Foreclosure by Advertisement (Torrens), and Index 00303-8A: Foreclosure by Advertisement (both [Abstract & Torrens]). In general, Index 00303-9A allows the user to view the foreclosure sales already scheduled for Sheriff's Sale within the county of the foreclosed property, but also the foreclosures the user has scheduled in other counties. The reasons for this are two fold. First, Sheriff are attempting to utilize their personnel in an well-organized manner and consequently their departments may be able to realize some efficiencies utilizing this calendar system allowing them to use the efficiencies gain in other public service areas. Second, because the user is attempting to determine/secure a date and time for the foreclosure prior to publication Public Notice, they may find it beneficial to their schedules as well as the Sheriff schedule to choose a date with minimal sales scheduled. This may assist the user in the event they have more than one sale on the date in question. It may assist the user in the event the sale will be held in a rural county that conducts sales on specific days of the week or month and may require advance notice of the impending sale. This aspect is important because in Minnesota the sale must be held within 1 hour of the time and date published in the Public Notice. This condition may be present in other states and the Sheriff's Calendar may proof to be an important aid to the parties scheduling a Sheriff Sale and to those conducting the aforementioned Sale.

Upon return to index 00301-1A: Attorney category Main Menu the next user category in the Main Menu is "View All Completed Public Notices'. Upon the user's selection of this category they are linked to Index 00304-1A: View All Completed Public Notices. This index is comprised of all Public Notices entered by the various users associated with an Attorney account. Essentially what this means is that a particular account may have more than one user and each user therein may have received different permissions at the time their user account were established by the Administrator of the account (for more information see Index 00315-1A: New/Modify User Permission). At the minimum a user can view the foreclosure records they have created for the account within the system, with additional permission they can view the foreclosure records created by other users within the account. With this concept of permission in mind we begin the category discussion as follows:

FIG. 35, Index 00304-1A: View All Completed Notices is a display of completed foreclosure public notices within the system as completed by a specific user, a specific user group, or group of users. Our discussions herein relate to all users. FIG. 35, item 1A displays instructive text to the user in a red font color. It displays "Red text displays properties which are in transition between expired redemption period and archive". This text informs the user that foreclosures that have passed beyond their redemption period as input within the system by the user will remain in the active window portion of the system until the period set for such actions expires (see Index 0030. Thereafter, they will pass to the inactive portion of the system. A typical time period for the transition activities is thirty days (30) beyond the last day of the specific redemption inputted period. Item 1B displays the "Set All Print Checkboxes" button. Upon user selection of this button all individual check boxes for each individual record will be checked (see item 1Q) and upon selection of the print icon (see item 1T) will be sent to the local printer queue and printed. Item 1C displays the "Clear All Print Checkboxes" button. Upon user selection the action of this button will reverse the action of item 1B. Item 1D displays the "Return to Main Menu" button. Upon user selection they will be linked to Index 00301-1A: Attorney category Main Menu. Item 1E displays instructive text informing the user their selection of the above button action "This may take a little while". Item 1F displays the window title "Active Foreclosure List." Item 1G displays the column title "Print." Note user must select either item 1B or item 1Q, and thereafter the print icon item 1T and send the local printer queue to effectively complete this action. Item 1H displays the column title "Sheriff Sale Date" that displays the date of the Sheriff Sale in column. Note by mousing over the column title a hand will display indicating the user may select the title and toggle the column text in ascending or descending sort order. FIG. 35, item 1I displays the column title "Original Document Number" that displays the document number given to the mortgage or the docketing number given to the court action in column. Note by mousing over the column title a hand will display indicating the user may select the title and toggle the column text in ascending or descending sort order.

FIG. 35, item 1J displays the column title "Original Mortgage Date" that displays the date the mortgage was created or "no data" in the case of court action in column. Note by mousing over the column title a hand will display indicating the user may select the title and toggle the column text in ascending or descending sort order. Item 1K displays the column title "End of Redemption Time Period Date—Date of Notice" that first displays the end of the redemption time period end date and then displays the date of the notice first publication in column. Note by mousing over the column title a hand will display indicating the user may select the title and toggle the column text in ascending or descending sort order. Item 1L displays the column title "Attorney Firm" that displays the name of the attorney firm representing the mortgagee in column. Note by mousing over the column title a hand will display indicating the user may select the title and toggle the column text in ascending or descending sort order. Item 1M displays the column title "Mortgagor(s) that displays the name of the mortgagor or mortgagors in column. Note by mousing over the column title a hand will display indicating the user may select the title and toggle the column text in ascending or descending sort order. Item 1N displays the column title "Mortgagee" that displays the name of the mortgagee in column. Note by mousing over the column title a hand will display indicating the user may select the title and toggle the column text in ascending or descending sort order. Item 1O displays the column title "County" that displays the name of the county in which the foreclosure property is located in column. Note by mousing over the column title a hand will display indicating the user may select the title and toggle the column text in ascending or descending sort order. Item 1P displays the column title "View" that displays a "View" button for each record that upon selection of the individual button links to a summary screen for the specific record (see item 1U). Item 1Q displays the check box and text "Select to Print" that the user may select to print and thereafter upon their selection of the print icon item 1T is sent to the local printer queue for printing. Item 1R first displays the End of Redemption Time Period End Date and then displays the Date the Public Notice was first published. Item 1S displays the background color in a shade of red that indicates this particular foreclosure record is within the transition time period from active to archive. Item 1U designates an individual "View" button that upon user selection will link the user to Index 00304-2A: View Completed Public Notice. At this point we will discuss this index and then utilize the "Return to List" therein to return to this point in our discussion.

FIG. 37, Index 00304-2A: View Completed Public Notice. The purpose of this screen is to display in summary manner the foreclosure record data inputted during the specific creation of the Public Notice within the New Public Notice category. FIG. 37, item 1A displays the "Return to Menu" button that upon user selection returns them to Index 00301-1A Attorney category Main Menu. Item 1B will be discussed after item 1CC. Item 1C displays the window title "the current date—Foreclosure". Item 1D displays either the Document number or the Docketing number. Item 1E displays the name of the mortgagor(s). Item 1F displays the legal description of the published Public Notice property. Item 1G displays the date of the Original Mortgage date or Judgment date. Item 1H displays the date the Sheriff Sale occurred or was to occur. In the event of a Postponement it would display the date the Sale had been postponed to. Item 1I displays the redemption period as published. In the event of a Trust foreclosure this item would not display. Item 1J displays the end of redemption time period end date as calculated by the system. Item 1K displays the amount of the Original Mortgage as published if a mortgage, but if a Judgment displays $0.00 as the Judgment is a custom form. Item 1L displays the Sheriff Sale Amount if the sale has occurred. This is another example of data sharing amongst the various user categories (this information is imported from the Sheriff user category). Item 1M displays the person or entity the foreclosed property was "Sold To" at the Sheriff's Sale. In certain user categories the contact information for the buyer will be displayed. Item 1N displays the County that the foreclosed property is located in. Item 1O displays the State that the foreclosed property is located in. Item 1P displays the name of the filing Mortgagee.

FIG. 38, Index 00304-2B: View Completed Public Notice. FIG. 38, Item 1Q displays the name of the Mortgagee's legal firm. Item 1R displays the name of the attorney within the firm in item 1Q. Item 1S displays the attorney firm's telephone number. Item 1T displays the street address of the attorney firm. Item 1U displays the line 2 street address of the attorney firm. Item 1V displays the City, State, and Zip Code of the attorney firm. Item 1W displays the legal description of the Public Notice property. Item 1X displays the Sheriff's page number whereupon the Public Notice can be located within the Sheriff's foreclosure book at the Sheriff's office. Item 1Y displays the Original Mortgage Record Date as published in the Public Notice or the date 0/0/0 if a court action due to the custom form needed for most court actions. Item 1Z displays the County Market Value less the amount the property sold for at Sheriff Sale. This value may give certain users an assessment perspective on the property. Item 1AA displays the County most recent sale price. Again, this value may give certain users an assessment perspective on the property. Item 1BB displays the local Multiple Listing Service (MLS) List Price, if listed. Again, this value may give certain users an assessment perspective on the property. Item 1CC displays the printer icon that upon user selection sends all item with a check box checked to the local printer queue for printing (this assumes a printer is attached to the local machine, although within some operating system the user may be able to select a network printer in the event one is setup to print to). Item 1B displays the "Return to List" button. Upon the user's selection of this button the user is returned to Index 00304-1A: View All Completed Public Notice wherein the user may select another Public Notice for viewing. Assuming the user has chosen this button, we will begin anew our discussion of Index 00304-1B: View All Completed Public Notices.

FIG. 37, Index 00304-1B: View All Completed Public Notices. Item 1TT displays the printer icon that upon user selection sends all item with a check box checked to the local printer queue for printing (this assumes a printer is attached to the local machine, although within some operating system the user may be able to select a network printer in the event one is setup to print to). FIG. 37, 'Search Pubic Data Criteria" button is displayed at the top left and bottom left of the scrollable screen. Please see FIG. 98, Index 00318-1A: Search Public Data Criteria for a discussion of this button's function. FIG. 37, item 1D displays the "Return to Main Menu" button. Upon user selection they will be linked to Index 00301-1A: Attorney category Main Menu.

The next discussion relates to the Attorney's Main Menu item "Calendar of Sheriff's Sales". After our discussion of this index we will discuss Index 00303-9A: Sheriff Cal a similar index the application utilizes as the "Sheriff Calendar" button within Indexes 00303-4C, 00303-7C, and 00303-8C.

The Sheriff Calendar is a vehicle that travels many roads. On the Sheriff side it can be a tool to organize the personnel needed to conduct a Sheriff Sale. A discussion of these objectives will be presented within the Sheriff User Category. For user who must schedule a Sheriff Sale it is also a tool that permits the user to view the number of Sheriff Sales scheduled for the date in question in the County of the foreclosed property, but also the Sheriff Sales the user has scheduled for the date in other counties on the date in question as well as other days of the month. Given this back ground let us begin the discussion with the Attorney User Category Index 00302-1A: Calendar of Sheriff Sales. This input form is linked to the Attorney's Main Menu item Calendar of Sheriff's Sales, and upon the user's selection of this category they are linked to Index 00302-1A: Calendar of Sheriff's Sales and its associated item numbers.

FIG. 12, Index 00302-1A: Calendar of Sheriff Sales. In general this Index is color coded to display a number of task and functions within the index. FIG. 12, item 1A displays the "Return to Menu" button that upon user selection returns the user to the Attorney's Main Menu. Item 1B displays the user instructive text "The month with the green background in the center is the month being displayed below. Mouse on other months to display them. If one uses the mouse on a document number, it will take you to a display of that foreclosure." In this case the month of January 2005 noted as item 1E is displayed with the green background (the author is unaware if patent review process accepts color prints and as such all prints are black and white). The months of November 2004 noted as item 1C, December 2004 noted as item 1D, February 2005 noted as item 1F, and March 2005 noted as item 1G are displayed with tan backgrounds. The term "mouse on" defines the user's cursor action when its position is changed to bring it immediately over an object. In this case the cursor changes from an arrow to a hand indicating the user may select the object over which the hand is positioned, and upon selecting an object so positioned linked to the displayed month or to the document display for the document number and county object chosen by the user.

Items 1C, 1D, 1E, 1F, and 1G all link to the calendar month display. As such we can discuss one month and receive the knowledge for all of them. Accordingly, the month of January 2005 is the currently displayed month and we utilize it for discussion purposes. The calendar displays the list of days of the week horizontally across the top of the vertical day columns. Next, from left to right beneath each day except "sat" are grey column cells that have no markings except a plus sign within them. These cells represent blank or filler cells to indicate or position the first day of the month that in this case is the 1$^{st}$ of the month that falls on a Saturday and thereafter days are numerical sequenced within the day columns. Note that the days Sunday (sun or item 1H) and Saturday (sat or item 1N) are lower case abbreviations (1st, 2nd, 8th, 9th, 15th, 16th, 22nd, 23rd, 29th, and 30th). Because there are no Sheriff Sales on these days the application devalues the names by the lower case designations (all other days have capitalized abbreviations item 1I, 1J, 1K, 1L, and 1M). Item 1P displays a county and a document number "Scott" and "A635831" that when moused over and selected links the user to Index 00304-2A: View Completed Public Notice and Index 00304-2B: View Completed Public Notices. Please see these index discussions for further details.

FIG. 6, Index 00302-1B: Calendar of Sheriff Sales. FIG. 6, item 1Q displays instructive text for the user "Days with this color background are before today". The color background is a light pink that indicates the dates are prior to "today's" date (3rd, 4th, 5th, 6th, 7th, and 10th). Item 1R display instructive text for the user "Today has this color background". The background color is white and the date is the 11$^{th}$ Item 1S displays instructive text for the user "Days with this color background are after today". The color background is a light green and the dates are in the future (12$^{th}$, 13$^{th}$, 14$^{th}$, 17$^{th}$, 18$^{th}$, 19$^{th}$, 20$^{th}$, 21$^{st}$, 24$^{th}$, 25$^{th}$, 26$^{th}$, 27$^{th}$, 28$^{th}$, and 31$^{st}$). Item 1T In addition to the lower case text the vertical columns are color coded with a reddish background to also indicate no Sheriff Sales on these dates of the month. At this point we discuss the similar Index 00303-9A: Sheriff Cal and Index 00303-9B: Sheriff Cal that are available to the user within some of the Template List such as Indexes 00303-4C, 00303-7C, and 00303-8C.

FIG. 33, Index 00303-9A: Sheriff Cal. In general this Index is color coded to display a number of task and functions within the index. This Index displays the County the user selected to locate the foreclosed property within during the Public Notice creation. FIG. 33, item 1A displays the "Release Calendar" button that upon user selection returns the user to the New Public Notice Template List it the Sheriff's Calendar was called from. Item 1B displays the user instructive text "County (inputted by the system). The month with the green background in the center is the month being displayed below. Mouse on the other months to display them. If you mouse on a document number, it will take you to a display of that foreclosure." In this case the month of January 2005 noted as item 1E is displayed with the green background (the author is unaware if patent review process accepts color prints and as such all prints are black and white). The months of November 2004 noted as item 1C, December 2004 noted as item 1D, February 2005 noted as item 1F, and March 2005 noted as item 1G are displayed with tan backgrounds. The term "mouse on" defines the user's cursor action when its position is changed to bring it immediately over an object. In this case the cursor changes from an arrow to a hand indicating the user may select the object over which the hand is positioned, and upon selecting an object so positioned linked to the displayed month or to the document display for the document number and county object chosen by the user.

Items 1C, 1D, 1E, 1F, and 1G all link to the calendar month display. As such we can discuss one month and receive the knowledge for all of them. Accordingly, the month of January 2005 is the currently displayed month and we utilize it for discussion purposes. The calendar displays the list of days of the week horizontally across the top of the vertical day columns. Next, from left to right beneath each day except "sat" are grey column cells noted as item 10 that have no markings except a plus sign within them. These cells represent blank or filler cells to indicate or position the first day of the month that in this case is the 1$^{st}$ of the month that falls on a Saturday and thereafter days are numerical sequenced within the day columns. Note that the days Sunday (sun or item 1H) and Saturday (sat or item 1N) are lower case abbreviations (1st, 2nd, 8th, 9th, 15th, 16th, 22nd, 23rd, 29th, and 30th). Because there are no Sheriff Sales on these days the application devalues the names by the lower case designations (all other days have capitalized abbreviations item 1I, 1J, 1K, 1L, and 1M).

Item 1P displays a document number "351548" that when moused over and selected links the user to Index 00304-2A: View Completed Public Notice and Index 00304-2B: View Completed Public Notices. Please see these index discussions for further details.

FIG. 6, Index 00302-1B: Calendar of Sheriff Sales FIG. 6, item 1Q displays instructive text for the user "Depending on the Publication schedule of the publishing newspaper the color white represents the end of the six week redemption period". The background color is white and the redemption period will depend on the redemption period chosen within the Public Notice template. Item 1R display instructive text for the user "Days with this color background are before today"; The background color is light pink (3$^{rd}$, 4$^{th}$, 5$^{th}$, 6$^{th}$, 7$^{th}$, 10$^{th}$, 11$^{th}$, 12$^{th}$, 13$^{th}$, 14$^{th}$, 17$^{th}$, 18$^{th}$, 19$^{th}$, 20$^{th}$, 21$^{st}$, 24$^{th}$, 25$^{th}$, 26$^{th}$, 27$^{th}$, 28$^{th}$, and 31$^{st}$). Item 1S displays instructive text for the user "Days with this color background are after today". The color background is a light green and the dates are in the future (none displayed). Item 1T In addition to the lower case text the vertical columns are color coded with a reddish background to also indicate no Sheriff Sales on these dates of the month. Our discussion now returns to the Attorney's Main Menu and the next user function "Affidavit of Costs and Disbursements". Upon the user's selection of this category they are linked to FIG. 35, Index 00305-1A: Affidavit of Costs and Disbursements, FIG. 35, and its associated item numbers. The filing mortgagee's attorney must file an affidavit of Costs and Disbursements within 10 days of the Sheriff's Sale, and is generally filed at the same time the Sheriff's Certificate of Sale is filed. The Affidavit of Costs and Disbursements details the moneys expended by the attorney to effect the foreclosure. Some of these costs may have dollar values established within state statutes that may not be exceeded such as attorney fees within the state of Minnesota. Other costs must be assessed without profit margin recovery. All of the costs in the Affidavit of Costs and Disbursements will be totaled and added to the amount sold for at the Sheriff's Sale. In general the costs herein are recoverable expenses the filing mortgagee has paid to effect the foreclosure.

FIG. 35, Index 00305-1A: Affidavit of Costs and Disbursements. FIG. 35, item 1A displays the "Search Public Data Criteria" that will be discussed within Index 00318-1A: Search Public Data Criteria as noted in the See FIG. 98, Index 00318-1A comment. Item 1B displays the "Set All Print Checkboxes" button. Upon user selection of this button all records that have a "Select to Print" checkbox as noted in item 1Q will be selected. This button has been provided to assist the user in quickly selecting all of the records available for printing. See discussion for item 1Q for further details. Item 1C displays the "Clear All Print Checkboxes" button. Upon user selection of this button all records that have been selected for printing by either utilization of the "Set All Print Checkboxes" button or by individual selection of the checkbox noted by item 1Q are cleared and not printable. This button has been provided to assist the user in quickly clearing all print checkboxes. Item 1D displays the "Return to Main Menu" button. Upon user selection of this button they are linked to Index 00301-1A: Attorney category Main Menu. Thereupon they may select another category if they so desire. Item 1E displays the instructive text "This may take a little while" that notifies the user their selection may require a small period of time to complete. Item 1F displays the window title "Menu for Affidavit of Costs And Disbursements". Item 1G displays the column title "Print". Note user must select either item 1B or item 1Q, and thereafter the print icon item 1OO to send the chosen records to the local printer queue to effectively complete this action. This assumes a local printer has been attached and setup. Some organizations may have network printers setup and the user may have rights to print to the network printer. Item 1H displays the column title "Sheriff Sale Date" that displays the date of the Sheriff Sale in column. Note by mousing over the column title a hand will display indicating the user may select the title and toggle the column text in ascending or descending sort order. Item 1I displays the column title "Original Document Number" that displays the document number given to the mortgage or the docketing number given to the court action in column. Note by mousing over the column title a hand will display indicating the user may select the title and toggle the column text in ascending or descending sort order. Item 1J displays the column title "Original Mortgage Date" that displays the date the mortgage was created or "no data" in the case of court action in column. Note by mousing over the column title a hand will display indicating the user may select the title and toggle the column text in ascending or descending sort order. Item 1K displays the column title "End of Redemption Time Period Date—Date of Notice" that first displays the "End of the Redemption Time Period" end date and then displays the date of the notice's first publication in column. Note by mousing over the column title a hand will display indicating the user may select the title and toggle the column text in ascending or descending sort order. Item 1L displays the column title "Attorney Firm" that displays the name of the attorney firm representing the mortgagee in column. Note by mousing over the column title a hand will display indicating the user may select the title and toggle the column text in ascending or descending sort order. Item 1M displays the column title "Mortgagor(s) that displays the name of the mortgagor or mortgagors in column. Note by mousing over the column title a hand will display indicating the user may select the title and toggle the column text in ascending or descending sort order. Item 1N displays the column title "County" that displays the name of the county in which the foreclosure property is located in column. Note by mousing over the column title a hand will display indicating the user may select the title and toggle the column text in ascending or descending sort order. Item 1O displays the column title "Select" that displays a "Create" or Modify button for each record that upon selection of the individual button links to the Create (item 1R) or Modify (item 1S) screen for the specific record. Item 1P displays the instructional text "No Affidavit". This text is utilized to instruct the user, along with the individual record "Create" button, that the Affidavit of Costs and Disbursements document has not been created for the record in this column that displays this text. Item 1Q displays the check box and text "Select to Print" that the user may select to print and thereafter upon their selection of the print icon item 1OO is sent to the local printer queue for printing. This assumes a local printer has been attached and setup. Some organizations may have network printers' setup and the user may have rights to print to the network printer. Item 1R displays the individual record "Create" button whereupon user selection they are linked to Index 00305-1B: Affidavit of Costs and Disbursements input/modify screen. The "Create" button displays only when the user has not previously created a Affidavit of Costs and Disbursements. Item 1S displays the individual record "Modify" button whereupon user selection they are linked to FIG. 39, Index 00305-1B: Affidavit of Costs and Disbursements input/modify screen. The "Modify" button displays only if the user has previously created a Affidavit of Costs and Disbursements.

FIG. 39, Index 00305-1B: Affidavit of Costs and Disbursements. FIG. 39, item 1T displays the "Update DB and return to List" button. Upon user selection the data inputted by user (item 1R) or data modified by user (item 1S) is saved within the database and is made available to print and or modify. Item 1U displays the "Return to Main Menu" button whereupon user selection the user is linked to Index 00301-1A: Attorney category Main Menu. Item 1W displays the individual Attorney within the filing Mortgagee's Attorney Firm. Item 1X displays an input text entry box for the user to enter a dollar value for the Attorney Fees for foreclosing said mortgage if an input and may be modified within the modify operation. Item 1Y displays an input text entry box for the user to enter a dollar value for the Publication of said mortgage if an input and may be modified within the modify operation. Item 1Z displays an input text entry box for the user to enter a dollar value for the Recording Fee of said mortgage if an input and may be modified within the modify operation. Item 1AA displays an input text entry box for the user to enter a dollar value for the Service Fee of said mortgage if an input and may be modified within the modify operation. Item 1BB displays an input text entry box for the user to enter a dollar value for the Sheriff's Sale Fee of said mortgage if an input and may be modified within the modify operation. Item 1CC displays an input text entry box for the user to enter a dollar value for the Recording Certificate Fee of said mortgage if an input and may be modified within the modify operation. Item 1DD displays an input text entry box for the user to enter a dollar value for the Abstracting Fee of said mortgage if an input and may be modified within the modify operation. Item 1EE displays an input text entry box for the user to enter a dollar value for the Name Search Fee of said mortgage if an input and may be modified within the modify operation. Item 1FF displays an input text entry box for the user to enter a dollar value for the Title Search Fee of said mortgage if an input and may be modified within the modify operation. Item 1GG displays two input text entry box for the user to first enter a text description of the second text entry box, then a dollar value for the Custom Fee of said mortgage if an input and may be modified within the modify operation. Note if the user enters the same Custom Fee description twice is will become listed category item. Item 1HH displays an input text entry box for the user to enter a dollar value for the Sum of All Categories of said mortgage if an input and may be modified within the modify operation.

FIG. 40, Index 00305-1C: Affidavit of Costs and Disbursements. FIG. 40, item 1II displays a signature line for the individual attorney noted in item 1W to sign the Affidavit of Costs and Disbursements when printed for signature and recording. Item 1JJ provides a space for a Public Notary to affix their stamp. Item 1KK provides a text entry box for the user to enter the date the month the Notary affixed their stamp and signature. Item 1LL provides a text entry box for the user to enter the month the Notary affix their stamp and signature. Item 1MM provides a text entry box for the user to enter the year the Notary affix their stamp and signature.

FIG. 42, Index 00305-1D: Affidavit of Costs and Disbursements. FIG. 41, item 1NN provides a display of the ascending/descending sort function upon the user's selection of the column heading to toggle the sort display order. Item 1OO displays the printer icon that upon user selection sends all item with a check box checked to the local printer queue for printing (this assumes a printer is attached to the local machine, although within some operating system the user may be able to select a network printer in the event one is setup to print to). Again, Item 1D "Return to Main Menu" is displayed. Upon the user's selection they are linked to Index 00301-1A: Attorney category Main Menu whereupon the user may select another category. Our discussion now returns to the Attorney's Main Menu and the next user function "Create Sheriff Sale Certificate". Upon the user's selection of this category they are linked to FIG. 44, Index 00306-1A: Create Sheriff's Sale Certificate, FIG. 44, and its associated item numbers. Note that within Minnesota the filing mortgagee's attorney usually prepares the Sheriff Sale Certificate as most often the Mortgagee will be the only bidder on the foreclosed property and as such it has become custom for the Mortgagee's Attorney to complete this document prior to the sale. Consequently, when there are additional bidders who enter the bid process and successfully bid the most often followed procedure is to hand modify the Sale Certificate the Mortgagee's Attorney has brought with the name, amount of successful bid, and contact information for the successful bidder. Pursuant to statute the certificate must include 1) a description of the mortgage, 2) a description of the property sold, 3) The price paid for each parcel, 4) The time and place of the sale and the name of the purchaser, and 5) The time allowed by law for redemption. The Sheriff's Certificate must be recorded within 20 days of the sale except for certain vacant properties and voluntary foreclosures, and is generally filed with the Affidavit of Costs that must be filed within 10 days of the sale.

FIG. 44, Index 00306-1A: Create Sheriff's Sale Certificate. FIG. 44, item 1A displays the window title as "Foreclosure List to Create Sale Certificate." Item 1B displays the column heading "Sheriff's Sale Date" thereunder is listed the Sheriff Sale Dates of the various foreclosed properties. Note by mousing over the column title a hand will display indicating the user may select the title and toggle the column text in ascending or descending sort order. Item 1C displays the column heading "Original Mortgage Document Number" thereunder is listed the original mortgage document numbers. Note by mousing over the column title a hand will display indicating the user may select the title and toggle the column text in ascending or descending sort order. Item 1D displays the column heading "Original Mortgage Record Date" thereunder is listed the original mortgage record dates. Note by mousing over the column title a hand will display indicating the user may select the title and toggle the column text in ascending or descending sort order. Item 1E displays the column heading "Attorney Firm" thereunder is listed the attorney firm representing the mortgagee. Note by mousing over the column title a hand will display indicating the user may select the title and toggle the column text in ascending or descending sort order. Item 1F displays the column heading "Mortgagor(s)" thereunder is listed the mortgagor(s) of the foreclosed property. Note by mousing over the column title a hand will display indicating the user may select the title and toggle the column text in ascending or descending sort order. Item 1G displays the column heading "County" thereunder is listed the county that the foreclosed property is located in. Note by mousing over the column title a hand will display indicating the user may select the title and toggle the column text in ascending or descending sort order. Item 1I displays the "Return to Main Menu" button that upon user selection returns them to Index 00301-1A: Attorney category Main Menu.

FIG. 44, item 1H displays the column heading "Create Sheriff's Sale Certificate" thereunder is a mouse over button titled "Create Certificate" for each record line. Upon selection of the button the user is linked to FIG. 45, Index 00306-1B: Create Sheriff's Sale Certificate.

FIG. 45, Index 00306-1B: Create Sheriff's Sale Certificate. FIG. 45, item 1J will display the system imported designated State of "State" which is the Current Active State. In addition the system imports other data that relates directly to the Current Active State such as the current active Sheriff of the active county. Item 1K displays the system imported Mortgage Document No. "Test 1234" that is a direct result of the user's selection of a specific record's "Create Certificate" button. Other data is also imported by the system as a result of the user's selection of a specific record's Create Certificate button. The following are also imported: Date of Mortgage, Mortgagor(s), Mortgagee, Date and Place of Recording, Date and Time of Sale, Place of Sale, Legal Description, County in that the property is located in, redemption period. Item 1L displays the system imported Jan. 1, 2005 due to the selection of a specific record's "Create Certificate" button.

FIG. 46, Index 00306-1C: Create Sheriff's Sale Certificate. FIG. 46, item 1M displays data imported from other user category input that has been designated as importable and displayable to the current user. For example, "Highest and Best Bidder" and "Bid Amount" are imported and displayed from input generated by a Sheriff User account.

FIG. 47, Index 00306-1D: Create Sheriff's Sale Certificate. FIG. 47, Item 1N displays the signature line for the Sheriff's Deputy who conducted the sale. Again, this information may be imported from another user category such as a Sheriff User account. For example "Jan. 1, 2005" and "John P. Villerius" are imported by the system for display within the text concerning when and whom the Notary Public is attesting to within this specific Sheriff's Sale Certificate as noted at FIG. 1, item 1O. FIG. 47, Item 1P displays the "Return to Main Menu" button that upon user selection returns the user to the Attorney's Main Menu. Item 1Q displays the printer icon that upon user selection to the local printer queue for printing (this assumes a printer is attached to the local machine, although within some operating system the user may be able to select a network printer in the event one is setup to print to). Upon return to the Attorney's Main Menu and user again selecting the Create Sheriff's Sale Certificate category to re-link to FIG. 47, Index 00306-1E: Create Sheriff's Sale Certificate input form. The user can visually observe the foreclosure list has been reduced by two records when compared to the initial Index 00306-1A: Create Sheriff's Sale Certificate input form. The records that are now not displaying herein have been transferred to Index 00307-1A: View Sheriff's Sale Certificates; please see this index hereinafter.

FIG. 48, Index 00306-1F: Create Sheriff's Sale Certificate displays the first index of Index 00318-1A (please see FIG. 98, Index 00318-1A: Search Public Notice List Criteria for the complete discussion of this index). It displays a single user designated choice within the county drop down menu of "Anoka" noted as item 1R. Upon the users' selection of the search button the results of this single parameter search are displayed within (FIG. 50) Index 00306-1G: Create Sheriff's Sale Certificate. This exercise displays an additional methodology to locate a specific property and thereafter select the "Create Certificate" button in the event the "record" has been mistakenly removed or had the user execute another procedure in error thus enabling the user to recover from the error.

Previously herein our discussion stated a "created" Sheriff's Sale Certificate was transferred to (FIG. 51) Index 00307-1A: View Sheriff's Sale Certificates. This index is accessed within the Attorney's Main Menu. Upon the user's selection of the View Sheriff's Sale Certificates category in the Attorney's Main Menu the user is linked to (FIG. 51) Index 00307-1A: View Sheriff's Sale Certificates and its associated FIG. 51 and item numbers.

FIG. 51, Index 00307-1A: View Sheriff's Sale Certificates. FIG. 51, item 1A displays the window title "Sheriff's Sale Certificate List". Item 1B displays the column title "Date of Certificate" or the date the Certificate was created within the column. Note by mousing over the column title a hand will display indicating the user may select the title and toggle the column text in ascending or descending sort order. In this case the date is Jan. 1, 2005. Item 1C displays the column title "First Mortgagor" or the first name and last name of the mortgagor within the column. Note by mousing over the column title a hand will display indicating the user may select the title and toggle the column text in ascending or descending sort order. In this case Felicia Jamerson. Item 1D displays the column title "County" where the foreclosed property is located within the column. Note by mousing over the column title a hand will display indicating the user may select the title and toggle the column text in ascending or descending sort order. In this case Hennepin. Item 1G displays a "Return to Main Menu" button. Upon user selection of this button they are linked to the Attorney's Main Menu. Item 1E displays the column title "Select Certificate to View" and within the column provides an individual mouse over "View" button noted as item 1F for each certificate record. Upon user selection, the user is linked to (FIG. 52) Index 00307-1B: View Sheriff's Sale Certificate.

FIG. 52, Index 00307-1B: View Sheriff's Sale Certificate displays the selected foreclosure record executed Sheriff's Sale Certificate. Note item 1H and 1I have not been utilized in these indexes. Item 1J displays the imported Sheriff's Name, County and State. Item 1K displays the imported Document Number for the foreclosure record. Item 1L displays the date the Sheriff's Sale Certificate was created.

FIG. 53, Index 00307-1C: View Sheriff's Sale Certificate. FIG. 53, item 1J displays system inputted data that in this case is the Name of the Sheriff and thereafter the County in which the named party is the Sheriff as well as the location of the foreclosed property. This data is imported from subscription data inputted or required of the user category during subscription. FIG. 53, multiple item 1K displays the imported Date of Mortgage "0, 0" (although imported correctly this designation indicates this foreclosure may have been a Foreclosure by Action perfected through the court system such as a Judgment Lien that would have a docketing number as the unique record identifier due to the court action). In sequence the following items noted as item 1K are imported and displayed within the Certificate: Mortgagor(s), Mortgagee, Date and Place of recording, Date and Time of Sale, Place of Sale, Legal Description of foreclosed property, County in which the property is located, and Redemption period. Item 1M displays data the system has imported from input by other user categories such as a user within the Sheriff's Category. This data is imported from user input in other categories. In this foreclosure record the Highest and Best Bidder data is imported from sheriff user input; Bid Amount is imported from sheriff user input; Redemption period is imported from attorney user input.

FIG. 54, Index 00307-1D: View Sheriff's Sale Certificate. FIG. 54, item 1N provides a line for the Sheriff's Deputy conducting the sale to provide their signature upon the printing of the Sheriff's Sale Certificate. Item 10 provides a line for the Notary of Public to affix their stamp after the printing of the Sheriff's Sale Certificate. Item 1P displays the "Return to Main Menu" button that upon user selection returns the user to Index 00301-1A: Attorney category Main Menu. Item 1Q displays the printer icon that upon user selection sends the Sheriff's Sale Certificate to the local printer queue for printing (this assumes a printer is attached to the local machine, although within some operating system the user may be able to select a network printer in the event one is setup to print to). The next discussion item on the Attorney's Main Menu is the Reinstate from Public Notice List (cancel). Reinstatement prior to the sale may be made by 1) the mortgagor(s) or assigns; or any person with a legal or equitable ownership interest; 2) the holder of a junior encumbrance, judgment, or lien; 3) may be made through the mortgagee, the attorney for the mortgagee, or the county sheriff. Reinstatement must pay the amount actually due and constituting the default at the time of commencement of the foreclosure proceedings including insurance, delinquent taxes, interest to the date of payment and attorneys' fees incurred and reasonable costs incurred in the proceeding as defined by statute. The end result of reinstatement is to make the mortgagee whole under the terms and conditions of the mortgage and thereafter permits the continuance of the mortgage by the mortgagor(s) under the terms of the mortgage as defined therein. Reinstatement removes the property from the foreclosure/pubic notice list within our application, as well as canceling scheduled Sheriff Sales upon the reinstatement. Most reinstatements occur between the mortgagee's attorney and the mortgagor(s). This application process permits the mortgagee's attorney to enter the reinstatement into the application for sharing of the data and removal from the Sheriff Sale process. This discussion explains why the Attorney's Main Menu category Reinstate from Public Notice List includes the notation cancel in parentheses (cancel) referring to the action that occurs within the system. It should be noted that under reinstatement any junior encumbrances remain in place. Again, it is noted that the requirements state herein are within our example state the State of Minnesota. Other states may have similar or dissimilar requirements. Upon the user's selection of the Reinstate from Public Notice List (cancel) category from Index 00301-1A: Attorney's category Main Menu they are linked to (FIG. 55) Index 00308-1A: Reinstate from Public Notice List (cancel), FIG. 1 and its associated item numbers.

FIG. 55, Index 00308-1A: Reinstate from Public Notice List (cancel). FIG. 55, Item 1A displays the window title "Reinstate List." Item 1B displays the column title "Sheriff's Sale Date in which column the Sheriff's Sale date is displayed for each record. Note by mousing over the column title a hand will display indicating the user may select the title and toggle the column text in ascending or descending sort order. Item 1C displays the column title "Original Mortgage Document Number" in which column the Original Mortgage Document Number is displayed for each record that is a mortgage foreclosure by advertisement. Other types of foreclosure by advertisement may be displayed in this list, and because the system imports only the mortgage document number at this time the document number is not displayed but rather a "No Data" message which indicates to the user to verify the reinstatement procedure before choosing this record for reinstatement. At this time the actual reinstatement is conducted outside the system, and as previously noted herein the system only function at this time is to provide the user a method to withdraw the record from the Sheriff Sale process online. Note by mousing over the column title a hand will display indicating the user may select the title and toggle the column text in ascending or descending sort order. Item 1D displays the column title "Original Mortgage Record Date" in which column the recording date is displayed for a mortgage foreclosure by advertisement. Note by mousing over the column title a hand will display indicating the user may select the title and toggle the column text in ascending or descending sort order. Item 1E displays the column title "Attorney Firm" in which column the Attorney Firm prosecuting the action is displayed. Note by mousing over the column title a hand will display indicating the user may select the title and toggle the column text in ascending or descending sort order. Item 1F displays the column title "Mortgagor(s) in which column the Mortgagor(s) name is displayed. Note by mousing over the column title a hand will display indicating the user may select the title and toggle the column text in ascending or descending sort order. Item 1G displays the column title "County" in which column the county name where the property is located is displayed. Note by mousing over the column title a hand will display indicating the user may select the title and toggle the column text in ascending or descending sort order. FIG. 55, see Index 00318-1A refers the reader to the specific index for details regarding the Search Reinstate List Criteria. Item 1I displays the "Return to Main Menu" button whereupon the user's selection they are returned to Index 00301-1A: Attorney category Main Menu. Item 1H displays the column title "Select Notice to Reinstate" in which column a mouse over "Reinstate" button for each record is displayed. Upon the user's selection of a specific record's Reinstate button they are linked to (FIG. 56) Index 00308-1B: Reinstate from Public Notice List, FIG. 1 and its associated item numbers.

FIG. 56, Index 00308-1B: Reinstate from Public Notice List. FIG. 56, item 1J displays the window title query "Are You Sure You Want To Reinstate?" Because the action herein is not reversible by the user; the system posses the query to remind the user of the importance of their choice herein. Item 1K displays the "Yes, Reinstate' button. Upon the user's selection the record is removed from the Sheriff Sale process and the record is transferred to Index 00309-1A: View Reinstated List. Item 1L displays the "No, Don't Reinstate" button. Upon the user's selection the user is re-linked to Index 00308-1A: Reinstate from Public Notice List. Item 1M displays the "Return to Main Menu" button. Upon the user's selection they are linked to Index 00301-1A: Attorney category Main Menu.

FIG. 57, Index 00308-1C: Reinstate from Public Notice List displays the results of a Reinstatement. Note the Mortgagor Bradley McClintok is not displayed. Upon the user's return to Index 00301-1A: Attorney category Main Menu the user may choose the "View Reinstated List" category and thereafter linked to Index 00309-1A: View Reinstated List, its FIG. 1 and associated item numbers. Index 0030901A: View Reinstated List. Item 1A displays the window title "Reinstated (Canceled List) List. Item 1B displays the column title "Sheriff's Sale Date" in which column the date of the Sheriff Sale Date is displayed. Note this date is the date the Sale would have been conducted, if not for it being reinstated. Note by mousing over the column title a hand will display indicating the user may select the title and toggle the column text in ascending or descending sort order. Item 1C displays the column title "Original Mortgage Document Number" in which column the Original Mortgage Document Number is displayed for each record that is a mortgage foreclosure by advertisement. Other types of foreclosure by advertisement may be displayed in this list, and because the system imports only the mortgage document number at this time the document number is not displayed but rather a "No Data" message which indicates to the user to verify the reinstatement procedure before choosing this record for reinstatement. At this time the actual reinstatement is conducted outside the system, and as previously noted herein the system only function at this time is to provide the user a method to withdraw the record from the Sheriff Sale process online. Note by mousing over the column title a hand will display indicating the user may select the title and toggle the column text in ascending or descending sort order. Item 1D displays the column title "Original Mortgage Record Date" in which column the recording date is displayed for a mortgage foreclosure by advertisement. Note by mousing over the column title a hand will display indicating the user may select the title and toggle the column text in ascending or descending sort order. Item 1E displays the column title "Attorney Firm" in which column the Attorney Firm prosecuting the action is displayed. Note by mousing over the column title a hand will display indicating the user may select the title and toggle the column text in ascending or descending sort order. Item 1F displays the column title "Mortgagor(s) in which column the Mortgagor(s) name is displayed. Note by mousing over the column title a hand will display indicating the user may select the title and toggle the column text in ascending or descending sort order. Item 1G displays the column title "County" in which column the county name where the property is located is displayed. Note by mousing over the column title a hand will display indicating the user may select the title and toggle the column text in ascending or descending sort order. FIG. 98, see Index 00318-1A refers the reader to the specific index for details regarding the Search Reinstate List Criteria. Item 1I displays the "Return to Main Menu" button whereupon the user's selection they are returned to Index 00301-1A: Attorney category Main Menu. Item 1H displays the column title "Select Reinstated Notice" in which column a mouse over "Select" button for each record is displayed. Upon the user's selection of a specific record's Select button they are linked to Index 00309-1B: View Reinstated List.

FIG. 59, Index 00309-1B: View Reinstated List. FIG. 59, Index 00309-1B and FIG. 60, Index 00309-1C imports from the system and displays the inputted data relevant to the Bradley McClintock record. Item 1J displays the window title "Jan. 1, 2005—Reinstatement." Item 1K imports from the system and displays the Judgment document number for the Bradley McClintock record (see Item C discussion for additional detail relative to this item). Additional item are noted as item 1K all of which are input imported and displayed within Index 00309-1B and 00309-1C. The following data inputs are noted as item 1K and item 1L indicating they have been imported by the system:

Property Owner
Legal Description
Sheriff Sale Date *
End of Redemption Time period End date *
Original Mortgage Amount
Sheriff Sale Amount *
Sheriff Sale Sold to *
County of Property
State of Property
Mortgagee
Legal Firm
Attorney
Attorney's Phone
Attorney's Address Within FIG. 60, Index 00309-1C the following:

Notice

Sheriff's Page Number

Original Mortgage Record Date

County Market Value Less Sheriff Sale Amount

County Most Recent Sale Price

MLS List Price, if listed *

* Indicates inputs that are not valid as a result of the Reinstatement, but are previous inputs or potential inputs for the specific record.

Item 1M displays the "Return to List" button that upon user selection returns the user to (FIG. 58) Index 00309-1A: View Reinstated List. Item 1N displays the print icon that upon user selection will print the display in Indexes 00309-1B and 00309-1C to the local printer (if a printer is attached to the local computer) or to a network printer (if a network printer has been setup). Upon the user's return to Index 00301-1A: Attorney category Main Menu the user may choose the "Create Filing Mortgagee Certificate of Redemption" category and thereafter linked to Index 00310-1A: Create Filing Mortgagee Certificate of Redemption, its FIG. 1 and associated item numbers.

FIG. 61, Index 00310-1A: Create Filing Mortgagee Certificate of Redemption. Redemption is an option granted the Mortgagor(s), their personal representatives or assigns under law within the State of Minnesota, as well as other Lien Theory land title states. Redemption is available to the redemption parties through the Sheriff of holder of the Sheriff Sale Certificate. The amount bid at sale together with interest at the mortgage rate (or 6 percent if no interest rate is provided), plus additional amounts advanced and proved under Minnesota statutes is required for redemption. If the redeeming party is unsure of the persons right to redeem as mortgagor this must insist upon proof as specified under Minnesota statute. The redeemer must file any documents required to establish that person's redeeming interest within 24 hours after redemption and record certificate of redemption within four days after redemption period, again as required by statutes in our example State of Minnesota. Redemption annuls the sale. Any junior encumbrances remain in place as if no sale had occurred. Junior lien creditors may redeem in the order of their priority, as established by their recorded interest. Each creditor filing a notice of intention to redeem from the foreclosure sale has successive five day periods after expiration of the mortgagor(s) right to redeem in which to effect a redemption. The Notice of Intent to Redeem must be filed during the mortgagor's period of redemption to preserve the right to redeem, again under Minnesota statutes. The amount to redeem is the same as the mortgagor and the redemption must be through the Sheriff or the holder of the Sheriff Sale Certificate. The process of redemption by Junior Lien holder continues until all redemptions available through filing of Notice of Intent to Redeem have been given the option of prosecuting the Notice of Intent. It should be noted other states may have similar or dissimilar requirements as our example state.

Upon the user's selection of Create Filing Mortgagee's Certificate of Redemption the user is linked to FIG. 61, Index 00310-1A: Create Filing Mortgagee's Certificate of Redemption, FIG. 1 and its associated item numbers.

FIG. 61, Index 00310-1A: Create Filing Mortgagee's Certificate of Redemption. Item 1A displays the "Return to Main Menu" button. Upon user selection they are returned to Index 00301-1A: Attorney category Main Menu. FIG. 1B see FIG. 98, Index 00318-1A refers the reader to the specific index for details regarding the Select Redeemable List Search Criteria that is same of Search Public Notice Criteria therefore the reference to 00318-1A. FIG. 61, Item 1C displays the column title "Sheriff's Sale Date" in which column the date of the Sheriff Sale Date is displayed. Note by mousing over the column title a hand will display indicating the user may select the title and toggle the column text in ascending or descending sort order. Item 1D displays the column title "Original Mortgage Document Number" in which column the Original Mortgage Document Number is displayed for each record that is a mortgage foreclosure by advertisement. Other types of foreclosure by advertisement may be displayed in this list. Note by mousing over the column title a hand will display indicating the user may select the title and toggle the column text in ascending or descending sort order. Item 1E displays the column title "Original Mortgage Record Date" in which column the recording date is displayed for a mortgage foreclosure by advertisement. Note by mousing over the column title a hand will display indicating the user may select the title and toggle the column text in ascending or descending sort order. Item 1F displays the column title "Attorney Firm" in which column the Attorney Firm prosecuting the action is displayed. Note by mousing over the column title a hand will display indicating the user may select the title and toggle the column text in ascending or descending sort order. Item 1G displays the window title "Redeemable List". Item 1H displays the column title "Mortgagor(s) in which column the Mortgagor(s) name is displayed. Note by mousing over the column title a hand will display indicating the user may select the title and toggle the column text in ascending or descending sort order. Item 1I displays the column title "County" in which column the county name where the property is located is displayed. Note by mousing over the column title a hand will display indicating the user may select the title and toggle the column text in ascending or descending sort order. FIG. 1B see Index 00318-1A refers the reader to the specific index for details regarding the Search Redeemable List Criteria. Item 1A displays the "Return to Main Menu" button whereupon the user's selection they are returned to Index 00301-1A: Attorney category Main Menu. Item 1J displays the column title "Create Sheriff's Redemption Certificate" in which column a mouse over "Create Certificate" button for each record is displayed. Upon the user's selection of a specific record's Select button they are linked to FIG. 62, Index 00310-1B: Create Sheriff Redemption Certificate.

FIG. 62, Index 00310-1B: Create Sheriff Redemption Certificate. Item 1M displays an input text entry box for the user to enter the Name of the Mortgagor, their personal representative or assigns. Note the large head to text distance. This distance is provided for the County Recorder's office to affixed their recording stamp, month, day, year, and document number for recording purposes. Item 1N displays an input text entry box for the user to enter the name of the county that the Mortgagor, their representative or assigns resides in. Item 1O displays an input text entry box for the user to enter the name of the state that the Mortgagor, their representative or assigns resides in. Item 1P displays an input text entry box for the user to enter the dollar value the mortgagor, their personal representative or their assigns paid to enable the redemption. Item 1Q displays an input text entry box for the user to enter the dollar value the mortgagor, their personal representative or their assigns included in item 1P for payment for the fees of the Sheriff. Item 1R displays an input text entry box for the user to enter the day of the month the Sheriff Sale was conducted. Item 1S displays an input text entry box for the user to enter the suffix of the day of the month the Sheriff's Sale was conducted on (st, rd, th, nd etc). Item 1T displays a drop down menu choice for the user to designate the Month the Sheriff's Sale was conducted in. Item 1U displays an input text entry box for the user to enter the year the Sheriff's Sale was conducted in. Item 1V displays an input text entry box for the user to enter the name of the Sheriff's Deputy who conducted the Sheriff's Sale. Item 1W displays an input text entry box for the user to enter the name of the purchaser of the Sheriff's Sale Certificate. Item 1X an input text entry box for the user to enter the day of the month the Sheriff Sale Certificate was recorded. Item 1Y displays an input text entry box for the user to enter the suffix of the day of the month the Sheriff's Sale Certificate was recorded on (st, rd, th, nd etc). Item 1Z displays a drop down menu choice for the user to designate the Month the Sheriff's Sale Certificate was recorded in. Item 1AA displays an input text entry box for the user to enter the year the Sheriff's Sale Certificate was recorded in. Item 1BB displays an input text entry box for the user to enter the recording document number assign to Sheriff's Sale Certificate during the recording process. Item 1CC displays an input text entry box for the user to enter the name of the mortgagor, their personal representative or assigns FIG. 63, Index 00310-1C: Create Filing Mortgagee Certificate of Redemption. FIG. 63, item 1DD displays an input text entry box for the user to enter the name of the mortgagor, their personal representative or assigns that has executed the redemption Item 1EE displays an input text entry box for the user to enter the claim or right that the redemption will be executed according to. Item 1FF displays the title of page two "Certificate of Redemption (page two". Note the large head to text distance. This distance is provided for the County Recorder's office to affix their recording stamp, month, day, year, and document number for recording purposes. Item 1GG provides the user an input text box for the entry of the day of the month in which the Sheriff or their Deputy affixes their signature to the Certificate of Redemption. Item 1HH provides the user an input text box for the entry of the day of the month suffix in which the Sheriff or their Deputy affixes their signature to the Certificate of Redemption (st, rd, th, nd etc). Item 1II provides the user a drop down menu for the designation of the year in which the Sheriff or their Deputy affixes their signature to the Certificate of Redemption. Item 1JJ provides the user an input text entry box for entry of the year in which the Sheriff or their Deputy affixes their signature to the Certificate of Redemption. Item 1KK provide the user an input text entry box for the entry of the Deputy Sheriff that executed the Certificate of Redemption (the entry of the name may be by signature or by typed text). Item 1LL provides the user an input text box for the entry of the day of the month in which the Public Notary affixes their signature or stamp to the Certificate of Redemption. Item 1MM provides the user an input text box for the entry of the day of the month suffix in which the Public Notary affixes their signature or stamp to the Certificate of Redemption (st, rd, th, nd etc). Item 1NN provides the user a drop down menu for the designation of the year in which the Public Notary affixes their signature or stamp to the Certificate of Redemption. Item 1OO provides the user an input text entry box for the year in which the Public Notary affixes their signature or stamp to the Certificate of Redemption. Item 1PP provides the Public Notary an input text box for entry of the Deputy Sheriff's Name that executed the Certificate of Redemption and appeared before the Public Notary for such Public Notary to designate same by signature or stamp.

FIG. 64, Index 00310-1D: Create Filing Mortgagee Certificate of Redemption. FIG. 64, item 1QQ provides a signature line for the Public Notary typed name or to affix their signature or stamp when the document is printed. Item 1RR displays the "Save and Send To Redemption List" button whereupon user's selection the user's input is saved and then sent to FIG. 65, Index 00311-1A: View Redeemed List. FIG. 65, item 1A displays the "Return to Main Menu" button. Upon user selection they are returned to Index 00301-1A: Attorney category Main Menu. Upon the user's return to Index 00301-1A: Attorney category Main Menu the user may choose the "View Redeemed List" category and thereafter linked to Index 00311-1A: View Redeemed List, its FIG. 65 and associated item numbers.

FIG. 65, Index 00311-1A: View Redeemed List displays a list of foreclosure records that have been redeemed by their Mortgagor, personal representative or assigns. This list allows the user to properly record their redemption and thereafter have the option of reviewing the redeemed foreclosure record. The user's list will display only those redemptions executed by the user. FIG. 65, Item 1A displays the window title "Redeemed List". Item 1B displays the column title "Sheriff's Sale Date" in which column the date of the Sheriff Sale Date is displayed. Note by mousing over the column title a hand will display indicating the user may select the title and toggle the column text in ascending or descending sort order. Item 1C displays the column title "Original Mortgage Document Number" in which column the Original Mortgage Document Number is displayed for each record that is a mortgage foreclosure by advertisement. Other types of foreclosure by advertisement may be displayed in this list. Note by mousing over the column title a hand will display indicating the user may select the title and toggle the column text in ascending or descending sort order. Item 1D displays the column title "Original Mortgage Record Date" in which column the recording date is displayed for a mortgage foreclosure by advertisement. Note by mousing over the column title a hand will display indicating the user may select the title and toggle the column text in ascending or descending sort order. Item 1E displays the column title "Attorney Firm" in which column the Attorney Firm prosecuting the action is displayed. Note by mousing over the column title a hand will display indicating the user may select the title and toggle the column text in ascending or descending sort order. Item 1F displays the column title "Mortgagor(s) in which column the Mortgagor(s) name is displayed. Note by mousing over the column title a hand will display indicating the user may select the title and toggle the column text in ascending or descending sort order. Item 1G displays the column title "County" in which column the county name where the property is located is displayed. Note by mousing over the column title a hand will display indicating the user may select the title and toggle the column text in ascending or descending sort order. Item 1H displays the column title "Select" in which column the "Select" button for each individual redeemed record is displayed. Item 1J see Index 00318-1A refers the reader to the specific index for details regarding the Select Redeemable List Search Criteria that is same of Search Public Notice Criteria therefore the reference to FIG. 98, 00318-1A. Item 1K displays the "Return to Main Menu" that upon user selection links the user to Index 00301-1A: Attorney category Main Menu. Item 1I displays the mouse over "Select" button for an individual redeemed foreclosure record that upon the user's selection links them to FIG. 66, Index 00311-1B: View Redeemed List. FIG. 66, Index 00311-1B: View Redeemed List. Item 1L displays the "Return to List" button that upon user selection re-links to Index 00311-1A: View Redeemed List. Item 1M displays the current date and the window title "Redeemed" Item 1N displays the original document number for the redeemed record. This document number may be a mortgage document number or a court docketing number. Item 1O displays the name of the Mortgagor. Item 1P displays the legal description of the redeemed property. Item 1Q displays the Sheriff's Sale date. Item 1R displays the redemption period. Item 1S displays the End of Redemption Time Period Date. Item 1T displays the original mortgage amount if the redemption if from a mortgage foreclosure; otherwise it will display $0.00 because the foreclosure action was originated within the court system. Item 1U displays the amount sold for at the Sheriff's Sale. Item 1V displays to whom the Sheriff Sale Certificate was sold (most often this may be the filing mortgagee, but it may be another third party). Item 1W displays the County that the redeemed property is located within. Item 1X displays the State that the redeemed property is located within. Item 1Y displays the foreclosure filing Mortgagee's name.

FIG. 67, Index 00311-1C: View Redeemed List. FIG. 67, item 1Z displays the filing Mortgagee's Attorney Firm's name. Item 1AA displays the individual Attorney name within the filing Mortgagee's Attorney Firm. Item 1BB displays either the individual Attorney's Phone number or the filing Mortgagee's Attorney Firm's phone number. Item 1CC displays the filing Mortgagee's Attorney Firm's street address. Item 1DD displays the filing Mortgagee's Attorney Firm's City, State, and Zip Code. Item 1EE displays the completed "Certificate of Redemption".

FIG. 68, Index 00311-1D: View Redeemed List FIG. 68, item 1FF displays the page number within the Sheriff's Foreclosure Book the redeemed record may be found upon. Item 1GG displays the Original Mortgage Record Date if the redemption is from a mortgage foreclosure. If not a mortgage foreclosure redemption it displays 0/0/0. Item 1HH displays the County Market Value Less the Sheriff's Sale Amount. If the County Market Value was entered (not a required element) the displayed value may provides an assessment of foreclosure's value to interested third parties. Item 1II displays the County's Most Recent Sale Price, if the county's most recent sale price was entered (not a required element). If displayed, the value may provide an assessment of the foreclosure's value to interested third parties. Item 1JJ displays the MLS List Price, if the property had been listed upon a Multiple Listing Service (MLS). Item 1KK displays the printer icon that upon the user's selection sends the summary to the local printer's queue for printing if a printer is attached to the computer, or may send the queue to a network printer if a network printer has been setup. Item 1L displays the "Return to List" button that upon user selection re-links to Index 00311-1A: View Redeemed List. Item 1K displays the "Return to Main Menu" that upon user selection links the user to Index 00301-1A: Attorney category Main Menu.

Attorney User Category

Upon the user's return to Index 00301-1A: Attorney category Main Menu the user may select the next category Newspapers. In general this database category contains the contact information for newspapers that publish Public Notices. These newspapers in general are a qualifying legal newspaper in the county where the mortgaged property or some part thereof is located. The notice must appear is 6 full weeks of publication or the Sale must be at least 42 days after the date of first publication. Again, note we are utilizing the State of Minnesota as our example state and these requirements may vary state to state. Upon the user selection of the Newspapers category they are linked to FIG. 69, Index 00312-1A: Newspaper, FIG. 1, and its associated item numbers. FIG. 69, index 00312-1A: Newspapers. Item 1A displays the window title "Newspaper Email List". Item 1B displays the column title "Mod" in which column the "Modify" button for each individual newspaper record is located. Item 1C displays the column title "Paper Name" in which column the individual record newspaper's name is displayed and from herein is made available by the application to the functions therein that may require it to compete a task(s). Item 1D displays the column title "Email Address" in which column the individual record newspaper's email address is displayed and from herein is made available by the application to the functions therein that may require it to complete a task(s). Item 1E displays the column title "Fax Number" in which column the individual record newspaper's fax number is displayed and from herein is made available by the application to the functions therein that may require it to complete a task(s). Item 1F displays the column title "Contact" in which column the individual record newspaper contact person's name is displayed and from herein is made available by the application to the functions therein that may require it to complete a task(s).

FIG. 70, Index 00312-1B: Newspapers. FIG. 70, item 1G "Modify" button has a note indicating the viewer should look to FIG. 71, Index 00312-1C. See below. Item 1H "Add Paper To List" has a note indicating the viewer should look to FIG. 72, Index 00312-1D. See below. Item 1I "Return" button returns user to Index 00301-1A: Attorney category Main Menu upon the user's selection.

FIG. 71, Index 00312-1C: Newspapers. Item 1J displays the window title "Modify Newspaper Email Address." Item 1K displays an input text entry box for the user to modify the newspaper name. Item 1L displays an input text entry box for the user to modify the newspaper's email address. Item 1M displays an input text entry box for the user to modify the newspaper's fax number. Item 1N displays an input text entry box for the user to modify the newspaper's contact name data. Item 1O displays the "Submit" button whereupon the user's selection the modifications made within this screen are saved to the database and the user is re-linked to FIG. 69, Index 00312-1A: Newspapers. Item 1P displays the "Return to Main Menu" whereupon the user's selection the user is linked to Index 00301-1A: Attorney category Main Menu.

FIG. 72, Index 00312-1D: Newspapers. FIG. 72, item 1Q displays the window title "Get New Paper." Item 1R displays an input text entry box for the user to enter the newspaper name. Item 1S displays an input text entry box for the user to enter the newspaper's email address. Item 1T displays an input text entry box for the user to enter the newspaper's fax number. Item 1U displays an input text entry box for the user to enter the newspaper's contact name data. Item 1V displays the "Submit" button whereupon the user's selection the modifications made within this screen are saved to the database and the user is re-linked to Index 00312-1A: Newspapers. Item 1W displays the "Return to Main Menu" whereupon the user's selection the user is linked to Index 00301-1A: Attorney category Main Menu. Upon the user's return to Index 00301-1A: Attorney category Main Menu the user may select the next category Index 00313-1A: Create/Modify Template for Public Notices. It is within this category that the online application provides to its user the flexibility to create custom input forms for their use. At this time the category is configured to customize Foreclosure by Advertisement, Contract for Deed, and Foreclosure by Judgments. As we have previously discussed we are utilizing the state of Minnesota to provide examples of generic input forms and from within this category the methodology to customize and name the forms for utilization after creation. As the formats become known for a specific state CRE will provide generic input forms and configuration for the custom input formats within those states. This will require the addition of user choice screen to indicate the state in which the form should be displayed as the input forms for each state are specific to that state. CRE will also build custom forms for the user upon their request as noted hereafter in Index 00313-1B, item 1J.

FIG. 73, Index 00313-1A: Create/Modify Template for Public Notice, FIG. 73 and its associated item numbers will be discussed. FIG. 73, Index 00313-1A: Create/Modify Template for Public Notice. Item 1A displays the window title "Template List for Public Notices." Item 1B displays the template name "Contract for Deed" and information about the input form 'Can't Modify". The input form cannot be modified because it is a generic form. If the input form had been generated by the user as a custom form the prerequisite "Modify" button would have been displayed. For greater detail concerning this input form see Index 00303-3A. Item 1C displays the template name "FC by Adv with assigns (Reverse dates)" and information about the input form 'Can't Modify". The input form cannot be modified because it is a generic form. If the input form had been generated by the user as a custom form the prerequisite "Modify" button would have been displayed. For greater detail concerning this input form see Index 00303-6A. Item 1D displays the template name "Foreclosure by Advertisement (Abstract)" and information about the input form 'Can't Modify". The input form cannot be modified because it is a generic form. If the input form had been generated by the user as a custom form the prerequisite "Modify" button would have been displayed. For greater detail concerning this input form see Index 00303-4A. Item 1E displays the template name "Foreclosure by Advertisement (Both)" and information about the input form 'Can't Modify." The input form cannot be modified because it is a generic form. If the input form had been generated by the user as a custom form the prerequisite "Modify" button would have been displayed. For greater detail concerning this input form see Index 00303-8A.Item 1F displays the template name "Foreclosure by Advertisement (Torrens)" and information about the input form 'Can't Modify." The input form cannot be modified because it is a generic form. If the input form had been generated by the user as a custom form the prerequisite "Modify" button would have been displayed. For greater detail concerning this input form see Index 00303-7A.

Item 1G displays the template name "Foreclosure by Judgment" and information about the input form 'Can't Modify". The input form cannot be modified because it is a generic form. If the input form had been generated by the user as a custom form the prerequisite "Modify" button would have been displayed. For greater detail concerning this input form see Index 00303-5A. Item 1H displays the "Add Template" button. Upon user selection they are linked to FIG. 74, Index 00313-1B: Create/Modify Template for Public Notice.

FIG. 74, Index 00313-1B below.Item 1I displays the "Return to Main Menu" button. Upon user selection the user is linked to Index 00301-1A: Attorney category Main Menu. FIG. 74, Index 00313-1B: Create/Modify Template for Public Notice. Item 1J displays instructive text to assist the user in making a decision to utilize the custom form creator or submit the request to CRE. In the event the user decides to have CRE create the form they may mouse over and select the text whereupon the application calls the user's email client and inputs the CRE contact's email address for the user to forward their data request to and begin the custom input form creation utilizing CRE. Item 1K provides the user a text input box for the user to input the name of template to be displayed in Index 00303-2A: Attorney Input Template List and within FIG. 73, Index 00313-1A: Create/Modify Template for Public Notice. Item 1L provides the user a text input box for the user to input the name of template to display in the window title menu bar of its input screen. Item 1M displays the text chosen for output in the order selected in a display window titled "This is the Template Output Box". Users may scroll up and down the screen selecting text through use of the text's associated "transfer" button in any order that matches their needs, although the user most likely will have statutory requirements for the text dictated by state statute. Item 1N displays the text "Notice of Default" that is an abbreviation for a text clause required within a Public Notice. The user's choice may be made and script code inserted at any point in the template creation process. Such choice determines the position of the text within the Public Notice and template to be created. The full text that will display in the template is: NOTICE OF MORTGAGE FORECLOSURE SALE NOTICE IS HEREBY GIVEN that default has occurred in the conditions of the following described mortgage: Item 1O displays a typical "transfer" button that is associated with a specific text and argument if required. Upon user selection the text and input box for an argument are coded into the template. Note the user may pick and chose the order of the text and its corresponding position in the template and thereafter the Public Notice. Item 1P displays the text "Date of Mortgage" that is an abbreviation for a text clause required within a Public Notice. The user's choice may be made and script code inserted at any point in the template creation process. Such choice determines the position of the text within the Public Notice and template to be created. The full text that will display in the template is DATE OF MORTGAGE: with input text box for Month, Day, Year display. Item 1Q displays the text "Original Principal Amount of Mortgage" that is an abbreviation for a text clause required within a Public Notice. The user's choice may be made and script code inserted at any point in the template creation process. Such choice determines the position of the text within the Public Notice and template to be created. The full text that will display in the template is: ORIGINAL PRINCIPAL AMOUNT OF MORTGAGE: $ with input text box for the dollar value. Item 1R displays the text "Mortgagor(s)" that is an abbreviation for a text clause required within a Public Notice. The user's choice may be made and script code inserted at any point in the template creation process. Such choice determines the position of the text within the Public Notice and template to be created. The full text that will display in the template is: a text input boxes for the name of the Mortgagor's First Name and initial or Company Name, text box for entry of the Mortgagor's Last Name, text box the Mortgagor's Spouse's First Name and initial if required, text box for Mortgagor's Spouse's Last name if required, and a drop down menu to indicate the relationship of the Mortgagor(s). Item 1S displays the text "Mortgagee" that is an abbreviation for a text clause required within a Public Notice. The user's choice may be made and script code inserted at any point in the template creation process. Such choice determines the position of the text within the Public Notice and template to be created. The full text that will display in the template is: MORTGAGEE: with a text input box for the name of the Mortgagee and a drop down menu to chose the type of legal entity the Mortgagee is organized as.

FIG. 75, Index 00313-1C: Create/Modify Template for Public Notice. Item 1T displays the text "Date and Place and Number of Recording Mortgage" that is an abbreviation for a text clause required within a Public Notice. The user's choice may be made and script code inserted at any point in the template creation process. Such choice determines the position of the text within the Public Notice and template to be created. The full text that will display in the template is: DATE AND PLACE OF RECORDING: Recorded: with a drop down menu choice to designate the month, an input text entry box for the day of the month, an input text entry box for the entry of the year, an input text box for entry of the location where the recording took place, a drop down menu for the choice of the County, and an input text box for the entry of the document number assigned by the recording local governmental unit. Item 1U displays the text "Assignments" that is an abbreviation for a text clause that may be required within a Public Notice if the original mortgage has been assigned. The user's choice may be made and script code inserted at any point in the template creation process. Such choice determines the position of the text within the Public Notice and template to be created. The full text that will display in the template is: Assignments with input text entry boxes for the Mortgagee Assigned to data; month, day, and year of the Assignment date; month, day, and year for the recording or registration date of the Assignment; Document Number; and Where Recorded or Registered. Item 1V displays the text "Legal Description" for a text clause that will be required within a Public Notice. The user's choice may be made and script code inserted at any point in the template creation process. Such choice determines the position of the text within the Public Notice and template to be created. The full text that will display in the template is: LEGAL DESCRIPTION OF PROPERTY along with an input text entry box to enter the data for the legal description. Item 1W displays the text "County of Property" that is an abbreviation for a text clause that will be required within a Public Notice. The user's choice may be made and script code inserted at any point in the template creation process. Such choice determines the position of the text within the Public Notice and template to be created. The full text that will display in the template is: COUNTY IN WHICH PROPERTY IS LOCATED: and thereafter a system generated text displaying the County Name. This code is determined from the active state and county that the user is logged in to. Item 1X displays the text "Amount due and claimed" that is an abbreviation for a text clause that will be required within a Public Notice. The user's choice may be made and script code inserted at any point in the template creation process. Such choice determines the position of the text within the Public Notice and template to be created. The full text that will display in the template is: AMOUNT DUE AND CLAIMED TO BE DUE AS OF DATE OF NOTICE, INCLUDING TAXES, IF ANY, PAID BY MORTGAGEE: $ and a input data text box for the entry of the dollar value. Item 1Y displays the text "THAT all pre-foreclosure requirements have been complied with, that no action or proceeding has been instituted at law or otherwise to recover the debt secured by said mortgage, or any part thereof:" for a text clause that will be required within a Public Notice. The user's choice may be made and script code inserted at any point in the template creation process. Such choice determines the position of the text within the Public Notice and template to be created. The full text that will display in the template is: THAT all pre-foreclosure requirements have been complied with, that no action or proceeding has been instituted at law or otherwise to recover the debt secured by said mortgage, or any part thereof.

FIG. 76, Index 00313-1D: Create/Modify Template for Public Notice. FIG. 76, item 1Z displays the text "PURSUANT to the power of sale contained in said mortgage, the above described property will be sold by the Sheriff of said county as follows:" for a text clause that will be required within a Public Notice. The user's choice may be made and script code inserted at any point in the template creation process. Such choice determines the position of the text within the Public Notice and template to be created. The full text that will display in the template is: PURSUANT to the power of sale contained in said mortgage, the above described property will be sold by the Sheriff of said county as follows: Item 1AA displays the text "DATE AND TIME OF SALE" that is an abbreviation for a text clause that will be required within a Public Notice. The user's choice may be made and script code inserted at any point in the template creation process. Such choice determines the position of the text within the Public Notice and template to be created. The full text that will display in the template is: DATE AND TIME OF SALE:, drop down menu choice to designate the month of the sale, an input text entry box for the user to enter the day of the month of the sale, and an input text entry box for the user to enter the year of the sale. Item 1BB displays the text "PLACE OF SALE" that is an abbreviation for a text clause that will be required within a Public Notice. The user's choice may be made and script code inserted at any point in the template creation process. Such choice determines the position of the text within the Public Notice and template to be created. The full text that will display in the template is: PLACE OF SALE: and an input text entry box for the user to enter the Sheriff's Office, street address or building in which the sale will take place; and an input text entry box for the city in which the sale will take place. Item 1CC displays the text "Redemption Length and text" that is an abbreviation for a text clause that will be required within a Public Notice. The user's choice may be made and script code inserted at any point in the template creation process. Such choice determines the position of the text within the Public Notice and template to be created. The full text that will display in the template is: to pay the debt secured by said mortgage and taxes, if any, on said premises and the costs and disbursements, including attorney fees allowed by law, subject to redemption within as designated by a drop down menu choice of redemption options allowed by law, from the date of said sale by the mortgagor(s), their personal representatives or assigns. Item 1DD displays the text "Mortgagor(s) released from financial obligation" for a text clause that will be required within a Public Notice. The user's choice may be made and script code inserted at any point in the template creation process. Such choice determines the position of the text within the Public Notice and template to be created. The full text that will display in the template is: Mortgagor(s) released from financial obligation.

FIG. 77, Index 00313-1E: Create/Modify Template for Public Notice. Item 1EE displays the text "THIS COMMUNICATION IS FROM A DEBT COLLECTOR ATTEMPTING TO COLLECT A DEBT. ANY INFORMATION OBTAINED WILL BE USED FOR THAT PURPOSE. THE RIGHT TO VERIFICATION OF THE DEBT AND IDENTITY OF THE ORIGINAL CREDITOR WITHIN THE TIME PROVIDED BY LAW IS NOT AFFECTED BY THIS ACTION" for a text clause that will be required within a Public Notice. The user's choice may be made and script code inserted at any point in the template creation process. Such choice determines the position of the text within the Public Notice and template to be created. The full text that will display in the template is: THIS COMMUNICATION IS FROM A DEBT COLLECTOR ATTEMPTING TO COLLECT A DEBT. ANY INFORMATION OBTAINED WILL BE USED FOR THAT PURPOSE. THE RIGHT TO VERIFICATION OF THE DEBT AND IDENTITY OF THE ORIGINAL CREDITOR WITHIN THE TIME PROVIDED BY LAW IS NOT AFFECTED BY THIS ACTION. Item 1FF displays the text "Notice dated" for a text clause that will be required within a Public Notice. The user's choice may be made and script code inserted at any point in the template creation process. Such choice determines the position of the text within the Public Notice and template to be created. The full text that will display in the template is: Notice dated: a drop down menu choice to designate the month of the notice creation, an input text entry box for the user to enter the day of the month of the notice creation, and an input text entry box for the user to enter the year of the notice creation. Item 1GG displays the text "Attorney" that is an abbreviation for a text clause that will be required within a Public Notice. The user's choice may be made and script code inserted at any point in the template creation process. Such choice determines the position of the text within the Public Notice and template to be created. The full text that will display in the template is: Select Attorney: a drop down menu to designate an individual attorney whereupon a selection is made will additional display the Attorney Firm's Name, address, address 2 (if any), City, State, Zip Code, telephone number in the format of xxx-xxx-xxxx, and File Id: with an input text entry box for the Attorney firm's internal file number, if the firm utilizes such a designation. Item 1HH displays the text "Published in the paper" that is an abbreviation for a text clause that will be required within a Public Notice. The user's choice may be made and script code inserted at any point in the template creation process. Such choice determines the position of the text within the Public Notice and template to be created. The full text that will display in the template is: (Published in the, a drop down menu choice to designate the newspaper the notice is to be published in, a drop down menu choice to designate the month the Notice will first be published in, an input text entry box for the user to enter the day of the month the Notice will be first published on and thereafter an extension by the system to display the remaining five (5) weeks of publication required by state statute, an input text entry box for the user to enter the year of the month and day the Notice is to be first published on, and an input text entry box for the user to enter the Issue Volume Number of the newspaper, if the newspaper utilizes same (note the user must be aware of the statutory requirement for the sale Notice to be first published within six months of the filing for notice of Les Pendency by the filing mortgagee's attorney). Item 1II displays the user instructional text "Type in your own text" and thereafter an input text entry box for the user to enter the text for the custom clause they may desire or a subsequent statutory requirement that may be optional such as the following text: "THE TIME ALLOWED BY LAW FOR REDEMPTION BY THE MORTGAGEOR, THE MORTGAGOR'S PERSONAL REPRESENTATIVE OR ASSIGNS, MAY BE REDUCED TO FIVE WEEKS IF A JUDICIAL ORDER IS ENTERED UNDER MINNESOTA STATUTES, SECTION 582.032, DETERMINING, AMONGST OTHER THINGS, THAT THE MORTGAGED PREMISES ARE IMPROVED WITH A RESIDENTIAL DWELLING OF LESS THAN FIVE UNITS, ARE NOT PROPERTY USED IN AGRICULTURAL PRODUCTION, AND ARE ABONDONED."

FIG. 78, Index 00313-1F: Create/Modify Template for Public Notice. FIG. 78, item 1JJ displays the "Add Template" button, whereupon the user's selection the created template is saved to the database for display and use within Index 00303-2A: Attorney Input Template List and Index 00313-1A: Create/Modify Template for Public Notice. Item 1KK displays the "Return" button, whereupon selection the user is linked to Index 00301-1A: Attorney category Main Menu.

FIG. 79, Index 00313-1G: Create/Modify Template for Public Notice. FIG. 79, item 1LL displays the "This is the Template Output Box" after a transfer action, in this case item 1N. As noted in items above, 1KK regarding user selection of the "Return" button and thereafter the user's return to Index 00301-1A: Attorney category Main Menu, the user may select the next category FIG. 80, Index 00314-1A: New/Modify Attorney Data. Upon the user's return to Index 00301-1A: Attorney category Main Menu the user may select the next category New/Modify Attorney Data. In general this database category contains the contact information for Attorneys' and their firms. This category does not grant system permissions to the Attorney users. Upon their selection of the New/Modify Attorney Data they are linked to Index 00314-1A: New/Modify Attorney Data, and its associated item numbers.

FIG. 80, Index 00314-1A: New/Modify Attorney Data. FIG. 80, item 1A displays the "Add New Attorney" button. Upon the user's selection of this button they are linked to Index 00314-1B: New/Modify Attorney Data. Due to the screen layouts the item numbers will appear to be out of order within this discussion area. Note that attorneys generally work for an Attorney Firm, consequently, most data input will relate to the attorney firm rather than an individual attorney. Having stated the aforementioned, the input text entry boxes apply to individual attorney data as well. This function would be inputted by the account Administrator. This goes to the point of the function that firms and individual attorney accounts may add users who are attorneys subject to subscription parameters. Item 1L displays the window title "Enter Attorney Data". Item 1M provides the user an input text entry box for the user to enter the new attorney's name. Item 1N provides the user an input text entry box for the user to enter the street address for the new attorney. Item 1O provides the user an input text entry box for the user to enter the $2^{nd}$ line of the street address for the new attorney in the event a $2^{nd}$ line is required. Item 1P provides the user an input text entry box for the user to enter the new attorney's City, State, and Zip Code. Item 1Q provides the user a drop down menu box to designate the state the attorney's practices in. Item 1R provides the user an input text entry box for the user to enter the new attorney's phone number. This may be the Firm the attorney works for, their individual direct number, or their individual number. Item 1S provides the user an input text entry box for the user to enter the new attorney's cell phone number. This may be the Firm the attorney works for cell number or their individual cell number. Item 1T provides the user an input text entry box for the user to enter the new attorney's fax phone number. This may be the Firm the attorney works for or their individual number. Item 1U provides the user an input text entry box for the user to enter the new attorneys email address. Item 1V provides the user an input text entry box for the user to enter the attorney's license number. Item 1K displays the "Return" button whereupon the user's selection they are linked to Index 00301-1A: Attorney category Main Menu. Item 1J displays the "Update DB" button whereupon the user's selection they re-linked to Index 00314-1A: New/Modify Attorney Data and their inputted new attorney data saved within the online application's database, available to other system call's for the inputted data, and displayed within the window titled Attorney Data List that comprises Index 00314-1A: New/Modify Attorney Data. Upon our return to this index screen we can continue our discussion with item numbers thereon. Item 1B displays the "Return to Main Menu" button whereupon the user's selection they are linked to Index 00301-1A: Attorney category Main Menu. Item 1C displays the column title "Attorney Name" wherein said column are displayed the Names of the individual record Attorneys. Item 1D displays the window title "Attorney Data List." Item 1E displays the column title "Modify (look at)" wherein the column are displayed the individual record "Modify" mouse over buttons. See item 1H. Item 1F displays the column title "Delete" wherein said column are displayed the individual record "Delete" mouse over buttons. See item 1I.

Item 1G displays the column title "Attorney Firm" wherein said column are displayed the individual record Attorney Firm Name. Note the display indicates the Attorney Firm is the same for all individual records in this account. Item 1H designates an individual record "Modify" button whereupon the user's selection they are linked to Index 00314-1C: New/Modify Attorney Data modification screen. This screen is the replicate of the Add New Attorney button seen in FIG. 81, Index 00314-1B: New/Modify Attorney Data. Item 1M, 1N, 1O, 1P, 1Q, 1R, 1S, 1T, 1U, 1V, 1W, and 1X all provide the user an opportunity to modify/change the original inputted data for each item. This applies to input text entry boxes in which no data was inputted originally, and to input text entry boxes in which data was originally inputted. Upon completion of the modify/change operations the user might again choose the "Update DB" button noted as item 1J and achieve the same result as before. As before, if the user selects item 1B "Return to Main Menu" button they will be linked to Index 00301-1A: Attorney category Main Menu. FIG. 83, Index 00315-1A: New/Modify User Permission (meeting with Jerry W on Thursday Jan. 20, 2005) to be added here.

FIG. 83, index 00315-1A: New/Modify User Permission. Upon the user's return to Index 00301-1A: Attorney category Main Menu the next category the user may select in our sequenced category discussion is Index 00315-1A: New/Modify User Permission, its FIG. 83 and the discussion of the item numbers therein. The purpose of this index is to add users and assign permissions to either attorney users or non-attorney users. After selection of the category item the user is linked to Index 00315-1A: New/Modify User Permission.

FIG. 83, Index 00315-1A: New/Modify User Permission. FIG. 83, item 1A displays the window title "User List." Item 1B displays the column field title "Mod" in which column the "Modify" mouse over button for each record is located (see item 1I). Item 1C displays the column field title "Log in Name" in which column the log in name of the individual records is displayed. This is a required item. Note user herein are either attorney or non-attorney members of the attorney firm. As such we have permitted certain permission holder to see and modify this item. See FIG. 90, Index 00315-1H for a discussion of the permissions grantable. Item 1D displays the column field title "Password" in which column the password of the individual records is displayed. This is a required item. Note user herein are either attorney or non-attorney members of the attorney firm. As such we have permitted certain permission holder to see and modify this item. See FIG. 90, Index 00315-1H for a discussion of the permissions grantable. Item 1E displays the column field title "Email" in which column the email address of the individual records is displayed. This is a required item. Item 1F displays the column field title "TEL" in which column the telephone number of the individual attorney records may be displayed. Non-attorney users are not required to have telephone number as they are employees of the attorney firm and contact maybe made through the firm's telephone number. In the event non-attorney users have a telephone or cell phone number it may be displays within this column. Item 1G displays the column field title "Rights" in which column the specific permission granted the individual record is displayed. See FIG. 90, Index 00315-1H for a discussion of the permissions grantable. Item 1H displays the column field title "DEL" in which column the red text "Delete" mouse over button for most records is displayed. Note the administrator record has no "Delete" mouse over button, but rather bares the text "No Delete" indicating the record may not be deleted by any user. This is a user generated by the system during the creation of the account and is designated as the administrator; as such it is not delectable. Conversely, those individual records displaying a "Delete" mouse over button designated as item 1J maybe deleted by users having the proper permission by their selection of the mouse over button and thereafter confirmation of the delete operation on a subsequent screen not depicted herein due to the commonality and wide use of this operation in Microsoft Corporation's applications.

Item 1L displays the "Return to Main Menu" button whereupon user selection the user is returned to the Index 00301-1A: Attorney category Main Menu. This item is purposely discussed out of order in order to provide continuity to remaining discussion items. Item 1I designates the mouse over button "Modify" whereupon the user's selection the user is linked to FIG. 84, Index 00315-1B: New/Modify User Permission, its continuation of FIG. 84 and associated item numbers.

FIG. 84, Index 00315-1B: New/Modify User Permission. FIG. 84, item 1M displays the "Continue" button which may be found at the head and footer of the screen. Upon user selection they are linked to the next screen in the sequence (Index). Item 1N displays the "Return to Main Menu" button whereupon user selection the user is returned to the Index 00301-1A: Attorney category Main Menu. Item 10 displays the window title "Modify States" and has immediately above it user instructional text concerning the user's choice's below "If a state is 'unselected' below, any county assigned to that state will be taken out." Item 1P displays a drop down menu for the user with appropriate permission to modify a previously designated the default state. This functionality is provided to modify designated the state or states from which the user may designate its own current work state within the Attorney category Main Menu item Index 00316:1A: Current Active State from which the display is generated for item 3C also found on the Attorney category Main Menu screen. See FIG. 86, Index 00315-1D for a discussion of counties within the default state or states. Item 1Q displays a "checked" check box for the state of Alabama indicating by check within the check box that the state has been designate by a user with the appropriate permissions as a state within which the user may execute the functions provided this online application. Users with the appropriate permissions may designate multiple states based upon the states selected during the subscription process in which the user may execute the functions of this online application. State with unmarked check boxes are not available to the user to execute the functions of this online application. Item 1R displays an unchecked check box for the state of Alaska. Unchecked states may or may not be available for designation. Again, the availability is determined during the subscription process.

FIG. 85, Index 00315-1C: New/Modify User Permission continues the display of state choices. Upon user selection of item 1M at the footer of the screen they are linked to FIG. 86, Index 00315-1D: New/Modify User Permission, its FIG. 86 continuation, and associated item numbers.

FIG. 86, Index 00315-1D: New/Modify User Permission. Item 1M see previous discussion. Item 1N see previous discussion. Item 1S displays the window title "Modify Data Level." Item 1T provides the user with the appropriate permission a drop down menu to modify the previously designated the level of data displayed by the system to the user. This designation is different than the user's permission level. The choices available are Public Data, Sheriff Data, and All Data. Public data is defined as data available within the system from created and displayed from Public Notices. Sheriff Data includes Public Data, but also includes data entered by the Sheriff during the execution of their statutory duties. All Data includes Public Data and Sheriff Data. All Data may include data imported from third party databases, data imputed either by CRE or third parties who are either members or interested third parties. Examples of but not a complete definitive list of such activities may be the importation/exportation of market/property specific information from local or national multiple listing services, title companies, appraisal companies, junior lien holders, judgment holders, owner contact information, property "listed" for sale in specific geographic areas by various members of the system, and similar data types. These data types may be also be added by keyed entry by the various members within the system. The aforementioned data is subsequently significant due to one of the following: importation, exportation, or keyed entry specifically as shared data levels provided within the online application to its member subscribers. It is this functionality of available data entry and thereafter the sharing of the data that provides great benefit to the online application and its members. Item 1U displays the window title "Modify Counties." Item 1V displays the previously selected counties within the designated state or states. A user with the appropriate permission may modify the selected counties, but only within the state or states chosen during the subscription process or by subsequent subscription addition thereto by the account. This item specifically designates by a marked check box the county or counties in which the user may execute the functions of this online application.

FIG. 87, Index 00315-1E: New/Modify User Permission is a continuation of FIG. 86, Index 00315-1D. Item 1W depicts counties with unmarked check boxes are not available to the user to execute the functions of this online application. Item 1X is a continuation of item 1V. Item 1N displays the "Return to Main Menu" button. See previous discussion. Upon user selection of item 1M at the footer of the screen they are linked to FIG. 88, Index 00315-1F: New/Modify User Permission, its FIG. 88 continuation, and associated item numbers.

FIG. 88, Index 00315-1F: New/Modify User Permission. FIG. 88, item 1Y displays the window title "Modify Log In." Item 1Z displays the "Enter First Name" text entry box in which a user with the appropriate permission may modify the previously entered text for the specific user account. Item 1AA displays the "Enter Last Name" text entry box in which a user with the appropriate permission may modify the previously entered text for the specific user account. Item 1BB displays the "Enter LOG In Name" text entry box in which a user with the appropriate permission may modify the previously entered text for the specific user account. Item 1CC displays the "Enter Password" text entry box in which a user with the appropriate permission may modify the previously entered text for the specific user account. Item 1DD displays the "Enter E-Mail Address" text entry box in which a user with the appropriate permission may modify the previously entered text for the specific user account. Item 1EE displays the "Enter Cell Phone Number" text entry box in which a user with the appropriate permission may modify the previously entered text for the specific user account. This requirement is not a required item for a non-attorney user. Item 1FF displays the "Enter Fax Number" text entry box in which a user with the appropriate permission may modify the previously entered text for the specific user account. Item 1GG displays the window title "Modify Shipping Address." Item 1HH displays the "Shipping Address" text entry box in which a user with the appropriate permission may modify the previously entered text for the specific user account. This address may be utilized to serve documents and or provide the appropriate address for couriers or other interested third parties. This item is not a system requirement Item 1II see item 1HH. Item 1JJ displays the "Shipping City, State, and Zip Code" for the previously designate address in items 1HH and 1II text entry box in which a user with the appropriate permission may modify the previously entered text for the specific user account. Item 1N displays the "Return to Main Menu" button. See previous discussion. Item 1KK displays the "Submit" button. See discussion after item 1RR for discussion regarding this button function.

FIG. 89, Index 00315-1G: New/Modify User Permission. In this index we will discuss the granting of permissions to a attorney created in Index 00314-1A (see discuss hereafter). FIG. 89, item 1LL is a drop down menu choice with text displaying "Select Attorney" with additional user instructional text following the drop down menu as follows: "If attorney not on list, leave selection at 'Add New Attorney' and an input window to get the new attorney data will appear after mousing on the submit button". The type of choices displayed within the drop down menu box are: Add New Attorney, New User is not an Attorney, or displays the name of Attorneys added within Index 00314-1A: New/Modify Attorney Data (Note the data entered in Index 00314-1A is utilized for display within Public Notices, therefore, it does not provide for the granting or modification of user permission available within Index 00315-1A). Pursuant to the index definition we will discuss the granting of permission to an attorney created within Index 00314-1A. Certain of our discussion items will be common requirements of the choices available within the drop down menu mentioned herein. These items will be defined herein and referenced hereafter within the continuing discussion of Index 00315-1A.

These common items begin with Item 1BBB that provides a data text entry box for the user with appropriate permissions to enter the user's first name. Item 1CCC that provides a data text entry box for the user with appropriate permissions to enter the user's middle initial. Item 1DDD that provides a data text entry box for the user with appropriate permissions to enter the user's last name. Item 1NN that provides the user with appropriate permission a text entry box for the entry of a log in name for the new user. This name must be from 5 to 35 characters long by system requirement. Item 1OO that provides the user with appropriate permission a text entry box for the entry of a password for the new user. This name must be from 5 to 35 characters long by system requirement. Item 1PP that provides the user with appropriate permission a text entry box for the entry of a email address for the new user. This item is a system requirement. Item 1QQ that provides the user with appropriate permission a text entry box for the entry of a drop down menu choice box for designating the default state for the new user. The choices available will be from the state or states chosen during the subscription process and/or added after the subscription process by the account. Item 1RR that provides the user with appropriate permission a text entry box for the entry of a drop down menu choice box for designating the permission level for the new user. These permission levels choices are View Only, Add Items, Modify Items, Delete Items, and Supervisor. Items 1KK and 1N see previous discussion of items. Item 1SS displays the "Explanation of Permissions" button whereupon user selection they are linked to Index 00315-1H to view the definitions of each permission grantable to a user. Only one permission level is grantable. This index is provided as an aid to user with appropriate permission in determining the level of permissions to grant a specific user. Upon selection of item 1SS a window designated herein as FIG. 90, Index 00315-1H pops up for viewing by the user. It contains the following text: Item 1TT displays the text "View Level can only view the data, no changes allowed". As noted this permission allows the user to view data, but allows no other functionality. This permission will not display the New/Modify User Permission category within the Attorney Main Menu of Index 00310-1A.

FIG. 90, item 1UU displays the text "Add Level can add data, but not modify or delete data". This permission allows the user to view and enter data, but allows no other functionality. This permission will not display the New/Modify User Permission category within the Attorney Main Menu of Index 00310-1A. Item 1VV displays the text "Modify Level can add and modify but not delete data". This permission allows the user to view, enter data, and to modify data they have entered, but no other functionality. This permission will not display the New/Modify User Permission category within the Attorney Main Menu of Index 00310-1A. Item 1WW displays the text "Delete Level can add, modify, and delete data". This permission allows the user to view, add data, modify their own data and other user's data, and add or modify user permissions. This permission will display the New/Modify User Permission category within the Attorney Main Menu of Index 00310-1A. Item 1XX displays the text "Accountant Level can add or modify data, but is available within user category CRE only, and is not yet in use". This permission is not available to users that are not member within the CRE user group. This permission may be granted to CRE users to add to or modify other user category data. This choice is not displayed as choice within the drop down menu. Item 1YY displays the text "Supervisor can do above, plus delete users". This permission allows the user to add data, modify their own data, modify other user's data within the account, add or modify user permissions, and delete other users except the administrator user. This permission will display the New/Modify User Permission category within the Attorney Main Menu of Index 00310-1A. Upon completion of the user's review the Explanation window they must utilize the "X" in the upper right corner of the Explanation window to close the window and return to FIG. 89, Index 00315-1G and make or modify their choice within item 1RR. Item 1KK displays the "Submit" button. See FIG. 94, Index 00315-1L: New/Modify User Permission hereafter for discussion of this item. In the event an attorney has not been previously entered within Index 00314-1A: New/Modify Attorney User, the user with appropriate permissions may select the "Add New Attorney" choice within the drop down menu choice designated by item 1AAA within FIG. 91, Index 00315-1I: New/Modify User Permission. Thereafter the previously discussed items 1BBB, 1CCC, 1DDD, 1NN, 1OO, 1PP, 1QQ, 1RR, 1SS and 1N are again displayed for text entry by the user with the appropriate permissions. See previous discussion of these items. Upon the user's selection of Item 1KK on this screen the user is linked to FIG. 92, Index 00315-1J: New/Modify User Permission which bares the notation "See Index 0314-1B" previously discussed herein. This Index allows the user to enter the data needed for the Public Notice for a new individual attorney within the account. Upon entry of data and subsequent selection of the Update button the user is returned to Index 00301-1A: Attorney category Main User whereupon the user with the appropriate permissions must reselect the New/Modify User Permission to return to Index 00315-1A. Upon their return they may again choose the "Add User" button returning them to FIG. 93, Index 00315-1K: New/Modify User Permission wherein the user may choose the "New User is not an Attorney" drop down menu choice noted as Item 1EEE. Thereafter the previously discussed items 1BBB, 1CCC, 1DDD, 1NN, 1OO, 1PP, 1QQ, 1RR, 1SS and 1N are again displayed for text entry by the user with the appropriate permissions. See previous discussion of these items. Upon the user's completion of the common items they must select Item 1KK to continue the user addition. Upon selection of the "Submit" button noted as item 1KK they are linked to FIG. 94, Index 00315-1L: New/Modify User Permission, its FIG. 1 continuation, and associated item numbers.

FIG. 94, Index 00315-1L: New/Modify User Permission. FIG. 94, item 1FFF displays the window title "Select States to Access." Item 1GGG displays the default State as chosen within the common item 1QQ drop down menu choices from the state or states chosen during the subscription and/or additions made after subscription. Item 1N displays the "Return to Main Menu" button. See previous discussion. Item 1HHH displays the "Get rest of sign up data" button. Whereupon the user's selection they are linked to FIG. 95, Index 00315-1M: New/Modify User Permission, its FIG. 1 continuation, and associated items numbers.

FIG.95, Index 00315-1M: New/Modify User Permission. FIG. 95, item 1III displays the window title "County Selection." Item 1JJJ displays the column field title "Tier: 1" in which counties designated by CRE as a Tier: 1 county are displayed. Tier level may designate a level of data input by the subscribed members to this county. This designation may determine a portion of the total subscription dollar value for counties within this Tier designation in the event CRE elects to charge a fee for this data. Item 1KKK displays the column field title "Tier: 2" in which counties designated by CRE as a Tier: 2 county are displayed. Tier level may designate a level of data input by the subscribed members to this county. This designation may determine a portion of the total subscription dollar value for counties within this Tier designation in the event CRE elects to charge a fee for this data. Item 1LLL displays the column field title "Tier: 3" in which counties designated by CRE as a Tier: 3 county are displayed. Tier level may designate a level of data input by the subscribed members to this county. This designation may determine a portion of the total subscription dollar value for counties within this Tier designation in the event CRE elects to charge a fee for this data. Item 1NNN displays a check box for a Tier 1 county or counties within the default state for the user to select to execute the functions of the online application. The number of county or counties displayed will depend on the Tier designation give the counties by CRE. Item 1OOO does not display a county or counties available for selection by the user due to CRE's non designation of a county or counties within the default state for this Tier type. In the event CRE had designated a Tier 3 county or counties for displays within the default state, a check box for a county or counties given a Tier 3 designation within the default state would display for the user to select to execute the functions of the online application. Again, the number of county or counties displayed will depend on the Tier designation give the counties by CRE. Item 1PPP displays a check box for a Tier 2 county or counties within the default state for the user to select to execute the functions of the online application. The number of county or counties displayed will depend on the Tier designation give the counties by CRE. Item 1N displays the "Return to Main Menu" button. See previous discussion. Item 1KK displays the "Submit" button. Upon the user selection they are returned to Index 00301-1A: Attorney category Main Menu.

Upon the user's return to Index 00301-1A: Attorney category Main Menu the next category for discussion is Current Active State whereupon the user's selection of this category they are linked to FIG. 96, Index 00316-1A: Current Active State, FIG. 96 and its associated item numbers.

FIG. 96, Index 00316-1A: Current Active State. FIG. 96, item 1A displays the window title "Change Default State." Item 1B provides the user a drop down menu choice to designate the working state that the logged on user will be working within its statutes while logged on. As we have previously pointed out herein we are working the State of Minnesota to demonstrate our input forms, displays, and data sharing examples. Item 1C displays the "Update State" button whereupon the user's state selection in item 1B becomes the default state under which parameters the user input form options, displays, and data sharing will be governed within the online application. This update will also update the displayed active state in item 3C as noted on Index 00301-1A: Attorney category Main Menu. Item 1D displays the "Return to Main Menu without Update" button. The user's selection of this button will cancel any user data choices or inputs within item 1B and item 1C and thereafter link the user to Index 00301-1A: Attorney category Main Menu. Upon the user's return to Index 00301-1A: Attorney category Main Menu the next category for discussion is Make Suggestion whereupon the user's selection of this category they are linked to FIG. 97, Index 00317-1A: Make Suggestion, FIG. 97 and its associated item numbers.

FIG. 97, Index 00317-1A: Make Suggestion. FIG. 97, item 1A displays the "Make Suggestion" button. Upon the user's selection of this button the suggestion inputted in item 1D is forwarded to CRE site administrator for review, comment, and implementation if appropriate. Item 1B displays the "Return to Main Menu" button whereupon the user's selection they are linked to Index 00301-1A: Attorney category Main Menu. Item 1C displays the window title "Suggestions." Item 1D provides the user an input text entry box for the user to input their suggestion to the CRE administrator. The suggestions are left to the user to make, but hopefully will be appropriate as well as germane to the foreclosure subject matter and associated subjects. Again, after the user's selection of item 1B the user is re-linked to Index 00301-1A: Attorney category Main Menu. Thereon, the next category for discussion is Index 00318-1A: Search Public Data Criteria. This category is not link on Index 00301-1A: Attorney category Main Menu, but rather is found with the View All Public Notice Affidavit of Costs and Disbursements, Create Sheriff Sale Certificate, Reinstate from Public Notice List as Search Reinstateable List Criteria, View Reinstated List as Search Reinstated List Criteria, Create Filing Mortgagee Certificate of Redemption as Select Redeemable List Search Criteria, and View Redeemed List as Select Redeemed List Criteria within the Attorney user category. This common site information will be also be found in the Sheriff user category, the Mortgagee user category, Casper Real Estate user category, Associate user category, and Sales Agent user category. This index is a common site information and common site resource index that provides users a method to find data based upon the specific part of the foreclosure data they process to search by. This index allows users to search by any parameter of data inputted during the Public Notice creation, data inputted by local governmental units (most often the County Sheriff), or data sourced to the application by CRE's programmers or from third parties (i.e. title companies, O & E data inputs, other local or state governmental units, etc). Upon the user's selection of the "Search Public Data Criteria" button within any of the aforementioned areas they are linked to FIG. 98, Index 00318-1A: Search Public Data Criteria, FIG. 98 and its associated item numbers.

FIG. 98, Index 00318-1A: Search Public Data Criteria. FIG. 98, item 1A displays the 'Search" button. This button is located at the left head and left toe of the scrolled screen. At this point we will leave the discussion of this button until we have reached the toe button. Item 1B displays the "Clear Form" button. Upon the user's selection of this button all data inputs are cleared from the form top to bottom. This function is necessary because search function engines do not by default clear the inputs in preparation for the next search, consequently, it must be done through this methodology. If the user does not utilize this button function it is quite likely a previously inputted search parameter will negate the current search function. Item 1C displays the "Return to Main Menu" button whereupon the user's selection within the attorney user category the user is linked to Index 00301-1A: Attorney category Main Menu. Item 1D displays a drop down menu choice to designate a county in the current active state as a search parameter. Item 1E provides an input text entry box for entry of the Mortgagor's first name or part thereof as a search parameter. Item 1F provides an input text entry box for entry of the Mortgagor's last name of part thereof as a search parameter. Item 1G provides an input text entry box for entry of the Property Identification Number as a search parameter. This number is affixed to the property by a local governmental unit. Item 1H provides an input text entry box for entry of the foreclosed property's house number or rather street number as search parameter. Item 1I also provides for this data input as a search parameter, but when combined with data entry from item 1H it can provide a search range parameter rather than a specific number parameter. Item 1J provides an input text entry box for the entry of the foreclosed properties street name as search parameter. Item 1K provides an input text entry box for the entry of the City where the foreclosed property is located within. Item 1L provides an input text entry box for the entry of the Zip Code where the foreclosed property is located within. Item 1M provides an input text entry box for the entry of the Mortgagor's Telephone number as a search parameter. Item 1N, item 1O, and item 1P provides an input text entry boxes for the month, day, and year respectively for the Original Mortgage Date. Item 1Q, item 1R, and item 1S provides an input text entry boxes for the month, day, and year respectively for the Original Mortgage Date. These items in combination with items 1N, 1O, and 1P will provide a range of dates as search parameters rather than a specific date. Item 1T, item 1U, and item 1V provides an input text entry boxes for the month, day, and year respectively for the Sheriff Sale Date. Item 1W, item 1X, and item 1Y provides an input text entry boxes for the month, day, and year respectively for the Sheriff Sale Date. These items in combination with items 1T, 1U, and 1V will provide a range of dates as search parameters rather than a specific date. Item 1Z provides an input text entry box for the entry of the Mortgagee's Name as a search parameter. Item 1AA provides an input text entry box for the entry of the Original Mortgage Amount as a search parameter. Item 1BB provides an input text entry box for the entry of the Original Mortgage Amount as a search parameter. This item in combination with item 1AA will provide a range for the Original Mortgage Amount rather than a specific value. Item 1CC provides an input text entry box for the entry of the Sheriff Sale Amount as a search parameter. Item 1DD provides an input text entry box for the entry of the Sheriff Sale Amount as a search parameter. This item in combination with item 1CC will provide a range for the Sheriff Sale Amount rather than a specific value. Item 1EE, item 1FF, and item 1GG provides an input text entry boxes for the month, day, and year respectively for the End of Redemption Time Period Date as a search parameter.

FIG. 99, Index 00318-1B: Search Public Data Criteria. FIG. 99, item 1HH provides an input text entry box to enter a number that in combination with item 1EE, 1FF, and 1GG provides a range search parameter for the immediate period before the End of Redemption Time Period Date. Item 1II, item 1JJ, and item 1KK provides an input text entry boxes for the entry of the month, day, and year respectively for the Date of Public Notice as a search parameter. Item 1LL displays a drop down menu choice to designate the Quality value of the foreclosed property (A, B, or C) as a search parameter. Item 1MM, item 1NN, and item 1OO provides an input text entry boxes for the entry of the month, day, and year respectively for the Date of Public Notice. These items in combination with 1II, 1JJ, and 1KK provide a range search parameter for the Date of Public Notice. Item 1PP displays a drop down menu choice to designate the Type of Property (Single Family, Commercial, Industrial, Land, Farm) as a search parameter. Item 1QQ provides an input text entry box to enter the Legal Description of the Foreclosed Property as a search parameter. This particular search parameter is difficult to execute properly, as the user must enter the description exactly as it is recorded. Given the difficulties in nomenclature of metes and bounds, rods, and other associated measurement terms that may be used CRE recommends the choice of another search parameter. Item 1RR provides an input text entry box to enter the Original Recorded Document number as a search parameter. Item 1SS, item 1TT, and item 1UU provides input text entry boxes to enter the month, day, and year respectively for an Original Recorded Date as a search parameter. Item 1VV, item 1WW, and item 1XX provides input text entry boxes to enter the month, day, and year respectively for an Original Recorded Date as a search parameter that in combination with item 1SS, 1TT, and 1UU provide a range search parameter. Item 1YY provides an input text entry box to enter the Original Registered Document Number. Item 1ZZ, item 1AAA, and 1BBB provide input text entry boxes to enter respectively the month, day of month, and year of the Original Registration Date. Item 1CCC, item 1DDD, and item 1EEE provide input text entry boxes to enter respectively the month, day of month, and year of the Original Registration Date that in combination with item 1ZZ, item 1AAA, and item 1BBB provides a range as a search parameter. Item 1FFF provides the user a radio button choice to chose “Get Just Abstract Properties” as a search parameter. Item 1GGG provides the user a radio button choice to chose “Get Just Torrens Properties” as a search parameter. Item 1HHH provides a the user a radio button choice to chose “Get foreclosures that have both registration numbers and recorded numbers (Torrens and Abstract Properties) as a search parameter. Item 1III provides an input text entry box to enter a Certificate of Title Number as a search parameter. Item 1JJJ provides an input text entry box to enter a Declaration Court Case Number (docketing number) as a search parameter. Item 1KKK provides an input text entry box to enter a Judgment Court Case Number (docketing number) as a search parameter. Item 1LLL, item 1MMM, and item 1NNN provide input text entry boxes to enter respectively the month, day of the month, and year of a Postponed Date for a Sheriff Sale as a search parameter. Item 1OOO, item 1PPP, and item 1QQQ provide input text entry boxes to enter respectively the month, day of the month, and year of a Postponed Date for a Sheriff Sale that in combination with item 1LLL, item 1MMM, and item 1NNN provides a range as a search parameter. Item RRR, item 1SSS, and item 1TTT provide input text entry boxes to enter respectively the month, day of the month, and year of a Date first Published for a Public Notice as a search parameter. Item 1UUU, item 1VVV, and item 1WWW provide input text entry boxes to enter respectively the month, day of the month, and year of a Date first Published for a Public Notice that in combination with item 1RRR, item 1SSS, and item 1TTT provides a range as a search parameter. Item 1XXX provides an input text entry box to enter the dollar value for the Amount Due & Claimed (at sale time). Item 1YYY not utilized. Item 1ZZZ provides an input text entry box to enter the dollar value for the Amount Due & Claimed (at sale time) that in combination with item 1XXX provides a range as a search parameter.

FIG. 100, Index 00318-1C: Search Public Data Criteria. FIG. 100, item 1AAAA provides an input text entry box to enter the dollar value for the County Market Value Less Amount Sold for AT SALE as a search parameter. Item 1BBBB provides an input text entry box to enter the dollar value for the County Market Value Less Amount Sold for AT SALE that in combination with item 1AAAA provides a range as a search parameter. Item 1CCCC provides an input text entry box to enter the dollar value for the County Most Recent Sale Price as a search parameter. Item 1DDDD provides an input text entry box to enter the dollar value for the County Most Recent Sale Price that in combination with item 1CCCC provides a range as a search parameter. Item 1EEEE provides an input text entry box to enter the To Whom Sold too at the Sheriff Sale as a search parameter. Item 1FFFF provides an input text entry box to enter text matching the Notes input portion of original online application input operation for a Public Notice as a search parameter. Item 1GGGG provides an input text entry box to enter the Mortgagee Attorney’s Name as a search parameter. Item 1HHHH provides an input text entry box to enter the Attorney Firm’s Telephone number in the format xxx-xxx-xxxx as a search parameter. Item 1IIII provides an input text entry box to enter the Attorney’s license number as a search parameter. Item 1JJJJ provides an input text entry box to enter the Mortgagee’s Legal Firm name as a search parameter. Item 1KKKK provides an input text entry box to enter the Legal firm’s Case File Number as a search parameter. Item 1LLLL is not utilized. Item 1MMMM provides a drop down menu choice to designate the redemption period as a search parameter (Five Weeks, Six Months, Twelve Months, Thirty Days, Forty Five Days, Sixty Days, Ninety Days). Item 1NNNN provides an input text entry box to enter the Publication Newspaper as a search parameter. Item 1OOOO, item 1PPPP, and item 1QQQQ provide input text entry boxes to enter respectively the month, day of the month, and year of the Date of Printer’s Affidavit as a search parameter. Note item 1SSSS duplicates item 1RRRR. Item 1RRRR, item 1TTTT, and item 1UUUU provide input text entry boxes to enter respectively the month, day of the month, and year of a Date of Printer’s Affidavit that in combination with item 1OOOO, item 1PPPP, and item 1QQQQ provides a range as a search parameter. Item 1VVVV, item 1WWWW, and item 1XXXX provide input text entry boxes to enter respectively the month, day of the month, and year of the Date the Sale Certificate Executed as a search parameter. Item 1YYYY, item ZZZZ, and item 1AAAAA provide input text entry boxes to enter respectively the month, day of the month, and year of the Date the Sale Certificate Executed that in combination with item 1OOOO, item 1PPPP, and item 1QQQQ provides a range as a search parameter. Item 1BBBBB provides an input text entry box to enter to whom the Sheriff’s Certificate was delivered to as a search parameter. Item 1CCCCC, item 1DDDDD, and item 1EEEEE provide input text entry boxes to enter respectively the month, day of the month, and year of Date certificate of redemption executed as a search parameter. Item 1FFFFF, item GGGGG, and item 1HHHHH provide input text entry boxes to enter respectively the month, day of the month, and year of Date certificate of redemption executed that in combination with item 1CCCCC, item 1DDDDD, and item 1EEEEE provides a range as a search parameter. Item 1IIIII, item 1JJJJJ, and item 1KKKKK provide input text entry boxes to enter respectively the month, day of the month, and year of the Affidavit of Vacancy as a search parameter. Item 1LLLLL not utilized. Item MMMMM, item 1NNNNN, and item 1OOOOO provide input text entry boxes to enter respectively the month, day of the month, and year of the Affidavit of Vacancy that in combination with item 1IIIII, item 1JJJJJ, and item 1KKKKK provides a range as a search parameter. Item 1PPPPP provides an input text entry box to enter the interest rate to be paid on redemption as a search parameter.

FIG. 101, Index 00318-1D: Search Public Data Criteria. FIG. 101, item 1QQQQQ provides an input text entry box to enter the by whom redeemed as a search parameter. Item 1RRRRR provides a drop down menu choice to designate the type of foreclosure as a search parameter (foreclosure by advertisement, Mortgage—by action, then potentially public notice of sale, Liens—by action, then potentially by public notice sale, Judgments—by action, then potentially by public notice sale, Association Lien—by action, then potentially by public notice sale, Contract for Deed). Item 1SSSSS provides an input text entry box to enter the dollar value for Serving Notice by the Sheriff as a search parameter. Item 1TTTTT provides an input text entry box to enter the dollar value for Serving Notice by the Sheriff to create a range for the dollar value for Serving Notice as a search parameter. Item 1UUUUU provides an input text entry box to enter the dollar value for the Mileage Charge of the Sheriff as a search parameter. Item 1VVVVV provides an input text entry box to enter the dollar value for Mileage Charges of the Sheriff to create a range for the dollar value the Mileage Charges as a search parameter. Item 1WWWWW provides an input text entry box to enter the dollar value for the Private Server charge as a search parameter. Item 1XXXXX provides an input text entry box to enter the dollar value for Private Server charges to create a range for the dollar value the Mileage Charges as a search parameter. Item 1YYYYY provides an input text entry box to enter the dollar value for the Postponing charge of the Sheriff as a search parameter. Item 1ZZZZZ provides an input text entry box to enter the dollar value for Postponing charges of the Sheriff to create a range for the dollar value the Postponing charges as a search parameter. Item 1AAAAAA provides an input text entry box to enter the dollar value for the Advertising charge of the Sheriff as a search parameter. Item 1BBBBBB provides an input text entry box to enter the dollar value for Advertising charges of the Sheriff to create a range for the dollar value the Advertising charges as a search parameter. Item 1CCCCCC provides an input text entry box to enter the dollar value for the Sale and Certificate charge of the Sheriff as a search parameter. Item 1DDDDDD provides an input text entry box to enter the dollar value for Sale and Certificate charges of the Sheriff to create a range for the dollar value the Sale and Certificate charges as a search parameter. Item 1EEEEEE provides an input text entry box to enter the dollar value for the Redemption Charge of the Sheriff as a search parameter. Item 1FFFFFF provides an input text entry box to enter the dollar value for Redemption Charges of the Sheriff to create a range for the dollar value the Redemption Charges as a search parameter. Item 1GGGGGG provides an input text entry box to enter the dollar value for the Miscellaneous Charge of the Sheriff as a search parameter Item 1HHHHHH provides an input text entry box to enter the dollar value for Miscellaneous Charges of the Sheriff to create a range for the dollar value the Miscellaneous Charges as a search parameter. Item 1IIIIII provides an input text entry box to enter the dollar value for the Custom Charge of the Sheriff as a search parameter. Item 1JJJJJJ provides an input text entry box to enter the dollar value for Custom Charges of the Sheriff to create a range for the dollar value the Custom Charges as a search parameter. Item 1KKKKKK provides an input text entry box to enter the dollar value for the Sum of Charges of the Sheriff as a search parameter. Item 1LLLLLL provides an input text entry box to enter the dollar value for Sum of Charges of the Sheriff to create a range for the dollar value the Sum of Charges as a search parameter. Item 1MMMMMM provides an input text entry box to enter the Sheriff's Page number where the entry will be found as a search parameter. Item 1NNNNNN provides an input text entry box to enter the Sheriff Deputy's Name that conducted the sale. Item 1OOOOOO provides an input text entry box to enter the Owner's Street name as a search parameter. Item 1PPPPPP provides an input text entry box to enter the Owner's City as a search parameter. Item 1QQQQQQ provides an input text entry box to enter the Owner's State as a search parameter. Item 1RRRRRR provides an input text entry box to enter the Owner's Zip Code as a search parameter. Item 1SSSSSS provides an input text entry box to enter the Owner's Email Address as a search parameter. Item 1TTTTTT provides an input text entry box to enter the Owner's Phone as a search parameter. Item 1UUUUUU provides an input text entry box to enter the Owner's Fax Number as a search parameter. Item 1VVVVVV provides an input text entry box to enter the Attorney Fees amount as a search parameter. Item 1WWWWWW provides an input text entry box to enter the filing fees as a search parameter. Item 1XXXXXX provides an input text entry box to enter the First Remarks Line text as a search parameter. Item 1YYYYYY provides an input text entry box to enter the Second Remarks Line text as a search parameter.

FIG. 102, Index 00318-1E: Search Public Data Criteria. FIG. 102, item 1ZZZZZZ provides an input text entry box to enter the Third Remarks Line text as a search parameter. Item 1AAAAAAA provides an input text entry box to enter the Fourth Remarks Line text as a search parameter. Item 1BBBBBBB provides an input text entry box to enter the Fifth Remarks Line text as a search parameter. Item 1CCCCCCC provides an input text entry box to enter the Sixth Remarks Line text as a search parameter. Item 1DDDDDDD not utilized. Item 1EEEEEEE provides an input text entry box to enter the Seventh Remarks Line text as a search parameter. Item 1FFFFFFF provides an input text entry box to enter the Eight Remarks Line text as a search parameter. Item 1GGGGGGG provides an input text entry box to enter the Ninth Remarks Line text as a search parameter. Item 1HHHHHHH provides an input text entry box to enter the Tenth Remarks Line text as a search parameter. Item 1IIIIIII provides an input text entry box to enter text from the Notice as a search parameter. Item 1JJJJJJJ, item 1KKKKKKK, and item 1LLLLLLL provide input text entry boxes to enter respectively the month, day of the month, and year of the System Date of Record Creation as a search parameter. Item 1MMMMMM, item 1NNNNNN, and item 1OOOOOO provide input text entry boxes to enter respectively the month, day of the month, and year of the System Date that of Record Creation in combination with item 1JJJJJJJ, item 1KKKKKKK, and item 1LLLLLLL provides a range as a search parameter. Item 1PPPPPPP, item 1QQQQQQQ, and item 1RRRRRRR provide input text entry boxes to enter respectively the month, day of the month, and year of the Modified On as a search parameter. Item 1SSSSSSS, item 1TTTTTTT, and item 1UUUUUUU provide input text entry boxes to enter respectively the month, day of the month, and year of the Modified On in combination with item 1PPPPPPP, item 1QQQQQQQ, and item 1RRRRRRR provides a range as a search parameter. Item 1A displays the 'Search" button. This button is located at the left head and left toe of the scrolled screen. Upon selection of this button the online application will search the database for the search parameters entered previously within this index by the user. In the event items matching the search parameters are found they are displayed by the system and are toggle sort able by column heading either in ascending or descending order. Given the vast search parameters available for search and the size of the active/inactive database items, as well as the familiarity of most users with search engines, no attempt will be made to display the results of a search. Item 1B displays the "Clear Form" button. Upon the user's selection of this button all data inputs are cleared from the form top to bottom. This function is necessary because search function engines do not by default clear the inputs in preparation for the next search, consequently, it must be done through this methodology. If the user does not utilize this button function it is quite likely a previously inputted search parameter will negate the current search function. Item 1C displays the "Return to Main Menu" button whereupon the user's selection within the attorney user category the user is linked to Index 00301-1A: Attorney category Main Menu. Upon the user return to Index 00301-1A: Attorney category Main Menu they may select the next sequential category within the Attorney category Main Menu noted as Index 00319-1A: Log Out. Upon the user selection of this mouse over category or their selection of FIG. 3, item 3A noted also within Index 00301-1A the user is returned to Index 00100-1A: Home Page Navigation. Upon their return to the Home page they will have completed or exited all executable functions of the online application for the Index 00300-1A: Attorney User Category. At this point in our presentation we will again emphasize the general and specific commonality of data inputs amongst the various User categories depicted FIG. 3 Index 00100-1A: Home Page Navigation. In summary for the discussions hereafter there will be substantial references made to exact or extremely similar input forms amongst the remaining user category. This is by design; as an attorney directly employed by a Mortgagee in a specific state desiring to execute the foreclosure process in-house will be required to enter the same data by state statute as a third party attorney contracted by the Mortgagee under power of attorney agreement to conduct the process. Thereafter, numerous other interested parties may be required by state statute to utilize the data previously inputted by the aforementioned attorneys. Through the utilization of customized input forms the online application is able to import the previously input data in a format utilizable by the other interested parties. Some of these interested parties are contained in the following list, but the following list should not be limited to the third parties listed. These parties may be: governmental units, junior lien holders, title companies, abstract companies, land companies, newspapers, mortgagor(s), mortgagee property owners, investors, real estate agents representing the sellers of foreclosed property, real estate agents representing the buyer of foreclosed property, state revenue departments, federal revenue departments, and other entities having an interest in foreclosure process.

Given the wide interest in accessing and utilizing the inputted data we begin our next user category discussion with a governmental user category responsible for conducting the foreclosure sale, recording the purchaser of the sheriff sale certificate, have a large potential for executing the redemption of a foreclosed property in lien theory states within the statutory parameters for the specific state, and having the responsibility of documenting the processes they execute within their statutory responsibilities all of which must be executed as an impartial party.

FIG. 103 shows a flow diagram/schematic of a non-limiting example of a system 100 that will support the practice of the technology described herein. A central processing system 102 is in communication with subscribers (e.g., 108 and 110) and a government/legal function 116 and an administrator 104. The communication is through wired or wireless links 114, 116, 118 and 120. The processes, including at least subscription, communication, modification, data entry, purchase. And the other steps described above, can be performed through these links. All steps and structures are meant to disclose species within a generic practice, and the scope of practice and claiming of this technology is not to be limited by the specific nature of any example, herein.

The systems and methods described herein may be generally described as follows. A system is provided for coordinating data and providing information to an external subscriber to the system. In a preferred mode, the data and information relates to at least one foreclosure real estate transaction. The system may structurally comprise: (a) a centralized transaction coordination system for accessing a transaction database; (b) at least one interface device for accessing the foreclosure real estate transaction coordination system, each interface device associated with a party to said foreclosure real estate transaction; (c) information relevant to the foreclosure real estate transaction being provided directly to the transaction coordination system by at least one information originating party originating the information; (d) the information being stored in the transaction database; and (e) the information being accessible by at least one party having registered access to the foreclosure real estate transaction database using the at least one interface device to access the transaction coordination system, the system comprising software enabling the creation and transmission of jurisdictionally required notice of a foreclosure based upon information input to the data base by authorized sources. The central storage capability may be on a processor and/or server using any data language or data format that is selected and used throughout the system. Communication may be over modems, cables, fiber optics, hardwire, wireless or the like. The centralized coordination system may be a distributed computing network. The at least one interface device may be selected from a group consisting of: (a) a computer; (b) a laptop computer; (c) a PDA; and (d) any networkable interface device, with or without computing capability, such as a thin-client terminal. An information originating party may be limited to a selection (e.g., by authorization through subscription) from a group consisting of: (a) a real estate attorney; (b) a real estate agent; (c) a court or governmental administrative body; (d) a sheriff; (e) a lender; (f) a real estate broker; (g) an escrow company; (h) a title company; (i) a lending institution; (j) an escrow agent; (k) a warranty provider; (l) an appraiser; (m) an inspector; (n) an insurance company; (o) an appraisers; (p) a government entity; (q) any authorized system service provider; and (r) an agent and or staff member of (a)-(q). The degree of access, and degree of write capability into the system and the database is limited by subscription class or other controlling parameters. The use of passwords is typically provided to protect and limit access by specific accounts and persons. Input data may be converted by an algorithm to provide a measure of economic merit in analyzing the foreclosure. The economic merit may be provided in terms of possible return on a foreclosure purchase price. The data base may be modified and searched only by government authorities and a system administrator within the parameters of capability to indicate a change in legal status of real property or foreclosed real property already in the data base. The system may provide read-only access to the data base for specific classes or specific subscribers to the system. For example, access to the data base may be limited by member class in a subscription.

The system and alternative constructs may perform a method of coordinating data and providing information to an external subscriber to a system, the system containing data, a data base and information relating to at least one foreclosure real estate transaction. The method may comprise: providing (a) a centralized transaction coordination system for accessing a transaction database; allowing access to at least certain portions of the data base in the coordination system to only administrators of the coordination system and to subscribers; allowing establishment of subscription service on-line to the coordination system to limit on-line access to at least those certain portions of the data base in the system; allowing certain classes of subscribers limited modification access to the data base; allowing certain classes of subscribers read-only access to the data base; and allowing only a system administrator and subscriber government authority modification access specific to legal status of real estate status in a foreclosure event. The information relevant to said foreclosure real estate transaction may be provided directly to said transaction coordination system by at least one subscriber authorized to modify the data base within limited parameters. The at least one class of subscriber may be allowed read-only access to the data base on-line. The read-only capability might include on-line search capability. The system administrator may download third party information into the data base which may then be accessed according to permission levels granted subscribers. The system administrator may conduct financial oversight of a real estate property transaction on the system and provides information on the real estate property transaction that is accessible by at least some subscribers. Such oversight might be as a sales agent, broker, facilitator, mortgage lender, attorney, etc.

What is claimed:

1. A foreclosure real estate coordination process for coordinating data and providing information to an external subscriber to the system, the data and information in a data base relating to at least one foreclosure real estate transaction, said system comprising:

a) a centralized transaction coordination system for accessing said foreclosure real estate transaction database;

b) at least one interface device for accessing said foreclosure real estate transaction coordination system, each interface device associated with a party to said foreclosure real estate transaction;

c) information relevant to said foreclosure real estate transaction being provided directly to said foreclosure real estate transaction coordination system by at least one information originating party originating said information;

d) said information being stored in said transaction database; and e) said information being accessible by at least one party having registered access to said foreclosure real estate transaction database using said at least one interface device to access said transaction coordination system, the system comprising software enabling the creation and transmission of jurisdictionally required notice of a foreclosure based upon input to the database by authorized sources, containing a database that can be modified and searched only by government authorities and a system administrator to indicate a change in legal status of real property or foreclosed real property already in the data base.

2. A foreclosure real estate coordination process for coordinating data and providing information to an external subscriber to the system, the data and information in a data base relating to at least one foreclosure real estate transaction, said system comprising:

a) a centralized transaction coordination system for accessing said foreclosure real estate transaction database;

b) at least one interface device for accessing said foreclosure real estate transaction coordination system, each interface device associated with a party to said foreclosure real estate transaction;

c) information relevant to said foreclosure real estate transaction being provided directly to said foreclosure real estate transaction coordination system by at least one information originating party originating said information;

d) said information being stored in said transaction database; and e) said information being accessible by at least one party having registered access to said foreclosure real estate transaction database using said at least one interface device to access said transaction coordination system, the system comprising software enabling the creation and transmission of jurisdictionally required notice of a foreclosure based upon input to the database by authorized sources, wherein read only access to the database is allowed for only subscribers to the system, and the system containing a database that can be modified and searched only by government authorities and a system administrator to indicate a change in legal status of real property or foreclosed real property already in the data base.

3. A foreclosure real estate coordination process for coordinating data and providing information to an external subscriber to the system, the data and information in a database relating to at least one foreclosure real estate transaction, said system comprising:

a) a centralized transaction coordination system for accessing said foreclosure real estate transaction database;

b) at least one interface device for accessing said foreclosure real estate transaction coordination system, each interface device associated with a party to said foreclosure real estate transaction;

c) information relevant to said foreclosure real estate transaction being provided directly to said foreclosure real estate transaction coordination system by at least one information originating party originating said information;

d) said information being stored in said transaction database; and e) said information being accessible by at least one party having registered access to said foreclosure real estate transaction database using said at least one interface device to access said transaction coordination system, the system comprising software enabling the creation and transmission of jurisdictionally required notice of a foreclosure based upon input to the database by authorized sources, wherein read only access to the database is allowed for only subscribers to the system, and wherein access to the data base is limited by member class in a subscription.

4. The system of claim 2 wherein access to the data base is limited by member class in a subscription.

* * * * *